US008216489B2

(12) United States Patent
Kobayashi

(10) Patent No.: US 8,216,489 B2
(45) Date of Patent: Jul. 10, 2012

(54) THREE-RING LIQUID CRYSTAL COMPOUND HAVING LATERAL FLUORINE, LIQUID CRYSTAL COMPOSITION, AND LIQUID CRYSTAL DISPLAY DEVICE

(75) Inventor: Masahide Kobayashi, Chiba (JP)

(73) Assignees: JNC Corporation, Tokyo (JP); Chisso Petrochemical Corporation, Tokyo (JP)

( * ) Notice: Subject to any disclaimer, the term of this patent is extended or adjusted under 35 U.S.C. 154(b) by 0 days.

(21) Appl. No.: 12/936,660

(22) PCT Filed: Mar. 25, 2009

(86) PCT No.: PCT/JP2009/055920

§ 371 (c)(1),
(2), (4) Date: Oct. 6, 2010

(87) PCT Pub. No.: WO2009/125668

PCT Pub. Date: Oct. 15, 2009

(65) Prior Publication Data

US 2011/0037024 A1 Feb. 17, 2011

(30) Foreign Application Priority Data

Apr. 9, 2008 (JP) ................................ 2008-101474

(51) Int. Cl.
*C09K 19/00* (2006.01)
*C09K 19/06* (2006.01)
*C09K 19/52* (2006.01)

(52) U.S. Cl. ......... 252/299.63; 252/299.01; 252/299.61; 252/299.62; 252/299.6; 252/299.64; 252/299.65; 430/20; 428/1.1; 349/1; 349/56; 349/182

(58) Field of Classification Search ....................... None
See application file for complete search history.

(56) References Cited

U.S. PATENT DOCUMENTS

| | | | | |
|---|---|---|---|---|
| 6,555,185 | B2 * | 4/2003 | Kondou et al. | 428/1.1 |
| 6,596,349 | B2 * | 7/2003 | Kondou et al. | 428/1.1 |
| 7,211,302 | B2 * | 5/2007 | Manabe et al. | 428/1.1 |
| 7,678,431 | B2 * | 3/2010 | Manabe et al. | 428/1.1 |

FOREIGN PATENT DOCUMENTS

| | | |
|---|---|---|
| JP | 11-116512 | 4/1999 |
| WO | 89/02425 | 3/1989 |
| WO | 89/06678 | 7/1989 |
| WO | 89/08633 | 9/1989 |

* cited by examiner

*Primary Examiner* — Geraldina Visconti
(74) *Attorney, Agent, or Firm* — J.C. Patents

(57) ABSTRACT

The invention provides a liquid crystal compound represented by the following formula having stability to heat, light and so forth, a wide temperature range of a nematic phase, a small viscosity, a large optical anisotropy and a suitable elastic constant $K_{33}$ ($K_{33}$: bend elastic constant), and further having a suitable and negative dielectric anisotropy and an excellent compatibility with other liquid crystal compounds, and provides a liquid crystal composition including the compound, (a-1)

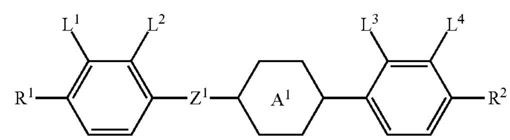

wherein $R^1$ and $R^2$ are hydrogen, alkyl or the like, ring $A^1$ is trans-1,4-cyclohexylene, 1,4-phenylene or the like, $L^1$ to $L^4$ are hydrogen or fluorine, and at least three of them are fluorine; when the ring $A^1$ is trans-1,4-cyclohexylene or the like, $Z^1$ is a single bond, —$(CH_2)_2$— or the like, when ring $A^1$ is 1,4-phenylene, $Z^1$ is —$(CH_2)_2$— or the like.

16 Claims, No Drawings

THREE-RING LIQUID CRYSTAL COMPOUND HAVING LATERAL FLUORINE, LIQUID CRYSTAL COMPOSITION, AND LIQUID CRYSTAL DISPLAY DEVICE

BACKGROUND OF THE INVENTION

1. Field of the Invention

The invention relates to a liquid crystal compound, a liquid crystal composition, and a liquid crystal display device. The invention relates more specifically to a fluorobenzene derivative having fluorine at a lateral position, which is a liquid crystal compound, a liquid crystal composition with a nematic phase comprising this compound, and a liquid crystal display device comprising this composition.

2. Description of Related Art

A liquid crystal display device typified by a liquid crystal display panel, a liquid crystal display module and so forth utilizes optical anisotropy, dielectric anisotropy and so forth which are possessed by a liquid crystal compound (in this invention a liquid crystal compound means a generic term for a compound having a nematic phase, a smectic phase and so forth, and a compound having no liquid crystal phases but useful as a component of a liquid crystal composition.). As operating modes of this liquid crystal display device, a variety of modes are known, such as PC (phase change), TN (twisted nematic), STN (super twisted nematic), BTN (bistable twisted nematic), ECB (electrically controlled birefringence), OCB (optically compensated bend), IPS (in-plane switching) and VA (vertical alignment) modes.

It is known that among these operating modes, the ECB mode, the IPS mode, the VA mode and so forth are utilizing a homeotropic property of liquid crystal molecules, and that a limited-viewing angle which is a disadvantage of conventional display modes such as the TN and STN modes can be improved especially by use of the IPS and VA modes.

A large number of liquid crystal compounds in which hydrogen on the benzene-ring is replaced by fluorine have been examined conventionally as components for a liquid crystal composition having negative dielectric anisotropy which is useable to the liquid crystal display device with these operating modes (for example, refer to the patent documents Nos. 1 to 4.).

For example, the compounds (A) and (B) in which hydrogen on the benzene ring is replaced by fluorine have been described (refer to the patent documents Nos. 1 and 2). However, such compounds do not have a large negative dielectric anisotropy.

The terphenyl compounds (C) having fluorine at a lateral position is described (refer to the patent document No. 3). However, this compound has a high melting point and a poor compatibility.

The compound (D) having an ester bonding group and a lateral fluorine is described (refer to the patent document No. 4). However, the compound (D) does not have a large negative dielectric anisotropy.

(A)

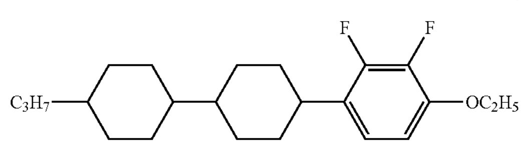

-continued (B)

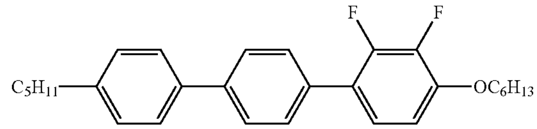

(C)

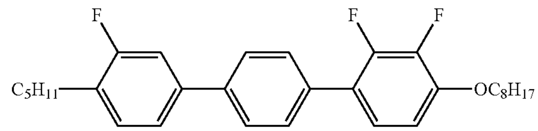

(D)

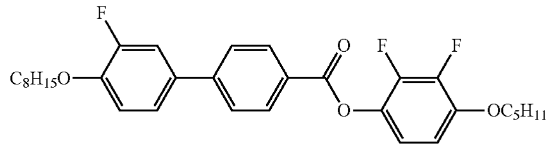

The patent documents cited herein are No. 1: JP H02-503441 A (1990); No. 2: WO 1989/02425 A; No. 3: JP H11-116512 A (1999); and No. 4: WO 1989/06678 A.

SUBJECTS TO BE SOLVED BY THE INVENTION

In view of the circumstances described above, even liquid crystal display devices by means of operating modes such as the IPS and VA modes are more problematic than CRTs for use of display devices, and, for example, an improvement of a response speed, an improvement of contrast and a decrease in driving voltage are required.

The display device operated by means of the IPS mode or VA mode described above is composed of a liquid crystal composition mostly having negative dielectric anisotropy. It is required for liquid crystal compounds contained in this liquid crystal composition to have characteristics shown in items (1) to (8) below in order to further improve these characteristics and so forth. That is to say:

(1) being chemically stable and physically stable, (2) having a high clearing point (transition temperature on a liquid crystal phase-an isotropic phase), (3) being low in a minimum temperature of liquid crystal phases (a nematic phase, a smectic phase and so forth), especially of the nematic phase, (4) being small in viscosity, (5) having a suitable optical anisotropy, (6) having a suitable and negative dielectric anisotropy, (7) having a suitable elastic constant $K_{33}$ ($K_{33}$: bend elastic constant), and (8) being excellent in compatibility with other liquid crystal compounds.

A voltage holding ratio can be increased by use of a composition containing a chemically and physically stable liquid crystal compound as described in item (1), for a liquid crystal display device.

The temperature range of a nematic phase is wide in a composition which contains a liquid crystal compound having a high clearing point or a low minimum temperature of liquid crystal phases as described in items (2) and (3), and thus the device is usable in a wide temperature range.

Furthermore, when a composition containing a compound with a small viscosity as described in item (4) and a compound having a large elastic constant $K_{33}$ as described in item (7) are used for a display device, response speed can be improved, and in the case of a display device using a composition which contains a compound having a suitable optical anisotropy as described in item (5), an improvement of the contrast in a display device can be expected. Optical anisotropy is required in a range of small to large values according to the design of a device. Recently, a method for improving the response speed by means of a smaller cell thickness has been investigated, whereby a liquid crystal composition having a large optical anisotropy has also been required.

Moreover, when a liquid crystal compound has a large negative dielectric anisotropy, the threshold voltage of the liquid crystal composition containing this compound can be decreased. Hence, the driving voltage of a display device can be decreased and electric power consumption can also be decreased in the case of a display device using a composition containing a compound which has a suitable and negative dielectric anisotropy as described in item (6). Further, the driving voltage of a display device can be decreased and the electric power consumption can also decreased by use of a composition containing a compound with a small elastic constant $K_{33}$ as described in item (7).

The liquid crystal compound is generally used as a composition prepared by being mixed with many other liquid crystal compounds in order to exhibit characteristics which cannot be attained with a single compound. Accordingly, it is desirable that a liquid crystal compound used for a display device has an excellent compatibility with other liquid crystal compounds and so forth, as described in item (8). Since the display device may also be used in a wide temperature range including a lower temperature than the freezing point, a compound which exhibits an excellent compatibility even in a low temperature region may be desirable.

SUMMARY OF THE INVENTION

The first aim of the invention is to provide a liquid crystal compound having stability to heat, light and so forth, a nematic phase in a wide temperature range, a small viscosity, a large optical anisotropy and a suitable elastic constant $K_{33}$, and further having a suitable and negative dielectric anisotropy and an excellent compatibility with other liquid crystal compounds.

The second aim of the invention is to provide a liquid crystal composition comprising this compound and having stability to heat, light and so forth, a small viscosity, a large optical anisotropy, a suitable and negative dielectric anisotropy, a suitable elastic constant $K_{33}$ and a low threshold voltage, and further having a high maximum temperature of a nematic phase (phase-transition temperature on a nematic phase-an isotropic phase) and a low minimum temperature of the nematic phase.

The third aim of the invention is to provide a liquid crystal display device comprising the composition described above, and having a short response time, a small power consumption, a low driving voltage, a large contrast, and a wide temperature range in which the device can be used.

MEANS TO SOLVE THE SUBJECTS

The inventors have keenly studied in view of these subjects and thus found that a three-ring liquid crystal compound having fluorine at a lateral position, in a specific structure having phenylene in which hydrogen on the benzene ring is replaced by fluorine, has stability to heat, light and so forth, a nematic phase in a wide temperature range, a small viscosity, a large optical anisotropy and a suitable elastic constant $K_{33}$, and further has a suitable and negative dielectric anisotropy and an excellent compatibility with other liquid crystal compounds. They also found that a liquid crystal composition comprising this compound has stability to heat, light and so forth, a small viscosity, a large optical anisotropy, a suitable elastic constant $K_{33}$, a suitable and negative dielectric anisotropy and a low threshold voltage, and further has a high maximum temperature of a nematic phase and a low minimum temperature of the nematic phase. They further found that a liquid crystal display device comprising this composition has a short response time, a small electric power consumption, a small driving voltage, a large contrast ratio, and a wide temperature range in which the device can be used. On the basis of the above findings, the invention has been completed.

The invention includes items 1 to 16 described below.

Item 1. A liquid crystal compound represented by formula (a-1):

(a-1)

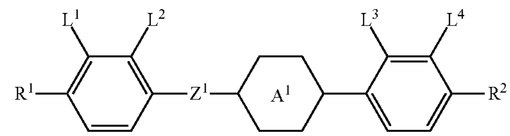

wherein $R^1$ and $R^2$ are each independently hydrogen, alkyl having 1 to 10 carbons, alkenyl having 2 to 10 carbons, alkoxy having 1 to 9 carbons, alkoxyalkyl having 2 to 9 carbons or alkenyloxy having 2 to 9 carbons;

ring $A^1$ is trans-1,4-cyclohexylene, 1,4-cyclohexenylene, 1,4-phenylene, tetrahydropyran-2,5-diyl, 1,3-dioxane-2,5-diyl, pyrimidine-2,5-diyl or pyridine-2,5-diyl;

$L^1$, $L^2$, $L^3$ and $L^4$ are each independently hydrogen or fluorine, and at least three of them are fluorine; and $Z^1$ is a single bond, —$(CH_2)_2$—, —CH═CH—, —$CH_2O$— or —$OCH_2$— when ring $A^1$ is trans-1,4-cyclohexylene, 1,4-cyclohexenylene, tetrahydropyran-2,5-diyl, 1,3-dioxane-2,5-diyl, pyrimidine-2,5-diyl or pyridine-2,5-diyl, and $Z^1$ is —$(CH_2)_2$—, —CH═CH—, —$CH_2O$— or —$OCH_2$— when ring $A^1$ is 1,4-phenylene.

Item 2. The compound according to item 1, wherein in formula (a-1), $R^1$ and $R^2$ are each independently alkyl having 1 to 10 carbons, alkenyl having 2 to 10 carbons, alkoxy having 1 to 9 carbons, alkoxyalkyl having 2 to 9 carbons or alkenyloxy having 2 to 9 carbons;

ring $A^1$ is trans-1,4-cyclohexylene, 1,4-cyclohexenylene, tetrahydropyran-2,5-diyl, 1,3-dioxane-2,5-diyl, pyrimidine-2,5-diyl or pyridine-2,5-diyl; and $Z^1$ is a single bond, —$(CH_2)_2$—, —CH═CH—, —$CH_2O$— or —$OCH_2$—.

Item 3. The compound according to item 1, wherein in formula (a-1), $R^1$ and $R^2$ are each independently alkyl having 1 to 10 carbons, alkenyl having 2 to 10 carbons, alkoxy having 1 to 9 carbons, alkoxyalkyl having 2 to 9 carbons or alkenyloxy having 2 to 9 carbons;

ring $A^1$ is 1,4-phenylene; and $Z^1$ is —$(CH_2)_2$—, —CH═CH—, —$CH_2O$— or —$OCH_2$—.

Item 4. The compound according to item 2, wherein in formula (a-1), $R^1$ and $R^2$ are each independently alkyl having 1 to 10 carbons, alkenyl having 2 to 10 carbons, alkoxy having 1 to 9 carbons, alkoxyalkyl having 2 to 9 carbons or alkenyloxy having 2 to 9 carbons;

ring $A^1$ is trans-1,4-cyclohexylene, 1,4-cyclohexenylene, tetrahydropyran-2,5-diyl or pyridine-2,5-diyl; and $Z^1$ is a single bond, —$(CH_2)_2$—, —CH═CH—, —$CH_2O$— or —$OCH_2$—.

Item 5. The compound according to item 4, wherein in formula (a-1), $R^1$ and $R^2$ are each independently alkyl having 1 to 10 carbons, alkenyl having 2 to 10 carbons, alkoxy having 1 to 9 carbons, alkoxyalkyl having 2 to 9 carbons or alkenyloxy having 2 to 9 carbons;

ring $A^1$ is trans-1,4-cyclohexylene, 1,4-cyclohexenylene or tetrahydropyran-2,5-diyl; and $Z^1$ is a single bond, —$(CH_2)_2$—, —CH═CH—, —$CH_2O$— or —$OCH_2$—.

Item 6. The compound according to item 1, wherein in formula (a-1), $R^1$ and $R^2$ are each independently alkyl having 1 to 10 carbons, alkenyl having 2 to 10 carbons, alkoxy having 1 to 9 carbons, alkoxyalkyl having 2 to 9 carbons or alkenyloxy having 2 to 9 carbons; and ring $A^1$ is trans-1,4-cyclohexylene.

Item 7. The compound according to item 2, wherein the compound is represented by formula (a-2) or (a-3):

(a-2)

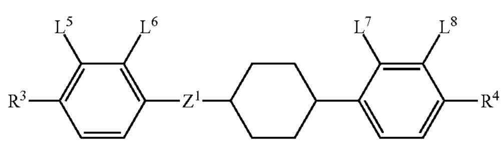

(a-3)

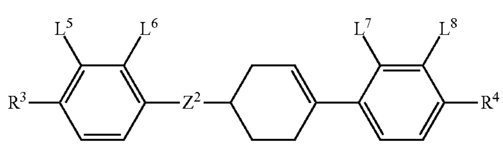

wherein, $R^3$ and $R^4$ are each independently alkyl having 1 to 10 carbons, alkenyl having 2 to 10 carbons, alkoxy having 1 to 9 carbons, alkoxyalkyl having 2 to 9 carbons or alkenyloxy having 2 to 9 carbons;

$L^5$, $L^6$, $L^7$ and $L^8$ are each independently hydrogen or fluorine, and at least three of them are fluorine; and $Z^2$ is a single bond, —$(CH_2)_2$—, —CH═CH—, —$CH_2O$— or —$OCH_2$—.

Item 8. The compound according to item 1, wherein the compound is represented by any one of formulas (a-4) to (a-13):

(a-4)

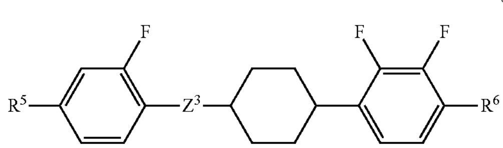

-continued (a-5)

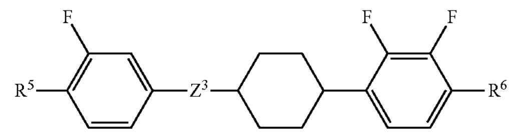

(a-6)

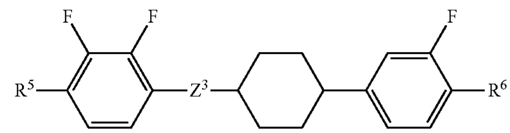

(a-7)

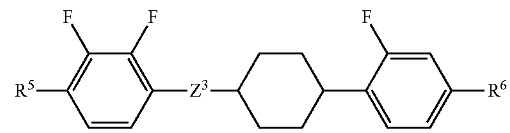

(a-8)

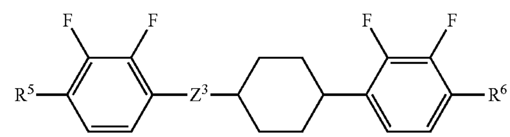

(a-9)

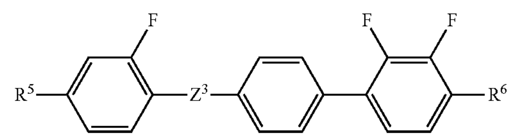

(a-10)

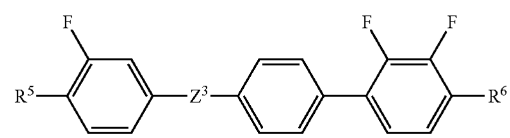

(a-11)

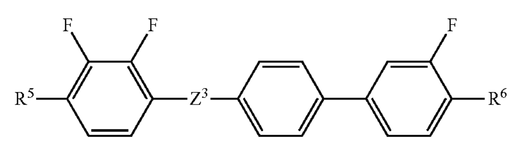

(a-12)

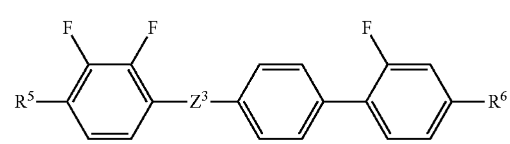

(a-13)

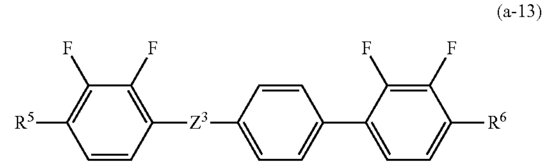

wherein $R^3$ and $R^4$ are each independently alkyl having 1 to 10 carbons, alkenyl having 2 to 10 carbons, alkoxy having 1 to 9 carbons, alkoxyalkyl having 2 to 9 carbons or alkenyloxy having 2 to 9 carbons; and $Z^3$ is —$(CH_2)_2$—, —CH═CH—, —$CH_2O$— or —$OCH_2$—.

Item 9. The compound according to item 7, wherein in formulas (a-4) to (a-13), $Z^3$ is —CH═CH—.

Item 10. The compound according to item 7, wherein in formulas (a-4) to (a-13), $Z^3$ is —$CH_2O$—.

Item 11. The compound according to item 7, wherein in formulas (a-4) to (a-13), $Z^3$ is —$OCH_2$—.

Item 12. The compound according to item 7, wherein in formulas (a-4) to (a-13), $Z^3$ is —$(CH_2)_2$—.

Item 13. A liquid crystal composition which has negative dielectric anisotropy, comprising a first component which is at least one compound selected from compounds represented by formula (a-1) according to any one of items 1 to 6, or by formula (a-2) or (a-3) according to item 7, and a second component which is at least one compound selected from the group of compounds represented by formulas (e-1) to (e-3):

(e-1)

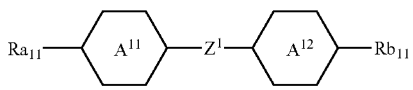

(e-2)

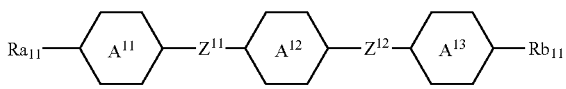

(e-3)

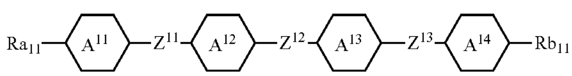

wherein $Ra_{11}$ and $Rb_{11}$ are each independently alkyl having 1 to 10 carbons, and in the alkyl, —$CH_2$— may be nonadjacently replaced by —O—, and —$(CH_2)_2$— may be nonadjacently replaced by —CH═CH—, and hydrogen may be replaced by fluorine;

ring $A^{11}$, ring $A^{12}$, ring $A^{13}$ and ring $A^{14}$ are each independently trans-1,4-cyclohexylene, 1,4-phenylene, 2-fluoro-1,4-phenylene, 3-fluoro-1,4-phenylene, pyrimidine-2,5-diyl, 1,3-dioxane-2,5-diyl or tetrahydropyran-2,5-diyl; and $Z^{11}$, $Z^{12}$ and $Z^{13}$ are each independently a single bond, —$CH_2$—$CH_2$—, —CH═CH—, —COO— or —$CH_2O$—.

Item 14. A liquid crystal composition which has negative dielectric anisotropy, comprising a first component which is at least one compound selected from the group of compounds represented by formulas (a-4) to (a-13) according to any one of items 8 to 12, and a second component which is at least one compound selected from the group of compounds represented by formulas (e-1) to (e-3) according to item 13.

Item 15. The liquid crystal composition according to item 13 or 14, wherein the content ratio of the first component is in the range of 5% to 60% by weight and the content ratio of the second component is in the range of 40% to 95% by weight, based on the total weight of the liquid crystal composition.

Item 16. The liquid crystal composition according to item 13 or 14, further comprising a third component which is at least one compound selected from the group of compounds represented by formulas (g-1) to (g-6), in addition to the first and second components:

(g-1)

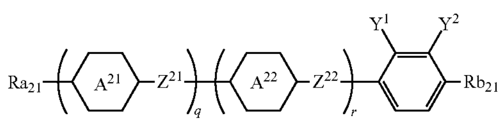

(g-2)

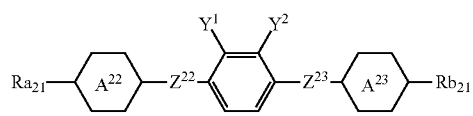

(g-3)

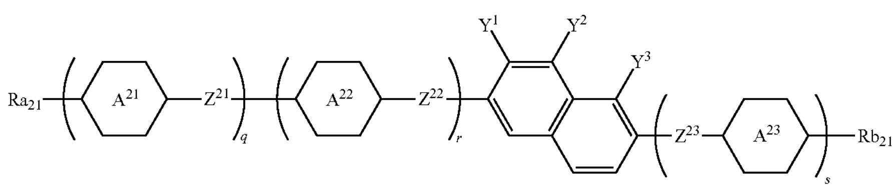

(g-4)

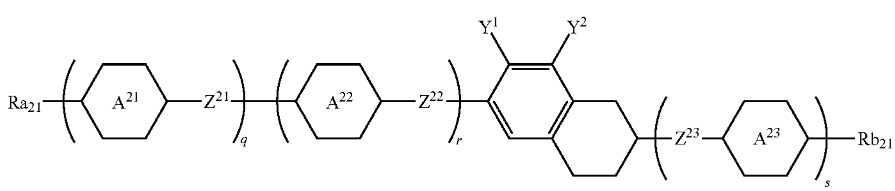

(g-5)

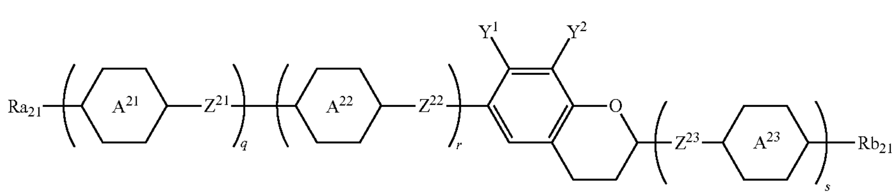

-continued (g-6)

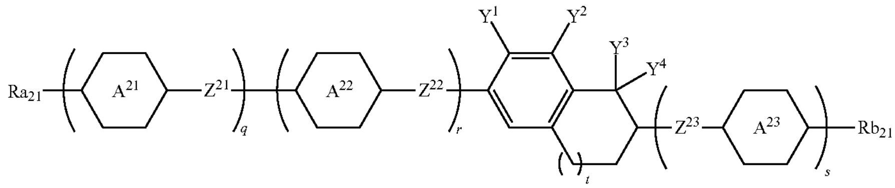

wherein $Ra_{21}$ and $Rb_{21}$ are each independently hydrogen or alkyl having 1 to 10 carbons, and in the alkyl, $—CH_2—$ may be nonadjacently replaced by —O—, and $—(CH_2)_2—$ may be nonadjacently replaced by —CH═CH—, and hydrogen may be replaced by fluorine;

ring $A^{21}$, ring $A^{22}$ and ring $A^{23}$ are each independently trans-1,4-cyclohexylene, 1,4-phenylene, 2-fluoro-1,4-phenylene, 3-fluoro-1,4-phenylene, 2,3-difluoro-1,4-phenylene, pyrimidine-2,5-diyl, 1,3-dioxane-2,5-diyl or tetrahydropyran-2,5-diyl;

$Z^{21}$, $Z^{22}$ and $Z^{23}$ are each independently a single bond, $—CH_2—CH_2—$, —CH═CH—, —C≡C—, $—OCF_2—$, $—CF_2O—$, $—OCF_2CH_2CH_2—$, $—CH_2CH_2CF_2O—$, —COO—, —COO—, $—OCH_2—$ or $—CH_2O—$;

$Y^1$, $Y^2$, $Y^3$ and $Y^4$ are each independently fluorine or chlorine;

q, r and s are each independently 0, 1 or 2, q+r is 1 or 2, and q+r+s is 1, 2 or 3; and t is 0, 1 or 2.

Item 17. The liquid crystal composition according to item 16, wherein the third component is at least one compound selected from the group of compounds represented by formulas (h-1) to (h-7):

(h-1)

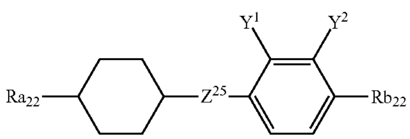

(h-2)

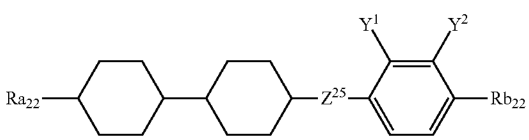

(h-3)

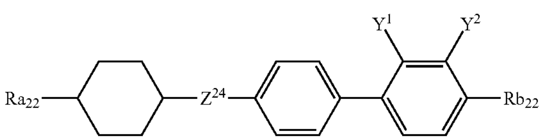

(h-4)

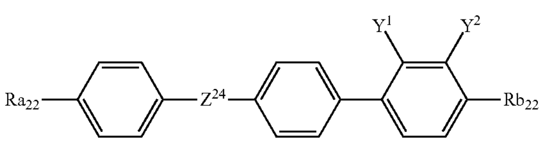

-continued (h-5)

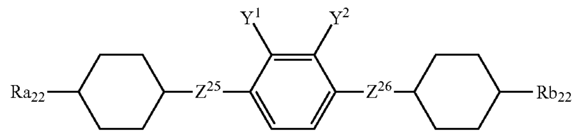

(h-6)

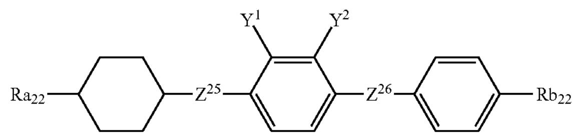

(h-7)

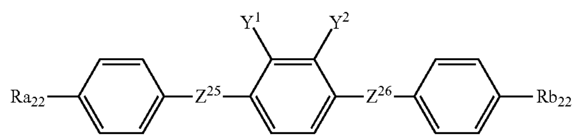

wherein $Ra_{22}$ and $Rb_{22}$ are each independently straight-chain alkyl having 1 to 8 carbons, straight-chain alkenyl having 2 to 8 carbons or straight-chain alkoxy having 1 to 7 carbons;

$Z^{24}$, $Z^{25}$ and $Z^{26}$ are each independently a single bond, $—CH_2CH_2—$, $—CH_2O—$ or $—OCH_2—$; and $Y^1$ and $Y^2$ are simultaneously fluorine, or one of $Y^1$ and $Y^2$ is fluorine and the other is chlorine.

Item 18. A liquid crystal composition which has negative dielectric anisotropy, comprising a first component which is at least one compound selected from the compounds represented by formulas (a-4) to (a-13) according to any one of items 8 to 12, a second component which is at least one compound selected from the group of compounds represented by formulas (e-1) to (e-3) according to item 13, and a third component which is at least one compound selected from the group of compounds represented by formulas (h-1) to (h-7) according to item 17.

Item 19. The liquid crystal composition according to any one of items 16 to 18, wherein the content ratio of the first component is in the range of 5% to 60% by weight, the content ratio of the second component is in the range of 20% to 75% by weight, and the content ratio of the third component is in the range of 20% to 75% by weight, based on the total weight of the liquid crystal composition.

Item 20. A liquid crystal display device comprising the liquid crystal composition according to any one of items 13 to 19.

Item 21. The liquid crystal display device according to item 20, wherein the operating mode thereof is a VA mode or an IPS mode, and the driving mode thereof is an active matrix mode.

EFFECT OF THE INVENTION

The liquid crystal compound of the invention has stability to heat, light and so forth, a nematic phase in a wide temperature range, a small viscosity, a large optical anisotropy and a suitable elastic constant $K_{33}$ ($K_{33}$: bend elastic constant), and further has a suitable and negative dielectric anisotropy and an excellent compatibility with other liquid crystal compounds. Moreover, the liquid crystal compound of the invention is quite excellent in the increasing tendency of the optical anisotropy without decreasing the maximum temperature of a nematic phase or increasing the viscosity.

The liquid crystal composition of the invention has a small viscosity, a large optical anisotropy, a suitable elastic constant $K_{33}$, a suitable and negative dielectric anisotropy and a low threshold voltage, and further has a high maximum temperature of a nematic phase and a low minimum temperature of the nematic phase. Since the liquid crystal composition of the invention has a large optical anisotropy, it is particularly effective in a device which requires a large optical anisotropy.

The liquid crystal display device of the invention is characterized by comprising this liquid crystal composition, and consequently has a short response time, a small power consumption, a small driving voltage, a large contrast ratio and a wide temperature range in which the device can be used, and can be suitably used as a liquid crystal display device with a display mode such as a PC, TN, STN, ECB, OCB, IPS or VA mode. It can be suitably used especially as a liquid crystal display device with the IPS mode or the VA mode.

DESCRIPTION OF THE EMBODIMENTS

Hereinafter, the invention is explained in more detail.

In the following description, the amount of a compound which is expressed in percentage means the weight percentage (% by weight) based on the total weight of the composition unless otherwise noted.

[Liquid Crystal Compound (a)]

The liquid crystal compound of the invention has a structure represented by formula (a-1) (hereinafter the compound is also referred to as "the compound (a-1)").

(a-1)

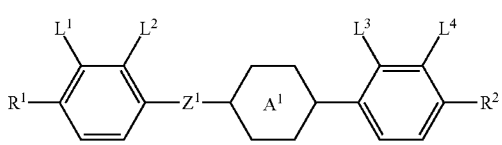

In formula (a-1), $R^1$ and $R^2$ are each independently hydrogen, alkyl having 1 to 10 carbons, alkenyl having 2 to 10 carbons, alkoxy having 1 to 9 carbons, alkoxyalkyl having 2 to 9 carbons or alkenyloxy having 2 to 9 carbons.

Ring $A^1$ is trans-1,4-cyclohexylene, 1,4-cyclohexenylene, 1,4-phenylene, tetrahydropyran-2,5-diyl, 1,3-dioxane-2,5-diyl, pyrimidine-2,5-diyl or pyridine-2,5-diyl.

$L^1$, $L^2$, $L^3$ and $L^4$ are each independently hydrogen or fluorine, and at least three of them are fluorine. $Z^1$ is a single bond, $—(CH_2)_2—$, $—CH{=}CH—$, $—CH_2O—$ or $—OCH_2—$ when ring $A^1$ is trans-1,4-cyclohexylene, 1,4-cyclohexenylene, tetrahydropyran-2,5-diyl, 1,3-dioxane-2,5-diyl, pyrimidine-2,5-diyl or pyridine-2,5-diyl, and $Z^1$ is $—(CH_2)_2—$, $—CH{=}CH—$, $—CH_2O—$ or $—OCH_2—$ when ring $A^1$ is 1,4-phenylene.

The compound (a-1), as described above, has 1,4-phenylene in which hydrogen at the 2- or 3-position is replaced by fluorine, and 1,4-phenylene in which hydrogen at 2- and 3-positions are replaced by fluorine. The compound (a-1) exhibits a small viscosity, a suitable optical anisotropy, a suitable elastic constant $K_{33}$, a large negative dielectric anisotropy and an excellent compatibility with other liquid crystal compounds because of having such a structure. In particular, the compound (a-1) is quite excellent in view of a large negative optical anisotropy, without decreasing the maximum temperature of a nematic phase and without increasing the viscosity.

In the formula, $R^1$ and $R^2$ are hydrogen, alkyl having 1 to 10 carbons, alkenyl having 2 to 10 carbons, alkoxy having 1 to 9 carbons, alkoxyalkyl having 2 to 9 carbons or alkenyloxy having 2 to 9 carbons, and are, for example, $CH_3(CH_2)_3—$, $—CH_2—$, $CH_3(CH_2)_2O—$, $CH_3—O—(CH_2)_2—$, $CH_3—O—CH_2—O—$, $H_2C{=}CH—(CH_2)_2—$, $CH_3—CH{=}CH—CH_2—$ or $CH_3—CH{=}CH—O—$.

However, a group such as $CH_3—O—O—CH_2—$ in which oxygen and another oxygen are adjacent and a group such as $CH_3—CH{=}CH—CH{=}CH—$ in which double bond parts are adjacent are undesirable in consideration for the stability of the compound.

More specifically, $R^1$ and $R^2$ include hydrogen, alkyl, alkoxy, alkoxyalkyl, alkenyl and alkenyloxy.

It is desirable that the chain of the carbon-carbon bonds in these groups is straight. If the chain of carbon-carbon bonds is straight, the temperature ranges of liquid crystal phases can be increased and the viscosity can be decreased. When either $R^1$ or $R^2$ is an optically active group, the compound is useful as a chiral dopant, and a reverse twist domain which will occur in a liquid crystal display device can be prevented by adding the compound to a liquid crystal composition.

The $R^1$ and $R^2$ are preferably alkyl, alkoxy, alkoxyalkyl and alkenyl, and more preferably alkyl, alkoxy and alkenyl.

If the $R^1$ and $R^2$ are alkyl, alkoxy and alkenyl, the temperature ranges of liquid crystal phases on the liquid crystal compounds can be increased.

A desirable configuration of $—CH{=}CH—$ in the alkenyl depends on the position of a double bond in the alkenyl.

A trans-configuration is desirable in the alkenyl having a double bond in an odd-numbered position, such as $—CH{=}CHCH_3$, $—CH{=}CHC_2H_5$, $—CH{=}CHC_3H_7$, $—CH{=}CHC_4H_9$, $—C_2H_4—CH{=}CHCH_3$ and $—C_2H_4—CH{=}CHC_2H_5$.

On the other hand, a cis-configuration is desirable in the alkenyl having a double bond at an even-numbered position, such as $—CH_2CH{=}CHCH_3$, $—CH_2CH{=}CHC_2H_5$ and $—CH_2CH{=}CHC_3H_7$. The alkenyl compound bearing the desirable configuration described above has a wide temperature range of liquid crystal phases, a large elastic constant ratio $K_{33}/K_{11}$ ($K_{33}$: bend elastic constant, $K_{11}$: spray elastic constant) and a decreased viscosity. Furthermore, if this compound is added to a liquid crystal composition, the maximum temperature ($T_{NI}$) of a nematic phase can be increased.

Specific examples of the alkyl include $—CH_3$, $—C_2H_5$, $—C_3H_7$, $—C_4H_9$, $—C_5H_{11}$, $—C_6H_{13}$, $—C_7H_{15}$, $—C_8H_{17}$, $—C_9H_{19}$ and $—C_{10}H_{21}$;

specific examples of the alkoxy include $—OCH_3$, $—OC_2H_5$, $—OC_3H_7$, $—OC_4H_9$, $—OC_5H_{11}$, $—OC_6H_{13}$, $—OC_7H_{15}$, $—OC_8H_{17}$ and $—OC_9H_{19}$;

specific examples of the alkoxyalkyl include $—CH_2OCH_3$, $—CH_2OC_2H_5$, $—CH_2OC_3H_7$, $—(CH_2)_2OCH_3$, $—(CH_2)_2OC_2H_5$, $—(CH_2)_2OC_3H_7$, $—(CH_2)_3OCH_3$, $—(CH_2)_4OCH_3$ and $—(CH_2)_5OCH_3$;

specific examples of the alkenyl include $—CH{=}CH_2$, $—CH{=}CHCH_3$, $—CH_2CH{=}CH_2$, $—CH{=}CHC_2H_5$, $—CH_2CH{=}CHCH_3$, $—(CH_2)_2CH{=}CH_2$, $—CH{=}CHC_3H_7$, $—CH_2CH{=}CHC_2H_5$, $—(CH_2)_2CH{=}CHCH_3$ and $—(CH_2)_3CH{=}CH_2$; and specific examples of the alkenyloxy include $—OCH_2CH═CH_2$, $—OCH_2CH═CHCH_3$ and $—OCH_2CH═CHC_2H_5$.

Thus, among the specific examples, $R^1$ and $R^2$ are preferably $—CH_3$, $—C_2H_5$, $—C_3H_7$, $—C_4H_9$, $—C_5H_{11}$, $—OCH_3$, $—OC_2H_5$, $—OC_3H_7$, $—OC_4H_9$, $—OC_5H_{11}$, $—CH_2OCH_3$, $—(CH_2)_2OCH_3—(CH_2)_3OCH_3$, $—CH_2CH═CH_2$, $—CH_2CH═CHCH_3$, $—(CH_2)_2CH═CH_2$, $—CH_2CH═CHC_2H_5$, $—(CH_2)_2CH═CHCH_3$, $—(CH_2)_3CH═CH_2$, $—(CH_2)_3CH═CHCH_3$, $—(CH_2)_3CH═CHC_2H_5$, $—(CH_2)_3CH═CHC_3H_7$, $—OCH_2CH═CH_2$, $—OCH_2CH═CHCH_3$ and $—OCH_2CH═CHC_2H_5$, and more preferably $—CH_3$, $—C_2H_5$, $—C_3H_7$, $—OCH_3$, $—OC_2H_5$, $—OC_3H_7$, $—OC_4H_9—(CH_2)_2CH═CH_2$, $—(CH_2)_2CH═CHCH_3$ and $—(CH_2)_2CH═CHC_3H_7$.

The ring $A^1$ is trans-1,4-cyclohexylene, cyclohexene-1,4-diyl, trans-1,3-dioxane-2,5-diyl, trans-tetrahydropyran-2,5-diyl, pyrimidine-2,5-diyl or pyridine-2,5-diyl, and in these rings, hydrogen may be replaced by fluorine.

The ring $A^1$ is preferably 1,4-phenylene, trans-1,4-cyclohexylene, cyclohexene-1,4-diyl, trans-1,3-dioxane-2,5-diyl, trans-tetrahydropyran-2,5-diyl and pyridine-2,5-diyl.

Among these, the rings are more preferably 1,4-phenylene, trans-1,4-cyclohexylene and trans-tetrahydropyran-2,5-diyl, and most preferably trans-1,4-cyclohexylene.

In particular, the viscosity can be decreased if at least one of these rings is trans-1,4-cyclohexylene, and if this liquid crystal compound is added to a liquid crystal composition, the maximum temperature ($T_{NI}$) of a nematic phase can be increased.

$L^1$, $L^2$, $L^3$ and $L^4$ are each independently hydrogen or fluorine, and at least three of them are fluorine.

It is desirable that one of $L^1$ and $L^2$, or one of $L^3$ and $L^4$ is hydrogen and the other is fluorine in order to decrease the melting point of the compound. Furthermore, it is desirable that all of $L^1$ and $L^2$, or all of $L^3$ and $L^4$ are fluorine in order to increase the dielectric anisotropy of the compound.

$Z^1$ is a single bond, $—(CH_2)_2—$, $—CH═CH—$, $—CH_2O—$ or $—OCH_2—$.

The $Z^1$ is preferably a single bond, $—(CH_2)_2—$ or $—CH═CH—$, since the viscosity of the compound can be decreased.

The $Z^1$ is preferably a single bond, $—(CH_2)_2—$ and $—CH═CH—$, and more preferably a single bond and $—(CH_2)_2—$ in consideration for the stability of the compound.

When the $Z^1$ is $—CH═CH—$, the configuration of other groups bonded to the double bond is preferably trans. The temperature range of the liquid crystal phases of this liquid crystal compound can be increased due to such configuration, and if this liquid crystal compound is added to a liquid crystal composition, the maximum temperature ($T_{NI}$) of a nematic phase can be increased.

If the $Z^1$ contains $—CH═CH—$, the temperature range of liquid crystal phases can be increased, the elastic constant ratio $K_{33}/K_{11}$ ($K_{33}$: bend elastic constant, $K_{11}$: spray elastic constant) can be increased, and the viscosity of the compound can be decreased, and if this compound is added to a composition, the maximum temperature ($T_{NI}$) of a nematic phase can be increased.

Incidentally, the compound (a) may also contain isotopes such as $^2H$ (deuterium), $^{13}C$ and so forth in a larger amount than the amount of the natural abundance, since such isotopes do not make a large difference in physical properties of the compound.

In the compound (a), it is possible to adjust physical properties such as the dielectric anisotropy, to desired values by suitably selecting $R^1$, $R^2$, ring $A^1$ and $Z^1$.

Desirable compounds among the compounds (a-1) include the compounds (a-4) to (a-13).

(a-4)

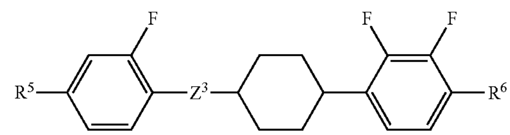

(a-5)

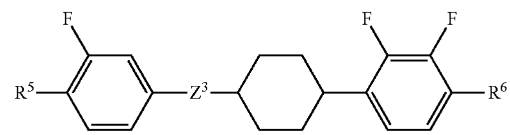

(a-6)

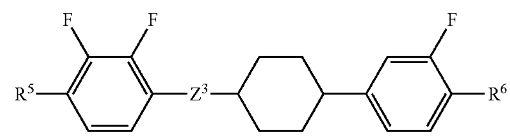

(a-7)

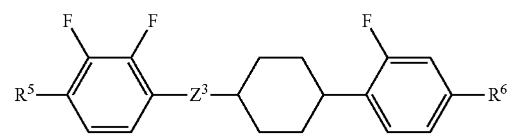

(a-8)

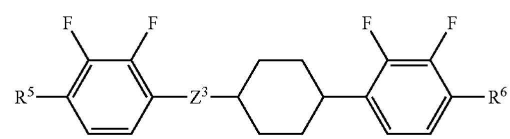

(a-9)

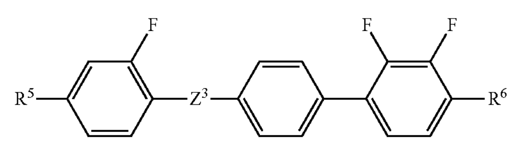

(a-10)

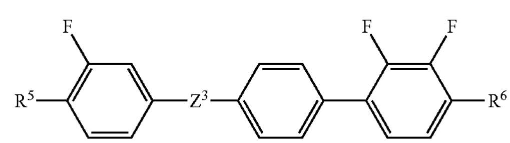

(a-11)

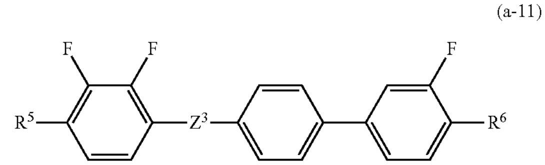

(a-12)

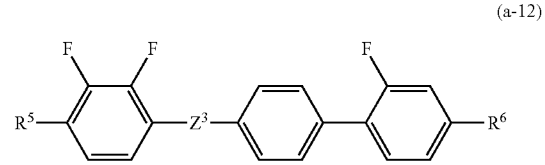

-continued (a-13)

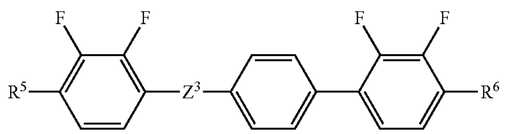

In the compounds (a-4) to (a-13), $R^5$ and $R^6$ are each independently alkyl having 1 to 10 carbons, alkenyl having 2 to 10 carbons, alkoxy having 1 to 9 carbons, alkoxyalkyl having 2 to 9 carbons or alkenyloxy having 2 to 9 carbons, and $Z^3$ is a single bond, —$(CH_2)_2$—, —CH═CH—, —$CH_2O$— or —$OCH_2$—.

The compounds (a-4) to (a-13) have a large negative dielectric anisotropy, stability to heat or light, a nematic phase in a wide temperature range, a suitable optical anisotropy and a suitable elastic constant $K_{33}$. Among these, the compound where $Z^3$ is —CH═CH— is desirable in view of a lower minimum temperature of liquid crystal phases and a smaller viscosity without decreasing mostly the maximum temperatures of nematic phases. Moreover, the compound where $Z^3$ is —$(CH_2)_2$— is more desirable in view of a lower minimum temperature of liquid crystal phases, a higher compatibility and a smaller viscosity. Furthermore, the compound where $Z^3$ is —$CH_2O$— or —$OCH_2$— is most desirable in view of a negatively larger dielectric anisotropy and a smaller viscosity.

When liquid crystal compounds have the structure represented by these compounds (a-4) to (a-13), they have a large negative dielectric anisotropy and a particularly excellent compatibility with other liquid crystal compounds. Furthermore, they have stability to heat, light and so forth, a small viscosity, a large optical anisotropy and a suitable elastic constant $K_{33}$. A liquid crystal composition comprising this compound (a-1) is stable under conditions in which a liquid crystal display device is usually used, and this compound does not deposit its crystals (or its smectic phase) even when the composition is kept at a low temperature.

Hence, the compound (a-1) is suitably applied to a liquid crystal composition used for liquid crystal display devices with display modes such as PC, TN, STN, ECB, OCB, IPS and VA, and is quite suitably applied to a liquid crystal composition used for liquid crystal display devices with display modes such as IPS and VA.

[Synthesis of Compound (a-1)]

The compound (a-1) can be synthesized by suitably combining techniques in synthetic organic chemistry. Methods of introducing objective terminal groups, rings and bonding groups into starting materials are described, for example, in ORGANIC SYNTHESES (John Wiley & Sons, Inc), ORGANIC REACTIONS (John Wiley & Sons, Inc), COMPREHENSIVE ORGANIC SYNTHESIS (Pergamon Press), NEW EXPERIMENTAL CHEMISTRY COURSE (Shin Jikken Kagaku Kouza, in a Japanese title) (Maruzen), and so forth.

<Formation of the Bonding Group $Z^1$>

One example of methods for forming the bonding group $Z^1$ is shown. Schemes for forming the bonding group are illustrated as follows. In the schemes, $MSG^1$ or $MSG^2$ is a monovalent organic group. A plurality of the $MSG^1$ (or $MSG^2$) used in the schemes may be identical or different. The compounds (1A) to (1E) correspond to the compound (a-1).

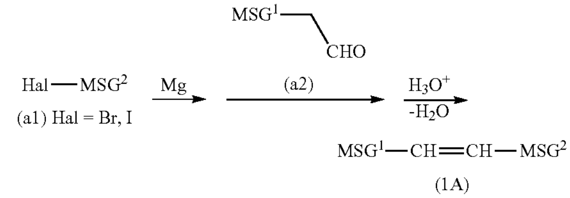

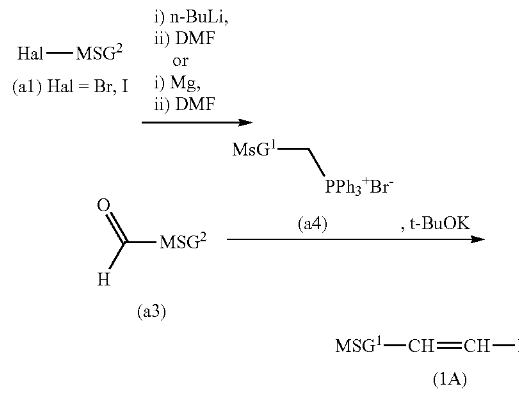

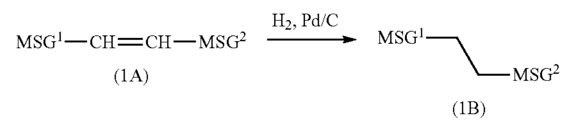

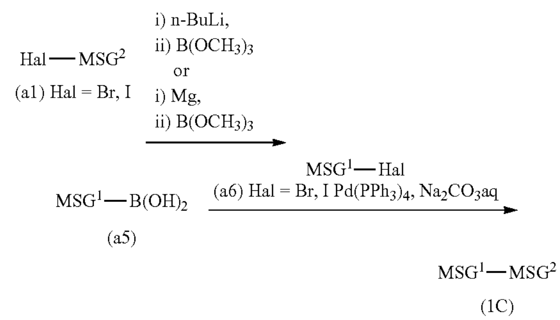

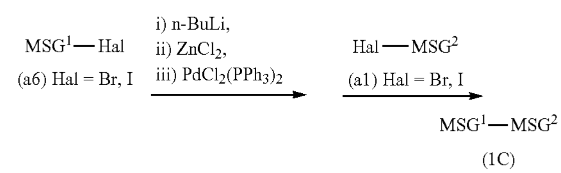

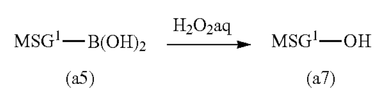

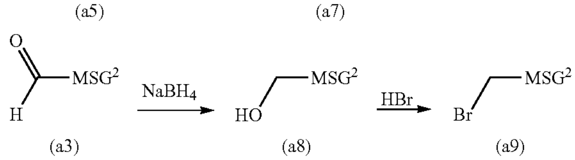

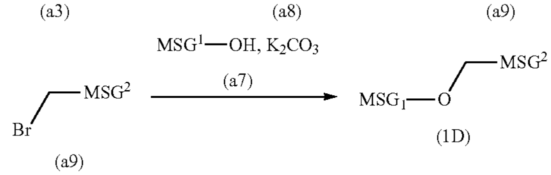

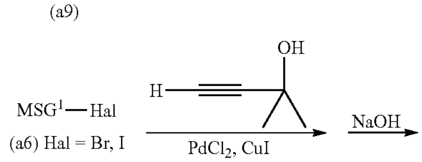

-continued

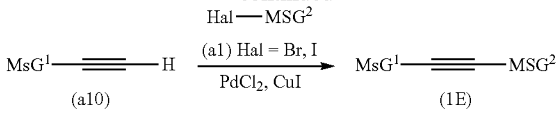

<Formation of Double Bonds>

A Grignard reagent is prepared by reacting the organohalogen compound (a1) having the monovalent organic group, $MSG^2$, with magnesium. A corresponding alcohol derivative is synthesized by reacting the Grignard reagent thus prepared or a lithium salt with the aldehyde derivative (a2). Then, the corresponding compound (1A) can be synthesized by dehydrating the alcohol derivative obtained, in the presence of an acid catalyst such as p-toluenesulfonic acid.

The organohalogen compound (a1) is treated with butyllithium or magnesium and then reacted with a formamide such as N,N-dimethylformamide (DMF), giving the aldehyde derivative (a3). The compound (1A) having a corresponding double bond can be synthesized by reacting the aldehyde (a3) obtained with phosphorus ylide that is obtained by the treatment of the phosphonium salt (a4) with a base such as potassium t-butoxide. Since a cis-isomer may be formed depending on reaction conditions, the cis-isomer is isomerized to a trans-isomer according to any known method as required.

<Formation of —$(CH_2)_2$—>

The compound (1B) is synthesized by hydrogenating the compound (1A) in the presence of a catalyst such as palladium on carbon (Pd/C).

<Formation of Single Bonds>

A Grignard reagent or a lithium salt is prepared by reacting the organohalogen compound (a1) with magnesium or butyllithium. The dihydroxyborane derivative (a5) is synthesized by reacting the Grignard reagent or the lithium salt prepared with a boric acid ester such as trimethyl borate, and then by hydrolyzing with an acid such as hydrochloric acid. The compound (1C) can be synthesized by reacting the dihydroxyborane derivative (a5) with the organohalogen compound (a6) in the presence of a catalyst, for example, composed of an aqueous carbonate solution and tetrakis(triphenylphosphine) palladium ($Pd(PPh_3)_4$).

The organohalogen compound (a6) having the monovalent organic group MSG' is reacted with butyllithium and then with zinc chloride, giving an intermediate. The compound (1C) can be synthesized by reacting the intermediate with the compound (a1), for example, in the presence of a catalyst of bistriphenylphosphinedichloropalladium ($Pd(PPh_3)_2Cl_2$).

<Formation of —$CH_2O$— or —$OCH_2$—>

The alcohol derivative (a7) is obtained by oxidizing the dihydroxyborane derivative (a5) with an oxidizing agent such as hydrogen peroxide. Separately, the alcohol derivative (a8) is obtained by reducing the aldehyde derivative (a3) with a reducing agent such as sodium borohydride. The organohalogen compound (a9) is obtained by halogenating the alcohol derivative (a8) obtained with hydrobromic acid or the like. The compound (1D) can be synthesized by reacting the alcohol derivative (a8) thus obtained with the organohalogen compound (a9) in the presence of potassium carbonate or the like.

<Formation of —C≡C—>

The compound (a10) is obtained by reacting the compound (a6) with 2-methyl-3-butyne-2-ol in the presence of a catalyst of dichloropalladium and copper halide, and then deprotecting the resulting product under a basic condition. The compound (1E) is synthesized by reacting the compound (a10) with the compound (a1) in the presence of a catalyst of dichloropalladium and copper halide.

<Formation of Ring $A^1$>

Starting materials are commercially available or methods for their syntheses are well known with regard to rings, such as trans-1,4-cyclohexylene, cyclohexene-1,4-diyl, 1,3-dioxane-2,5-diyl, tetrahydropyran-2,5-diyl, 1,4-phenylene, pyrimidine-2,5-diyl and pyridine-2,5-diyl.

[Method for Synthesizing Compound (a-1)]

The synthetic examples for the compound (a-1) are shown as follows.

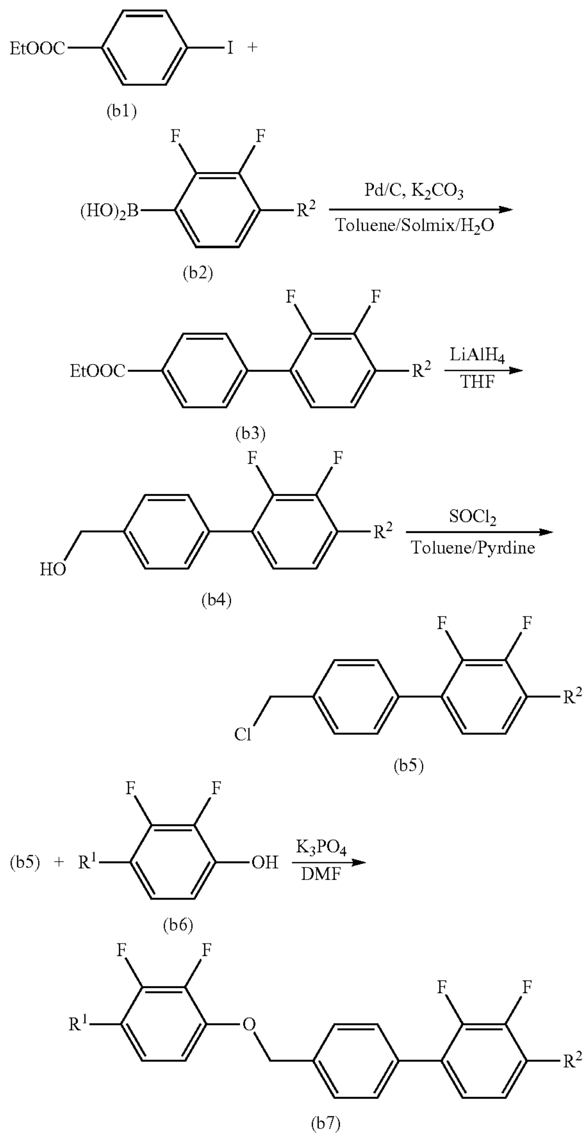

First, the compound (b3) is obtained by reacting ethyl 4-iodobenzoate (b1) with the dihydroxyborane derivative (b2) in the presence of a catalyst such as potassium carbonate and Pd/C. Subsequently, the compound (b4) is obtained by reducing the compound (b3) with lithium aluminum hydride or the like. Then, the compound (b5) is obtained by chlorination with thionyl chloride or the like. The compound (b7), which is one example of the compound (a-1), can be synthesized by etherifying the compound (b5) obtained by use of the above procedure with the phenol derivative (b6) in the presence of a base such as potassium carbonate.

[Liquid Crystal Compositions]

The liquid crystal composition of the invention is explained as follows. The liquid crystal composition is characterized by containing at least one compound (a-1), and the composition may contain two or more of the compounds (a-1), and may be composed of the liquid crystal compound (a-1) alone. When the liquid crystal composition is prepared, its components can also be selected, for example, by taking into consideration the dielectric anisotropy of the liquid crystal compound (a-1). The liquid crystal composition containing selected components has a small viscosity, a suitable and negative dielectric anisotropy, a suitable elastic constant $K_{33}$, a low threshold voltage, a high maximum temperature of a nematic phase (phase-transition temperature on a nematic phase-an isotropic phase) and a low minimum temperature of the nematic phase.

[Liquid Crystal Composition (1)]

It is desirable that the liquid crystal composition of the invention (hereinafter also referred to as the liquid crystal composition (1)) further comprises at least one liquid crystal compound selected from the group of compounds represented by formulas (e-1) to (e-3) as a second component (hereinafter also referred to as the compounds (e-1) to (e-3), respectively) in addition to the liquid crystal compound (a-1).

(e-1)

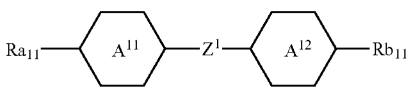

(e-2)

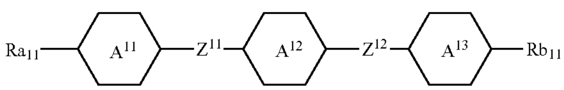

(e-3)

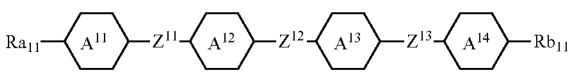

In formulas (e-1) to (e-3), $Ra_{11}$ and $Rb_{11}$ are each independently alkyl having 1 to 10 carbons, and in the alkyl, —$CH_2$— may be nonadjacently replaced by —O—, and —$(CH_2)_2$— may be nonadjacently replaced by —CH═CH—, and hydrogen may be replaced by fluorine.

In formulas (e-1) to (e-3), ring $A^{11}$, ring $A^{12}$, ring $A^{13}$ and ring $A^{14}$ are each independently trans-1,4-cyclohexylene, 1,4-phenylene, 2-fluoro-1,4-phenylene, 3-fluoro-1,4-phenylene, pyrimidine-2,5-diyl, 1,3-dioxane-2,5-diyl or tetrahydropyran-2,5-diyl.

In formulas (e-1) to (e-3), $Z^{11}$, $Z^{12}$ and $Z^{13}$ are each independently a single bond, —$CH_2$—$CH_2$—, —CH═CH—, —COO— or $CH_2$O—.

The viscosity of a liquid crystal composition can be decreased and the minimum temperature of a nematic phase can be decreased by adding a second component to the compound (a-1). Since the dielectric anisotropy of the compounds (e-1) to (e-3) are nearly 0 (zero), the dielectric anisotropy of the liquid crystal composition containing the compounds can be adjusted so as to approach 0 (zero).

The compound (e-1) or (e-2) is effective in decreasing the viscosity and increasing the voltage holding ratio of the liquid crystal composition comprising the compound. The compound (e-3) is effective in increasing the maximum temperature of a nematic phase and increasing the voltage holding ratio of the liquid crystal composition comprising the compound.

If two or more rings are trans-1,4-cyclohexylene in the ring A", ring $A^{12}$, ring $A^{13}$ and ring $A^{14}$, the maximum temperature of a nematic phase in the liquid crystal composition comprising the compound can be increased. If two or more rings are 1,4-phenylene, the optical anisotropy of the liquid crystal composition comprising the compound can be increased.

More desirable compounds in the second component are represented by formulas (2-1) to (2-74) (hereinafter also referred to as the compounds (2-1) to (2-74), respectively). In these compounds, $Ra_{11}$ and $Rb_{11}$ have the meanings identical to those described for the compounds (e-1) to (e-3).

(2-1)

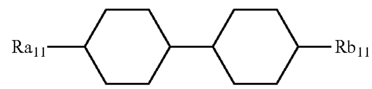

(2-2)

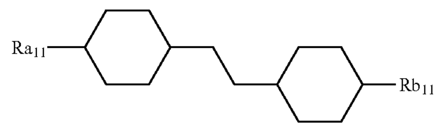

(2-3)

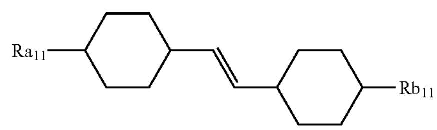

(2-4)

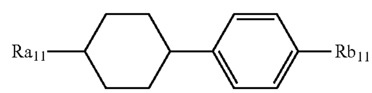

(2-5)

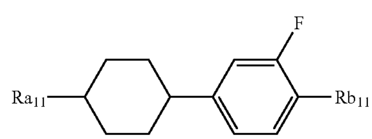

(2-6)

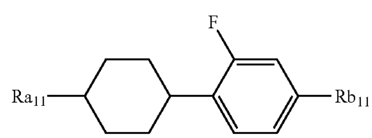

(2-7)

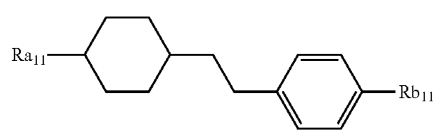

(2-8)

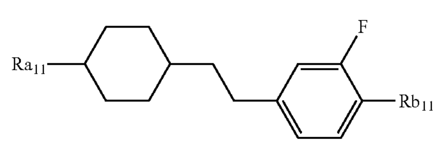

(2-9)

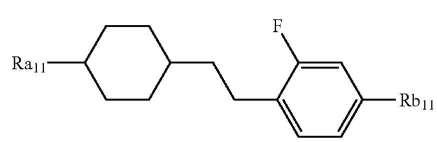

(2-10)

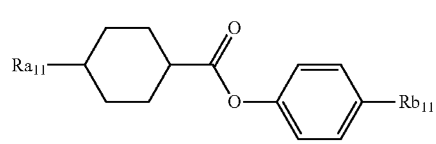

-continued
(2-11)
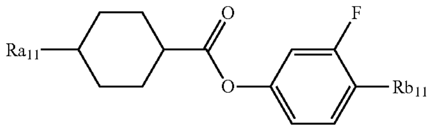
(2-12)
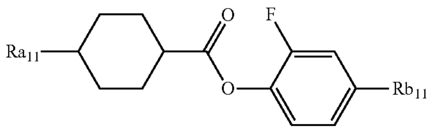
(2-13)
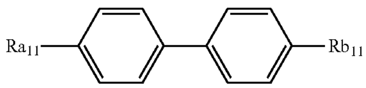
(2-14)
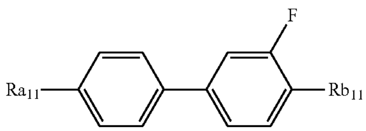
(2-15)
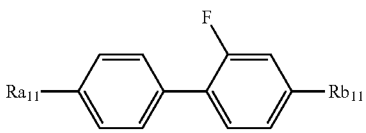
(2-16)
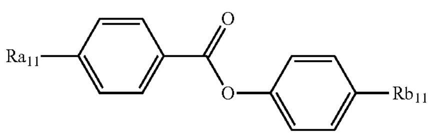
(2-17)
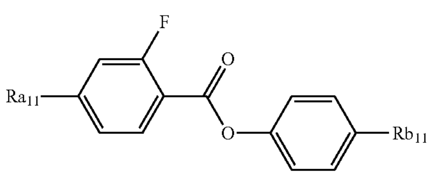
(2-18)
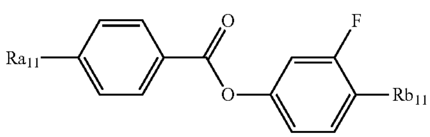
(2-19)
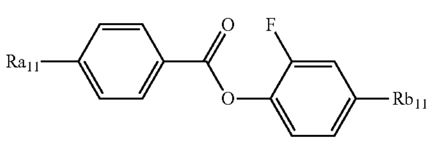
(2-20)
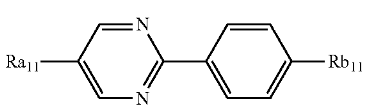
(2-21)
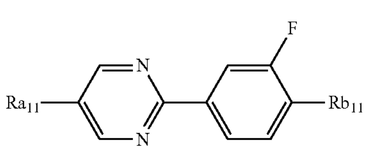
-continued
(2-22)
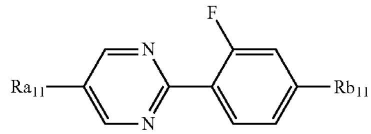
(2-23)
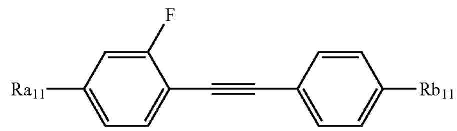
(2-24)
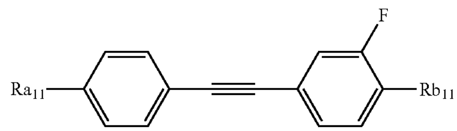
(2-25)
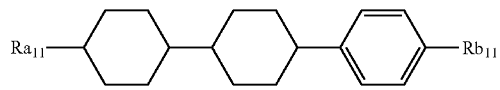
(2-26)
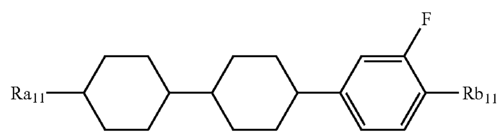
(2-27)
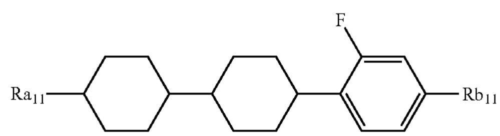
(2-28)
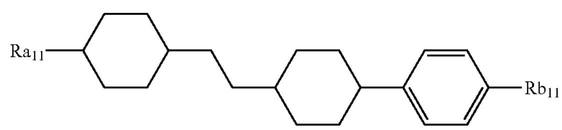
(2-29)
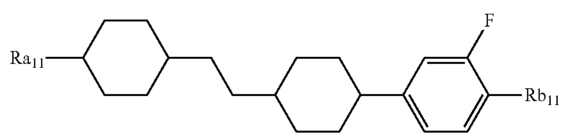
(2-30)
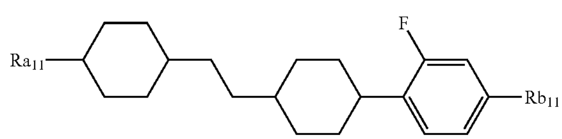
(2-31)
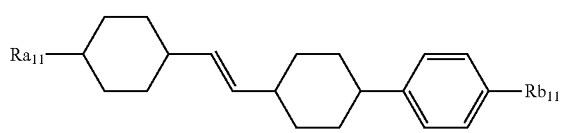
(2-32)
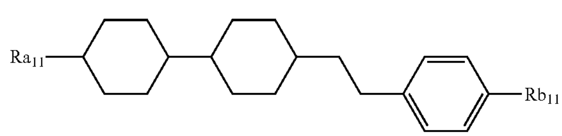

-continued
(2-33)
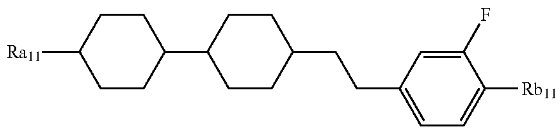
(2-34)
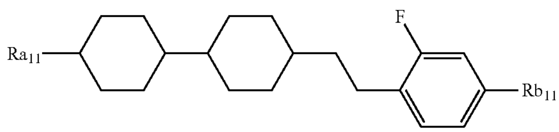
(2-35)
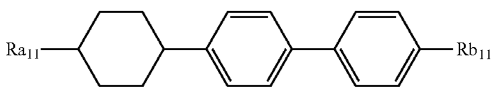
(2-36)
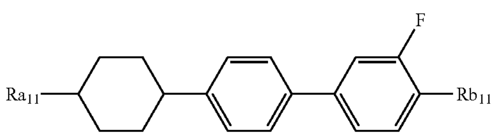
(2-37)
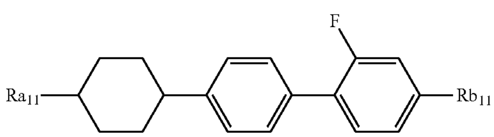
(2-38)
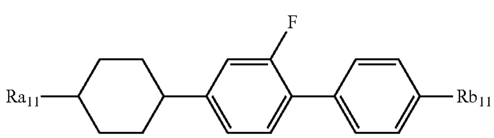
(2-39)
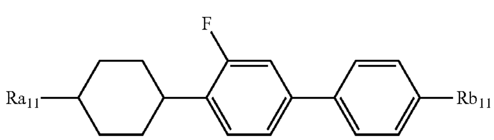
(2-40)
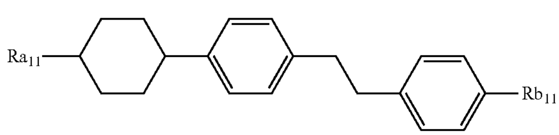
(2-41)
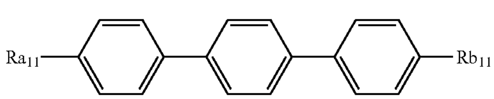
(2-42)
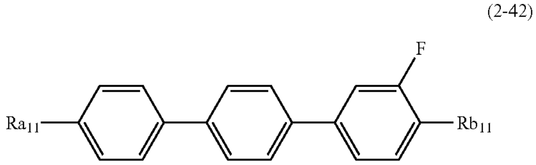
-continued
(2-43)
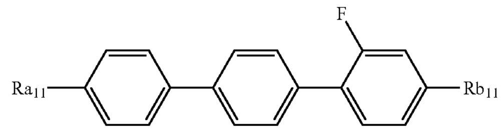
(2-44)
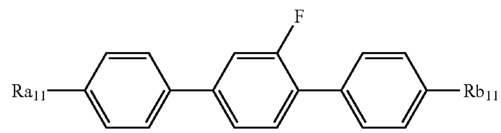
(2-45)
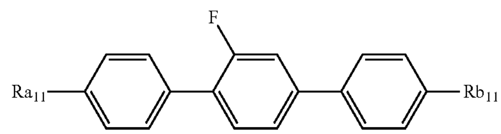
(2-46)
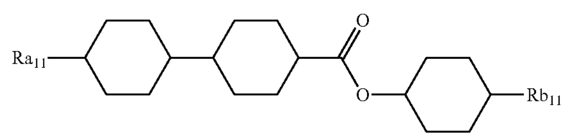
(2-47)
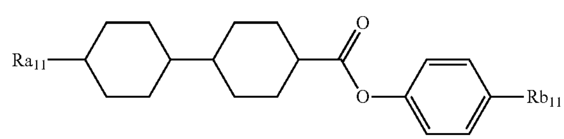
(2-48)
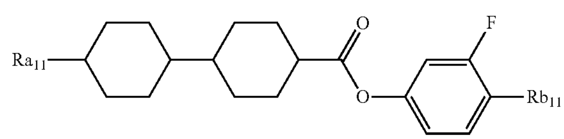
(2-49)
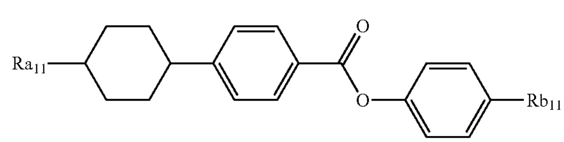
(2-50)
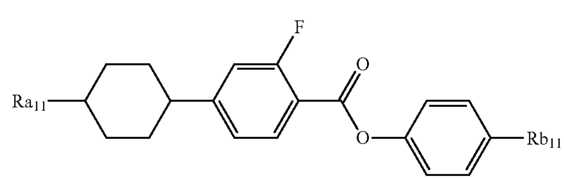
(2-51)
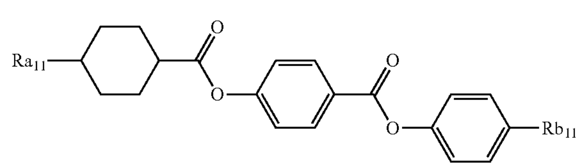

-continued
(2-52)
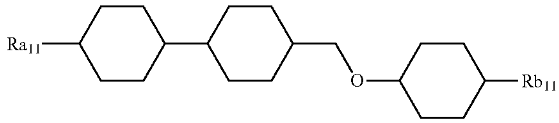
(2-53)
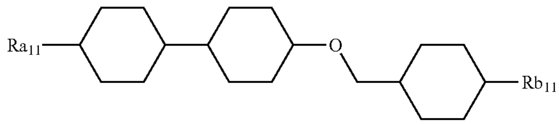
(2-54)
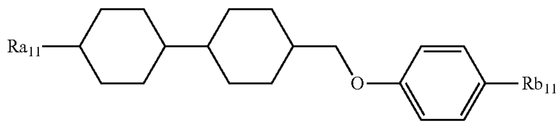
(2-55)
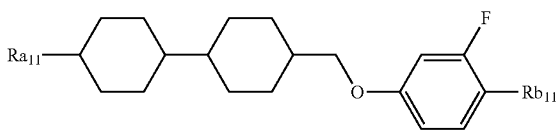
(2-56)
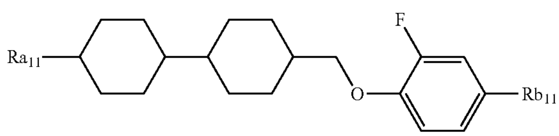
(2-57)
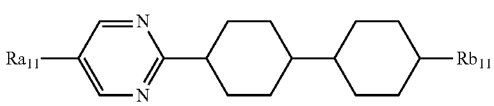
(2-58)
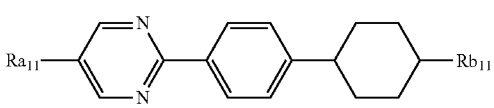
(2-59)
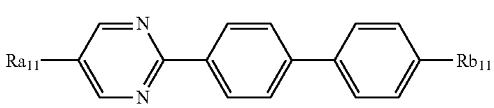
(2-60)
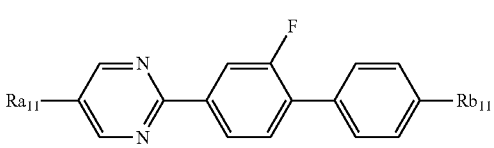
(2-61)
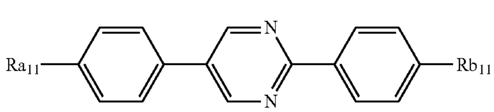
(2-62)
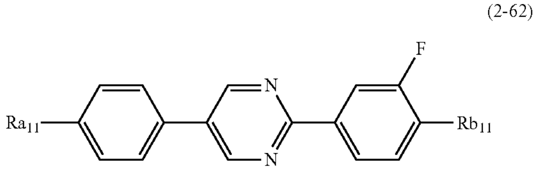
-continued
(2-63)
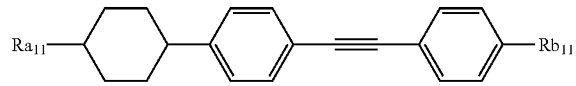
(2-64)
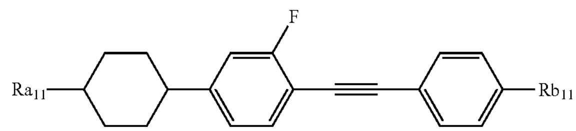
(2-65)
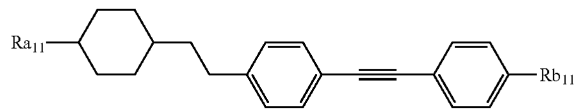
(2-66)
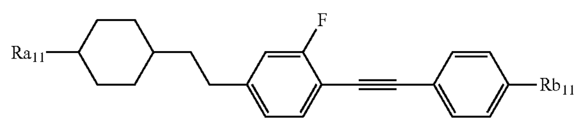
(2-67)
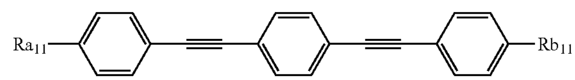
(2-68)
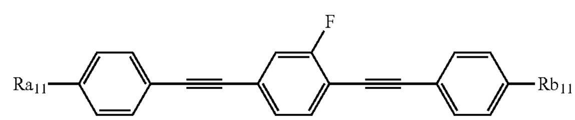
(2-69)
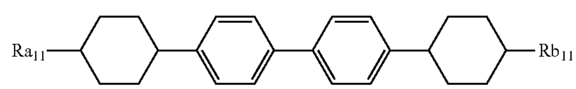
(2-70)
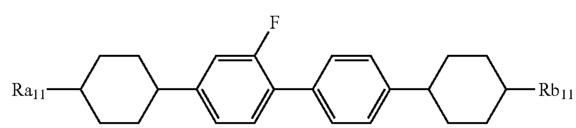
(2-71)
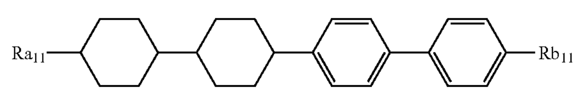
(2-72)
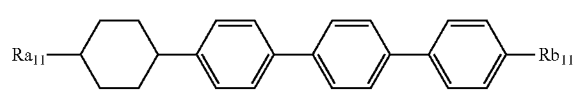
(2-73)
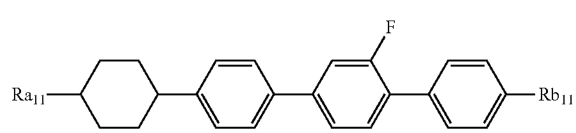
(2-74)
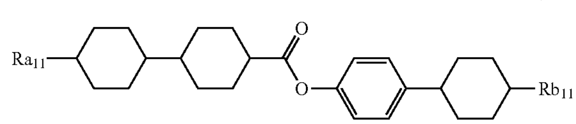

If the second component is the compounds (2-1) to (2-74), the liquid crystal composition having an excellent heat and light resistance, a larger specific resistance and a nematic phase in a wide range can be prepared.

In particular, the liquid crystal composition (1), wherein the first component is at least one compound selected from the compounds (a-4) to (a-13), and the second component is at least one compound selected from the compounds (e-1) to (e-3), has an excellent heat and light resistance, a wider range of a nematic phase, a larger voltage holding ratio, a smaller viscosity and a suitable elastic constant $K_{33}$.

Although the content of the second component in the liquid crystal composition (1) is not limited particularly, it is desirable to increase the content in view of a smaller viscosity. composition of the invention is used, for example, for a liquid crystal device with the VA mode.

[Liquid Crystal Composition (2)]

A liquid crystal composition comprising at least one compound selected from the group of the liquid crystal compounds represented by formulas (g-1) to (g-4) (hereinafter also referred to as the compounds (g-1) to (g-4), respectively) as a third component, in addition to the first and second components, is also desirable (hereinafter also referred to as the liquid crystal composition (2)) for the liquid crystal composition of the invention.

(g-1)

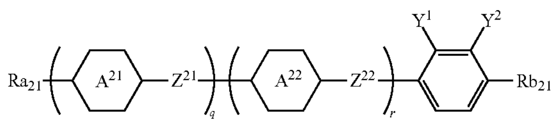

(g-2)

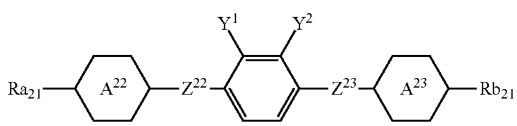

(g-3)

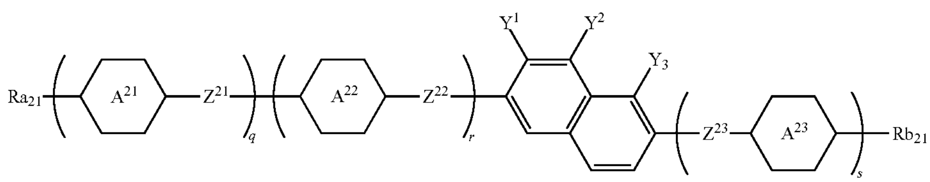

(g-4)

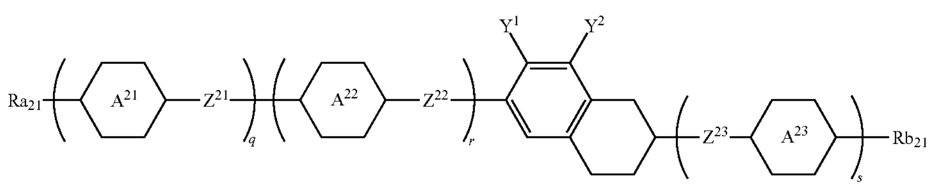

(g-5)

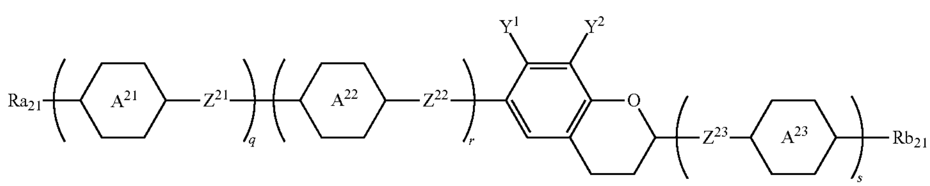

(g-6)

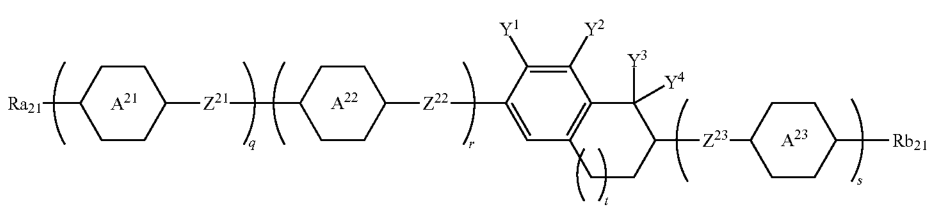

Since the threshold voltage of a liquid crystal composition tends to increase with an increase of the content of the second component, the content of the second component is in the range of 45% to 95% by weight based on the total weight of the liquid crystal compounds contained in the liquid crystal composition (1), and the content of the first component is more preferably in the range of 5% to 60% by weight based on the total weight of the liquid crystal compounds contained in the liquid crystal composition (1), when the liquid crystal In formulas (g-1) to (g-6), $Ra_{21}$ and $Rb_{21}$ are each independently hydrogen or alkyl having 1 to 10 carbons, and in the alkyl, —$CH_2$— may be nonadjacently replaced by —O—, —$(CH_2)_2$— may be nonadjacently replaced by —CH═CH—, and hydrogen may be replaced by fluorine.

In formulas (g-1) to (g-6), rings $A^{21}$, $A^{22}$ and $A^{23}$ are each independently trans-1,4-cyclohexylene, 1,4-phenylene, 2-fluoro-1,4-phenylene, 3-fluoro-1,4-phenylene, 2,3-difluoro-1,4-phenylene, pyrimidine-2,5-diyl, 1,3-dioxane-2,5-diyl or tetrahydropyran-2,5-diyl.

In formulas (g-1) to (g-6), $Z^{21}$, $Z^{22}$ and $Z^{23}$ are each independently a single bond, —$CH_2$—$CH_2$—, —CH═CH—, —$OCF_2$—, —$CF_2O$—, —$OCF_2CH_2CH_2$—, —$CH_2CH_2CF_2O$—, —COO—, —COO—, —$OCH_2$— or —$CH_2O$—, and $Y^1$, $Y^2$, $Y^3$ and $Y^4$ are each independently fluorine or chlorine.

In formulas (g-1) to (g-6), q, r and s are each independently 0, 1 or 2, q+r is 1 or 2, q+r+s is 1, 2 or 3, and t is 0, 1 or 2.

The liquid crystal composition (2) which further comprises the third component has a large negative dielectric anisotropy.

The liquid crystal composition having a wide temperature range of a nematic phase, a small viscosity, a large negative dielectric anisotropy and a large specific resistance can be obtained, and the liquid crystal composition in which these physical properties are suitably balanced is obtained.

In the third component, at least one compound selected from the group of compounds represented by formulas (h-1) to (h-7) (hereinafter also referred to as the compounds (h-1) to (h-7), respectively) are desirable in view of a small viscosity, heat and light resistance.

(h-1)

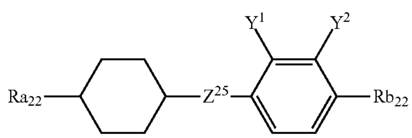

(h-2)

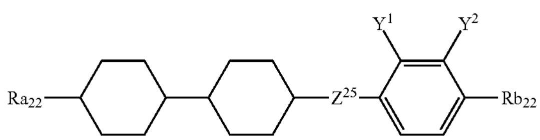

(h-3)

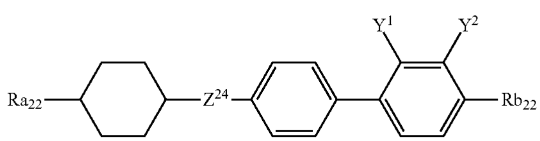

(h-4)

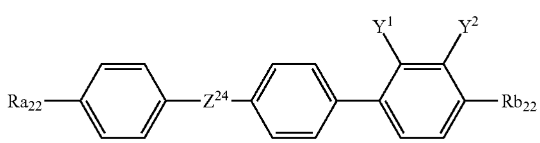

(h-5)

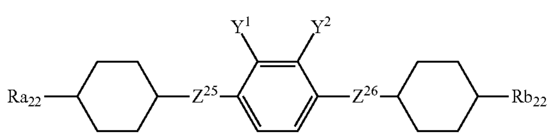

(h-6)

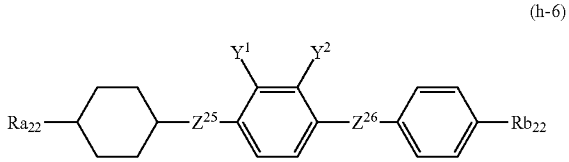

-continued (h-7)

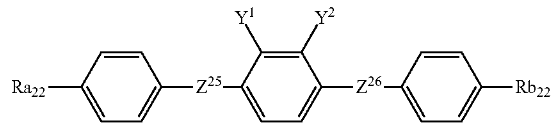

In formulas (h-1) to (h-7), $Ra_{22}$ and $Rb_{22}$ are each independently straight-chain alkyl having 1 to 8 carbons, straight-chain alkenyl with 2 to 8 carbons or alkoxy of 1 to 7 carbons; $Z^{24}$, $Z^{25}$ and $Z^{26}$ are a single bond, —$CH_2CH_2$—, —$CH_2O$—, —$OCH_2$—, —COO— or —COO—; and $Y^1$ and $Y^2$ are simultaneously fluorine, or one of them is fluorine and the other is chlorine.

For example, the compounds (h-1) and (h-2) can decrease the viscosity, decrease the threshold voltage, and decrease the minimum temperature of a nematic phase in the liquid crystal composition comprising them. The compounds (h-2), (h-3) and (h-4) can decrease the threshold voltage without decreasing the maximum temperature of a nematic phase, in the liquid crystal composition comprising them.

The compounds (h-3) and (h-6) can increase the optical anisotropy and the compounds (h-4) and (h-7) can further increase the optical anisotropy.

The compounds (h-5), (h-6) and (h-7) can decrease the minimum temperature of a nematic phase in the liquid crystal composition comprising them.

In the liquid crystal composition (2), especially a liquid crystal composition which comprises first, second and third components has an excellent heat and light resistance, a wide temperature range of a nematic phase, a small viscosity, a large voltage holding ratio, a suitable optical anisotropy, a suitable dielectric anisotropy, and a suitable elastic constant $K_{33}$, wherein the first component is at least one compound selected from the compounds (a-2) to (a-11), the second component is at least one compound selected from the compounds (e-1) to (e-3), and the third component is at least one compound selected from the compounds (h-1) to (h-7). Furthermore, the liquid crystal composition is desirable in view of these physical properties suitably balanced.

More desirable compounds in the third component are the compounds (3-1) to (3-118). In these compounds, $Rb_{22}$ and $Rb_{22}$ have the meanings identical to those described for the compounds (h-1) to (h-7).

(3-1)

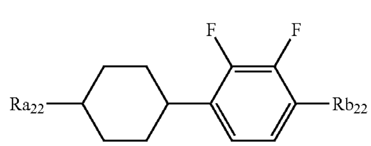

(3-2)

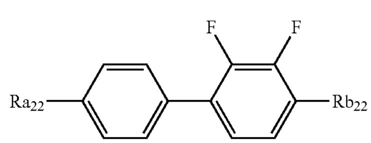

(3-3)

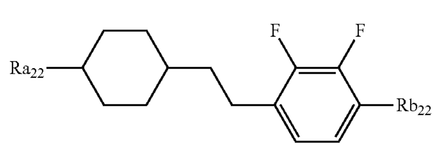

(3-4)
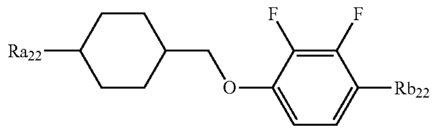
(3-5)
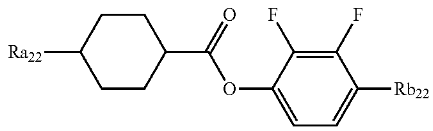
(3-6)
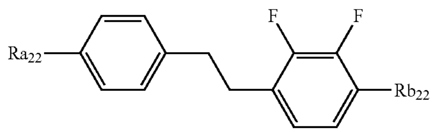
(3-7)
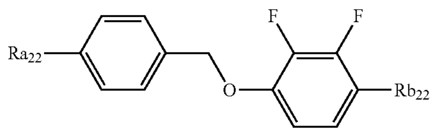
(3-8)
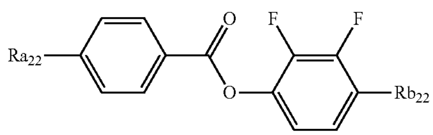
(3-9)
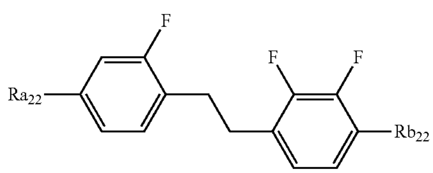
(3-10)
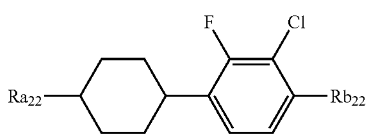
(3-11)
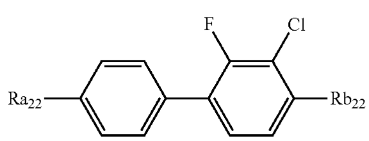
(3-12)
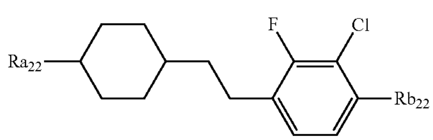
(3-13)
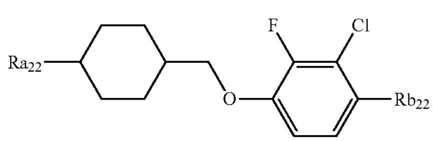
(3-14)
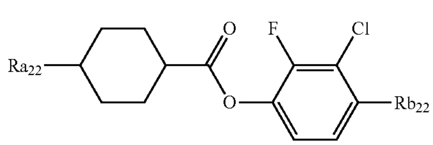
(3-15)
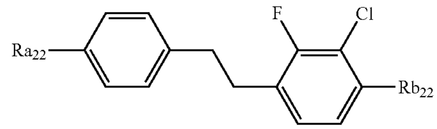
(3-16)
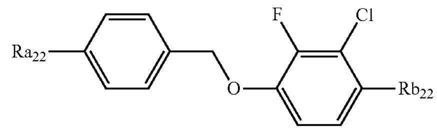
(3-17)
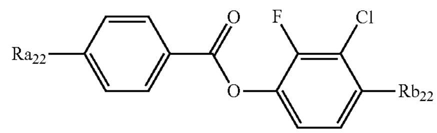
(3-18)
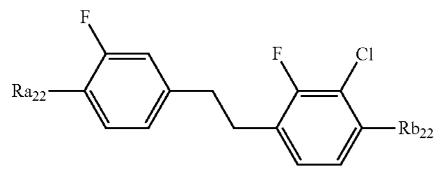
(3-19)
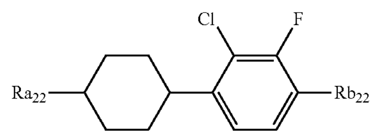
(3-20)
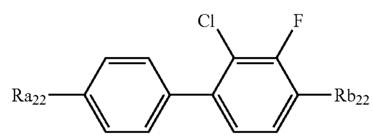
(3-21)
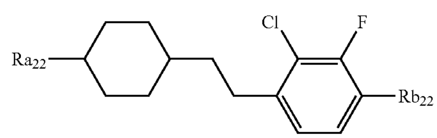
(3-22)
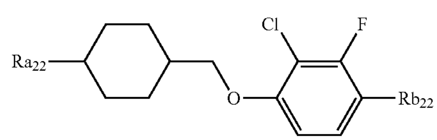
(3-23)
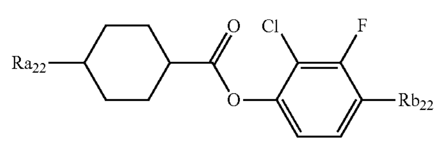
(3-24)
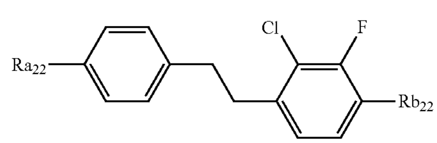
(3-25)
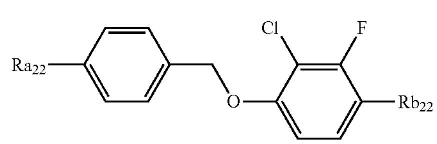

-continued
(3-26)
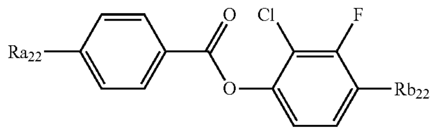
(3-27)
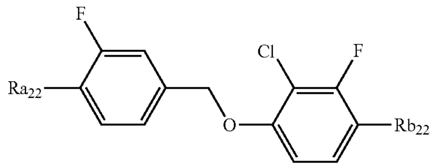
(3-28)
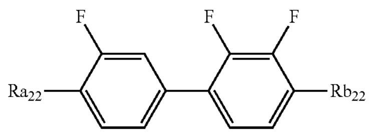
(3-29)
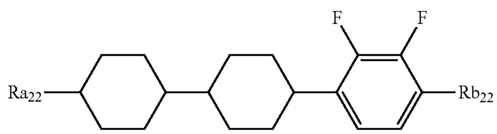
(3-30)
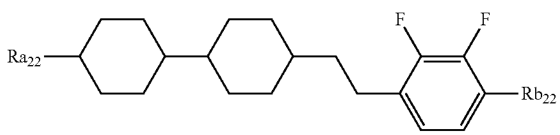
(3-31)
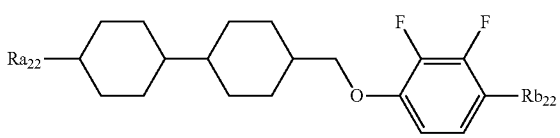
(3-32)
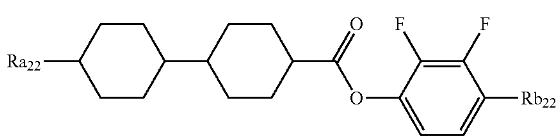
(3-33)
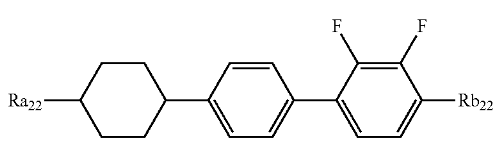
(3-34)
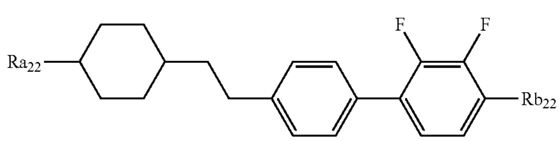
(3-35)
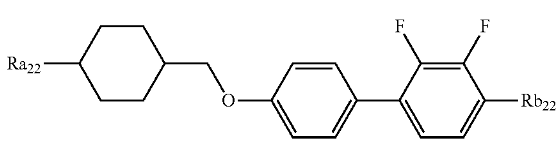
-continued
(3-36)
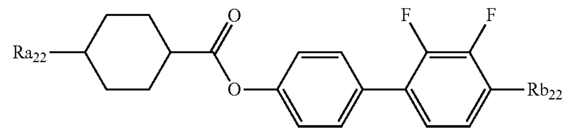
(3-37)
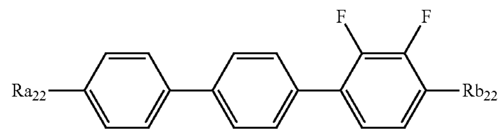
(3-38)
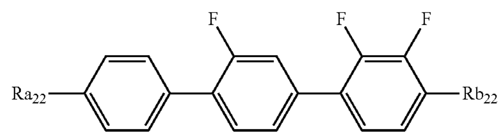
(3-39)
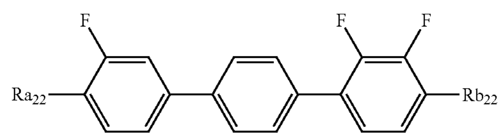
(3-40)
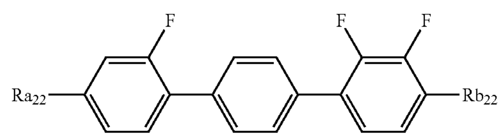
(3-41)
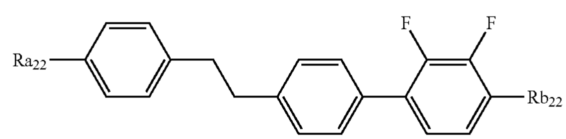
(3-42)
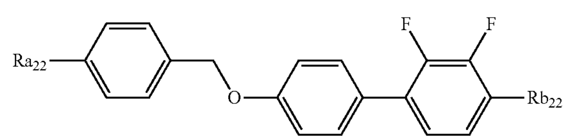
(3-43)
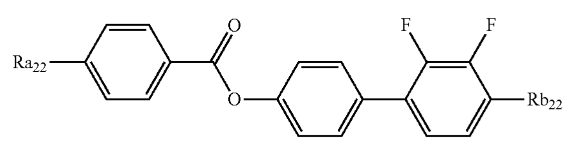
(3-44)
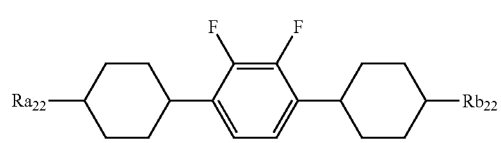
(3-45)
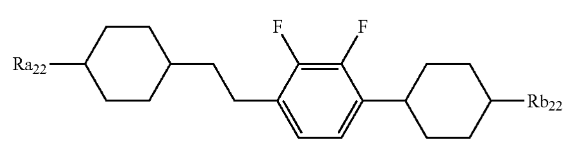

-continued
(3-46)
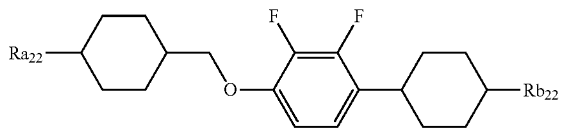
(3-47)
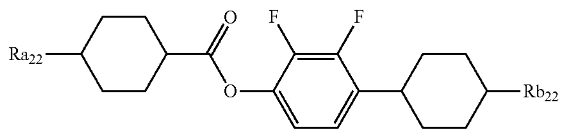
(3-48)
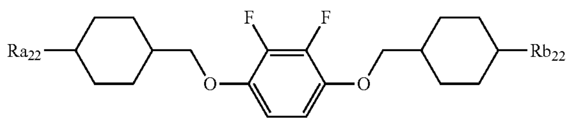
(3-49)
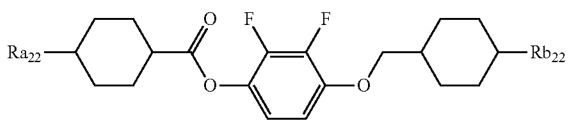
(3-50)
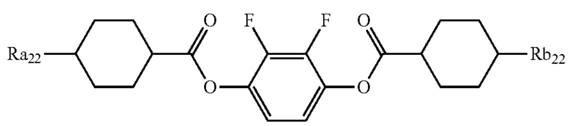
(3-51)
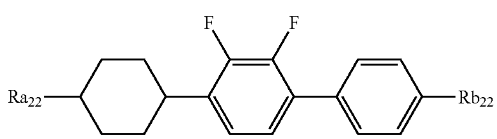
(3-52)
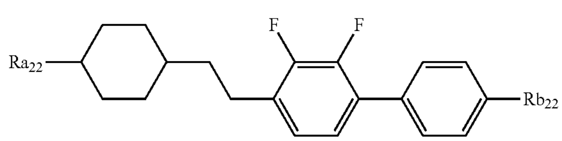
(3-53)
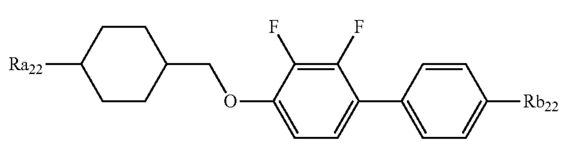
(3-54)
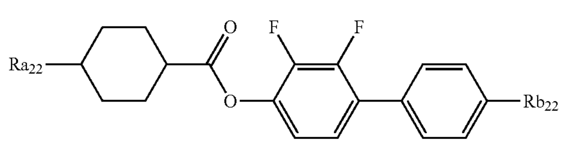
(3-55)
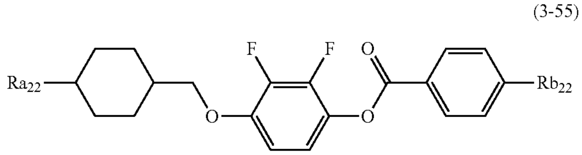
-continued
(3-56)
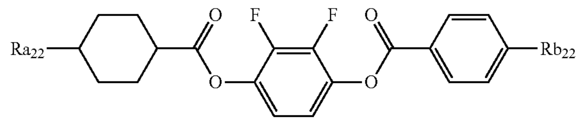
(3-57)
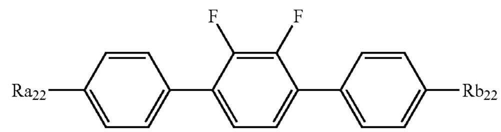
(3-58)
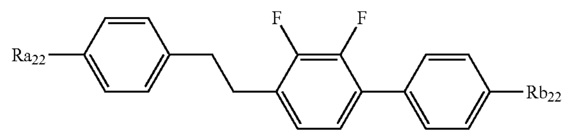
(3-59)
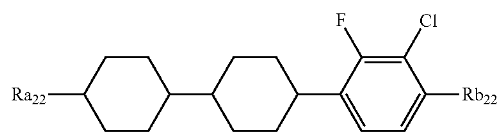
(3-60)
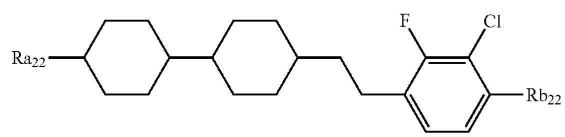
(3-61)
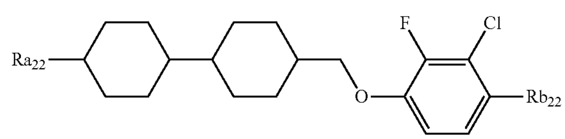
(3-62)
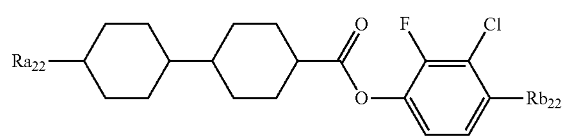
(3-63)
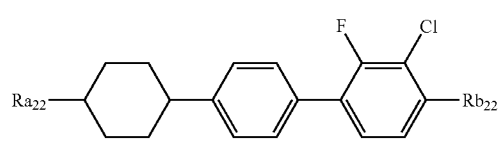
(3-64)
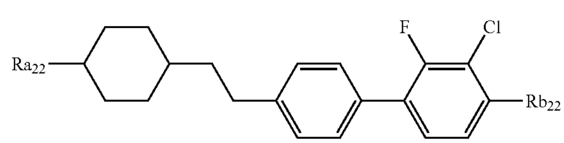
(3-65)
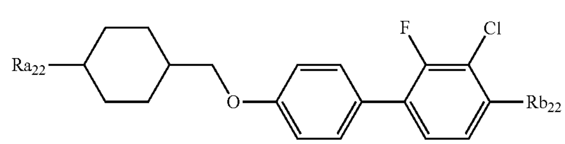

-continued
(3-66)
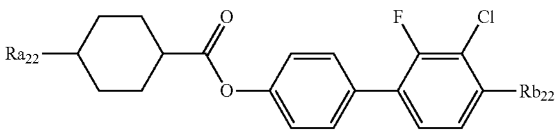
(3-67)
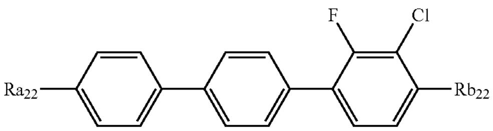
(3-68)
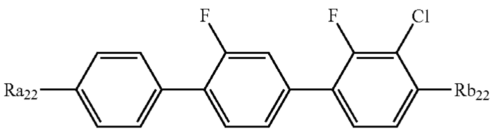
(3-69)
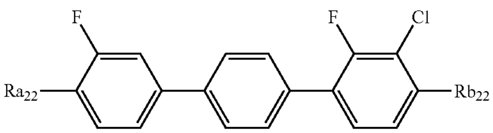
(3-70)
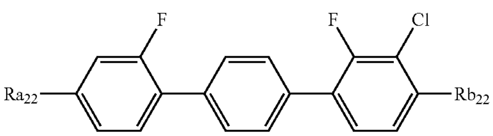
(3-71)
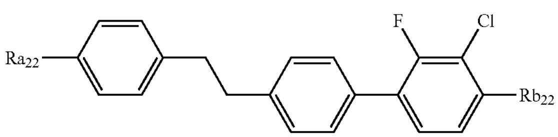
(3-72)
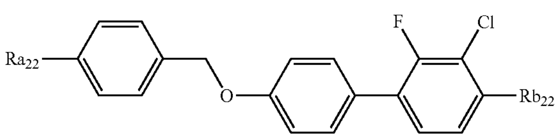
(3-73)
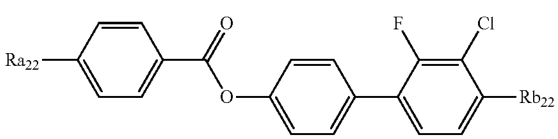
(3-74)
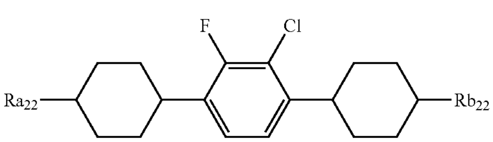
(3-75)
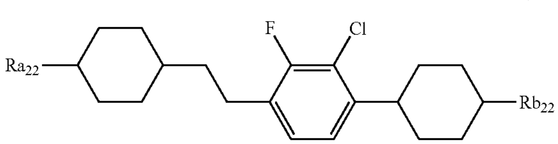
-continued
(3-76)
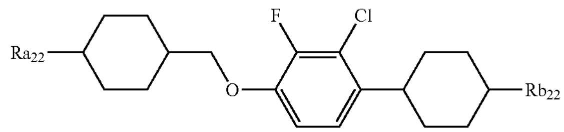
(3-77)
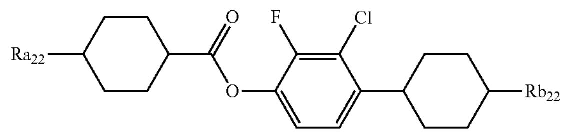
(3-78)
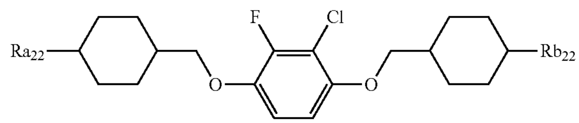
(3-79)
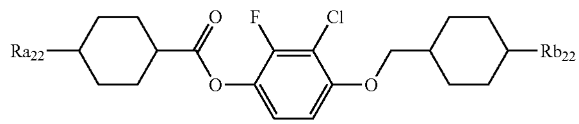
(3-80)
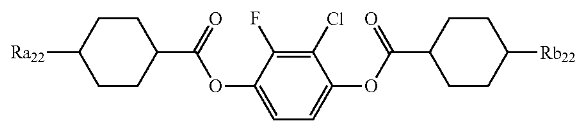
(3-81)
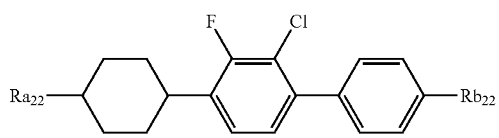
(3-82)
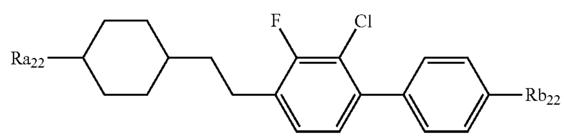
(3-83)
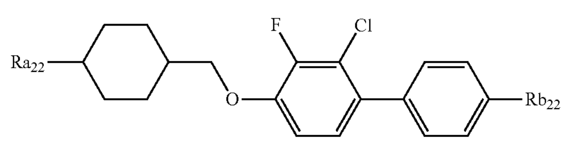
(3-84)
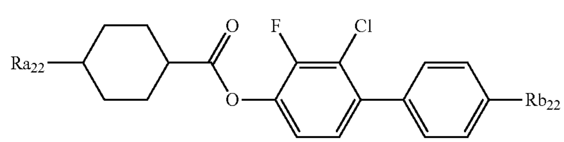
(3-85)
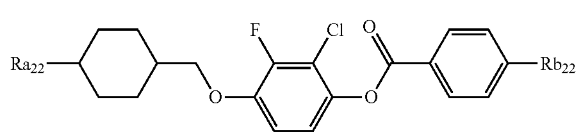

-continued
(3-86)
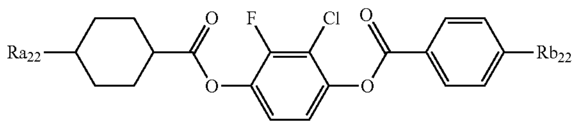
(3-87)
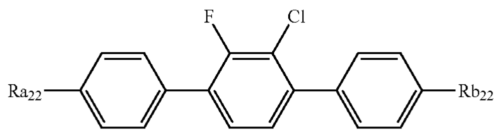
(3-88)
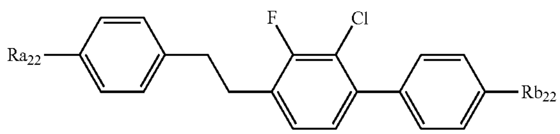
(3-89)
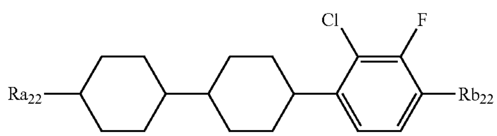
(3-90)
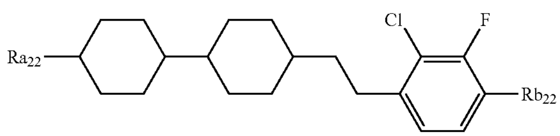
(3-91)
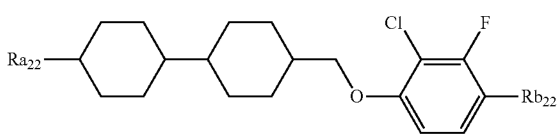
(3-92)
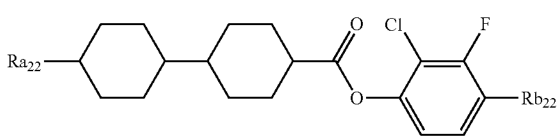
(3-93)
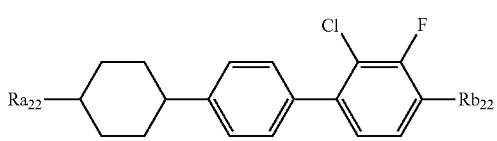
(3-94)
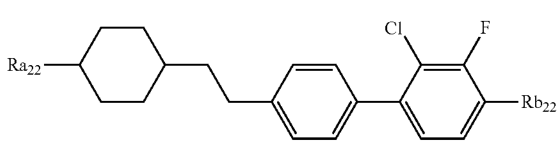
(3-95)
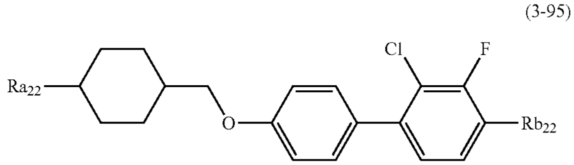
-continued
(3-96)
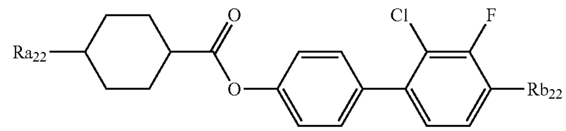
(3-97)
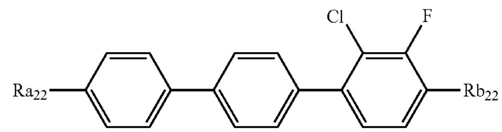
(3-98)
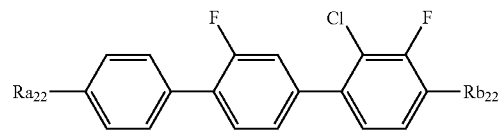
(3-99)
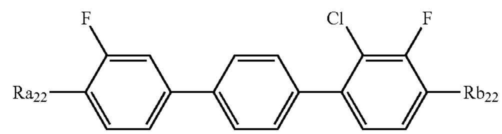
(3-100)
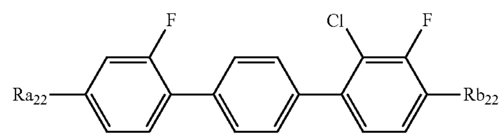
(3-101)
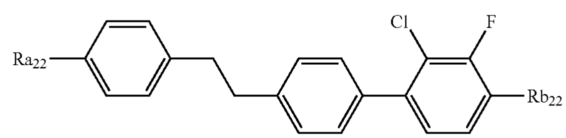
(3-102)
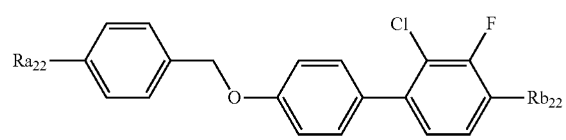
(3-103)
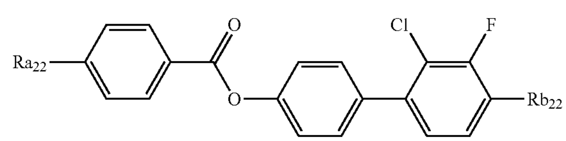
(3-104)
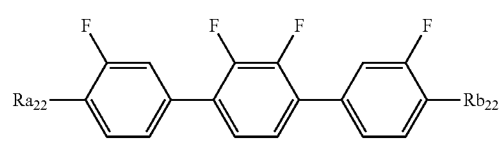
(3-105)
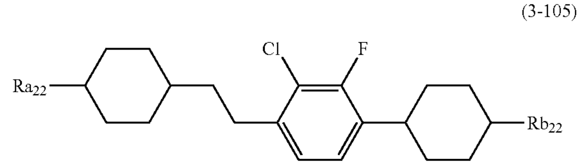

-continued
(3-106)
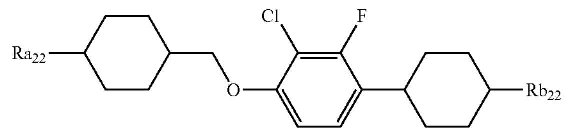
(3-107)
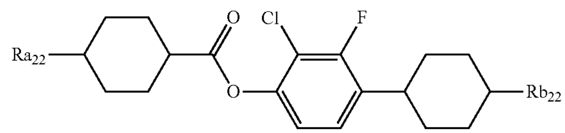
(3-108)
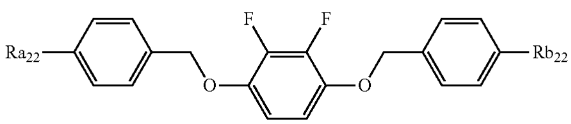
(3-109)
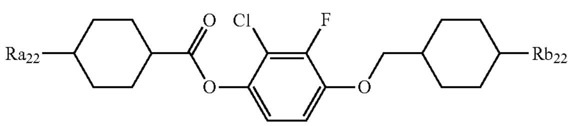
(3-110)
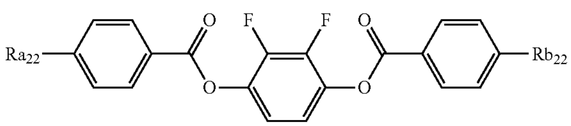
(3-111)
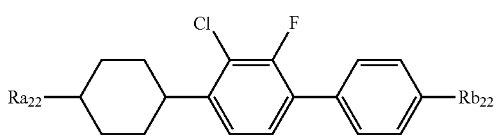
(3-112)
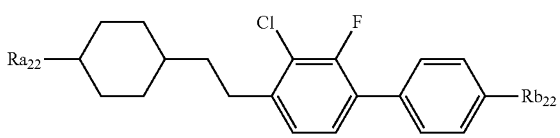
(3-113)
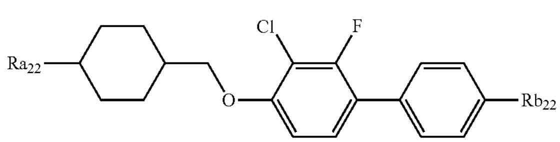
(3-114)
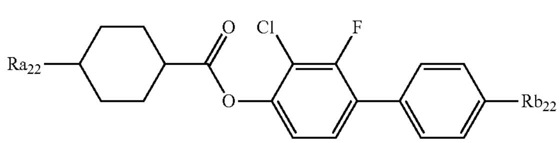
(3-115)
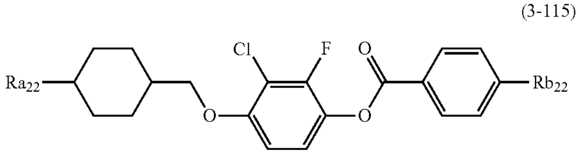
-continued
(3-116)
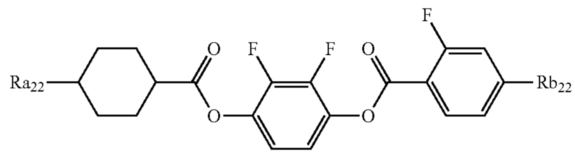
(3-117)
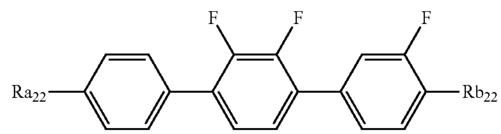
(3-118)
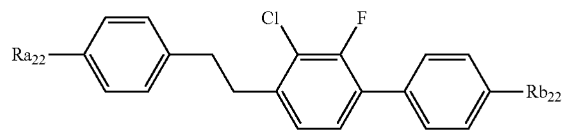
For example, compounds having a condensed ring, such as the compounds (g-3) to (g-6), are desirable in view of a low threshold voltage, and the compounds (3-119) to (3-143) are desirable in view of heat or light resistance. In these compounds, $Ra_{22}$ and $Rb_{22}$ have the meanings identical to those described for the compounds (g-3) to (g-6).
(3-119)
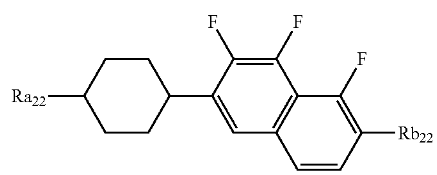
(3-120)
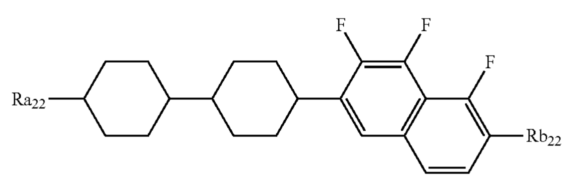
(3-121)
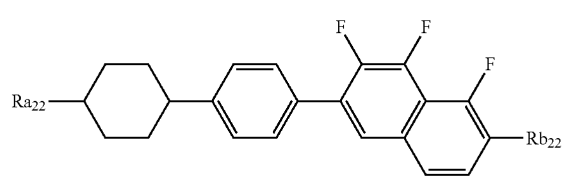
(3-122)
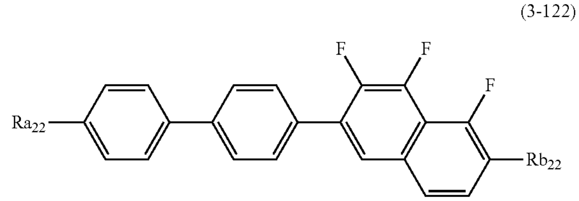

-continued
(3-123)
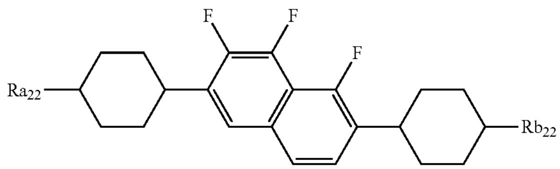
(3-124)
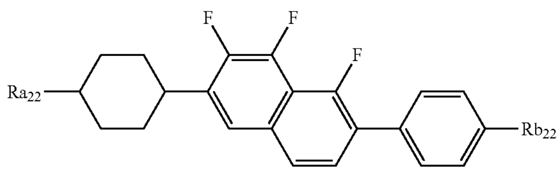
(3-125)
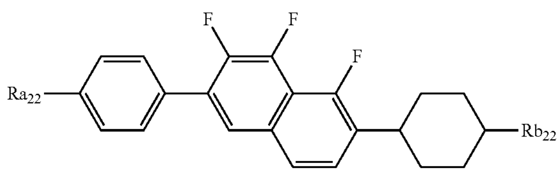
(3-126)
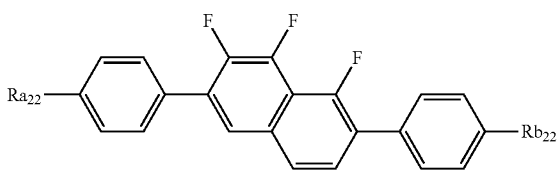
(3-127)
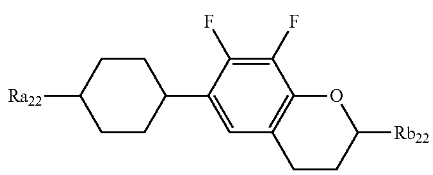
(3-128)
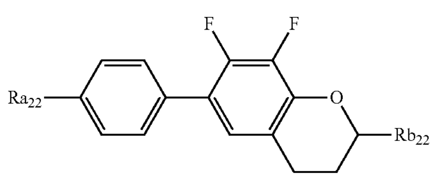
(3-129)
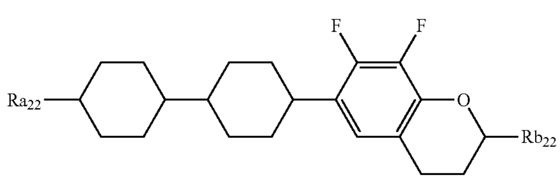
(3-130)
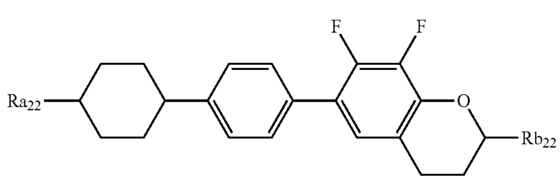
-continued
(3-131)
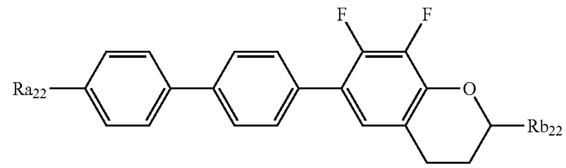
(3-132)
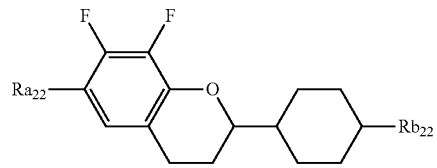
(3-133)
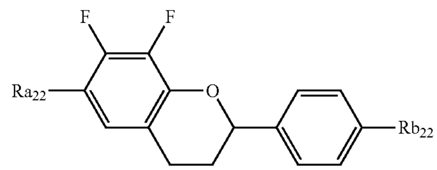
(3-134)
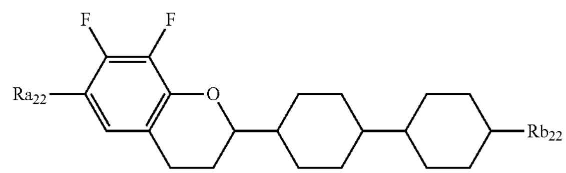
(3-135)
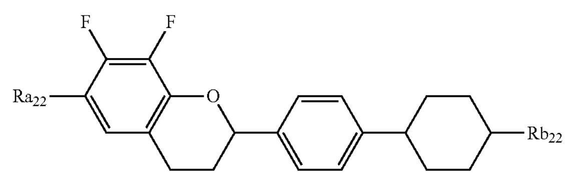
(3-136)
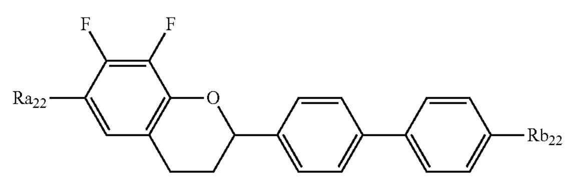
(3-137)
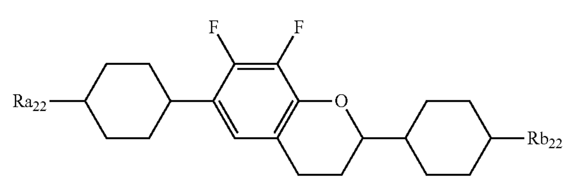
(3-138)
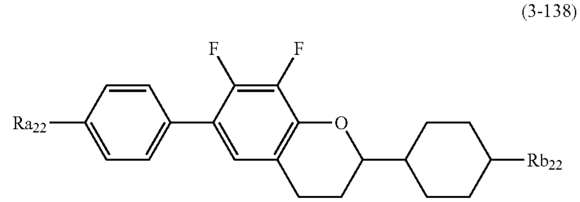

-continued (3-139)

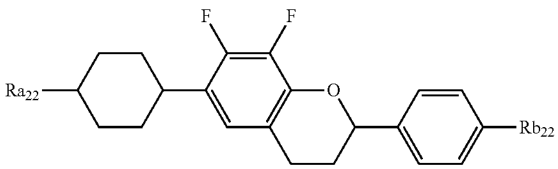

(3-139)

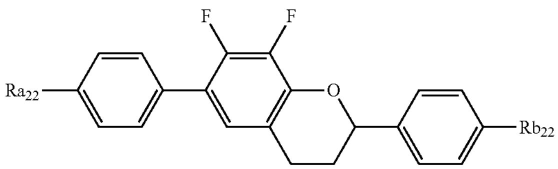

(3-140)

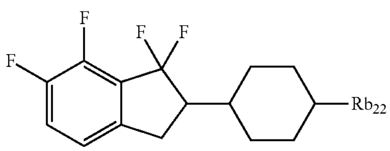

(3-141)

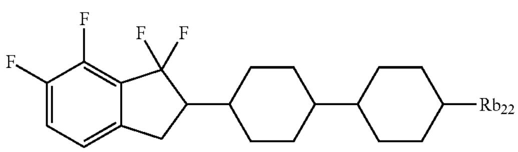

(3-142)

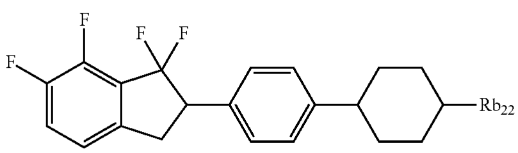

(3-143)

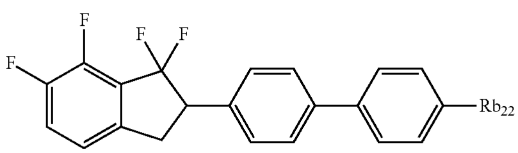

Although the content of the third component in the liquid crystal composition of the invention is not limited particularly, it is desirable to increase the content in view of preventing a decrease in the absolute value of the negative dielectric anisotropy.

Although the content of the first, second, and third components of the liquid crystal composition (2) are not limited particularly, it is desirable that the content ratio of the compound (a-1) is in the range of 5% to 60% by weight, and the content ratio of the second component is in the range of 20% to 75% by weight, and the content ratio of the third component is in the range of 20% to 75% by weight based on the total weight of the liquid crystal composition (2).

When the content ratios of the first, second and third components of the liquid crystal composition (2) are in these ranges, the composition (2) has an excellent heat and light resistance, a wide temperature range of a nematic phase, a small viscosity, a large voltage holding ratio, a suitable optical anisotropy, a suitable dielectric anisotropy and a suitable elastic constant $K_{33}$. Furthermore, a liquid crystal composition in which these physical properties are more suitably balanced is obtained.

[Aspects and so forth of Liquid Crystal Composition]

In one aspect on the liquid crystal composition of the invention, other liquid crystal compounds may be added to liquid crystal compounds of the first and second components, and of the third component which is used as required, for the purpose of further adjusting, for example, characteristics of the liquid crystal composition. In another aspect on the liquid crystal composition of the invention, no other liquid crystal compounds may be added to the liquid crystal compounds of the first and second components, and of the third component which is used as required, in view of their cost.

Additives, such as an optically active compound, dye, an antifoaming agent, an ultraviolet absorber and an antioxidant may further be added to the liquid crystal composition of the invention.

When the optically active compound is added to the liquid crystal composition of the invention, it may induce a helical structure in liquid crystals, forming a twist angle and so forth.

A known chiral doping agent is added as the optically active compound. This chiral doping agent is effective in inducing a helical structure in liquid crystals, adjusting a twist angle required and then preventing a reverse twist. Examples of the chiral doping agents include the following optically active compounds (Op-1) to (Op-13).

(Op-1)

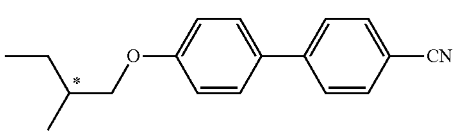

(Op-2)

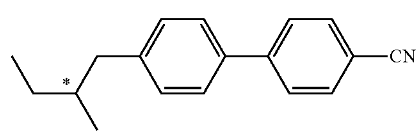

(Op-3)

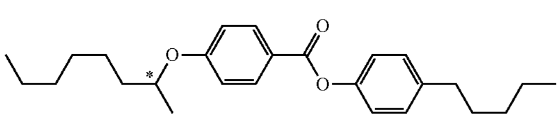

(Op-4)

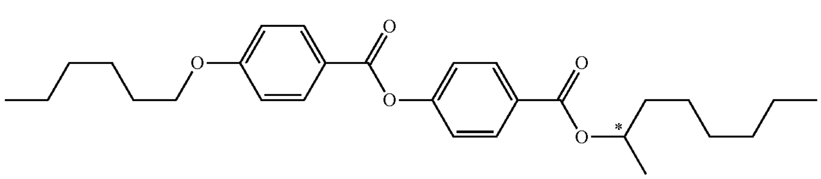

-continued
(Op-5)
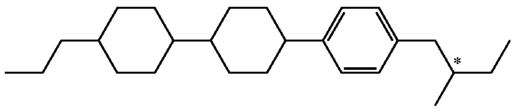
(Op-6)
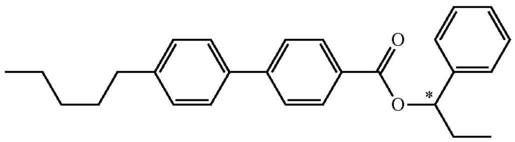
(Op-7)
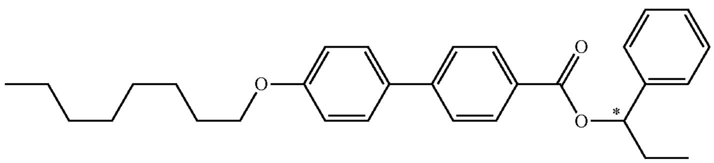
(Op-8)
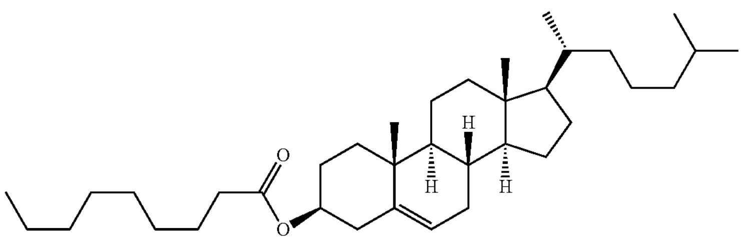
(Op-9)
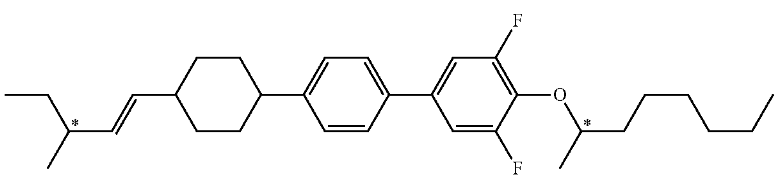
(Op-10)
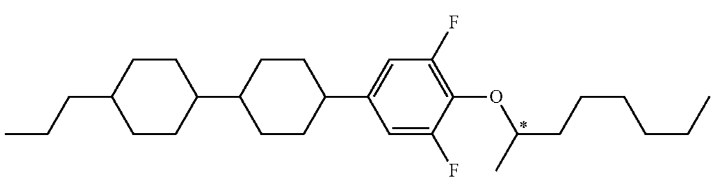
(Op-11)
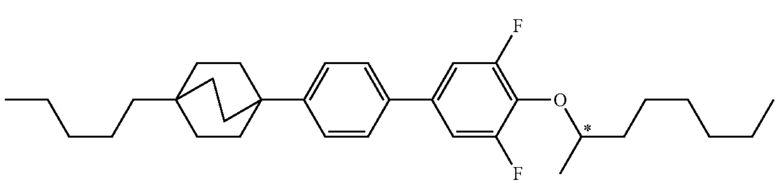
(Op-12)
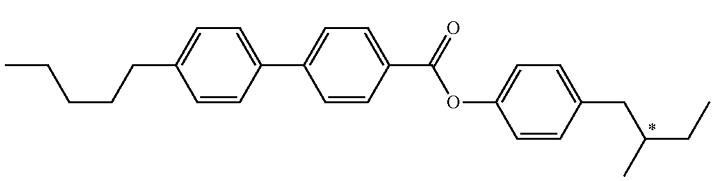

-continued (Op-13)

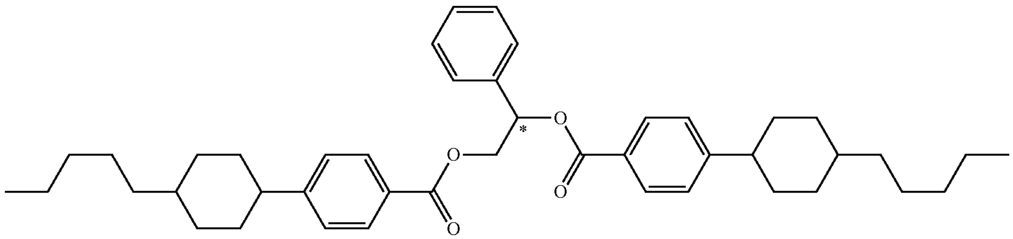

When the dye is added to the liquid crystal composition of the invention, the liquid crystal composition can be applied to the liquid crystal display device which has a GH (Guest host) mode.

When the antifoaming agent is added to the liquid crystal composition of the invention, it is possible to suppress the formation of foam during the transportation of the liquid crystal composition or in a process of manufacturing liquid crystal display devices using this liquid crystal composition.

When the ultraviolet absorber or the antioxidant is added to the liquid crystal composition of the invention, it is possible to prevent degradation of the liquid crystal composition and of the liquid crystal display device containing the liquid crystal composition. For example, the antioxidant can suppress a decrease in a specific resistance, when the liquid crystal composition is heated.

The ultraviolet absorber includes a benzophenone-based ultraviolet absorber, a benzoate-based ultraviolet absorber, a triazole-based ultraviolet absorber and so forth. A specific example of the benzophenone-based ultraviolet absorber is 2-hydroxy-4-n-octoxybenzophenone.

A specific example of the benzoate-based ultraviolet absorber is 2,4-di-t-butylphenyl-3,5-di-t-butyl-4-hydroxybenzoate.

Specific examples of the triazole-based ultraviolet absorber are 2-(2-hydroxy-5-methylphenyl)benzotriazole, 2-[2-hydroxy-3-(3,4,5,6-tetrahydroxyphthalimido-methyl)-5-methylphenyl]benzotriazole and 2-(3-t-butyl-2-hydroxy-5-methylphenyl)-5-chlorobenzotriazole.

The antioxidant includes a phenol-based antioxidant, an organosulfur-based antioxidant and so forth.

An antioxidant represented by formula (I) is desirable especially in view of a large effect on antioxidation without varying physical properties of a liquid crystal composition.

(I)

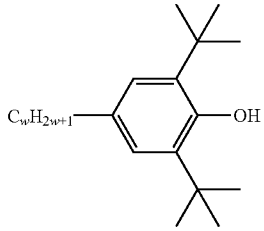

In formula (I), w is an integer of 1 to 15.

Specific examples of the phenol-based antioxidant are 2,6-di-t-butyl-4-methylphenol, 2,6-di-t-butyl-4-ethylphenol, 2,6-di-t-butyl-4-propylphenol, 2,6-di-t-butyl-4-butylphenol, 2,6-di-t-butyl-4-pentylphenol, 2,6-di-t-butyl-4-hexylphenol, 2,6-di-t-butyl-4-heptylphenol, 2,6-di-t-butyl-4-octylphenol, 2,6-di-t-butyl-4-nonylphenol, 2,6-di-t-butyl-4-decylphenol, 2,6-di-t-butyl-4-undecylphenol, 2,6-di-t-butyl-4-dodecylphenol, 2,6-di-t-butyl-4-tridecylphenol, 2,6-di-t-butyl-4-tetradecylphenol, 2,6-di-t-butyl-4-pentadecylphenol, 2,2'-methylenebis(6-t-butyl-4-methylphenol), 4,4'-butylidenebis (6-t-butyl-3-methylphenol), 2,6-di-t-butyl-4-(2-octadecyloxycarbonyl)ethylphenol and pentaerythritol tetrakis[3-(3,5-di-t-butyl-4-hydroxyphenyl)propionate].

Specific examples of the organosulfur-based antioxidant are dilauryl-3,3'-thiopropionate, dimyristyl-3,3'-thiopropionate, distearyl-3,3'-thiopropionate, pentaerythritoltetrakis (3-laurylthiopropionate) and 2-mercaptobenzimidazole.

Additives typified by an ultraviolet absorber, an antioxidant and so forth may be added and used in the range of amounts which do not prevent the purpose of the invention and can attain the purpose of the addition of the additives.

When the ultraviolet absorber or the antioxidant is added, for example, its content ratio is usually in the range of 10 ppm to 500 ppm, preferably in the range of 30 ppm to 300 ppm, and more preferably in the range of 40 ppm to 200 ppm based on the total weight of the liquid crystal composition of the invention.

Incidentally, in another aspect, the liquid crystal composition of the invention may contain impurities of starting materials, by-products, solvents used for reactions, catalysts for syntheses and so forth, which have been contaminated in the processes such as for synthesizing each compound constituting a liquid crystal composition and for preparing the liquid crystal composition.

[Method for Preparing Liquid Crystal Compositions]

When each of the compounds of the components in the liquid crystal composition of the invention is a liquid, for example, the composition is prepared by mixing and shaking the compounds. When solids are included, the composition is prepared by mixing the compounds, and then shaking after the compounds have been heated and liquefied. Moreover, the liquid crystal composition of the invention can also be prepared according to other known methods.

[Characteristics of Liquid Crystal Compositions]

Since the maximum temperature of a nematic phase can be adjusted to 70° C. or above and the minimum temperature of the nematic phase can be adjusted to −20° C. or below in the liquid crystal composition of the invention, the temperature range of the nematic phase is wide. Accordingly, the liquid crystal display device containing this liquid crystal composition can be used in a wide temperature range.

In the liquid crystal composition of the invention, the optical anisotropy can be properly adjusted in the range of 0.10 to 0.13, or in the range of 0.05 to 0.18, by suitably adjusting the composition ratio and so forth.

The dielectric anisotropy can be normally adjusted in the range of −5.0 to −2.0, and preferably in the range of −4.5 to −2.5 in the liquid crystal composition of the invention. The liquid crystal composition having the dielectric anisotropy of the range of −4.5 to −2.5 can be suitably used for a liquid crystal display device which operates by means of the IPS and VA modes.

[Liquid Crystal Display Devices]

The liquid crystal composition of the invention can be used not only for the liquid crystal display devices with operating modes such as the PC, TN, STN and OCB modes which are driven by means of the AM mode, but also for liquid crystal display devices with operating modes such as the PC, TN, STN, OCB, VA and IPS modes which are driven by means of the passive matrix (PM) mode.

The liquid crystal display devices with the AM and PM modes can be applied to liquid crystal displays and so forth having any of a reflection type, a transmission type and a semi-transmission type.

Moreover, the composition of the invention can also be used for a DS (dynamic scattering) mode-device having the composition to which a conducting agent is added, and a NCAP (nematic curvilinear aligned phase) device having the composition microencapsulated, and a PD (polymer dispersed) device having a three-dimensional network polymer formed in the composition, for example, a PN (polymer network) device.

Since the liquid crystal composition of the invention has the characteristics described above, it can be suitably used for the liquid crystal display device with an AM mode which is driven by means of operating modes such as the VA and IPS modes, wherein the liquid crystal composition having negative dielectric anisotropy is used, especially for the liquid crystal display device with the AM mode which is driven by means of the VA mode.

The direction of an electric field is perpendicular to liquid crystal layers in a liquid crystal display device which is driven by means of the TN mode, the VA mode or the like. On the other hand, the direction of an electric field is parallel to liquid crystal layers in a liquid crystal display device which is driven by means of the IPS mode or the like. The structure of the liquid crystal display device which is driven by means of the VA mode is reported by K. Ohmuro, S. Kataoka, T. Sasaki and Y. Koike, SID '97 Digest of Technical Papers, 28, 845 (1997), and the structure of the liquid crystal display device which is driven by means of the IPS mode is reported in WO 1991/10936 A (patent family: U.S. Pat. No. 5,576,867).

EXAMPLES

Example of Liquid Crystal Compound (a-1)

The invention will be explained below in more detail based on examples. However, the invention is not limited to the examples. The term "%" means "% by weight", unless otherwise specified.

Since the compounds obtained were identified by means of nuclear magnetic resonance spectra obtained by using $^{1}$H-NMR analyses, gas chromatograms obtained by using gas chromatography (GC) analyses and so forth, methods for analyses will be explained at first.

$^{1}$H-NMR Analysis:

A model DRX-500 apparatus (made by Bruker BioSpin Corporation) was used for measurement. Samples prepared in examples and so forth were dissolved in deuterated solvents such as $CDCl_3$, in which the samples were soluble, and measurement was carried out under the conditions of room temperature, thirty two times of accumulation and 500 MHz. In the explanation of the nuclear magnetic resonance spectra obtained, symbols s, d, t, q, m and br stand for singlet, doublet, triplet, quartet, multiplet and broad, respectively. Tetramethylsilane (TMS) was used as a zero-point standard of chemical shifts 6.

GC Analysis:

A Gas Chromatograph Model GC-14B made by Shimadzu Corporation was used for measurement. A capillary column CBP1-M25-025 (length 25 m, bore 0.22 mm, film thickness 0.25 μm; dimethylpolysiloxane as a stationary phase; non-polar) made by Shimadzu Corporation was used. Helium was used as a carrier gas, and its flow rate was adjusted to 1 ml per minute. The temperature of the sample injector was set at 280° C. and the temperature of the detector (FID) was set at 300° C.

A sample was dissolved in toluene, giving a 1% by weight solution, and then 1 microliter of the solution obtained was injected into the sample injector.

Chromatopac Model C-R6A made by Shimadzu Corporation or its equivalent was used as a recorder. The resulting gas chromatogram indicated the retention time of peaks and the values of peak areas corresponding to component compounds.

Chloroform or hexane, for example, may also be used as a solvent for diluting the sample. The following capillary columns may also be used: DB-1 (length 30 m, bore 0.32 mm, film thickness 0.25 μm) made by Agilent Technologies Inc., HP-1 (length 30 m, bore 0.32 mm, film thickness 0.25 μm) made by Agilent Technologies Inc., Rtx-1 (length 30 m, bore 0.32 mm, film thickness 0.25 μm) made by Restek Corporation, BP-1 (length 30 m, bore 0.32 mm, film thickness 0.25 μm) made by SGE International Pty. Ltd, and so forth.

The ratio of peak areas in the gas chromatogram corresponds to the ratio of component compounds. In general, the percentage by weight of each component compound in an analytical sample is not completely the same with the percentage of each peak area in the analytical sample. In the invention, however, the percentage by weight of the component compound in the analytical sample corresponds substantially to the percentage of the peak area in the analytical sample, because the correction coefficient is essentially 1 (one) when the columns described above are used. This is because there is no significant difference among the correction coefficients of liquid crystal compounds as components. An internal standard method by use of gas chromatograms is employed in order to determine the composition ratio of the liquid crystal compounds in the liquid crystal composition more accurately by means of gas chromatograms. The component of each liquid crystal compound (test-component) weighed accurately in a fixed amount and a liquid crystal compound serving as a standard (standard reference material) are analyzed simultaneously by means of gas chromatography, and the relative intensity on the ratio of the peak area of the test-component to that of the standard reference material is calculated in advance. Next, the composition ratio of the liquid crystal compounds in the liquid crystal composition can be determined more accurately by means of the gas-chromatographic analysis using the correction based on the relative intensity of the peak area of each component to that of the standard reference material.

[Samples for Measuring Physical Properties of Liquid Crystal Compounds and so Forth]

Two kinds of samples are used for measuring physical properties of a liquid crystal compound: one is a compound itself, and the other is a mixture of the compound and mother liquid crystals.

In the latter case using a sample in which a compound is mixed with mother liquid crystals, measurement is carried out according to the following method. First, the sample is prepared by mixing 15% by weight of the liquid crystal compound obtained and 85% by weight of the mother liquid crystals. Then, extrapolated values were calculated from the measured values of the resulting sample by means of an extrapolation method based on the following equation. The extrapolated values were regarded as the values of the physical properties of the compound.

<Extrapolated value>=(100×<Measured value of sample>−<% by weight of mother liquid crystals>×<Measured value of mother liquid crystals>)/<% by weight of liquid crystal compound>

When a smectic phase or crystals are deposited even at this ratio of the compound to the mother liquid crystals at 25° C., the ratio of the liquid crystal compound to the mother liquid crystals was varied in the order of (10% by weight: 90% by weight), (5% by weight: 95% by weight) and (1% by weight: 99% by weight). The physical properties of the sample were measured at the ratio in which the smectic phase or the crystals are not deposited at 25° C. Extrapolated values were determined according to the above equation, and regarded as the values of the physical properties of the compound.

There are a variety of mother liquid crystals used for the measurement. For example, the composition ratio of the mother liquid crystals (i) is as shown below. Mother Liquid Crystals (i):

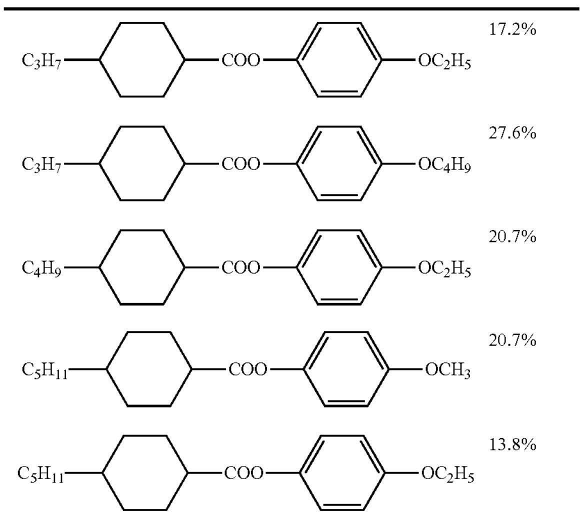

A liquid crystal composition itself was used as a sample for measuring the physical properties of the liquid crystal composition.

[Method for Measuring Physical Properties of Compounds and so Forth]

Physical properties of the compounds were measured according to the following methods. Most of them were described in the Standard of Electric Industries Association of Japan, EIAJ•ED 2521 A or those with some modifications. No TFT was attached to a TN device or a VA device used for measurement.

Among the values of physical properties, values obtained by use of a sample of a compound itself and values obtained by use of a sample of a liquid crystal composition itself, as they were, were reported herein as data. When a sample in which a compound was mixed to mother liquid crystals was used, values calculated by means of extrapolation were reported herein as data.

Phase Structure and Transition Temperature (° C.):

Measurement was carried out according to the following methods (1) and (2).

(1) A compound was placed on a hot plate of a melting point apparatus (Hot Stage Model FP-52 made by Mettler Toledo International Inc.) equipped with a polarizing microscope, and phase conditions and their changes were observed with the polarizing microscope, specifying the kinds of liquid crystal phases while the compound was heated at the rate of 3° C. per minute.

(2) A sample was heated and then cooled at a rate of 3° C. per minute by use of a Perkin-Elmer differential scanning calorimeter, a DSC-7 System or a Diamond DSC System. A starting point of an endothermic peak or an exothermic peak caused by a phase change of the sample was obtained by means of the extrapolation (on set) and the phase transition temperature was determined.

Hereinafter, the symbol C stood for crystals, which were expressed by $C_1$ or $C_2$ when the kinds of crystals were distinguishable. The symbols S and N stood for a smectic phase and a nematic phase, respectively. The symbol I stood for a liquid (isotropic). When a smectic B phase or a smectic A phase was distinguishable in the smectic phases, they were expressed as $S_B$ or $S_A$ respectively. Transition temperatures were expressed as, for example, "C 50.0 N 100.0 I", which means that the transition temperature from crystals to a nematic phase (CN) is 50.0° C., and the transition temperature from the nematic phase to a liquid (NI) is 100.0° C. The same applied to other transition temperatures.

Maximum Temperature of Nematic Phase ($T_{NI}$; ° C.):

A sample (a liquid crystal composition, or a mixture of a liquid crystal compound and mother liquid crystals) was placed on a hot plate of a melting point apparatus (Hot Stage Model FP-52 made by Mettler Toledo International Inc.) equipped with a polarizing microscope, and was observed with the polarizing microscope while being heated at the rate of 1° C. per minute. A maximum temperature meant a temperature measured when part of the sample began to change from a nematic phase to an isotropic liquid. Hereinafter the maximum temperature of a nematic phase may simply be abbreviated to "maximum temperature".

Compatibility at Low Temperature:

Samples were prepared by mixing a compound with mother liquid crystals so that the amount of the compound became 20% by weight, 15% by weight, 10% by weight, 5% by weight, 3% by weight and 1% by weight, and put in glass vials. After these glass vials had been kept in a freezer at −10° C. or −20° C. for a certain period, they were observed whether or not crystals or a smectic phase had been deposited.

Viscosity (η; measured at 20° C.; mPa·s):

Viscosity was measured by use of an E-type viscometer.

Rotational Viscosity (γ1; measured at 25° C.; mPa·s):

Measurement was carried out according to the method described in M. Imai, et al., Molecular Crystals and Liquid Crystals, Vol. 259, 37 (1995). A sample (a liquid crystal composition, or a mixture of a liquid crystal compound and mother liquid crystals) was put in a VA device in which the distance between two glass substrates (cell gap) was 20 μm. Voltage was applied to the device stepwise with an increment of 1 volt in the range of 30 to 50 volts. After 0.2 second of no voltage application, the voltage application was repeated with only one rectangular wave (rectangular pulse; 0.2 second) and no voltage application (2 seconds). The peak current and the peak time of the transient current generated by the voltage applied were measured. The value of rotational viscosity was obtained from the measured values and the calculating equation (8) in page 40 of the paper presented by M. Imai, et al.

The value of dielectric anisotropy necessary for the calculation was available from the section on dielectric anisotropy described below.

Optical Anisotropy (Refractive Index Anisotropy; Measured at 25° C.; Δn):

Measurement was carried out by use of an Abbe refractometer with a polarizing plate attached to the ocular, on irradiation with light at a wavelength of 589 nm at 25° C. The surface of the main prism was rubbed in one direction, and then a sample (a liquid crystal composition, or a mixture of a liquid crystal compound and mother liquid crystals) was dropped onto the main prism. A refractive index (n||) was measured when the direction of polarized light was parallel to that of the rubbing. A refractive index (n⊥) was measured when the direction of polarized light was perpendicular to that of the rubbing. The value of optical anisotropy was calculated from the equation: Δn=n||−n⊥.

Dielectric Anisotropy (Δ∈; measured at 25° C.):

Dielectric anisotropy was measured by the following method.

An ethanol (20 mL) solution of octadecyltriethoxysilane (0.16 mL) was applied to well-washed glass substrates. The glass substrates were rotated with a spinner, and then heated at 150° C. for 1 hour. A VA device in which the distance (cell gap) was 20 μm was assembled from the two glass substrates.

A polyimide alignment film was prepared on glass substrates in a similar manner. After a rubbing-treatment to the alignment film obtained on the glass substrates, a TN device in which the distance between the two glass substrates was 9 μm and the twist angle was 80 degrees was assembled.

A sample (a liquid crystal composition, or a mixture of a liquid crystal compound and mother liquid crystals) was put in the VA device obtained, and applied with a voltage of 0.5 V (1 kHz, sine waves), and then a dielectric constant (δ||) in a major axis direction of liquid crystal molecules was measured.

The sample (the liquid crystal composition, or the mixture of the liquid crystal compound and the mother liquid crystals) was put in the TN device obtained, and applied with a voltage of 0.5 V (1 kHz, sine waves), and then a dielectric constant (∈⊥) in a minor axis direction of liquid crystal molecules was measured.

The value of dielectric anisotropy was calculated from the equation of ∈=∈||−∈⊥.

Voltage Holding Ratio (VHR; Measured at 25° C.; %):

A TN device used for measurement had a polyimide-alignment film and the distance between two glass substrates (cell gap) was 6 μm. A sample (a liquid crystal composition, or a mixture of a liquid crystal compound and mother liquid crystals) was put in the device, and then the device was sealed with an adhesive polymerizable under ultraviolet irradiation. The TN device was charged by applying pulse voltage (60 microseconds at 5 V). Decaying voltage was measured for 16.7 milliseconds with a High Speed Voltmeter, and the area A between a voltage curve and a horizontal axis in a unit period was measured. The area B was an area without the voltage decay. The voltage holding ratio was the percentage of the area A to the area B.

Elastic Constant ($K_{11}$ and $K_{33}$; Measured at 25° C.):

Elastic Constant Measurement System Model EC-1 made by Toyo Corporation was used for measurement. A sample was put in a homeotropic cell in which the distance between two glass substrates (cell gap) was 20 μm. An electric charge of 20 volts to 0 volts was applied to the cell, and electrostatic capacity and applied voltage were measured. The measured values of the electric capacity (C) and the applied voltage (V) were fitted to equation (2.98) and equation (2.101) in page 75 of LIQUID CRYSTAL DEVICE HANDBOOK (Nikkan Kogyo Shimbun) and the value of the elastic constant was obtained from equation (2.100).

Example 1

Synthesis of 4-ethoxy-2,3-difluoro-4'-(4-ethoxy-2,3-difluorophenoxymethyl)-1,1'-biphenyl (No. 678)

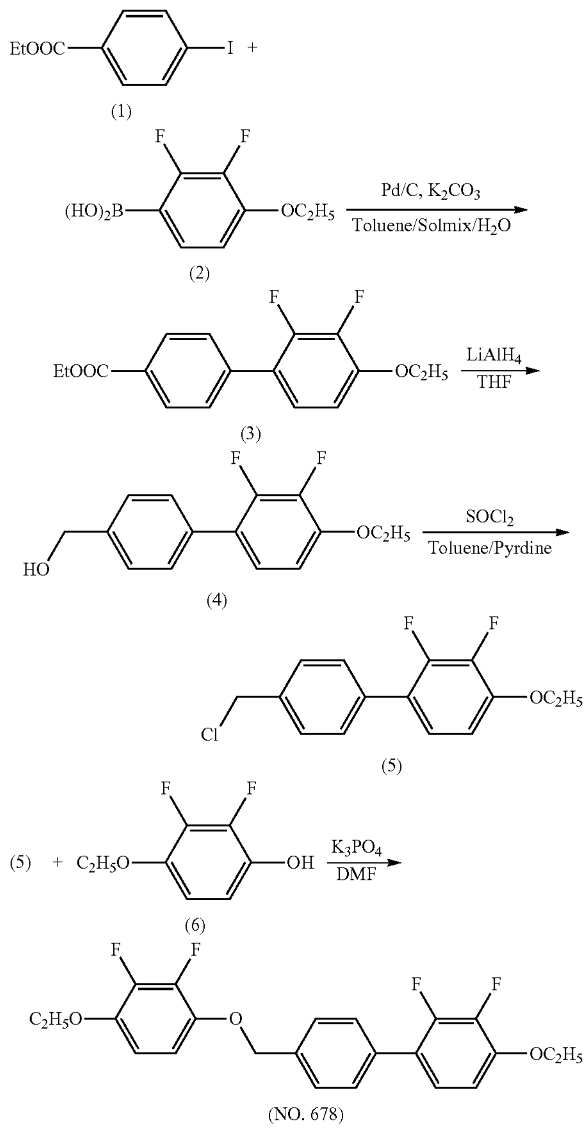

First Step:

Ethyl 4-iodoethylbenzoate (1) (25.0 g), 4-ethoxy-2,3-difluorophenylboronic acid (2) (20.1 g), potassium carbonate (25.0 g), Pd/C (0.25 g), toluene (100 ml), ethanol (100 ml) and water (100 ml) were put in a reaction vessel under a nitrogen atmosphere, and heated under reflux for 2 hours. The reaction mixture was cooled to 25° C., and then poured into water (500 ml) and toluene (500 ml), and mixed. The mixture was then allowed to stand until it had separated into two phases of organic and aqueous phases. The extraction to an organic phase was carried out. The organic phase obtained was washed with water, and then dried over anhydrous magnesium sulfate. The solution obtained was concentrated under reduced pressure, and the residue obtained was purified by means of column chromatography (silica gel; toluene). The product was further purified by means of recrystallization from ethanol and dried, giving 18.8 g of ethyl 4-ethoxy-2,3-difluoro-4'-biphenylcarboxylate (3). The yield based on the compound (1) was 67.9%.

Second Step:

Lithium aluminum hydride (1.4 g) was suspended in THF (100 ml). The compound (3) (18.8 g) was added dropwise to this suspension in the temperature range of −20° C. to −10° C., and the stirring was continued 2 hours. After the completion of reaction had been confirmed by means of GC analysis, ethyl acetate and a saturated aqueous solution of ammonia were added to the reaction mixture under ice cooling and the deposit was removed by filtration through Celite. The filtrate was extracted with ethyl acetate. The organic phase obtained was washed sequentially with water and saturated brine, and then dried over anhydrous magnesium sulfate. The product was purified by means of recrystallization from heptane, dried, concentrated under reduced pressure, giving 12.0 g of (4-ethoxy-2,3-difluoro-4'-biphenyl)methanol (4)

The yield based on the compound (3) was 74.0%.

Third Step:

The compound (4) (12.0 g), toluene (50 ml) and pyridine (0.12 ml) were put in a reaction vessel under a nitrogen atmosphere, and stirred for 1 hour at 45° C. Then, thionyl chloride (3.6 ml) was added in the temperature range of 45° C. to 55° C., and the mixture was heated under reflux for 2 hours. The reaction mixture was cooled to 25° C., and then poured into water (200 ml) and toluene (200 ml), and mixed. The mixture was then allowed to stand until it had separated into organic and aqueous phases, and the extraction into an organic phase was carried out. The organic phase obtained was washed twice with a saturated aqueous solution of sodium hydrogencarbonate and three times with water, and dried over anhydrous magnesium sulfate. The solution obtained was concentrated under reduced pressure, and the residue obtained was purified by means of column chromatography using a mixed solvent of toluene and heptane (toluene: heptane=1:1 by volume) as the eluent and silica gel as the filler. The product was further purified by means of recrystallization from Solmix A-11 and dried, giving 9.4 g of 4'-chloromethyl-4-ethoxy-2,3-difluoro-biphenyl (5). The yield based on the compound (4) was 73.2%.

Fourth Step:

4-Ethoxy-2,3-difluorophenol (6) (1.5 g) and tripotassium phosphate ($K_3PO_4$) (7.5 g) were added to DMF (100 ml) under a nitrogen atmosphere, and the stirring was continued at 70° C. The compound (5) (2.0 g) was added thereto and the stirring was continued at 70° C. for 7 hours. After the reaction mixture obtained had been cooled to 30° C. and then separated from the solid by filtration, toluene (100 ml) and water (100 ml) were added thereto and mixed. The mixture was then allowed to stand until it had separated into two phases of organic and aqueous phases. The extraction into an organic phase was carried out. The organic phase obtained was washed with brine and dried over anhydrous magnesium sulfate. Then, the solvent was distilled off, and the residue obtained was purified by means of column chromatography (silica gel; heptane: toluene=1:2 by volume). The product was further purified by means of recrystallization from a mixed solvent of Solmix A-11 and heptane (Solmix A-11: heptane=1:2 by volume) and dried, giving 2.2 g of 4-ethoxy-2,3-difluoro-4'-(4-ethoxy-2,3-difluorophenoxymethyl)-1,1'-biphenyl (No. 678). The yield based on the compound (5) was 74.0%.

The transition temperature of the compound (No. 678) obtained was as follows.

Transition temperature: C 123.7 (N 113.4) I.

The chemical shift δ (ppm) in $^1$H-NMR analysis was described below, and the compound obtained was identified as 4-ethoxy-2,3-difluoro-4'-(4-ethoxy-2,3-difluorophenoxymethyl)-1,1'-biphenyl.

Chemical shift δ (ppm; $CDCl_3$); 7.49 (dd, 4H), 7.09 (td, 1H), 6.80 (td, 1H), 6.67 (td, 1H), 6.62 (td, 1H), 5.12 (s, 2H), 4.16 (q, 2H), 4.05 (q, 2H), 1.47 (t, 3H) and 1.41 (t, 3H).

Example 2

Synthesis of 4-ethoxy-2,3-difluoro-4'-(4-ethoxy-2,3-difluorophenylethyl)-1,1'-biphenyl (No. 378)

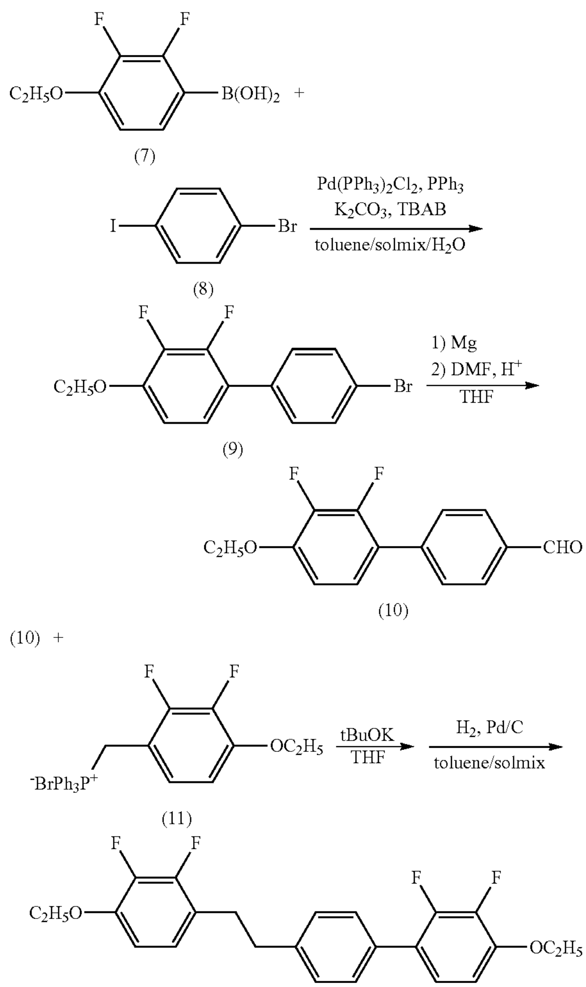

(NO. 378)

First Step:

4-Ethoxy-2,3-difluorophenylboronic acid (7) (14.4 g), 4-bromoiodobenzene (8) (20.0 g), potassium carbonate (29.3 g), $Pd(Ph_3P)_2Cl_2$ (1.49 g), toluene (100 ml), Solmix A-11 (100 ml) and water (100 ml) were put in a reaction vessel under a nitrogen atmosphere, and heated under reflux for 2 hours. The reaction mixture was cooled to 25° C., and then poured into water (500 ml) and toluene (500 ml), and mixed. The mixture was then allowed to separate into organic and aqueous phases. The extraction into an organic phase was carried out. The organic phase obtained was washed with water and dried over anhydrous magnesium sulfate. Then, the solution was concentrated under reduced pressure, and the residue obtained was purified by means of column chromatography (silica gel; toluene). The product was further purified by means of recrystallization (Solmix A-11), giving 20.8 g of 4-ethoxy-4'-bromo-2,3-difluoro-1,1'-biphenyl (9). The yield based on the compound (8) was 94.0%.

Second Step:

Magnesium (dried; 0.83 g) and THF (20 ml) were put into a reaction vessel under a nitrogen atmosphere and heated to 50° C. 4-Ethoxy-4'-bromo-2,3-difluoro-1,1'-biphenyl (9) (10.0 g) dissolved in THF (50 ml) was slowly added dropwise thereto in the temperature range of 40° C. to 60° C., and the stirring was continued for another 60 minutes. Then, N,N-dimethylformamide (3 ml) dissolved in THF (20 ml) was slowly added dropwise in the temperature range of 50° C. to 60° C., and the stirring was continued for another 60 minutes. The reaction mixture obtained was cooled to 30° C., and then poured into a vessel containing 1 N HCl (100 ml) and ethyl acetate (50 ml), and mixed. The mixture was allowed to separate into organic and aqueous phases, and the extraction was carried out. The obtained organic phase was washed sequentially with water, a saturated aqueous solution of sodium hydrogencarbonate, and water, and dried over anhydrous magnesium sulfate. Then, the solvent was distilled off under reduced pressure, and the residue obtained was purified by means of column chromatography (silica gel; toluene), giving 8.3 g of 4-ethoxy-2,3-difluoro-4'-biphenylcarboxyaldehyde (10). The yield based on the compound (9) was 99.2%.

Third Step:

4-Ethoxy-2,3-difluorobenzyltriphenylphosphonium chloride (11) (9.4 g) dried and THF (200 ml) were mixed under a nitrogen atmosphere and cooled to −30° C. Then, potassium t-butoxide (t-BuOK) (2.1 g) was added thereto in the temperature range of −30° C. to −20° C. The stirring was continued at −20° C. for 30 minutes, and the compound (10) (8.3 g) dissolved in THF (50 ml) was added dropwise in the temperature range of −30° C. to −20° C. The reaction mixture was stirred at −10° C. for 30 minutes, it was poured into a mixture of water (100 ml) and toluene (100 ml), and mixed. The mixture was then allowed to separate into organic and aqueous phases, and the extraction into an organic phase was carried out. The organic phase obtained was washed with water and dried over anhydrous magnesium sulfate. The solution obtained was concentrated under reduced pressure, and the residue obtained was purified with a fractional operation by means of column chromatography (silica gel; toluene). The eluent obtained was concentrated under reduced pressure, and dissolved in a mixed solvent of toluene (50 ml) and Solmix A-11 (50 ml). Furthermore, Pd/C (0.5 g) was added, and the stirring was continued under a hydrogen atmosphere at room temperature under a hydrogen atmosphere until hydrogen absorption had ceased. After the reaction had been completed, Pd/C was removed and the solvent was distilled off. The residue obtained was purified by means of column chromatography (silica gel; heptane: toluene=3:7 by volume), and further purified by means of recrystallization (Solmix A-11: heptane=1:2 by volume), giving 5.9 g of 4-ethoxy-2,3-difluoro-4'-(4-ethoxy-2,3-difluorophenoxymethyl)-1,1'-biphenyl (No. 378). The yield based on the compound (10) was 44.6%.

The transition temperature of the compound (No. 378) obtained was as follows.

Transition temperature: C 99.0 N 112.1 I.

The chemical shift δ (ppm) in $^{1}$H-NMR analysis was described below, and the compound obtained was identified as 4-ethoxy-2,3-difluoro-4'-(4-ethoxy-2,3-difluorophenoxymethyl)-1,1'-biphenyl (No. 378).

Chemical shift δ (ppm; $CDCl_3$); 7.42 (d, 2H), 7.24 (d, 2H), 7.08 (td, 1H), 6.77 (qd, 2H), 6.62 (td, 1H), 4.15 (q, 2H), 4.08 (q, 2H), 2.92 (s, 4H), 1.48 (t, 3H) and 1.44 (t, 3H).

Example 3

Synthesis of 2,3-difluoro-4-ethoxy-[trans-4-(2,3-difluoro-4-ethoxyphenylethenyl)cyclohexyl]benzene (No. 228)

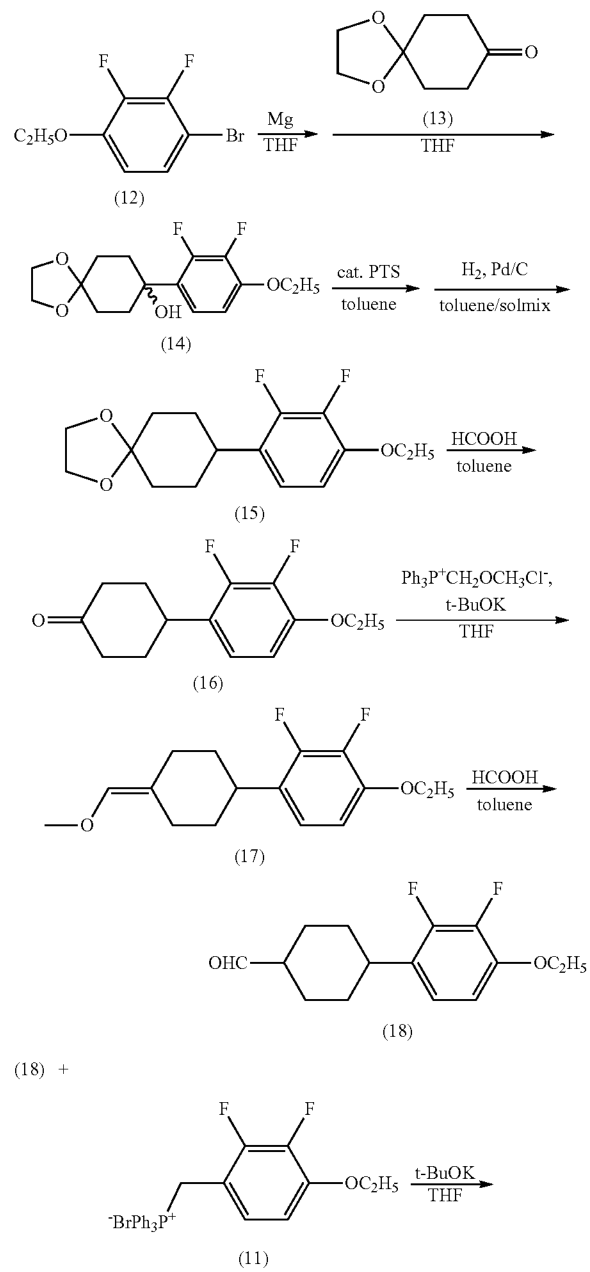

-continued

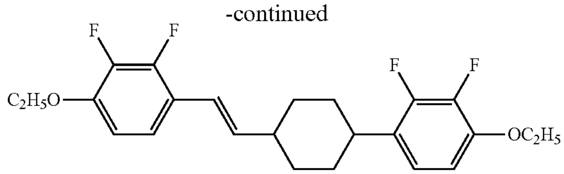

(NO. 228)

First Step:

Magnesium (dried; 6.1 g) and THF (20 ml) were put in a reaction vessel under a nitrogen atmosphere, and heated to 40° C. 1-Bromo-4-ethoxy-2,3-difluorobenzene (12) (59.2 g) dissolved in THF (300 ml) was slowly added dropwise thereto in the temperature range of 40° C. to 60° C., and the stirring was continued for another 60 minutes. Then, 1,4-dioxaspyro [4.5]decane-8-one (13) (30.0 g) dissolved in THF (150 ml) was slowly added dropwise in the temperature range of 50° C. to 60° C., and the stirring was continued for another 60 minutes. The obtained reaction mixture was cooled to 30° C., poured into to a vessel containing an aqueous solution of ammonium chloride (3%; 900 ml) and toluene (500 ml) which were cooled to 0° C., and mixed. The mixture obtained was allowed to stand until it had separated into organic and aqueous phases, and the extraction into an organic phase was carried out. The organic phase obtained was washed sequentially with water, a saturated aqueous solution of sodium hydrogencarbonate and water, and dried over anhydrous magnesium sulfate. Then, the solvent was distilled off under reduced pressure, giving 86.2 g of 8-(4-ethoxy-2,3-difluorophenyl)-1,4-dioxaspyro[4.5]decan-8-ol (14). The obtained compound (14) was yellow oil.

Second Step:

The compound (14) (86.2 g), p-toluenesulfonic acid (2.4 g) and toluene (250 ml) was mixed and heated under reflux for 2 hours while water being distilled was removed. The obtained reaction mixture was cooled to 30° C., water (500 ml) and toluene (900 ml) were added to the mixture obtained, and mixed. The mixture was allowed to separate into organic and aqueous phases, and the extraction into an organic phase was carried out. The organic phase obtained was washed sequentially with a saturated aqueous solution of sodium hydrogencarbonate and water, and dried over anhydrous magnesium sulfate. The solution obtained was purified by means of column chromatography (silica gel; toluene). The product was dissolved in a mixed solvent of toluene (150 ml) and Solmix A-11 (150 ml), and Pd/C (3.0 g) was added thereto. The stirring was continued under a hydrogen atmosphere until hydrogen absorption had ceased. After the reaction had been completed, Pd/C was removed and the solvent was distilled off. The residue obtained was purified by means of column chromatography (silica gel; heptane), and further purified by means of recrystallization (Solmix A-11), giving 59.7 g of 8-(4-ethoxy-2,3-difluorophenyl)-1,4-dioxaspyro[4.5]decane (15). The obtained compound (15) was yellow oil.

Third Step:

The compound (15) (59.7 g), 87% formic acid (20 ml) and toluene (200 ml) were mixed, and this mixture was heated under reflux for 2 hours. The reaction mixture was cooled to 30° C., and water (500 ml) and toluene (1000 ml) were added and mixed. The mixture was then allowed to stand until it had separated into two phases of organic and aqueous phases. The extraction into an organic phase was carried out. The obtained organic phase was washed with water, a saturated aqueous solution of sodium hydrogencarbonate, and water, and dried over anhydrous magnesium sulfate. Then, the solvent was distilled off under reduced pressure, the residue obtained was purified by means of separation using column chromatography (silica gel; toluene) and recrystallization (heptane), giving 27.5 g of 1-(4-ethoxy-2,3-difluorophenyl)-cyclohexane-4-one (16). The yield based on the compound (13) was 56.4%.

Fourth Step:

Methoxymethyltriphenylphosphonium chloride (dried; 26.3 g) and THF (100 ml) were mixed under a nitrogen atmosphere and cooled to −30° C. Then, potassium t-butoxide (t-BuOK) (8.6 g) was added in twice in the temperature range of −30° C. to −20° C. The stirring was continued at −20° C. for 30 minutes, and the compound (16) (15.0 g) dissolved in THF (100 ml) was added dropwise in the temperature range of −30° C. to −20° C. The reaction mixture was stirred at −10° C. for 30 minutes, poured into a mixture of water (200 ml) and toluene (200 ml), and mixed. The mixture was allowed to separate into organic and aqueous phases, and the extraction into an organic phase was carried out. The organic phase obtained was washed with water, and dried over anhydrous magnesium sulfate. The solution obtained was concentrated under reduced pressure and the residue was purified by means of column chromatography (silica gel; toluene). The eluent obtained was concentrated under reduced pressure, giving 21.8 g of 1-(4-ethoxy-2,3-difluorophenyl)-4-methoxymethylenecyclohexane (17). The compound obtained (17) was colorless oil.

Fifth Step:

The compound (17) (16.6 g), formic acid (87%; 6.2 g) and toluene (100 ml) were mixed and this mixture was heated under reflux for 2 hours. The reaction mixture was cooled to 30° C. Water (100 ml) and toluene (200 ml) were added to the mixture obtained and mixed. The mixture was allowed to stand until it had separated into two phases of organic and aqueous phases, and the extraction into an organic phase was carried out. The obtained organic phase was washed sequentially with water, a saturated aqueous solution of sodium hydrogencarbonate and water, and dried over anhydrous magnesium sulfate. Then, the solvent was distilled off under reduced pressure, giving 19.0 g of light yellow solids. The residue dissolved in toluene (50 ml) was added to a mixture of 95% sodium hydroxide (0.5 g) and methanol (200 ml) which was cooled to 7° C. The mixture obtained was stirred at 10° C. for 2 hours. Then, aqueous 2N-sodium hydroxide solution (20 ml) was added and the stirring was continued at 5° C. for 2 hours. The reaction mixture obtained was poured into a mixture of water (500 ml) and toluene (500 ml), and mixed. The mixture was then allowed to stand until it had separated into two phases of organic and aqueous phases, and the extraction into an organic phase was carried out. The organic phase obtained was fractioionated, washed with water, and then dried over anhydrous magnesium sulfate. Then, the solvent was distilled off, and the residue obtained was purified by means of column chromatography (silica gel; toluene), giving 11.9 g of 1-(4-ethoxy-2,3-difluorophenyl)-cyclohexanecarboaldehyde (18). The yield based on the compound (16) was 75.2%.

Sixth step:

4-Ethoxy-2,3-difluorobenzyltriphenylphosphonium chloride (11) (dried; 24.9 g) and THF (100 ml) were mixed under a nitrogen atmosphere and cooled to −10° C. Then, potassium t-butoxide (t-BuOK) (5.4 g) was added thereto in twice in the temperature range of −10° C. to −5° C. The stirring was continued at −10° C. for 60 minutes, and then the compound (18) (10.0 g) dissolved in THF (30 ml) was added thereto dropwise in the temperature range of −10° C. to −5° C. The stirring was continued at 0° C. for 30 minutes, and then the reaction mixture was poured into a mixture of water (100 ml)

and toluene (50 ml), and mixed. The mixture was then allowed to separate into organic and aqueous phases, and the extraction into an organic phase was carried out. The organic phase obtained was washed with water and dried over anhydrous magnesium sulfate. The solution obtained was concentrated under reduced pressure and the residue obtained was purified with a fractional operation by means of column chromatography (silica gel; toluene). The eluent obtained was concentrated under reduced pressure. Sodium benzenesulphinate dihydrate (2.6 g) was added, with stirring, to obtained light yellow crystals in Solmix A-11 (20 ml) and then 6N-hydrochloric acid (2.2 ml) was added, and the mixture was heated under reflux for 5 hours. The reaction mixture was cooled to 30° C., and water (100 ml) and toluene (100 ml) were added to the mixture obtained, and mixed. The mixture was then allowed to separate into organic and aqueous phases, and the extraction into an organic phase was carried out. The obtained organic phase were washed sequentially with water, aqueous 0.5 N-sodium hydroxide solution, a saturated aqueous solution of sodium hydrogencarbonate, and dried over anhydrous magnesium sulfate. The solution obtained was concentrated under reduced pressure and the residue obtained was purified by means of column chromatography (silica gel; heptane: toluene=2:3 by volume), and the eluent was concentrated under reduced pressure. The residue obtained was purified by means of recrystallization (heptane: Solmix=3:2 by volume), giving 10.6 g of 2,3-difluoro-4-ethoxy-[trans-4-(2,3-difluoro-4-ethoxyphenylethenyl)cyclohexyl]benzene (No. 228). The yield based on the compound (18) was 67.5%.

The transition temperature of the compound (No. 228) obtained was as follows.

Transition temperature: C 110.1 I.

The chemical shift δ (ppm) in $^1$H-NMR analysis was described below, and the compound obtained was identified as 2,3-difluoro-4-ethoxy-[trans-4-(2,3-difluoro-4-ethoxyphenylethenyl)cyclohexyl]benzene (No. 228). Solvent used for measurement is.

Chemical shift δ (ppm; $CDCl_3$); 7.07 (td, 1H), 6.85 (td, 1H), 6.68 (td, 2H), 6.43 (d, 1H), 6.17 (dd, 1H), 4.10 (q, 4H), 2.79 (tt, 1H), 2.20 (m, 1H), 1.94 (td, 4H) and 1.59-1.43 (m, 10H).

Example 4

Synthesis of 2,3-difluoro-4-ethoxy-[trans-4-(2,3-difluoro-4-ethoxyphenylethyl)cyclohexyl]benzene (No. 528)

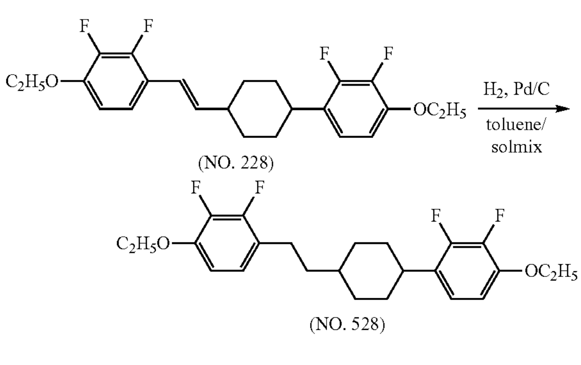

First Step:

The compound (No. 228) (15.6 g) was dissolved in a mixed solvent of toluene (150 ml) and Solmix A-11 (150 ml) and Pd/C (1.0 g) was added therein, and then the stirring was continued at room temperature under a hydrogen atmosphere until hydrogen absorption had ceased. After the reaction had been completed, Pd/C was removed and the solvent was distilled off. The residue obtained was purified by means of column chromatography (silica gel; heptane/toluene=2/3 by volume), and further purified by means of recrystallization (heptane: Solmix=3:2 by volume), giving 8.8 g of 2,3-difluoro-4-ethoxy-[trans-4-(2,3-difluoro-4-ethoxyphenylethyl)cyclohexyl]benzene (No. 528). The yield based on the compound (No. 228) was 56.8%.

The transition temperature of the compound (No. 528) obtained was as follows.

Transition temperature: C 114.3 (N 109.6) I.

The chemical shift δ (ppm) in $^1$H-NMR analysis was described below, and the compound obtained was identified as 2,3-difluoro-4-ethoxy-[trans-4-(2,3-difluoro-4-ethoxyphenylethyl)cyclohexyl]benzene.

Chemical shift δ (ppm; $CDCl_3$); 6.81 (m, 2H), 6.65 (m, 2H), 4.10 (q, 2H), 4.08 (q, 2H), 2.75 (tt, 2H), 2.63 (t, 2H), 1.91 (d, 2H), 1.86 (d, 2H), 1.57-1.38 (m, 9H), 1.38-1.26 (m, 1H) and 1.19-1.07 (m, 2H).

Example 5

Synthesis of 2,3-difluoro-4-ethoxy-[trans-4-(2,3-difluoro-4-ethoxyphenoxymethyl)cyclohexyl]benzene (No. 828)

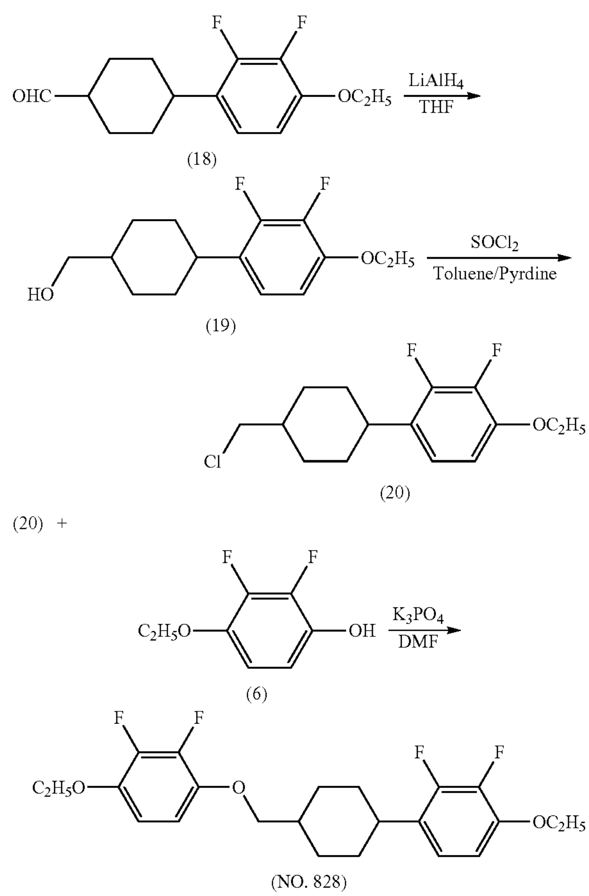

First Step:

Lithium aluminum hydride (4.2 g) was suspended in THF (300 ml). 1-(4-Ethoxy-2,3-difluorophenyl)-cyclohexanecarboaldehyde (18) (50.0 g) was added to this suspension dropwise in the temperature range of −20° C. to −10° C., and the stirring was continued in this temperature range for another 2 hours. After the completion of reaction had been confirmed by means of GC analysis, ethyl acetate and a saturated aqueous solution of ammonia were sequentially added to the reaction mixture under ice cooling, and the deposit was removed by filtration through Celite. The filtrate was extracted in ethyl acetate. The organic phase obtained was washed sequentially with water and saturated brine, and dried over anhydrous magnesium sulfate. The product was purified by means of recrystallization (heptane) and concentrated under reduced pressure, giving 47.6 g of 4-hydroxymethyl-(4-ethoxy-2,3-difluoro)cyclohexane (19). The yield based on the compound (18) was 94.5%.

Second Step:

The compound (19) (47.6 g), toluene (300 ml) and pyridine (0.5 ml) were put in a reaction vessel under a nitrogen atmosphere, and the stirring was continued at 45° C. for 1 hour. Then, thionyl chloride (14.0 ml) was added in the temperature range of 45° C. to 55° C., and the solution was heated under reflux for 2 hours. The reaction mixture was cooled to 25° C., and then poured into water (300 ml) and toluene (300 ml), and mixed. The mixture was then allowed to separate into organic and aqueous phase, and the extraction into an organic phase was carried out. The organic phase obtained was washed twice with a saturated aqueous solution of sodium hydrogencarbonate and three times with water, and dried over anhydrous magnesium sulfate. The solution obtained was concentrated under reduced pressure, and the residue obtained was purified by means of column chromatography (silica gel; heptane/toluene=1:1 by volume), and further purified by means of recrystallization (Solmix A-11), giving 47.6 g of 4-chloromethyl-(4-ethoxy-2,3-difluorophenyl)-cyclohexane (20). The yield based on the compound (19) was 93.6%.

Third Step:

4-Ethoxy-2,3-difluorophenol (6) (2.2 g) and tripotassium phosphate ($K_3PO_4$) (11.0 g) were added to DMF (100 ml) under a nitrogen atmosphere, and the stirring was continued at 70° C. The compound (20) (3.0 g) was added thereto, and the stirring was continued at 70° C. for 7 hours. After the reaction mixture obtained had been cooled to 30° C. and separated from the solid by filtration, toluene (100 ml) and water (100 ml) were added thereto and mixed. The mixture was then allowed to separate into organic and aqueous phases. The extraction into an organic phase was carried out. The organic phase obtained was washed with brine and dried over anhydrous magnesium sulfate. Then, the solvent was distilled off, and the residue obtained was purified by means of column chromatography (silica gel/toluene=1/2 by volume). The product was further purified by means of recrystallization (Solmix A-11: heptane=1:2 by volume), giving 2.2 g of 1-(4-ethoxy-2,3-difluorophenyl)-4-(4-ethoxy-2,3-difluorophenoxymethyl)-cyclohexane (No. 828). The yield based on the compound (20) was 74.0%.

The transition temperature of the compound (No. 828) obtained was as follows.

Transition temperature: C 97.0 N 102.5 I.

The chemical shift δ (ppm) in $^1$H-NMR analysis was described below, and the compound obtained was identified as 2,3-difluoro-4-ethoxy-[trans-4-(2,3-difluoro-4-ethoxyphenoxymethyl)cyclohexyl]benzene (No. 828).

Chemical shift δ (ppm; $CDCl_3$); 6.84 (td, 1H), 6.67 (td, 1H), 6.63 (d, 2H), 4.09 (q, 2H), 4.06 (q, 2H), 3.83 (d, 2H), 2.80 (tt, 1H), 2.06-2.00 (m, 2H), 1.97-1.83 (m, 3H), 1.51 (qd, 2H), 1.42 (q, 6H) and 1.25 (qd, 2H).

Example 6

Synthesis of 4-ethoxy-2,3-difluoro-4'-(4-butoxy-2,3-difluorophenoxymethyl)-1,1'-biphenyl (No. 681)

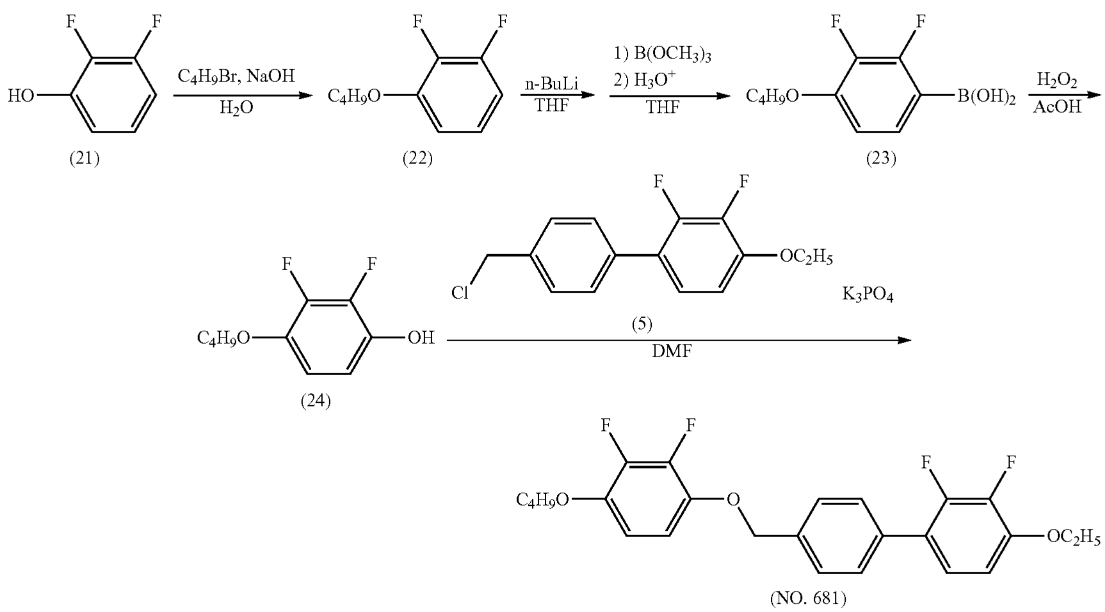

First Step:

2,3-Difluorophenol (21) (100.0 g) and sodium hydroxide (NaOH; 36.9 g) were added to water (300 ml) under a nitrogen atmosphere, and the stirring was continued at 70° C. 1-Bromobutane (158.0 g) was added thereto, and the stirring was continued at 70° C. for 2 hours. The reaction mixture obtained was cooled to 30° C., heptane (100 ml) and water (100 ml) were added, and mixed. The mixture was then allowed to separate into organic and aqueous phases. The extraction into an organic phase was carried out. The organic phase obtained was washed with brine and dried over anhydrous magnesium sulfate. Then, fractional distillation was carried out under reduced pressure, giving 114.4 g of 4-butoxy-2,3-difluorobenzene (22). The compound (22) obtained was a colorless oil having a boiling point of 109° C. to 110° C./20 mmHg. The yield based on the compound (21) was 80.0%.

Second Step:

The compound (22) (84.6 g) and THF (500 ml) were put in a reaction vessel under a nitrogen atmosphere, and cooled to −74° C. n-Butyllithium (1.65 M in a n-hexane solution; 303.0 ml) was added dropwise in the temperature range of −74° C. to −70° C., and the stirring was continued for another 2 hours. Then, the mixture was added dropwise to a THF (200 ml) solution of trimethyl borate (56.7 g) in the temperature range of −74° C. to −65° C., and the stirring was continued for another 8 hours while the mixture was allowed to return to 25° C. Subsequently, the reaction mixture was poured into a vessel containing 1N—HCl (100 ml) and ice-water (500 ml), and mixed. Ethyl acetate (300 ml) was added thereto and the mixture was allowed to separate into organic and aqueous phases, and the extraction was carried out. The organic phase obtained was washed sequentially with water, a saturated aqueous solution of sodium hydrogencarbonate and brine, and dried over anhydrous magnesium sulfate. Then the solvent was distilled off under reduced pressure, giving 4-butoxy-2,3-difluorophenylboronic acid (23) (6.4 g). The yield based on the compound (22) was 69.2%.

Third Step:

The compound (23) (40.0 g) and acetic acid (100 ml) were put in a reaction vessel under a nitrogen atmosphere, and hydrogen peroxide (31% aqueous solution; 40.4 ml) was added dropwise in the temperature range of 25° C. to 30° C., and the stirring was continued for another 2 hours. Then the reaction mixture was poured into a vessel containing sodium hydrogen sulfite solution (100 ml) and ethyl acetate (300 ml), and mixed. Then the mixture was allowed to separate into organic and aqueous phases, and the extraction was carried out. The organic phase obtained was washed sequentially with water and brine, and dried over anhydrous magnesium sulfate. Then the solvent was distilled off under reduced pressure, giving 31.7 g of 4-butoxy-2,3-difluorophenol (24). The yield based on the compound (23) was 90.2%.

Fourth Step:

4-Butoxy-2,3-difluorophenol (24) (3.6 g) and tripotassium phosphate ($K_3PO_4$) (11.3 g) were added to DMF (100 ml) under a nitrogen atmosphere, and the stirring was continued at 70° C. The compound (5) (3.0 g) was added thereto, and the stirring was continued at 70° C. for 7 hours. After the reaction mixture obtained had been cooled to 30° C. and then separated from the solid by filtration, toluene (100 ml) and water (100 ml) were added thereto and mixed. The mixture was then allowed to separate into organic and aqueous phases, and the extraction into an organic phase was carried out. The organic phase obtained was washed with brine and dried over anhydrous magnesium sulfate. Then, the solvent was distilled off under reduced pressure, and the residue obtained was purified by means of column chromatography (silica gel; heptane/toluene=1/2 by volume). The product was further purified by means of recrystallization (Solmix A-11: heptane=1:2 by volume), giving 3.62 g of 1-(4-butoxy-2,3-difluoro)-4-(4-ethoxy-2,3-difluorophenoxymethyl)-cyclohexane (No. 681). The yield based on the compound (5) was 76.1%.

The transition temperature of the compound (No. 681) obtained was as follows.

Transition temperature: C 115.7 (N 106.7) I.

The chemical shift δ (ppm) in $^1$H-NMR analysis was described below, and the compound obtained was identified as 4-ethoxy-2,3-difluoro-4'-(4-butoxy-2,3-difluorophenoxymethyl)-1,1'-biphenyl.

Chemical shift δ (ppm; $CDCl_3$); 7.51 (d, 2H), 7.48 (d, 2H), 7.08 (td, 1H), 6.79 (td, 1H), 6.66 (td, 1H), 6.62 (td, 1H), 4.16 (q, 2H), 3.98 (t, 2H), 1.77 (tt, 2H), 1.53-1.43 (m, 5H) and 0.97 (t, 3H).

Example 7

Synthesis of 2,3-difluoro-4-ethoxy-[trans-4-(2,3-difluoro-4-butoxyphenoxymethyl)cyclohexyl]benzene (No. 831)

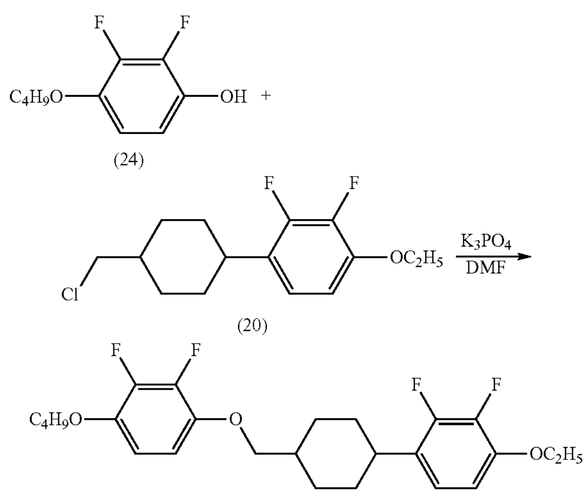

(NO. 831)

First Step:

4-Butoxy-2,3-difluorophenol (24) (4.6 g) and tripotassium phosphate ($K_3PO_4$) (14.0 g) were added to DMF (100 ml) under a nitrogen atmosphere, and the stirring was continued at 70° C. The compound (20) (3.0 g) was added thereto, and the stirring was continued at 70° C. for 7 hours. After the reaction mixture obtained had been cooled to 30° C. and separated from solid materials by filtration, toluene (100 ml) and water (100 ml) were added thereto, and mixed. The mixture was then allowed to separate into organic and aqueous phases, and the extraction into an organic phase was carried out. The organic phase obtained was washed with brine and dried over anhydrous magnesium sulfate. Then, the solvent was distilled off, and the residue obtained was purified by means of column chromatography (silica gel; heptane/toluene=1/2 by volume). The product was further purified by means of recrystallization (Solmix A-11: heptane=1:2 by volume), giving 4.02 g of 2,3-difluoro-4-ethoxy-[trans-4-(2,3-difluoro-4-butoxyphenoxymethyl)cyclohexyl]benzene (No. 831). The yield based on the compound (20) was 85.1%.

The transition temperature of the compound (No. 831) obtained was as follows.

Transition temperature: C 72.4 N 92.8 I.

The chemical shift δ (ppm) in $^{1}$H-NMR analysis was described below, and the compound obtained was identified as 2,3-difluoro-4-ethoxy-[trans-4-(2,3-difluoro-4-butoxyphenoxymethyl)cyclohexyl]benzene (No. 831).

Chemical shift δ (ppm; $CDCl_3$); 6.84 (td, 1H), 6.67 (td, 1H), 6.62 (d, 2H), 4.09 (q, 2H), 3.99 (t, 2H), 3.82 (d, 2H), 2.80 (tt, 1H), 2.03 (dd, 2H), 1.96-1.82 (m, 3H), 1.77 (quin, 2H), 1.57-1.45 (m, 4H), 1.43 (t, 3H), 1.25 (qd, 2H) and 0.97 (t, 3H).

Example 8

Synthesis of 4-ethoxy-2,3-difluoro-4'-(2-fluorophenylethyl)-1,1'-biphenyl (No. 497)

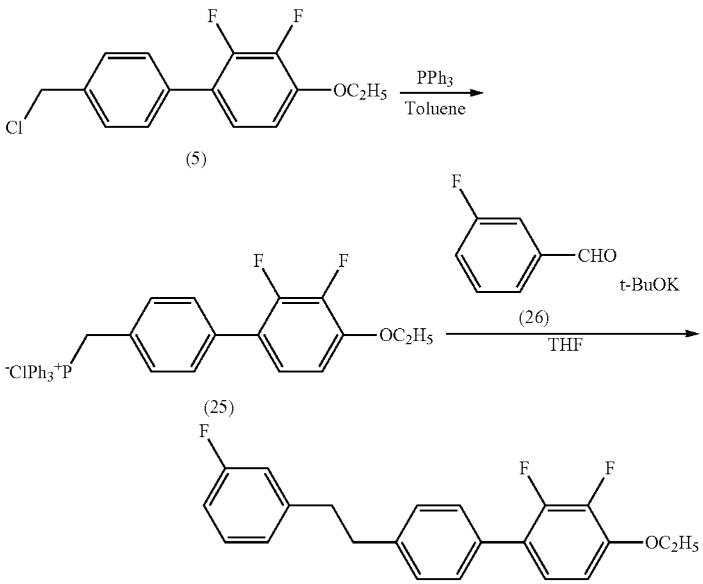

(5) (26) (25) (NO. 497)

First Step:

The compound (5) (20.0 g), triphenylphosphine (37.1 g) and toluene (200 ml) were mixed under a nitrogen atmosphere, and this mixture was heated under reflux for 2 hours. The reaction mixture was filtered and unreacted starting materials were washed away with toluene three times, giving 38.5 g of 4-ethoxy-2,3-difluoro-1,1'-biphenylmethyltriphenylphosphonium chloride (25). The yield based on the compound (5) was 99.9%.

Second Step:

The compound (25) (dried; 26.3 g) and THF (200 ml) were mixed under a nitrogen atmosphere and cooled to −30° C. Then, potassium t-butoxide (t-BuOK; 5.4 g) was added thereto in twice in the temperature range of −30° C. to −20° C. After the mixture had been stirred at −20° C. for 30 minutes, 3-fluorobenzaldehyde (26) (5.0 g) dissolved in THF (100 ml) was added dropwise in the temperature range of −30° C. to −20° C. After the mixture had been stirred at −10° C. for 30 minutes, the reaction mixture was poured into a mixture of water (200 ml) and toluene (200 ml), and mixed. The mixture was then allowed to separate into organic and aqueous phases, and the extraction into an organic phase was carried out. The organic phase obtained was washed with water and dried over anhydrous magnesium sulfate. The solution obtained was concentrated under reduced pressure and the residue obtained was purified by means of column chromatography (silica gel; toluene). The eluent obtained was concentrated under reduced pressure, and further purified by means of recrystallization (Solmix A-11: heptane=2:1 by volume), giving 13.0 g of 4-ethoxy-2,3-difluoro-1,1'-biphenylethyl-3-fluorobenzene (No. 497). The yield based on the compound (26) was 90.5%.

The transition temperature of the compound (No. 497) obtained was as follows.

Transition temperature: $C_1$ 59.0 $C_2$ 61.2 I.

The chemical shift δ (ppm) in $^{1}$H-NMR analysis was described below, and the compound obtained was identified as 4-ethoxy-2,3-difluoro-1,1'-biphenylethyl-3-fluorobenzene (No. 497).

Chemical shift δ (ppm; $CDCl_3$); 7.43 (dd, 2H), 7.24 (m, 3H), 7.09 (td, 1H), 7.00 (d, 1H), 6.90 (m, 2H), 6.79 (td, 1H), 4.15 (q, 2H), 2.95 (s, 4H) and 1.48 (t, 3H).

Example 9

Synthesis of 1-(4-ethoxy-2,3-difluorophenyl)-4-(4-butoxy-2,3-difluorophenyl)cyclohexene (No. 77)

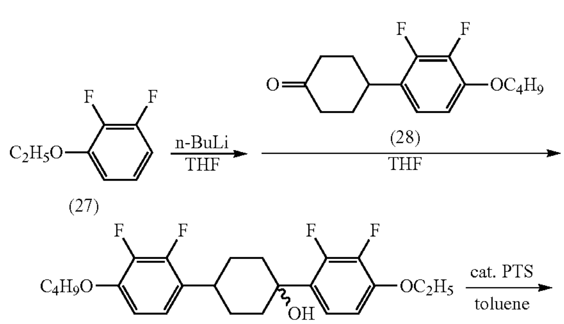

(27) (28) (29)

-continued

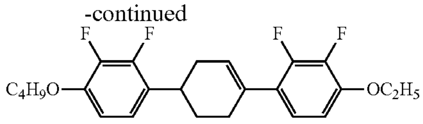

(NO. 77)

First Step:

1-Ethoxy-2,3-difluorobenzene (27) (7.0 g) and THF (200 ml) were added to a reaction vessel under a nitrogen atmosphere, and cooled to −74° C. n-Butyl lithium (1.57 M in n-hexane; 31.0 ml) was added dropwise in the temperature range of −74° C. to −70° C., and the stirring was continued for another 2 hours. Then, 1-(4-butoxy-2,3-difluorophenyl)-cyclohexane-4-one (28) (12.5 g) dissolved in THF (50 ml) was slowly added dropwise in the temperature range of 50° C. to 60° C., and stirring was continued for another 60 minutes. The obtained reaction mixture was cooled to 30° C., and then poured into a vessel containing an aqueous solution of ammonium chloride (3%; 400 ml) and toluene (200 ml) cooled to 0° C., and mixed. Then the mixture was allowed to separate into organic and aqueous phases, and the extraction into an organic phase was carried out. The organic phase obtained was washed sequentially with water, a saturated aqueous solution of sodium hydrogencarbonate and water, and dried over anhydrous magnesium sulfate. Then, the solvent was distilled off under reduced pressure, giving 19.0 g of 1-(4-ethoxy-2,3-difluorophenyl)-4-(4-butoxy-2,3-difluorophenyl)cyclohexan-1-ol (29). The obtained compound (29) was yellow oil.

Second Step:

The compound (29) (19.0 g), p-toluenesulfonic acid (0.57 g) and toluene (200 ml) were mixed, and the mixture was heated under reflux for 2 hours while water being distilled was removed. The obtained reaction mixture was cooled to 30° C., and water (200 ml) and toluene (200 ml) were added thereto, and mixed. The mixture was then allowed to separate into organic and aqueous phases, and the extraction into an organic phase was carried out. The organic phase obtained was washed sequentially with a saturated aqueous solution of sodium hydrogencarbonate and water, and dried over anhydrous magnesium sulfate. The solution obtained was purified by means of column chromatography (silica gel; toluene), and further purified by means of recrystallization (Solmix A-11: ethyl acetate=2:1 by volume), giving 10.3 g of 1-(4-ethoxy-2,3-difluorophenyl)-4-(4-butoxy-2,3-difluorophenyl)cyclohexene (No. 77). The yield based on the compound (27) was 55.0%.

The transition temperature of the compound (No. 77) obtained was as follows.

Transition temperature: $C_1$ 61.8 $C_2$ 67.5 N 105.8 I.

The chemical shift δ (ppm) in $^1$H-NMR analysis was described below, and the compound obtained was identified as 1-(4-ethoxy-2,3-difluorophenyl)-4-(4-butoxy-2,3-difluorophenyl)cyclohexene (No. 77).

Chemical shift δ (ppm; $CDCl_3$); 6.90 (dd, 2H), 6.69 (dd, 2H), 5.99 (m, 1H), 4.12 (q, 2H), 4.03 (t, 2H), 3.18 (m, 1H), 2.63-2.38 (m, 3H), 2.35-2.25 (m, 1H), 2.04-1.98 (m, 1H), 1.98-1.88 (m, 1H), 1.80 (quin, 2H), 1.54-1.43 (m, 5H) and 0.98 (t, 3H).

Example 10

Synthesis of 1-(4-ethoxy-2,3-difluorophenyl)-4-(4-butoxy-2,3-difluorophenyl)cyclohexane (No. 78)

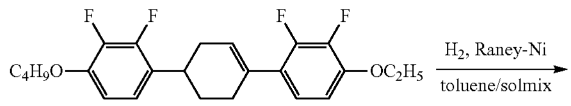

(NO. 77)

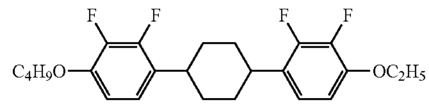

(NO. 78)

First Step:

The compound (No. 77) (9.0 g) was dissolved in a mixed solvent of toluene (150 ml) and Solmix A-11 (150 ml), and Raney nickel (0.90 g) was added thereto. The stirring was continued at room temperature under a hydrogen atmosphere until hydrogen absorption had ceased. After the reaction had been completed, the Raney nickel was removed, and the solvent was distilled off. The residue obtained was purified by means of column chromatography (silica gel; heptane: toluene=1:2 by volume), and the obtained residue was further purified by means of recrystallization (ethyl acetate: Solmix=1:2 by volume), giving 6.2 g of 1-(4-ethoxy-2,3-difluorophenyl)-4-(4-butoxy-2,3-difluorophenyl)cyclohexane (No. 78). The yield based on the compound (No. 77) was 68.3%.

The transition temperature of the compound (No. 78) obtained was as follows.

Transition temperature: C 85.6 N 124.2 I.

The chemical shift δ (ppm) in $^1$H-NMR analysis was described below, and the compound obtained was identified as 1-(4-ethoxy-2,3-difluorophenyl)-4-(4-butoxy-2,3-difluorophenyl)cyclohexane (No. 78).

Chemical shift δ (ppm; $CDCl_3$); 6.89 (dd, 2H), 6.70 (dd, 2H), 4.10 (q, 2H), 4.03 (t, 2H), 2.88 (m, 2H), 1.97 (d, 4H), 1.80 (quin, 2H), 1.70-1.59 (m, 4H), 1.55-1.48 (m, 2H), 1.45 (t, 3H) and 0.98 (t, 3H).

Example 11

The compounds (No. 1) to (No. 1410) shown below can be synthesized by synthetic methods similar to those described in Examples 1 to 10. Attached data were measured in accordance with the methods described above. Measured values of the compound itself were used for the transition temperature, and extrapolated values converted from the measured values of the sample, in which the compound was mixed in the mother liquid crystals (i), by means of the extrapolation method described above were used for the maximum temperature ($T_{NI}$), the dielectric anisotropy (Δε) and the optical anisotropy (Δn).

The values for the compounds No. 228, 678 and 681 were obtained by preparing compositions consisting of 95% by weight of the mother liquid crystals and 5% by weight of the compounds, and measuring the physical properties of the liquid crystal composition obtained, and extrapolating the measured values.

The values for the compound No. 528 were obtained by preparing compositions consisting of 90% by weight of the mother liquid crystals and 10% by weight of the compound, and measuring the physical properties of the liquid crystal composition obtained, and extrapolating the measured values.

The values for compounds for which data are described were obtained by preparing compositions consisting of 85% by weight of the mother liquid crystals and 15% by weight of the compounds, and measuring the physical properties of the liquid crystal composition obtained, and extrapolating the measured values.

| No. | |
|---|---|
| 1 | 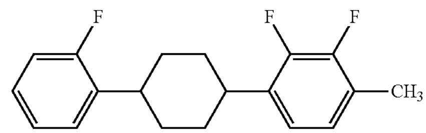 |
| 2 | 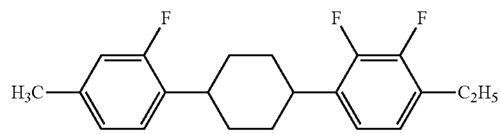 |
| 3 | 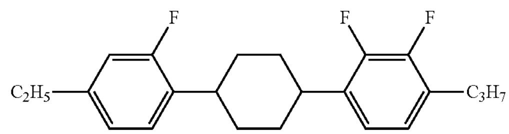 |
| 4 | 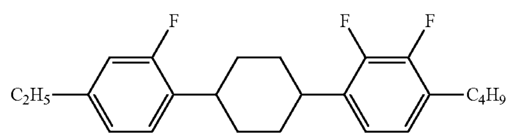 |
| 5 | 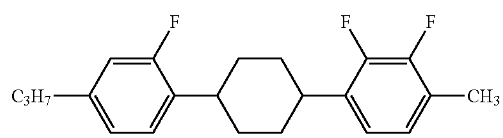 |
| 6 | 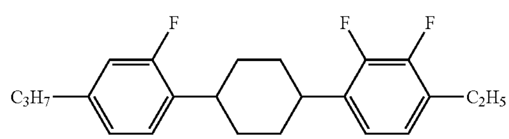 |
| 7 | 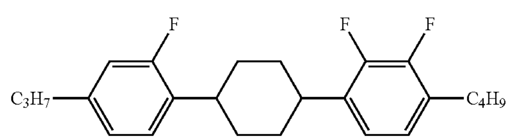 |
| 8 | 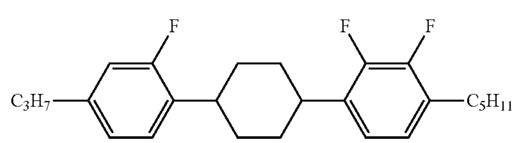 |
| 9 | 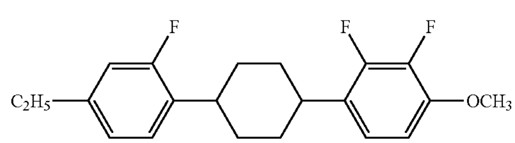 |

-continued
| No. | |
|---|---|
| 10 | 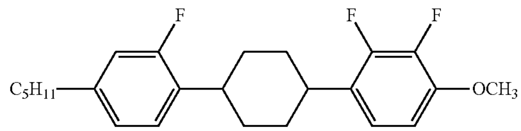 |
| 11 | 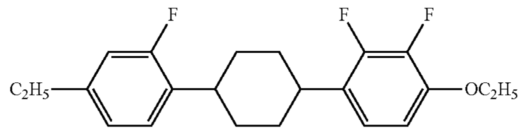 |
| 12 | 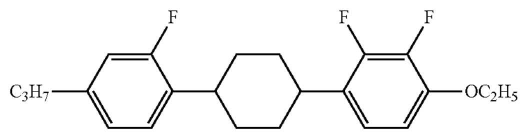 |
| 13 | 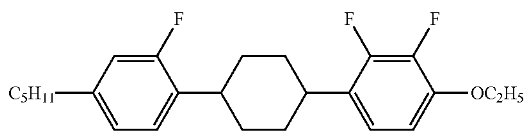 |
| 14 | 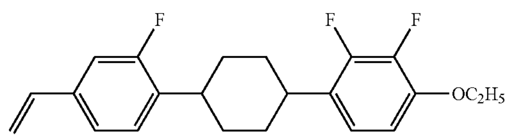 |
| 15 | 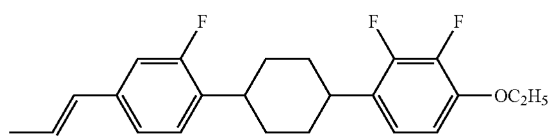 |
| 16 | 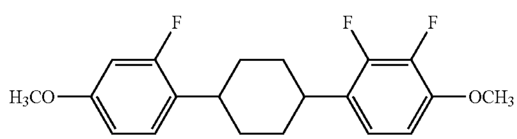 |
| 17 | 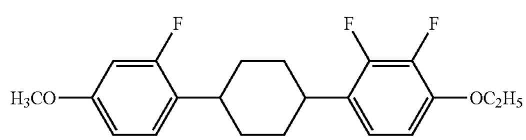 |
| 18 | 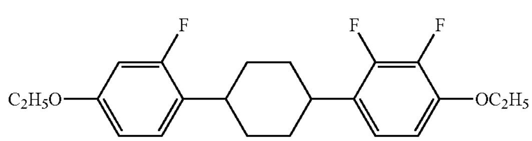 |
| 19 | 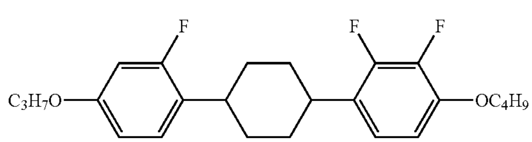 |
| 20 | 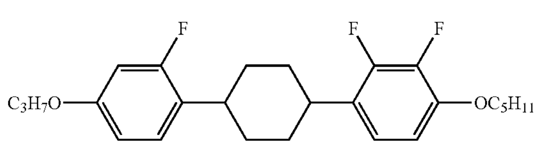 |

-continued
| No. | |
|---|---|
| 21 | 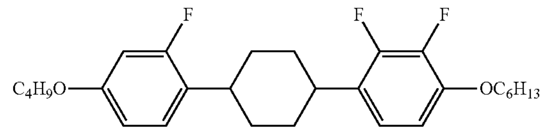 |
| 22 | 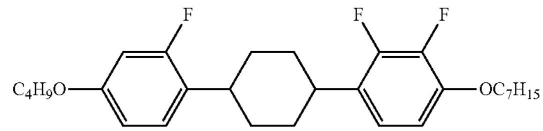 |
| 23 | 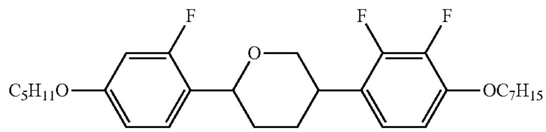 |
| 24 | 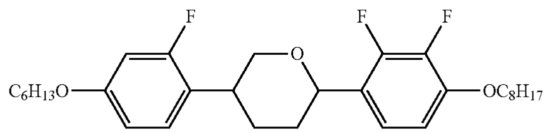 |
| 25 | 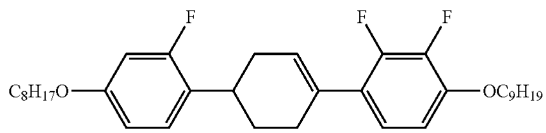 |
| 26 | 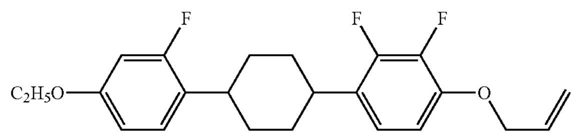 |
| 27 | 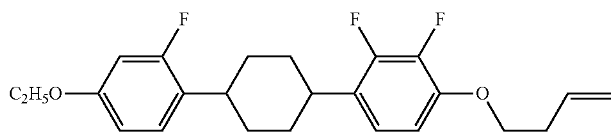 |
| 28 | 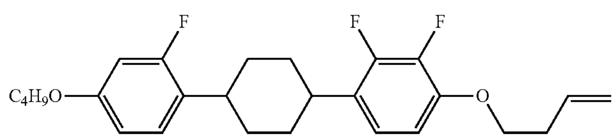 |
| 29 | 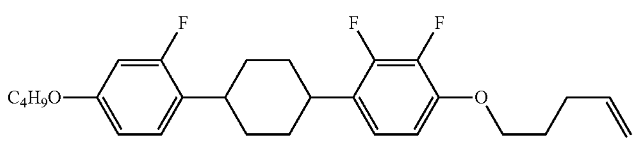 |
| 30 | 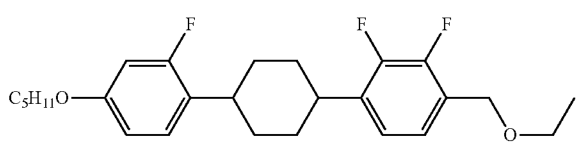 |
| 31 | 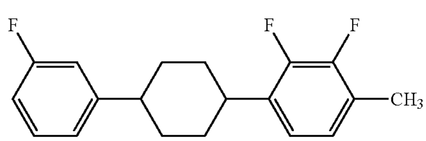 |

-continued
| No. | |
|---|---|
| 32 | 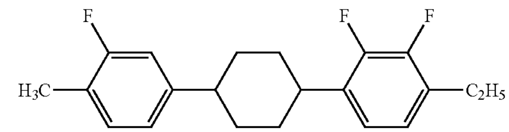 |
| 33 | 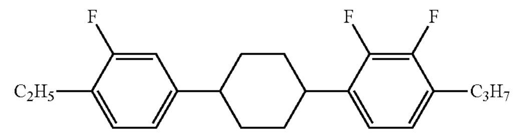 |
| 34 | 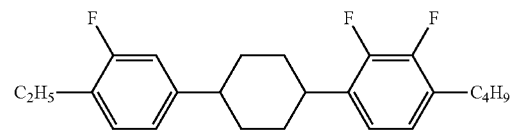 |
| 35 | 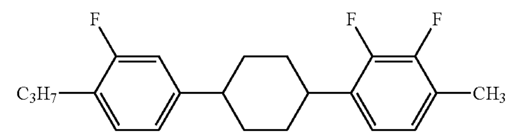 |
| 36 | 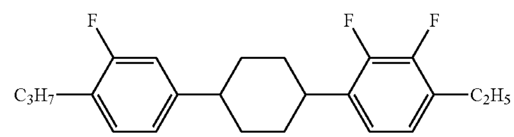 |
| 37 | 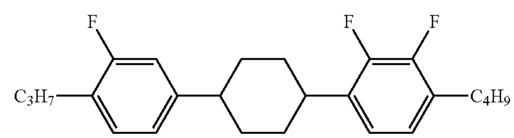 |
| 38 | 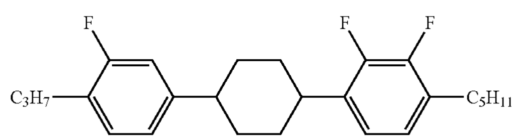 |
| 39 | 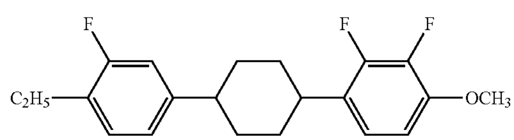 |
| 40 | 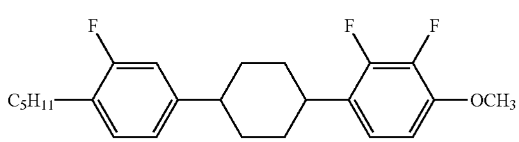 |
| 41 | 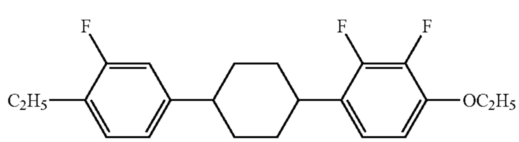 |
| 42 | 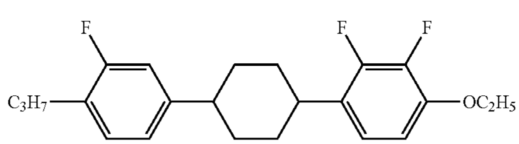 |

-continued
| No. | |
|---|---|
| 43 | 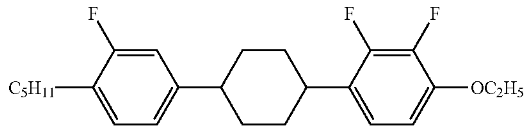 |
| 44 | 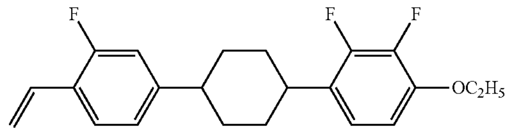 |
| 45 | 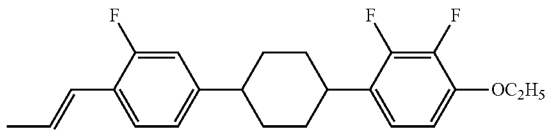 |
| 46 | 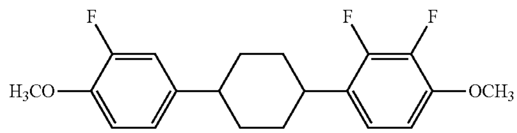 |
| 47 | 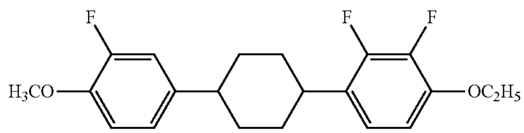 |
| 48 | 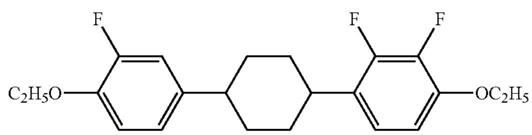 |
| 49 | 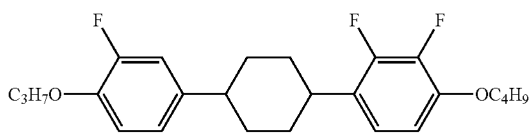 |
| 50 | 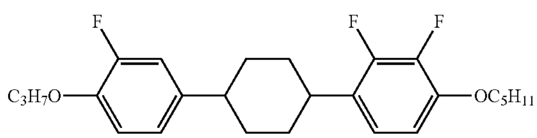 |
| 51 | 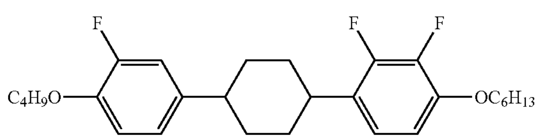 |
| 52 | 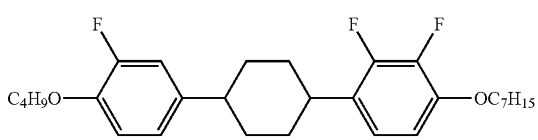 |
| 53 | 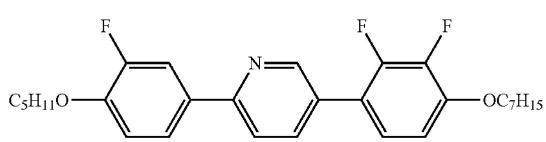 |

-continued
| No. | |
|---|---|
| 54 | 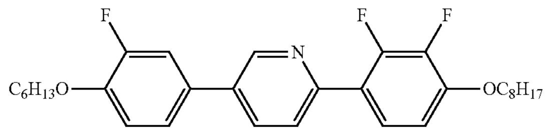 |
| 55 | 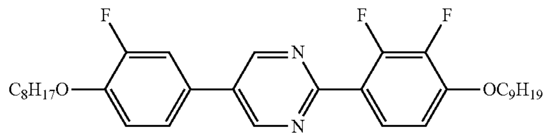 |
| 56 | 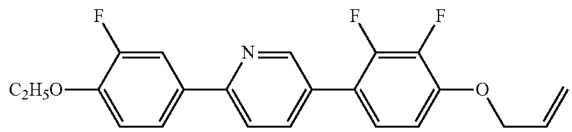 |
| 57 | 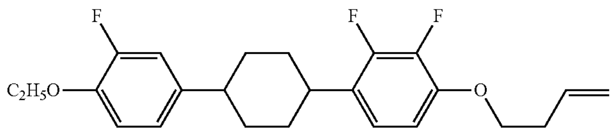 |
| 58 | 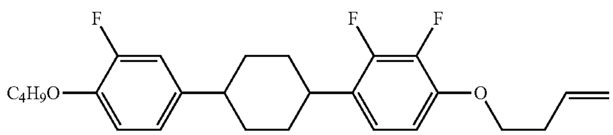 |
| 59 | 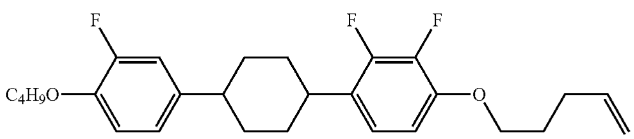 |
| 60 | 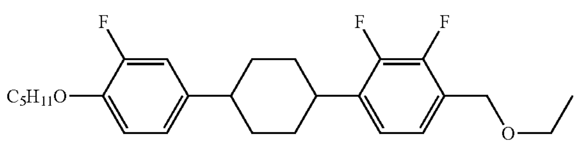 |
| 61 | 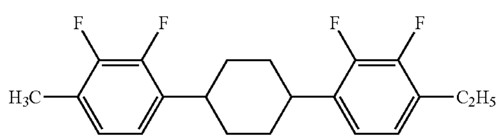 |
| 62 | 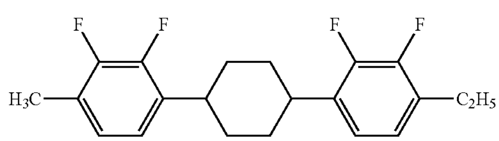 |
| 63 | 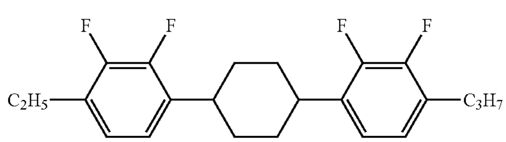 |
| 64 | 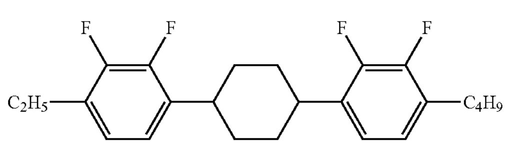 |

-continued
| No. | |
|---|---|
| 65 | 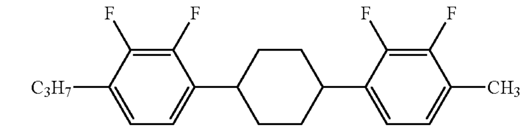 |
| 66 | 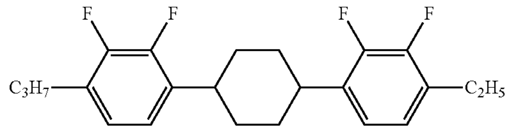 |
| 67 | 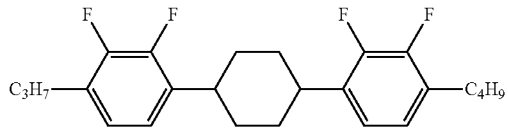 |
| 68 | 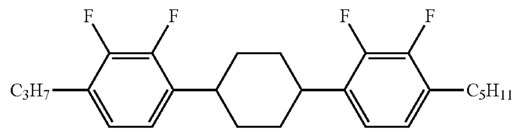 |
| 69 | 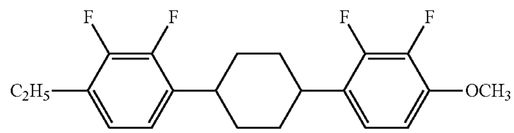 |
| 70 | 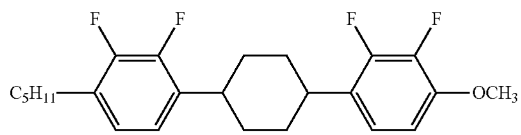 |
| 71 | 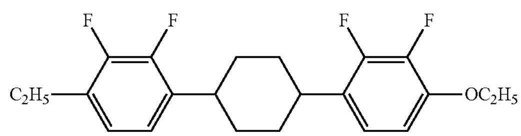 |
| 72 | 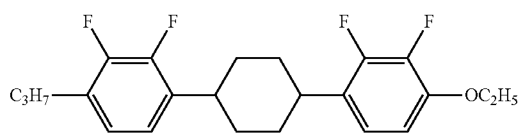 |
| 73 | 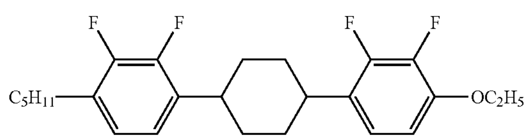 |
| 74 | 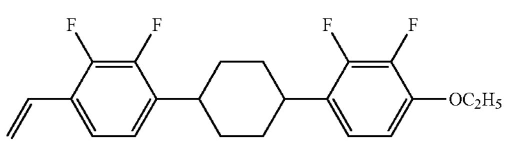 |
| 75 | 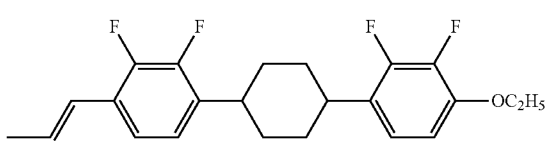 |

-continued
| No. | |
|---|---|
| 76 | 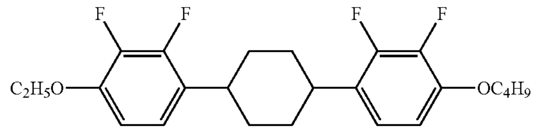 |
| 77 | 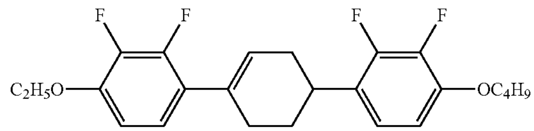 $C_1$ 61.8 $C_2$ 67.5 N 105.8 I $T_{NI}$; 97.9° C., Δϵ; −9.57, Δn; 0.140 |
| 78 | 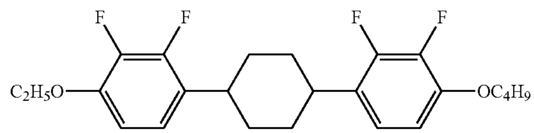 C 85.6 N 124.2 I $T_{NI}$; 111.3° C., Δϵ; −6.25, Δn; 0.140 |
| 79 | 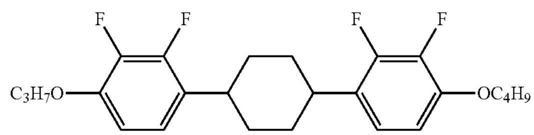 |
| 80 | 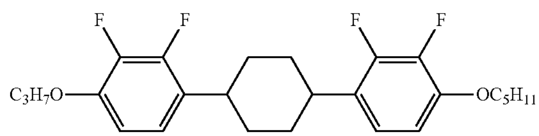 |
| 81 | 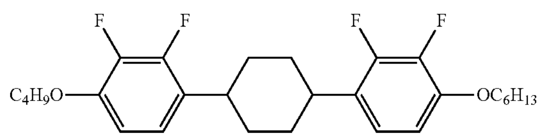 |
| 82 | 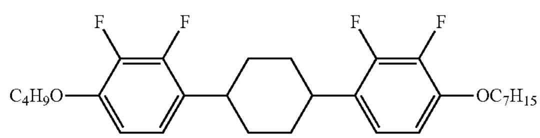 |
| 83 | 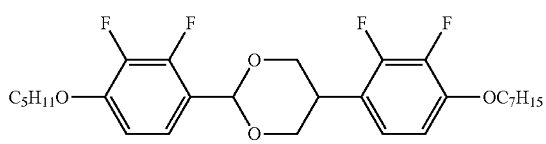 |
| 84 | 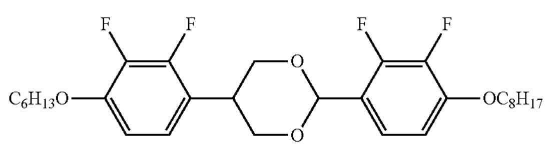 |
| 85 | 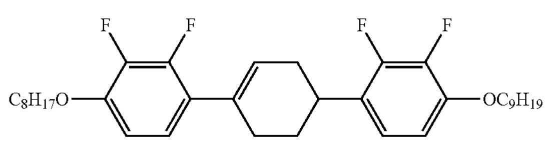 |

-continued
| No. | |
|---|---|
| 86 | 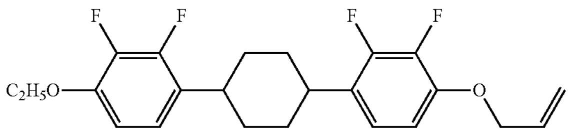 |
| 87 | 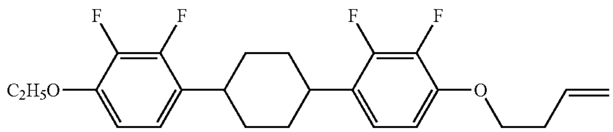 |
| 88 | 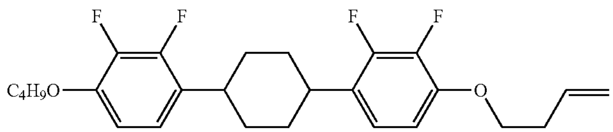 |
| 89 | 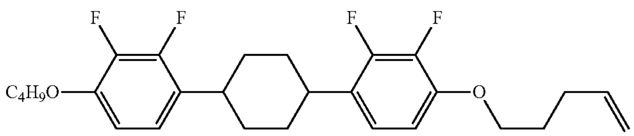 |
| 90 | 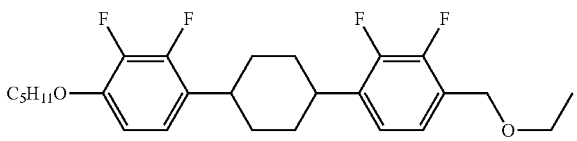 |
| 91 | 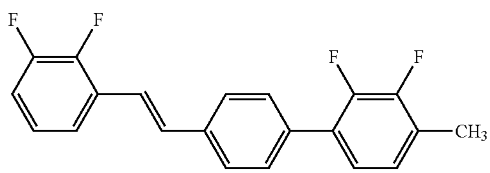 |
| 92 | 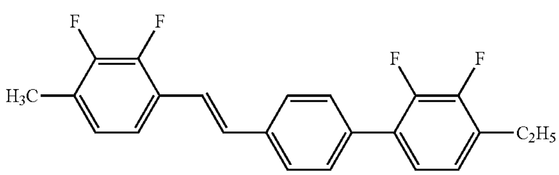 |
| 93 | 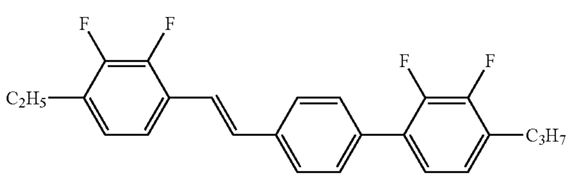 |
| 94 | 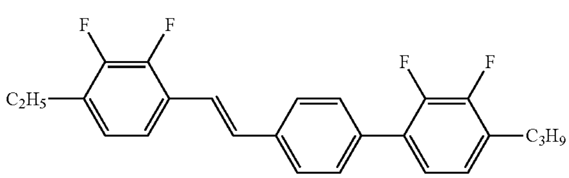 |
| 95 | 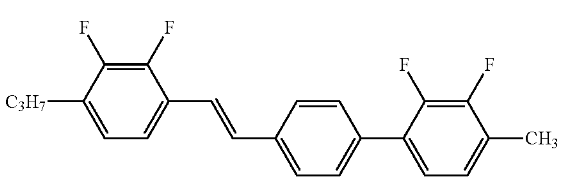 |

-continued
| No. | |
|---|---|
| 96 | 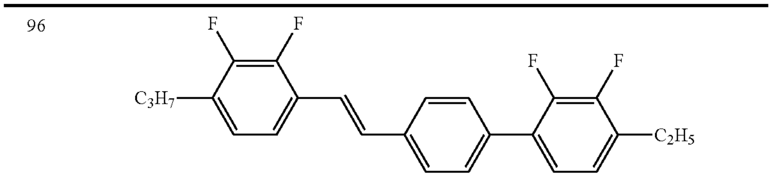 |
| 97 | 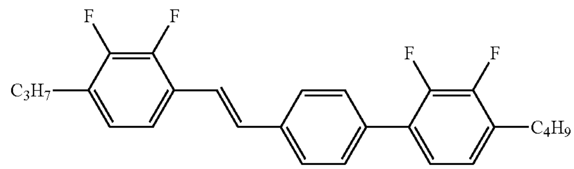 |
| 98 | 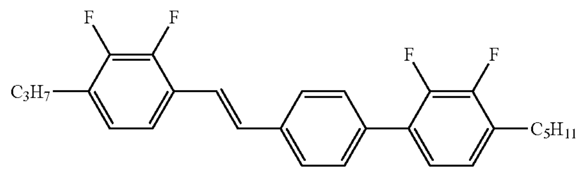 |
| 99 | 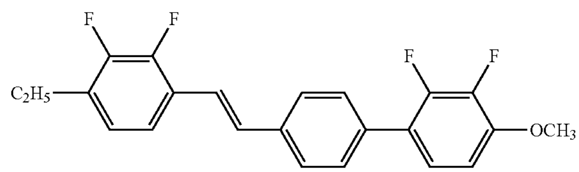 |
| 100 | 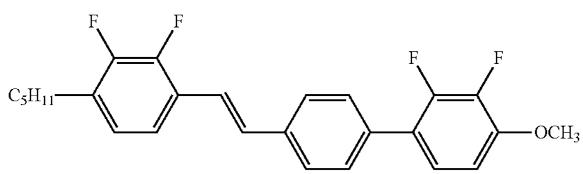 |
| 101 | 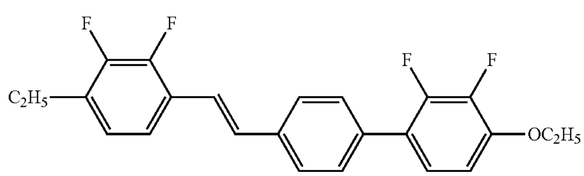 |
| 102 | 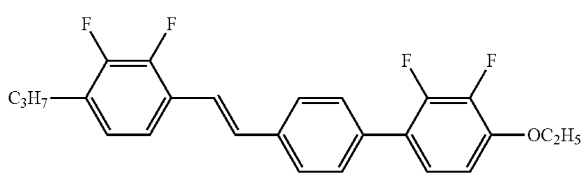 |
| 103 | 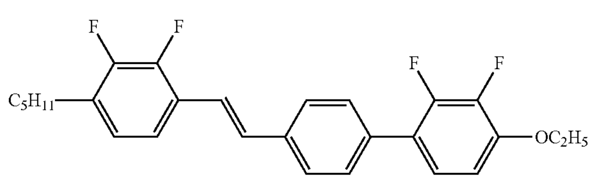 |
| 104 | 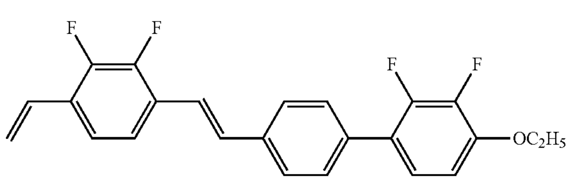 |

-continued
| No. | |
|---|---|
| 105 | 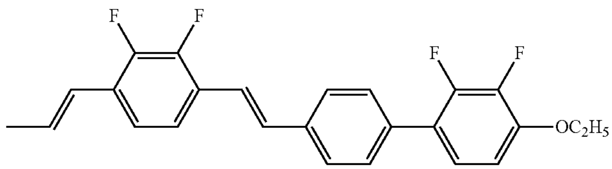 |
| 106 | 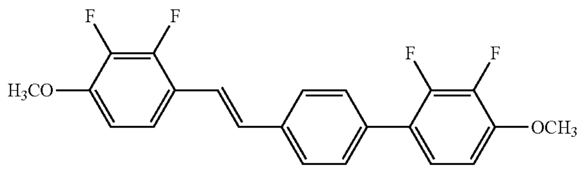 |
| 107 | 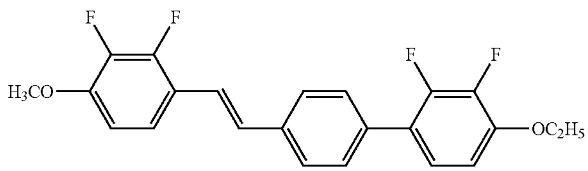 |
| 108 | 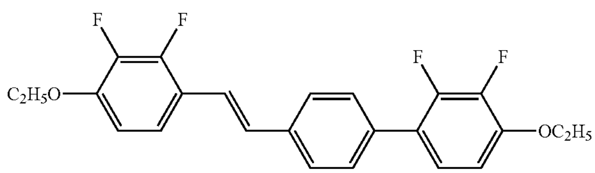 |
| 109 | 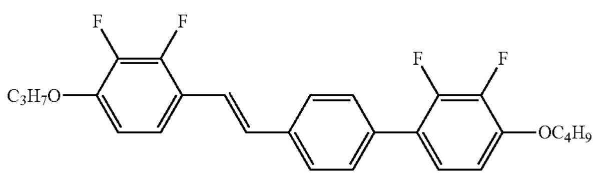 |
| 110 | 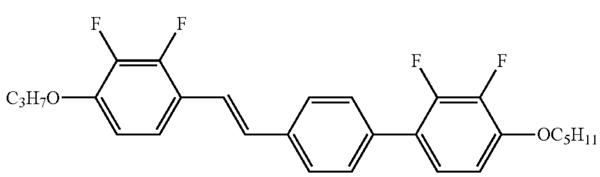 |
| 111 | 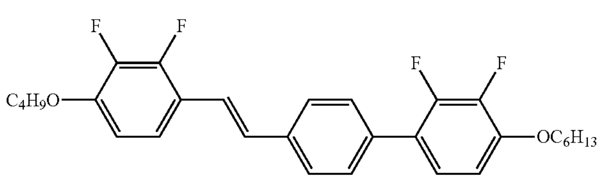 |
| 112 | 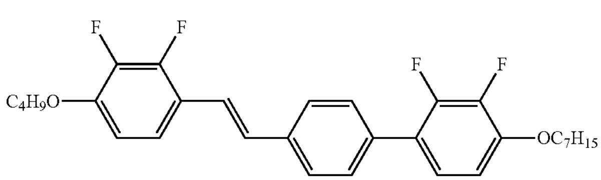 |
| 113 | 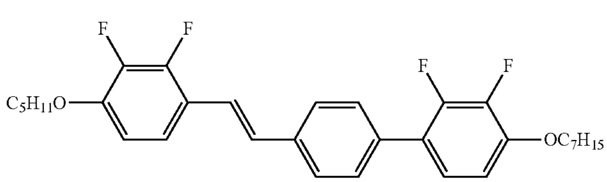 |

-continued
| No. | |
| --- | --- |
| 114 | 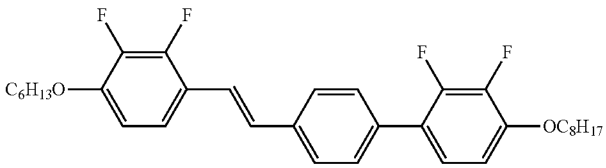 |
| 115 | 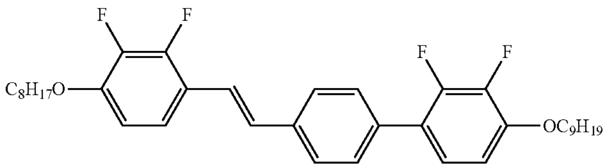 |
| 116 | 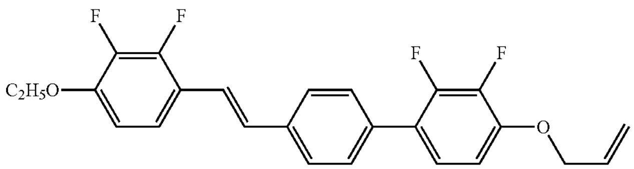 |
| 117 | 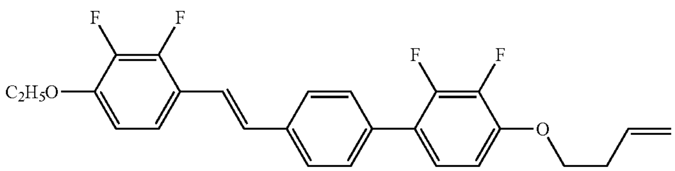 |
| 118 | 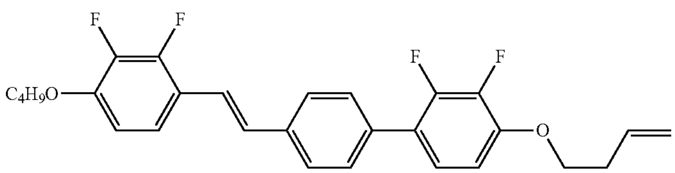 |
| 119 | 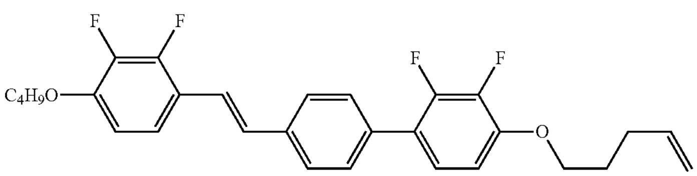 |
| 120 | 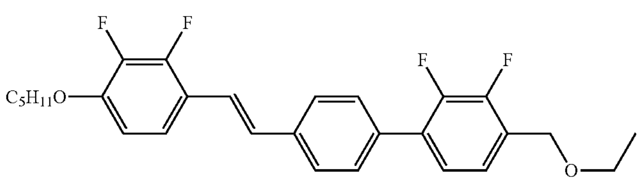 |
| 121 | 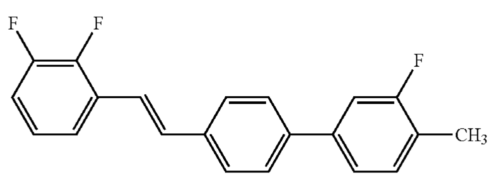 |
| 122 | 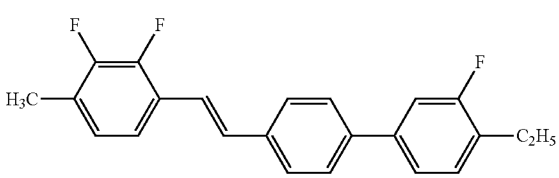 |

-continued
| No. | |
|---|---|
| 123 | 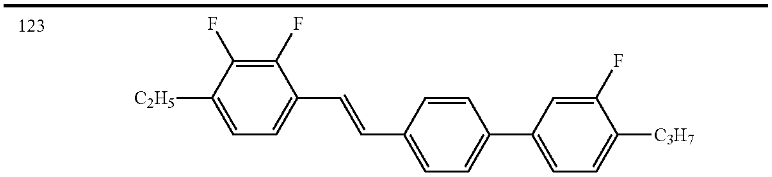 |
| 124 | 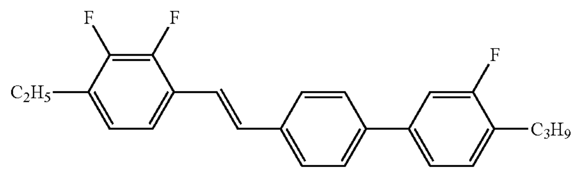 |
| 125 | 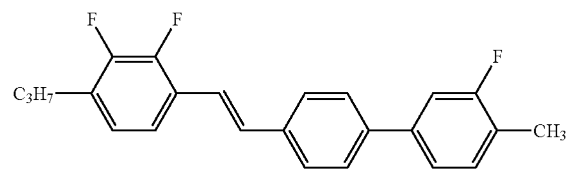 |
| 126 | 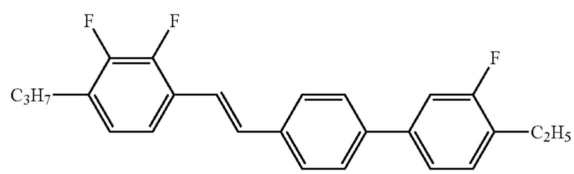 |
| 127 | 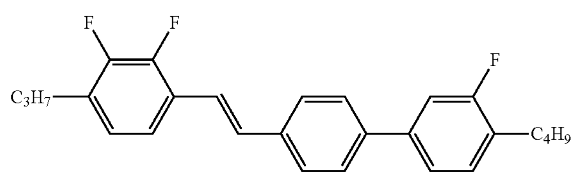 |
| 128 | 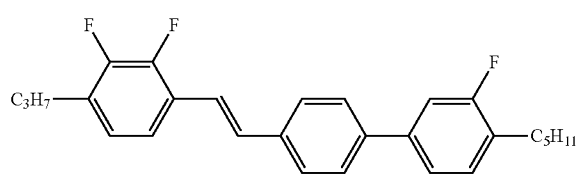 |
| 129 | 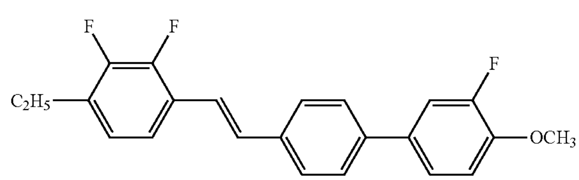 |
| 130 | 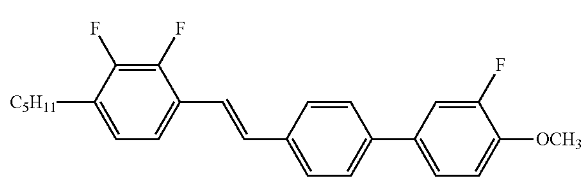 |
| 131 | 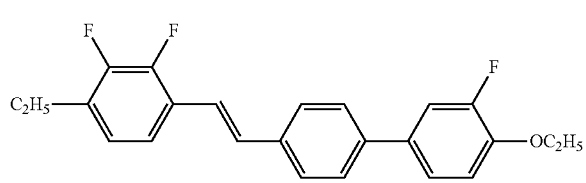 |

-continued
| No. | |
|---|---|
| 132 | 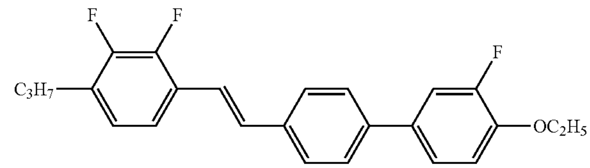 |
| 133 | 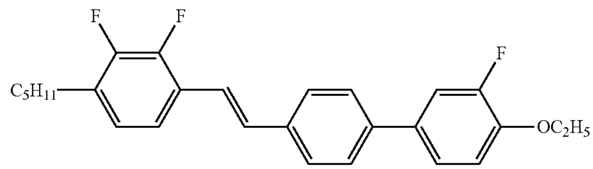 |
| 134 | 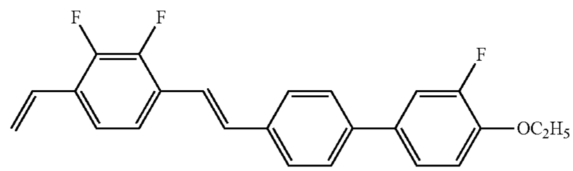 |
| 135 | 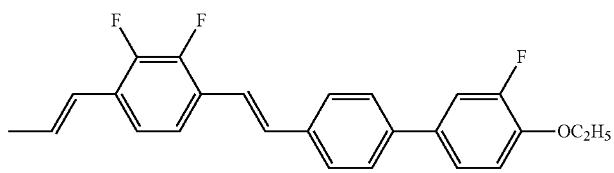 |
| 136 | 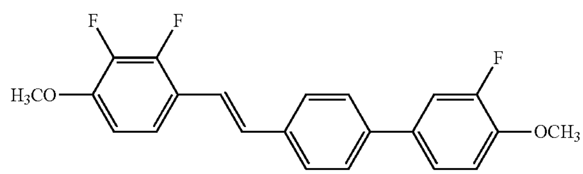 |
| 137 | 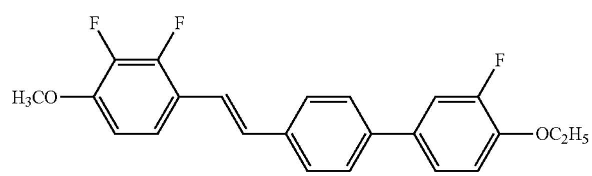 |
| 138 | 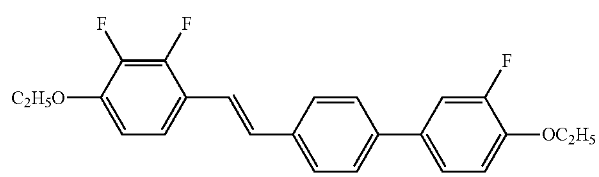 |
| 139 | 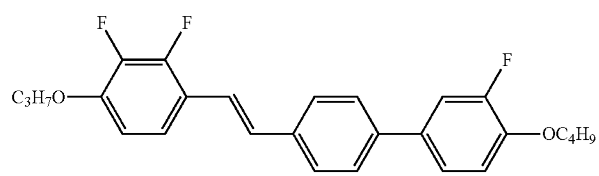 |
| 140 | 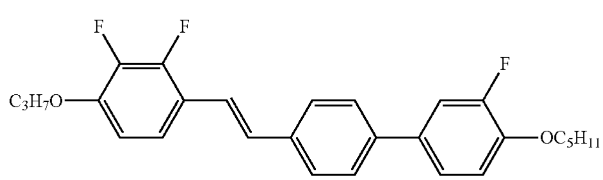 |

-continued
| No. | |
|---|---|
| 141 | 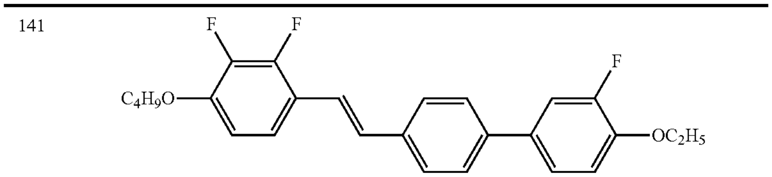 |
| 142 | 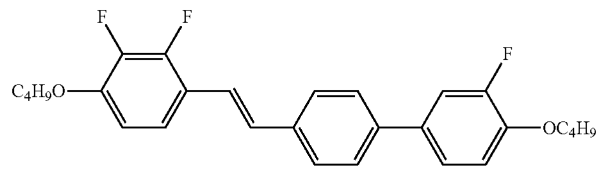 |
| 143 | 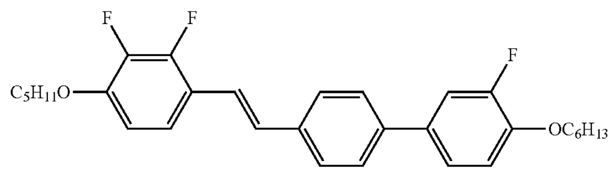 |
| 144 | 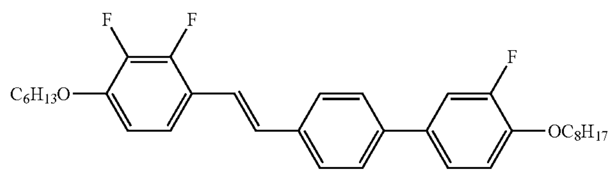 |
| 145 | 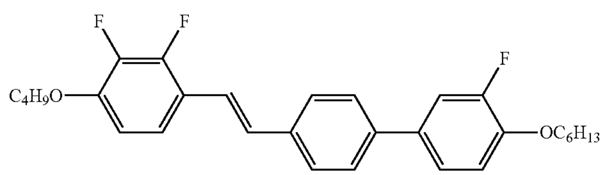 |
| 146 | 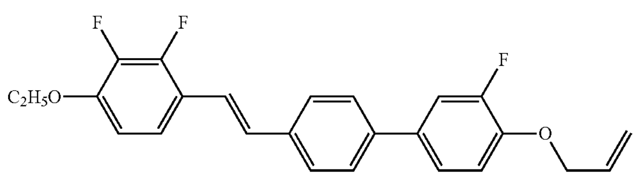 |
| 147 | 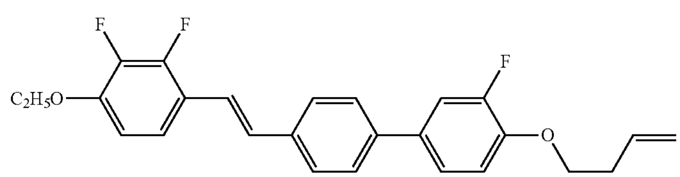 |
| 148 | 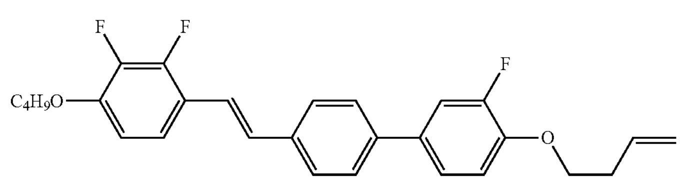 |
| 149 | 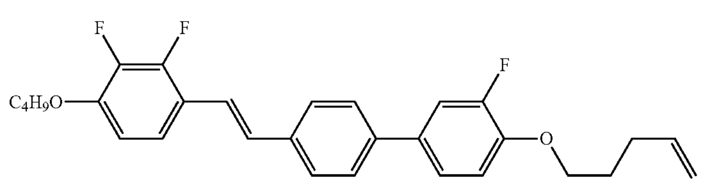 |

-continued
| No. | |
|---|---|
| 150 | 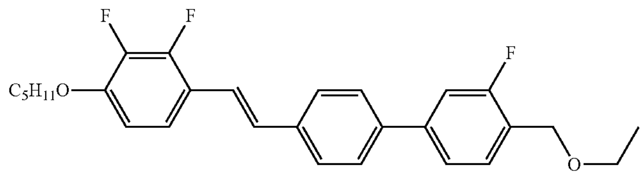 |
| 151 | 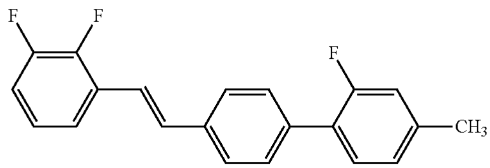 |
| 152 | 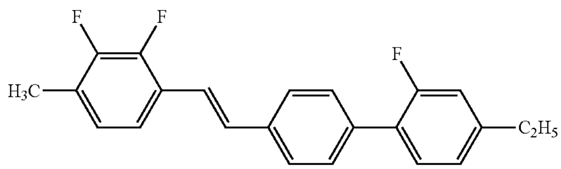 |
| 153 | 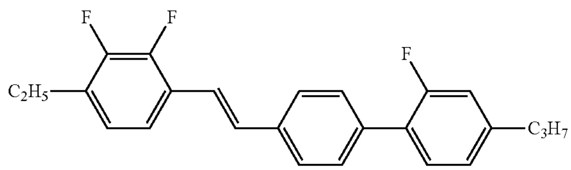 |
| 154 | 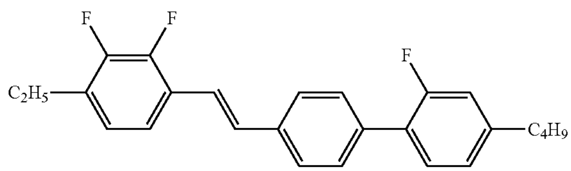 |
| 155 | 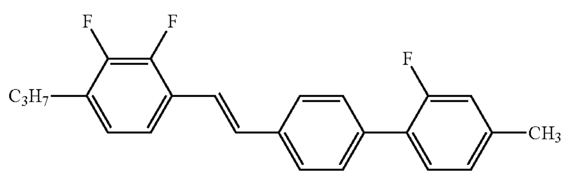 |
| 156 | 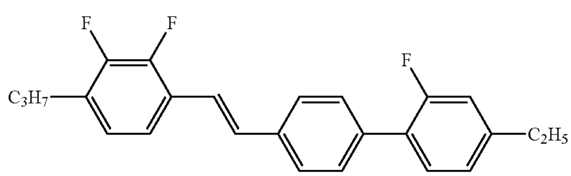 |
| 157 | 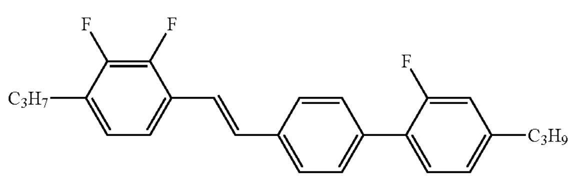 |
| 158 | 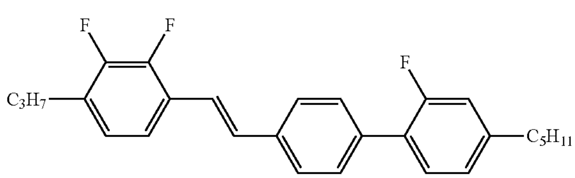 |

-continued
| No. | |
|---|---|
| 159 | 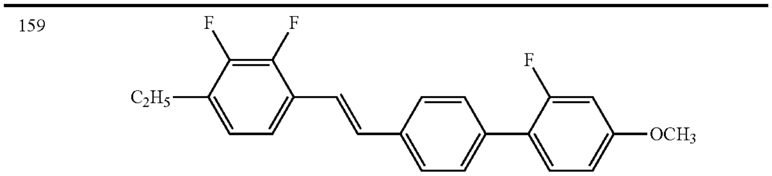 |
| 160 | 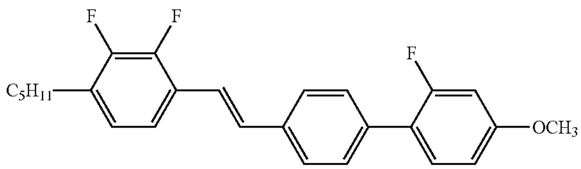 |
| 161 | 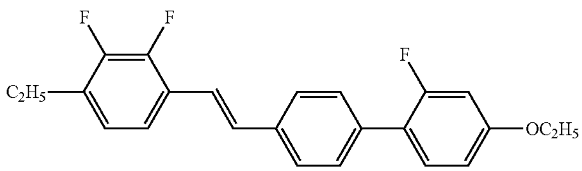 |
| 162 | 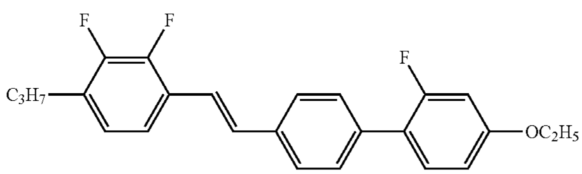 |
| 163 | 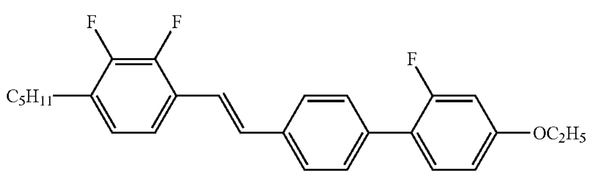 |
| 164 | 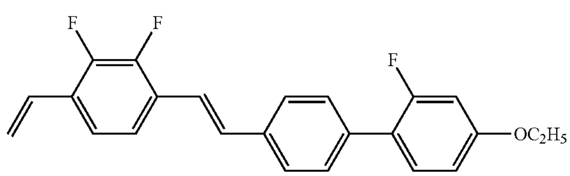 |
| 165 | 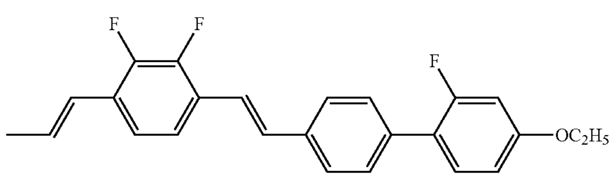 |
| 166 | 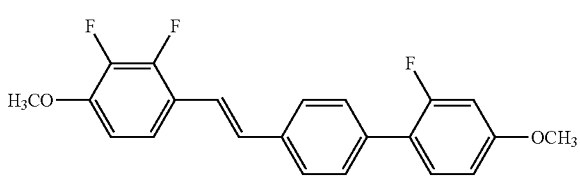 |
| 167 | 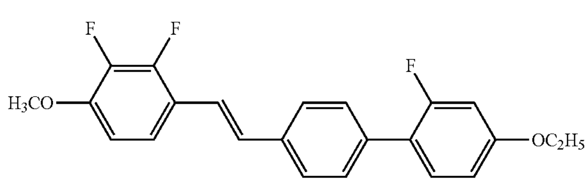 |

-continued
| No. | |
|---|---|
| 168 | 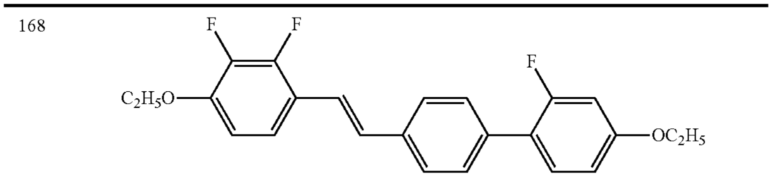 |
| 169 | 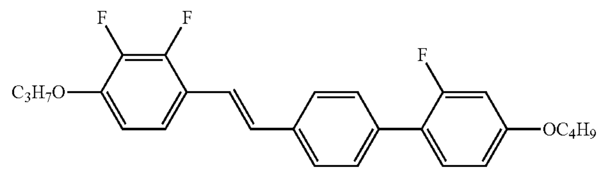 |
| 170 | 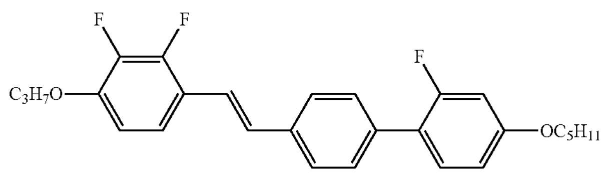 |
| 171 | 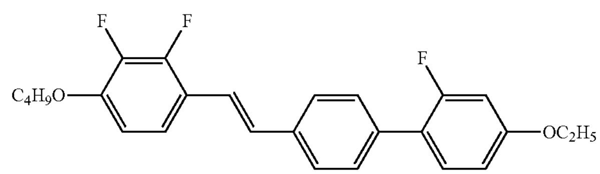 |
| 172 | 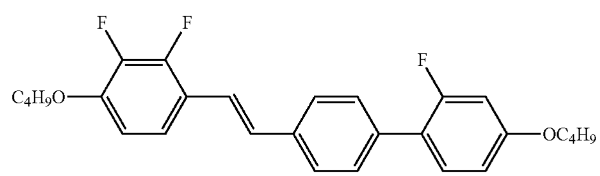 |
| 173 | 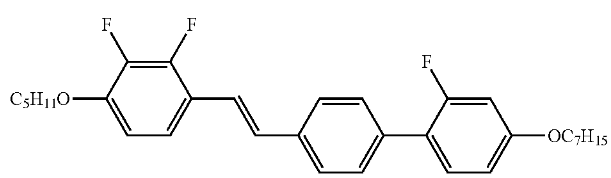 |
| 174 | 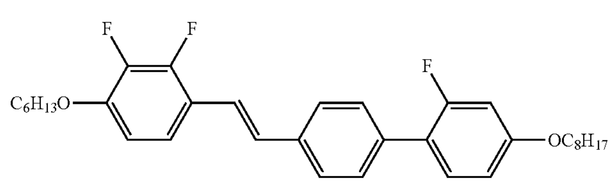 |
| 175 | 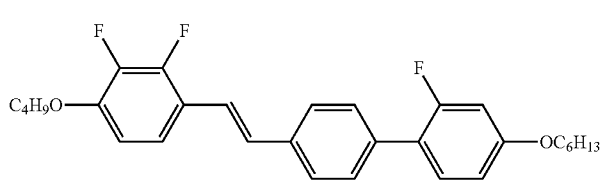 |
| 176 | 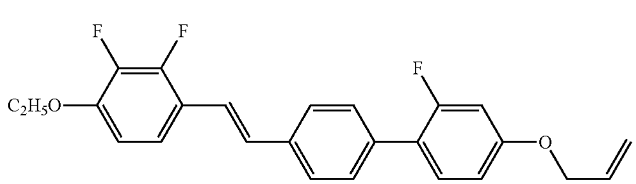 |

-continued
| No. | |
|---|---|
| 177 | 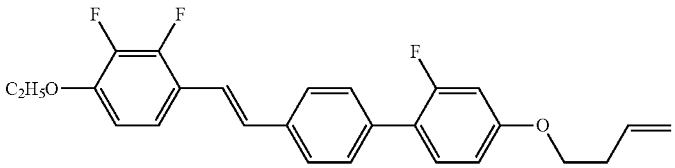 |
| 178 | 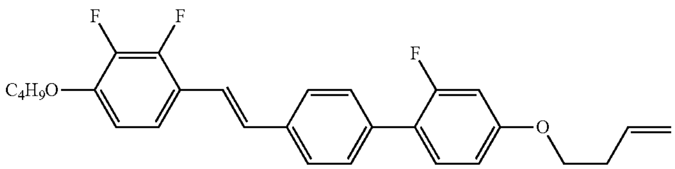 |
| 179 | 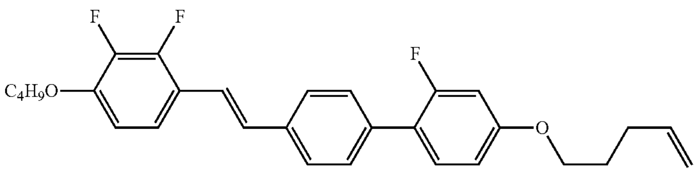 |
| 180 | 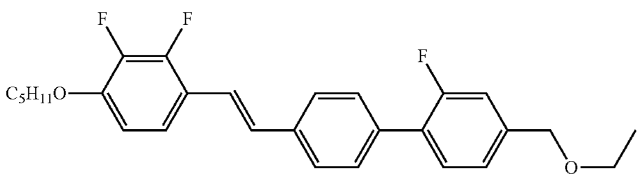 |
| 181 | 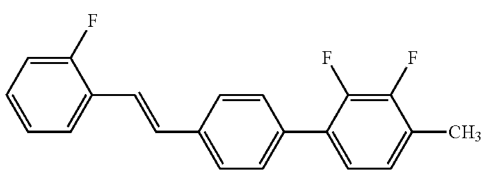 |
| 182 | 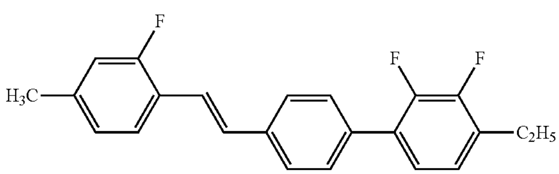 |
| 183 | 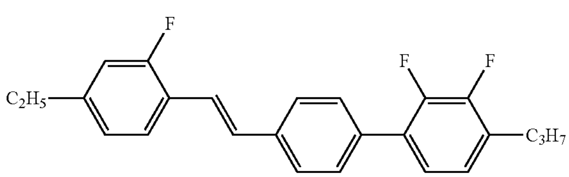 |
| 184 | 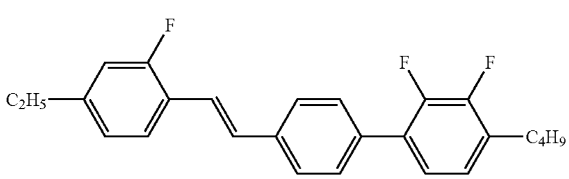 |
| 185 | 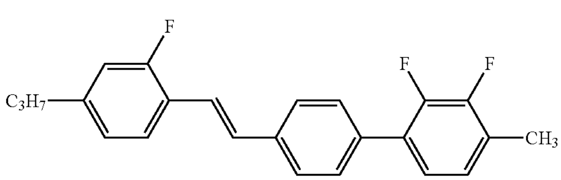 |

-continued
| No. | |
|---|---|
| 186 | 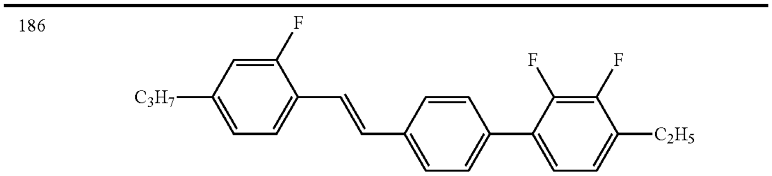 |
| 187 | 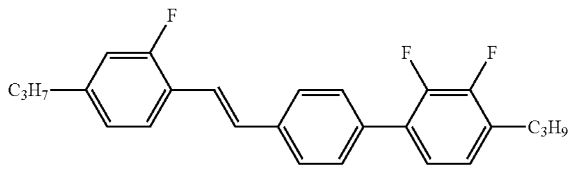 |
| 188 | 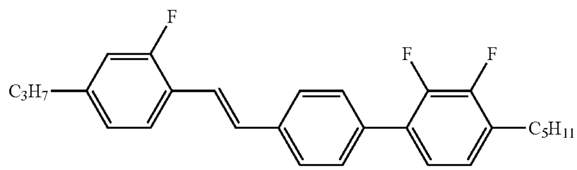 |
| 189 | 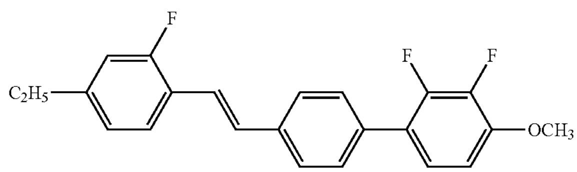 |
| 190 | 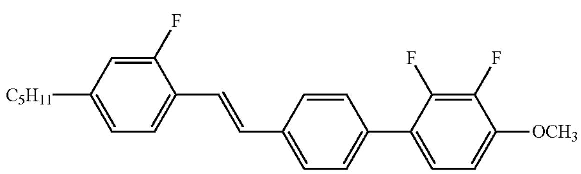 |
| 191 | 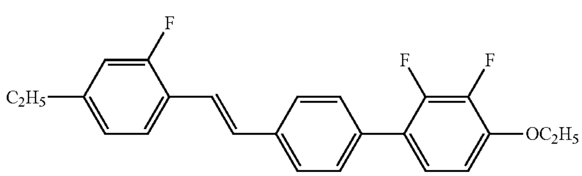 |
| 192 | 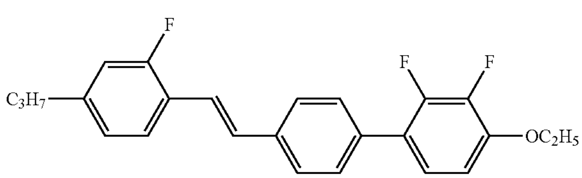 |
| 193 | 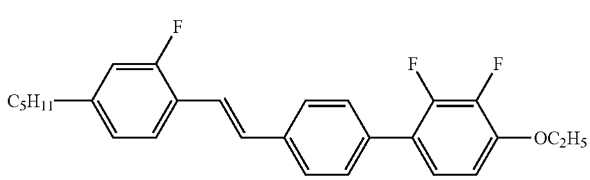 |
| 194 | 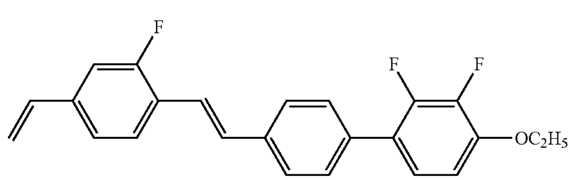 |

-continued
| No. | |
|---|---|
| 195 | 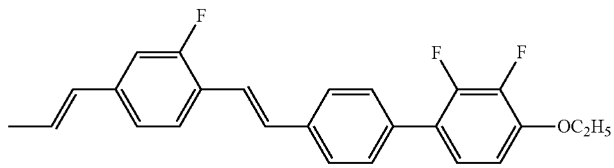 |
| 196 | 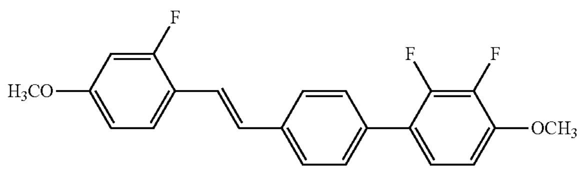 |
| 197 | 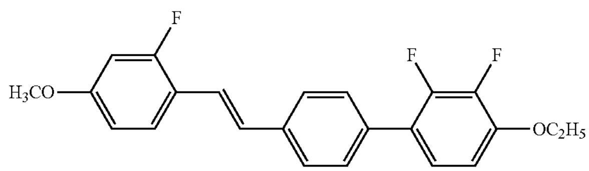 |
| 198 | 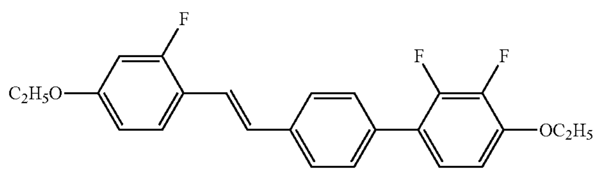 |
| 199 | 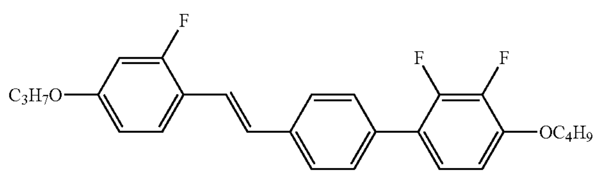 |
| 200 | 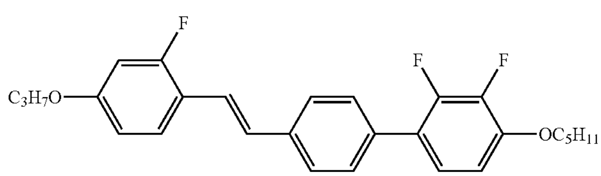 |
| 201 | 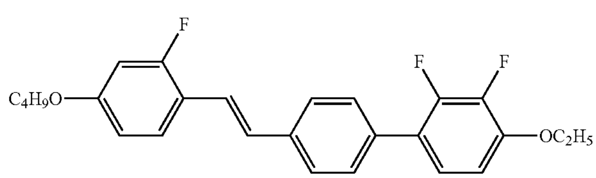 |
| 202 | 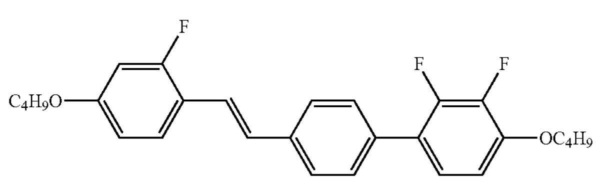 |
| 203 | 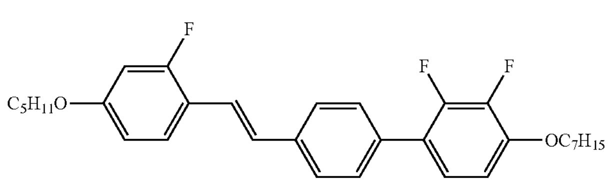 |

-continued
| No. | |
|---|---|
| 204 | 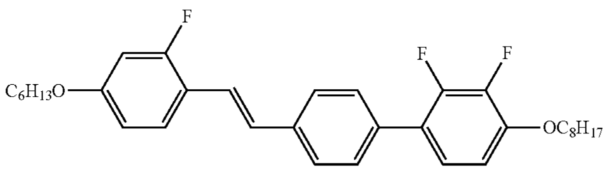 |
| 205 | 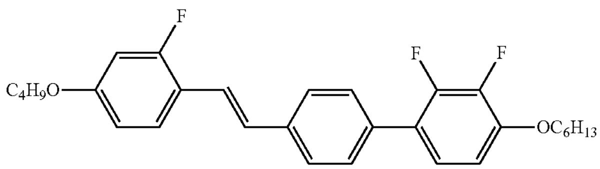 |
| 206 | 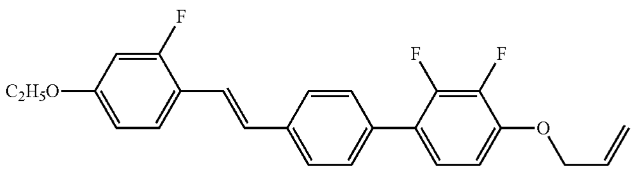 |
| 207 | 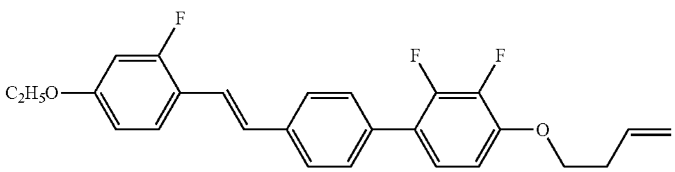 |
| 208 | 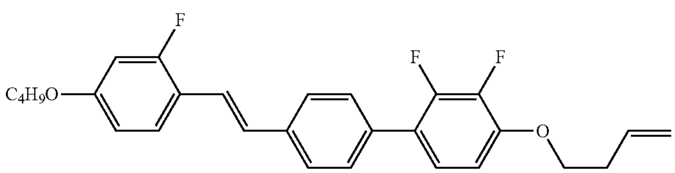 |
| 209 | 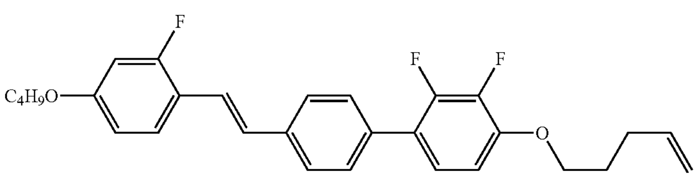 |
| 210 | 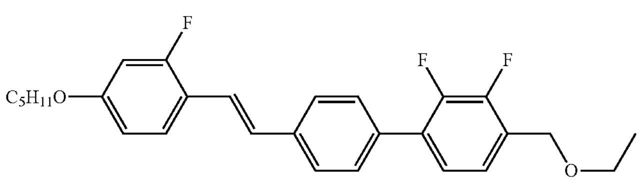 |
| 211 | 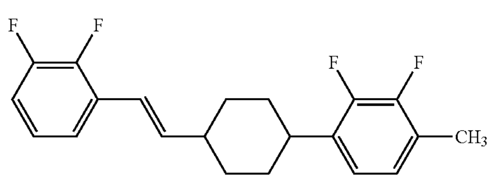 |
| 212 | 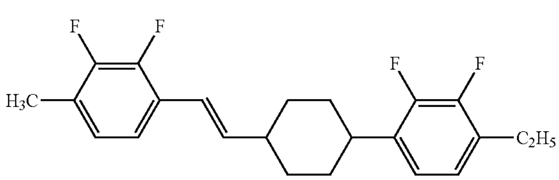 |

-continued
| No. | |
|---|---|
| 213 | 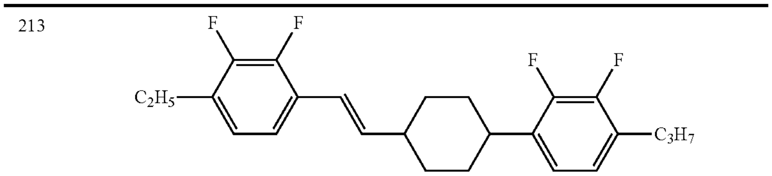 |
| 214 | 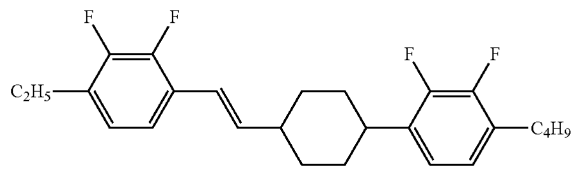 |
| 215 | 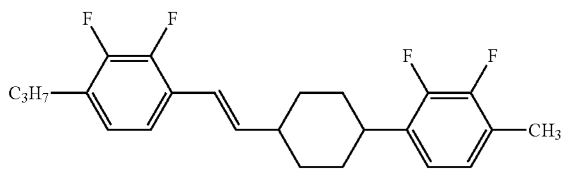 |
| 216 | 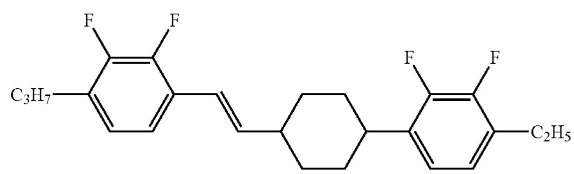 |
| 217 | 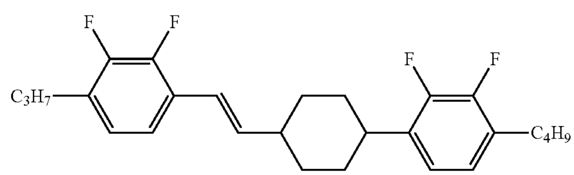 |
| 218 | 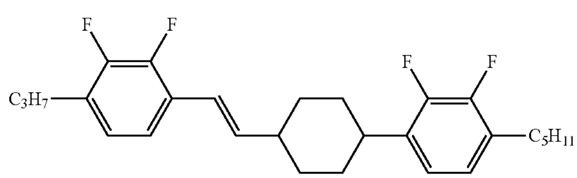 |
| 219 | 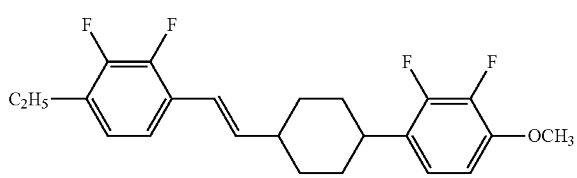 |
| 220 | 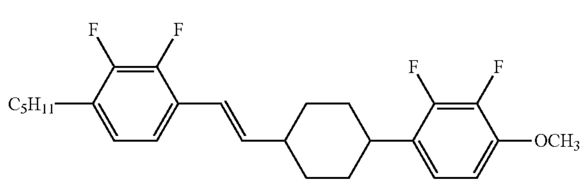 |
| 221 | 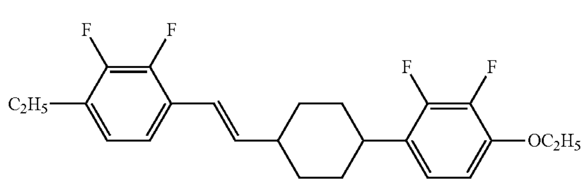 |

-continued
| No. | |
|---|---|
| 222 | 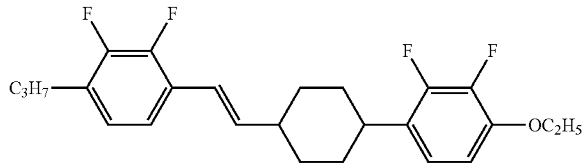 |
| 223 | 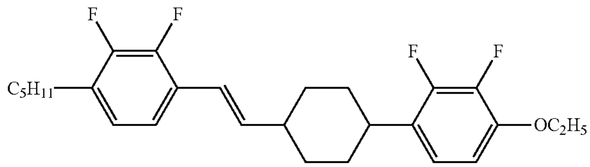 |
| 224 | 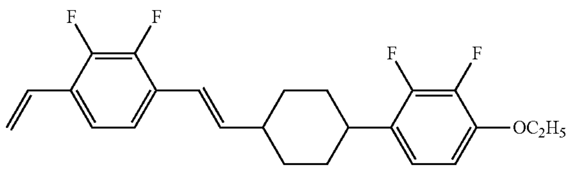 |
| 225 | 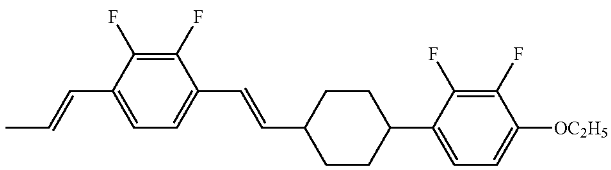 |
| 226 | 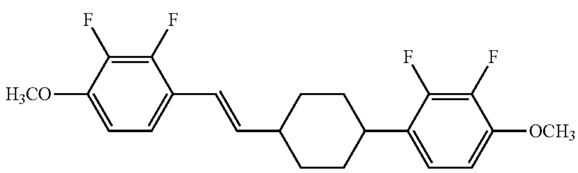 |
| 227 | 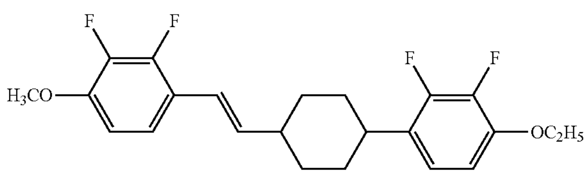 |
| 228 | 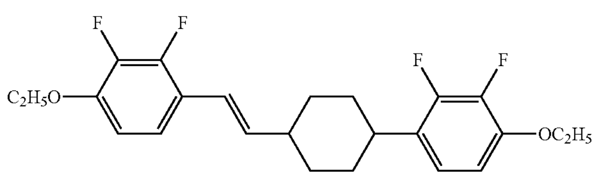<br>C 110.1 I<br>$T_{NI}$; 156.6° C., $\Delta\epsilon$; −8.49, $\Delta n$; 0.167 |
| 229 | 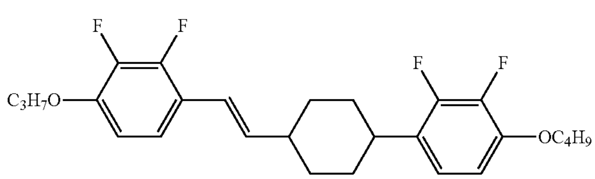 |

-continued
| No. | |
|---|---|
| 230 | 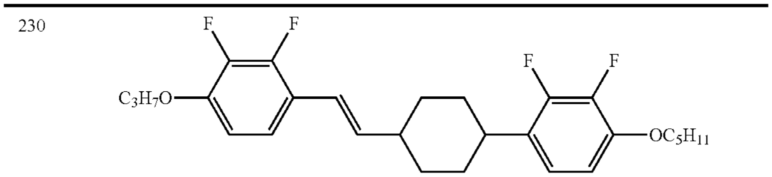 |
| 231 | 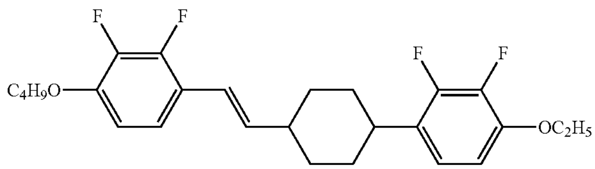 |
| 232 | 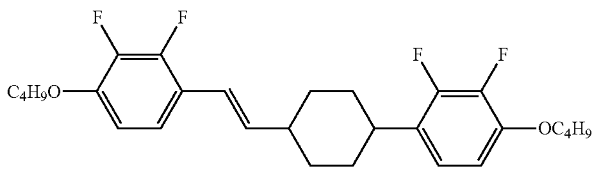 |
| 233 | 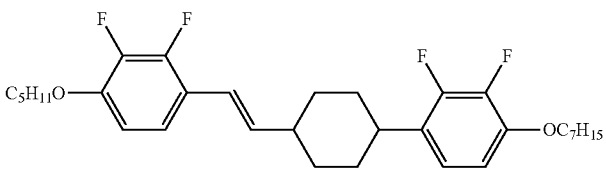 |
| 234 | 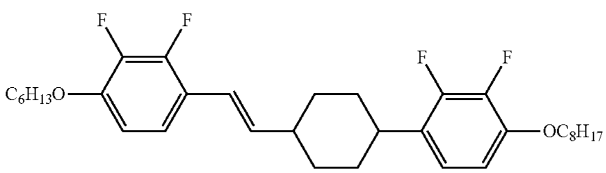 |
| 235 | 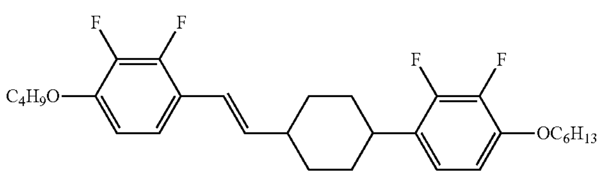 |
| 236 | 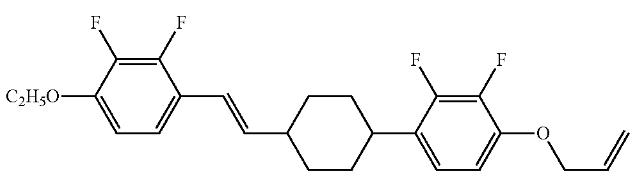 |
| 237 | 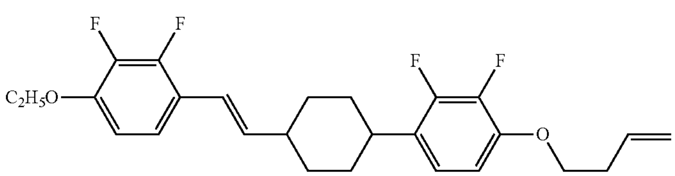 |
| 238 | 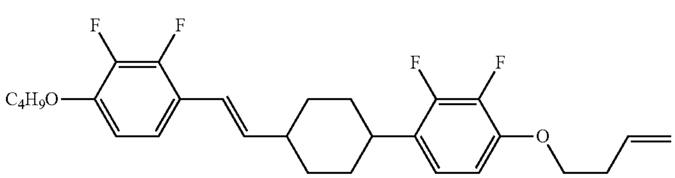 |

-continued
| No. | |
|---|---|
| 239 | 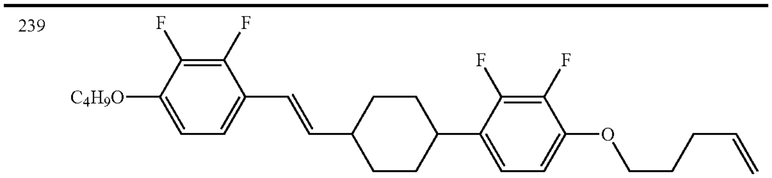 |
| 240 | 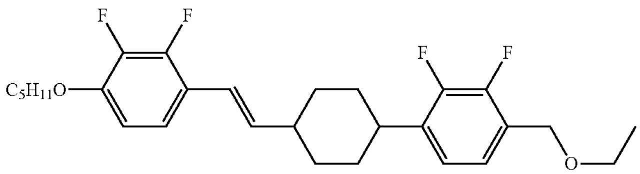 |
| 241 | 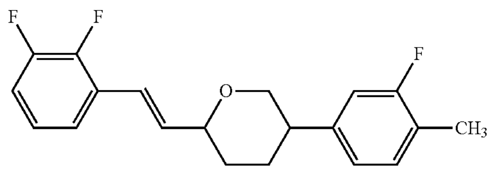 |
| 242 | 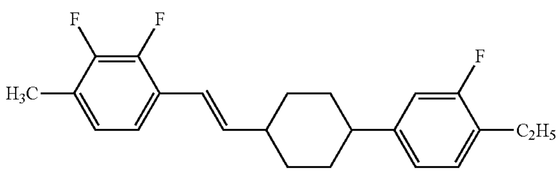 |
| 243 | 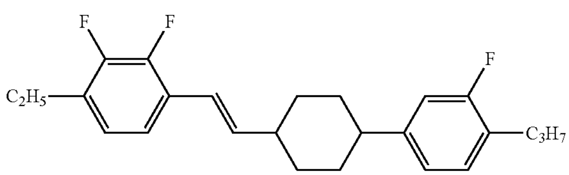 |
| 244 | 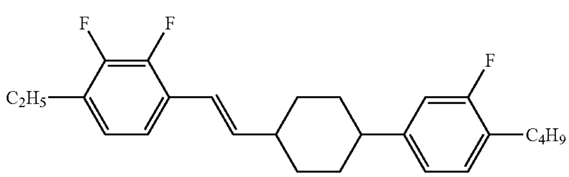 |
| 245 | 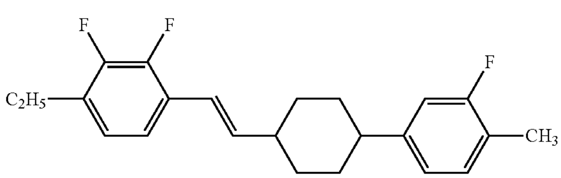 |
| 246 | 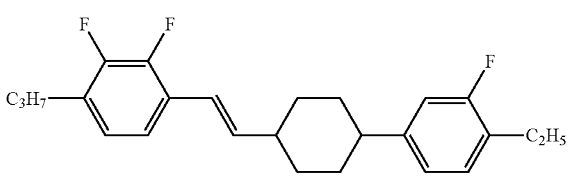 |
| 247 | 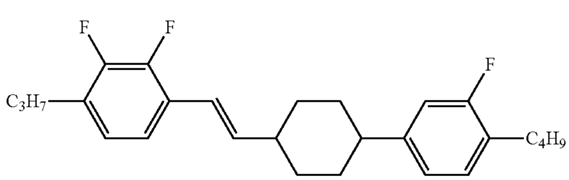 |

-continued
| No. | |
|---|---|
| 248 | 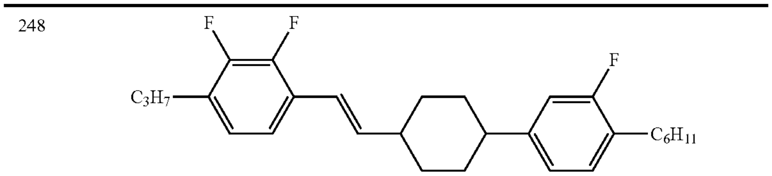 |
| 249 | 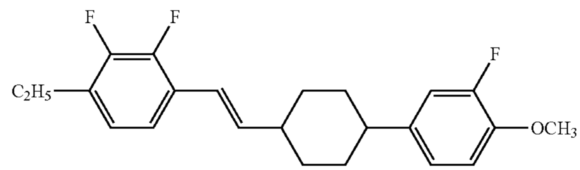 |
| 250 | 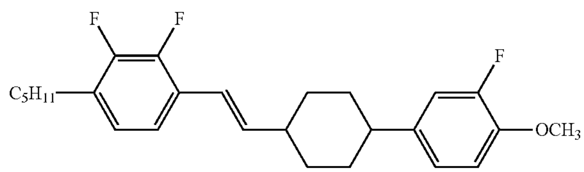 |
| 251 | 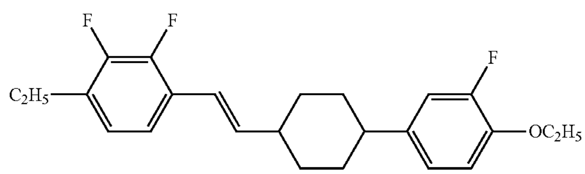 |
| 252 | 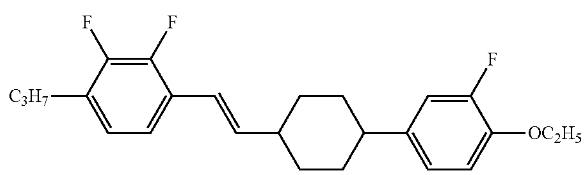 |
| 253 | 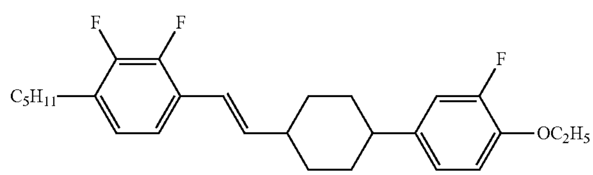 |
| 254 | 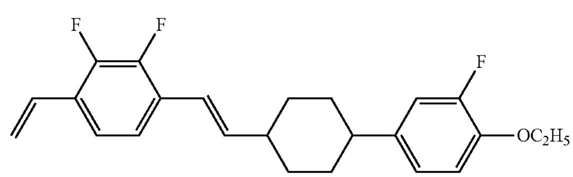 |
| 255 | 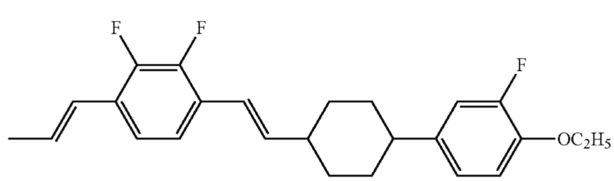 |
| 256 | 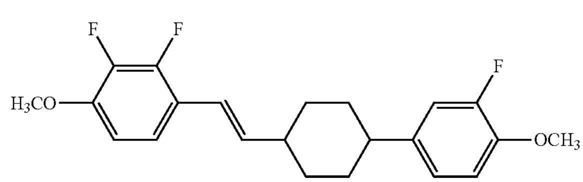 |

-continued
| No. | |
|---|---|
| 257 | 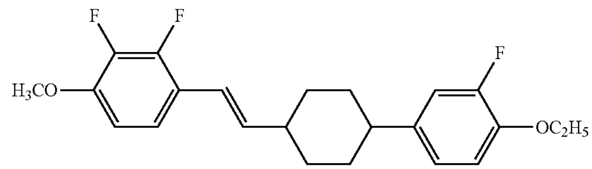 |
| 258 | 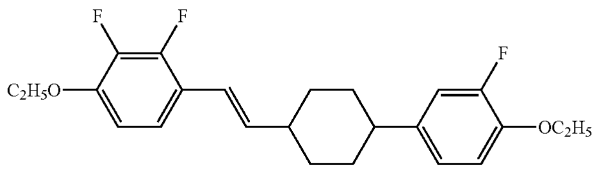 |
| 259 | 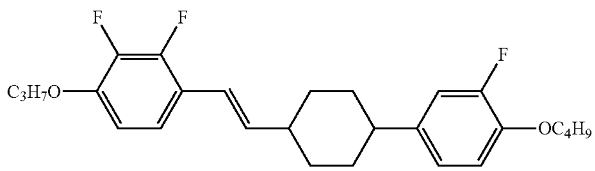 |
| 260 | 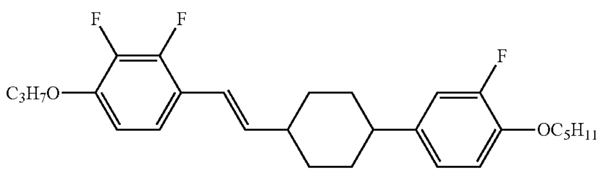 |
| 261 | 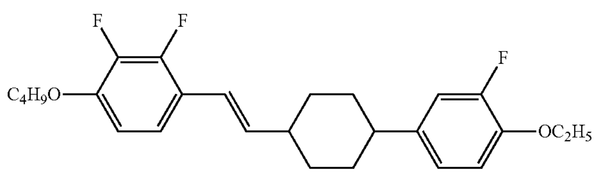 |
| 262 | 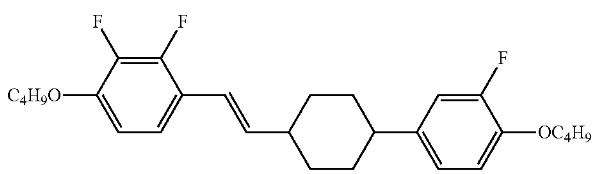 |
| 263 | 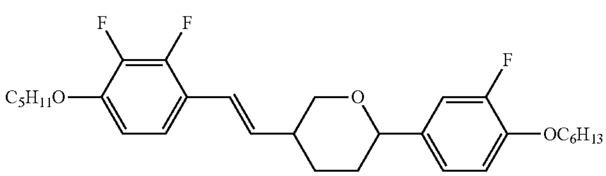 |
| 264 | 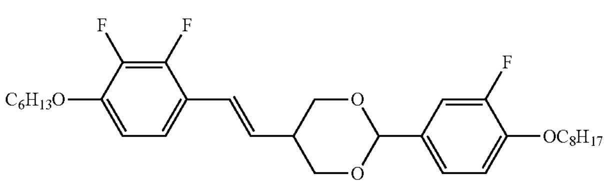 |
| 265 | 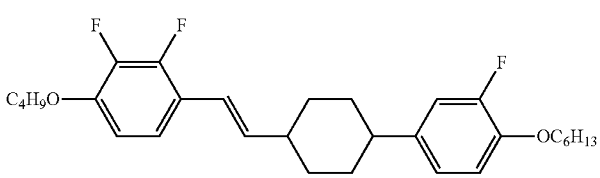 |

-continued
| No. | |
|---|---|
| 266 | 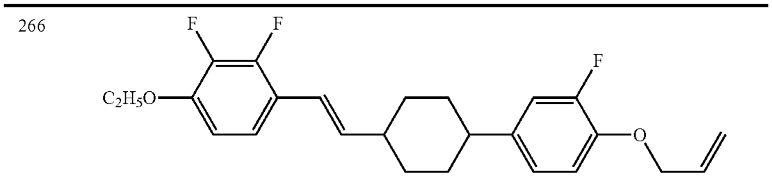 |
| 267 | 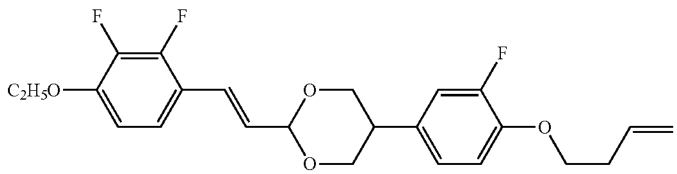 |
| 268 | 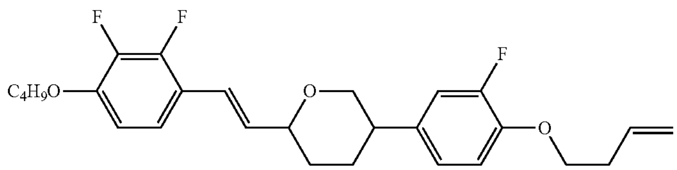 |
| 269 | 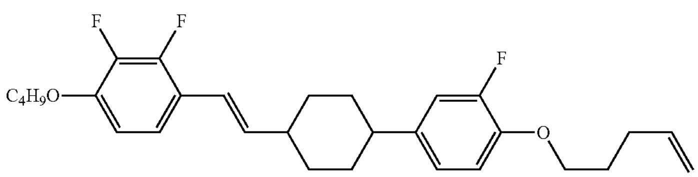 |
| 270 | 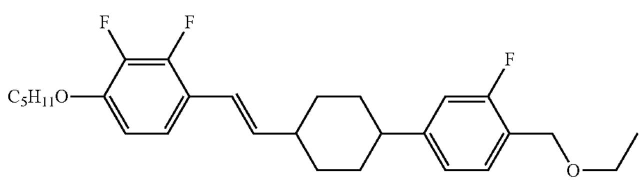 |
| 271 | 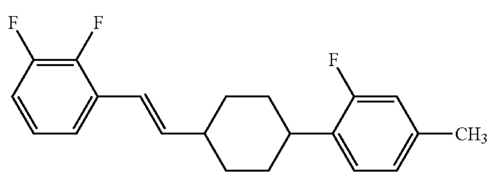 |
| 272 | 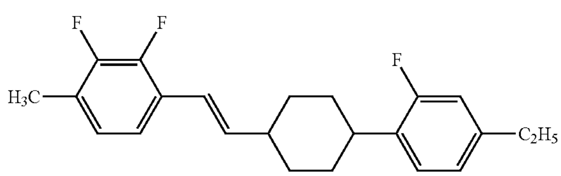 |
| 273 | 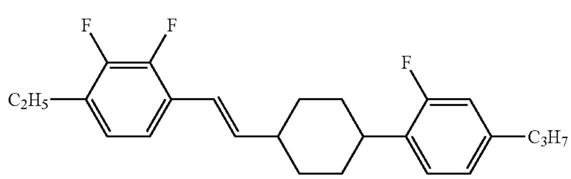 |
| 274 | 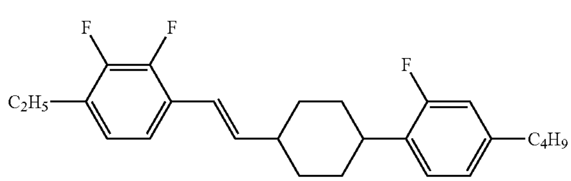 |

-continued
| No. | |
|---|---|
| 275 | 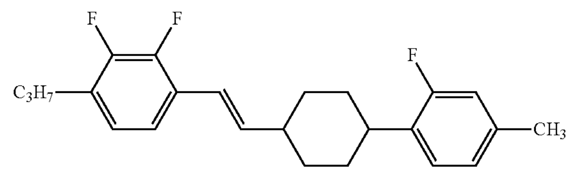 |
| 276 | 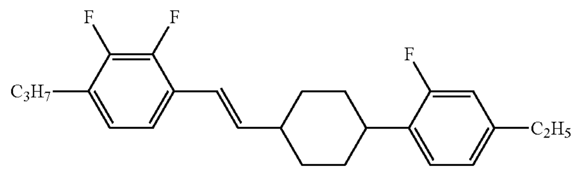 |
| 277 | 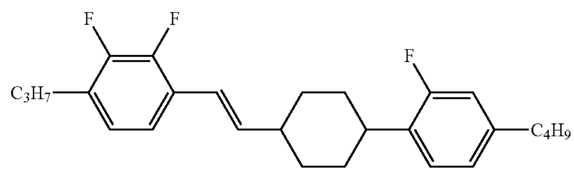 |
| 278 | 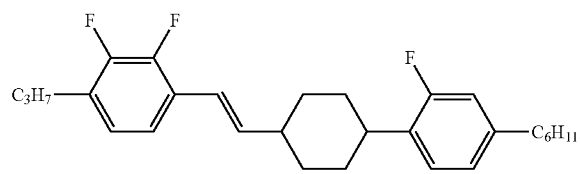 |
| 279 | 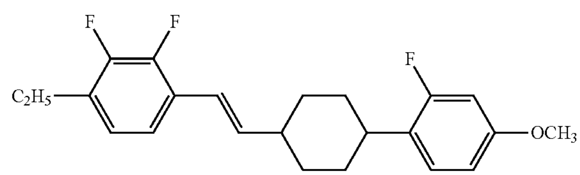 |
| 280 | 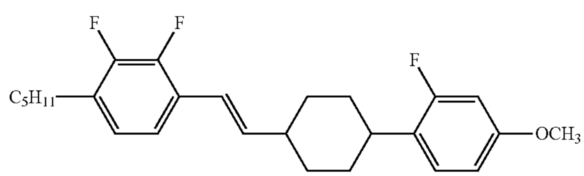 |
| 281 | 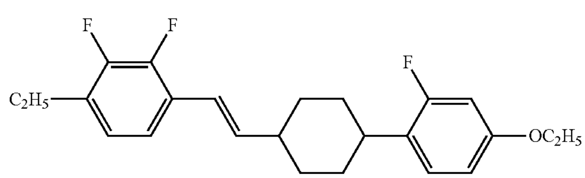 |
| 282 | 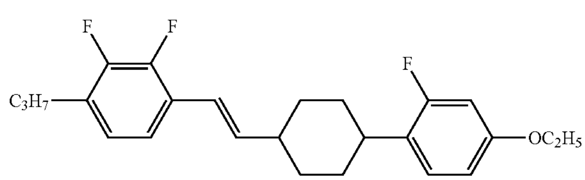 |
| 283 | 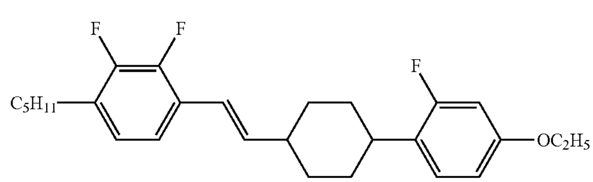 |

-continued
| No. | |
|---|---|
| 284 | 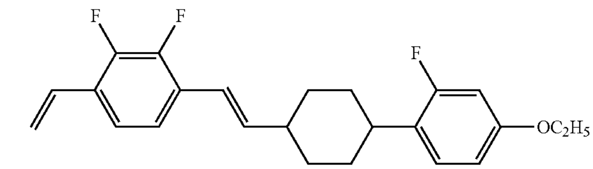 |
| 285 | 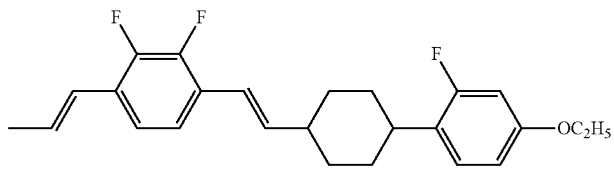 |
| 286 | 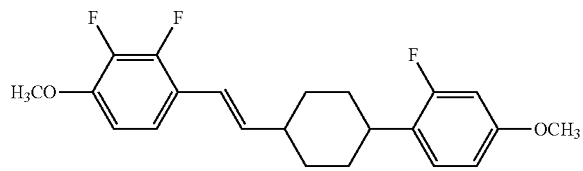 |
| 287 | 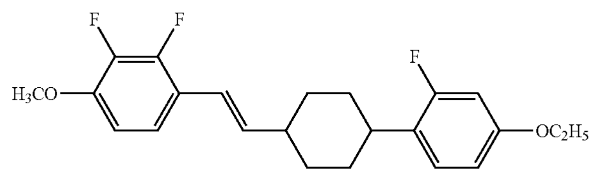 |
| 288 | 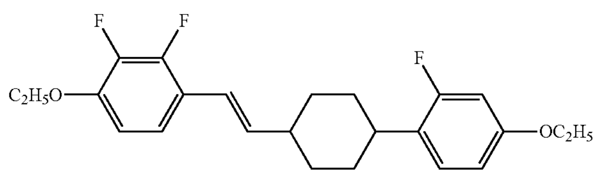 |
| 289 | 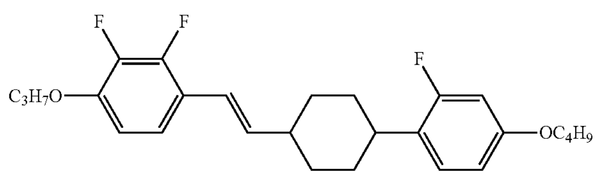 |
| 290 | 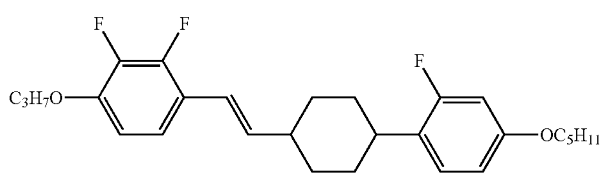 |
| 291 | 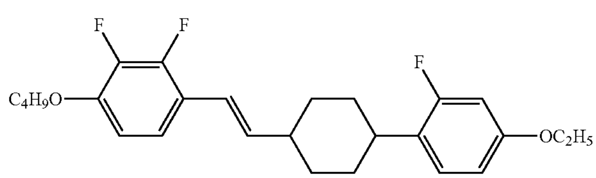 |
| 292 | 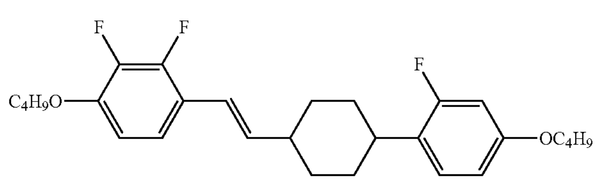 |

-continued
| No. | |
|---|---|
| 293 | 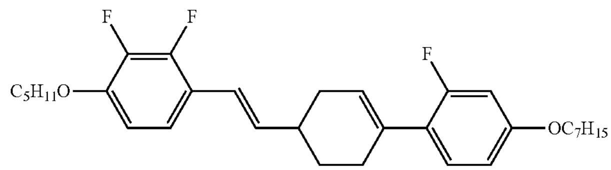 |
| 294 | 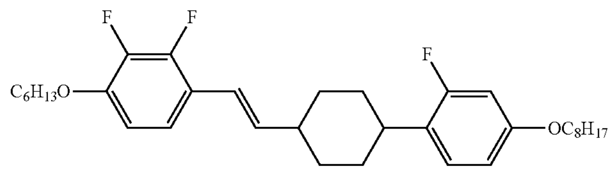 |
| 295 | 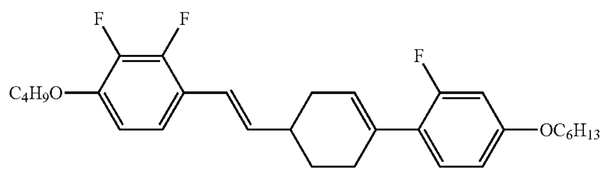 |
| 296 | 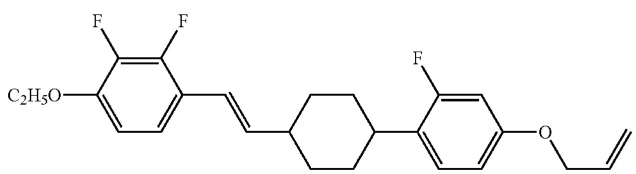 |
| 297 | 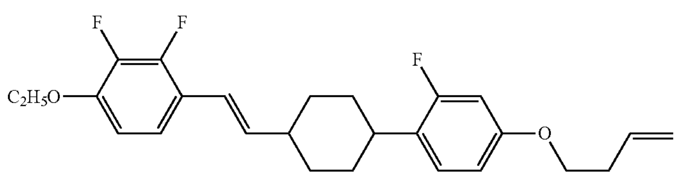 |
| 298 | 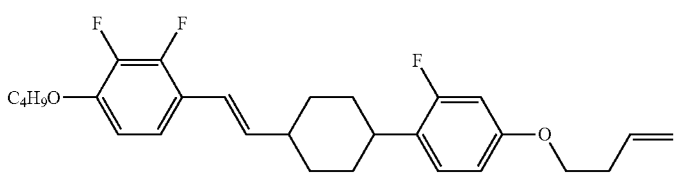 |
| 299 | 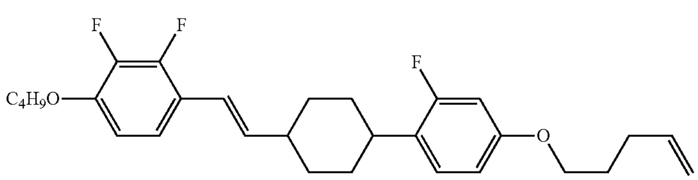 |
| 300 | 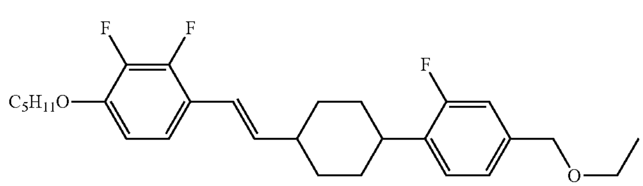 |
| 301 | 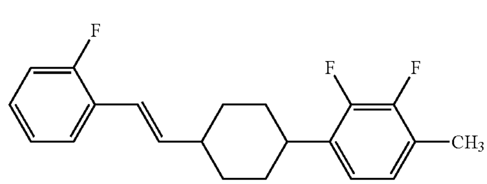 |

-continued
| No. |
| --- |
302
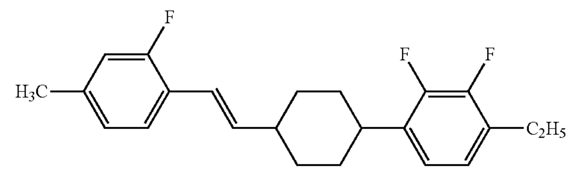
303
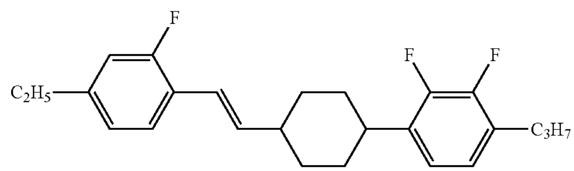
304
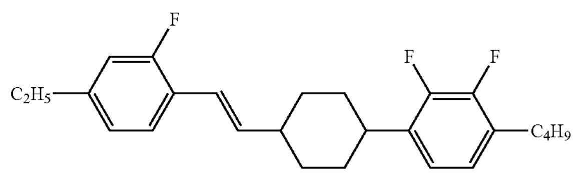
305
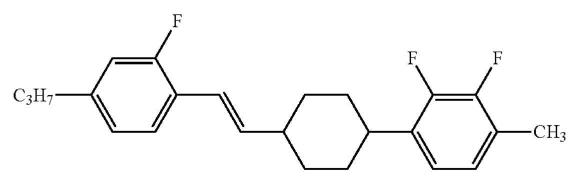
306
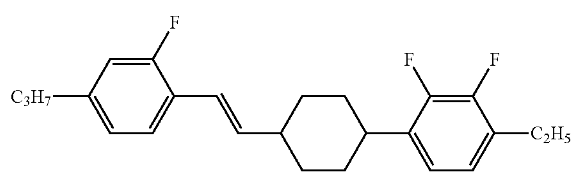
307
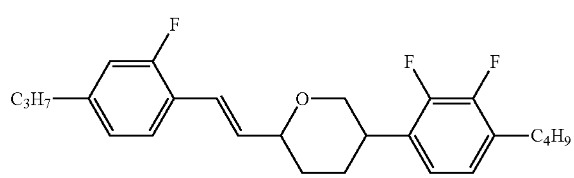
308
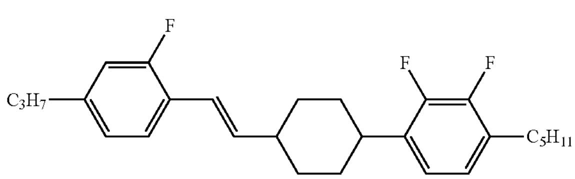
309
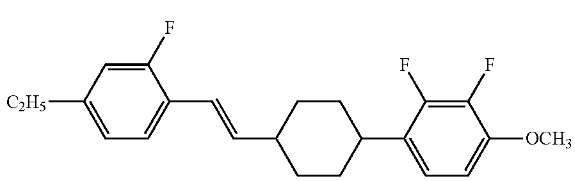
310
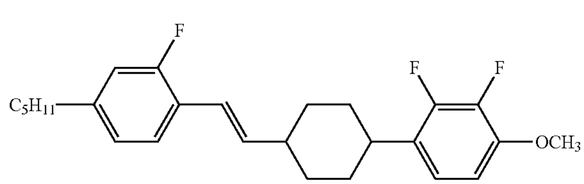

-continued
| No. | |
|---|---|
| 311 | 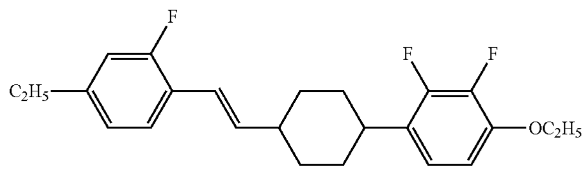 |
| 312 | 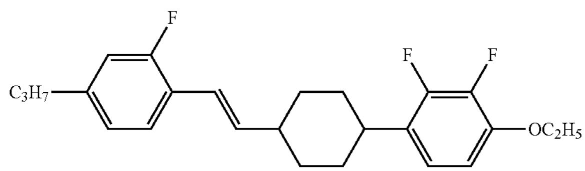 |
| 313 | 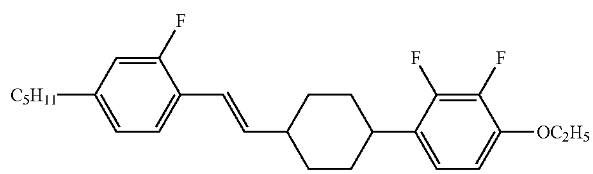 |
| 314 | 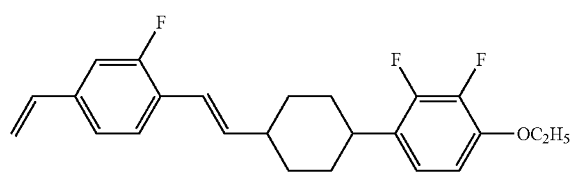 |
| 315 | 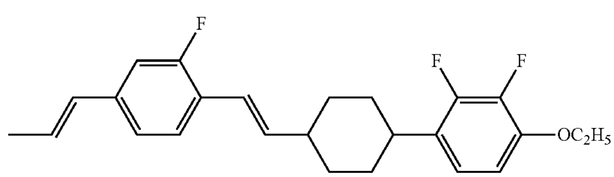 |
| 316 | 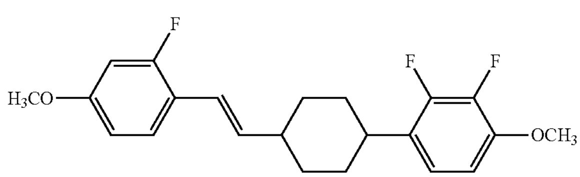 |
| 317 | 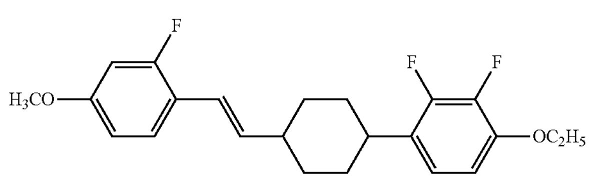 |
| 318 | 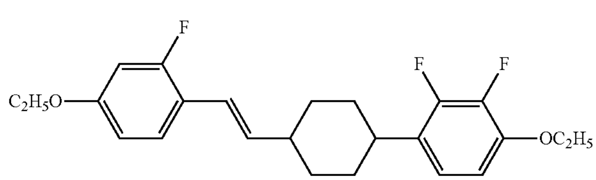 |
| 319 | 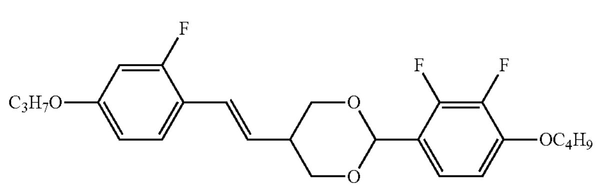 |

-continued
| No. | |
|---|---|
| 320 | 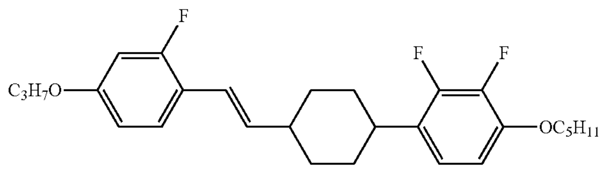 |
| 321 | 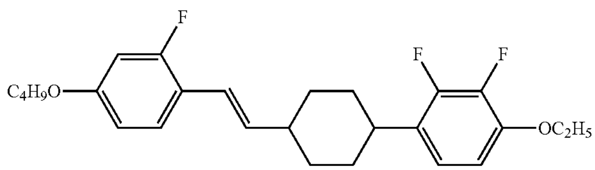 |
| 322 | 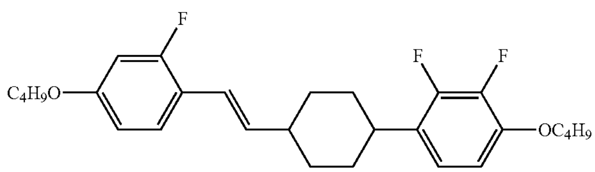 |
| 323 | 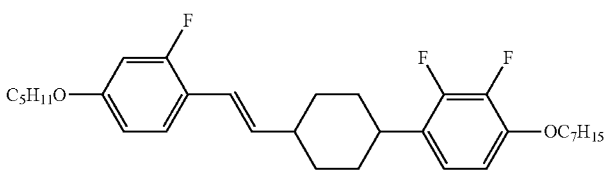 |
| 324 | 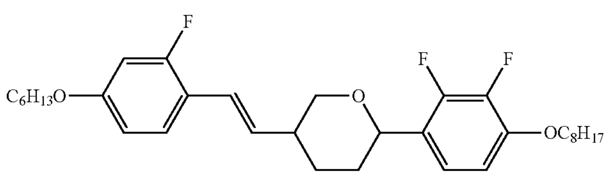 |
| 325 | 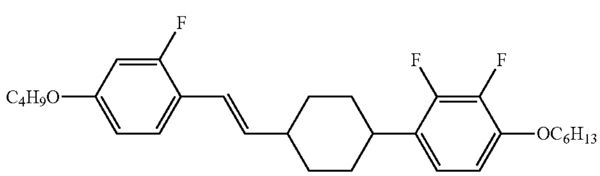 |
| 326 | 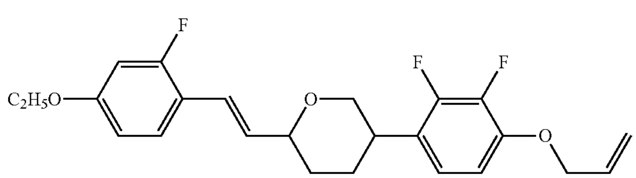 |
| 327 | 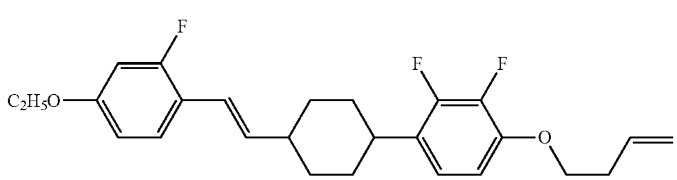 |
| 328 | 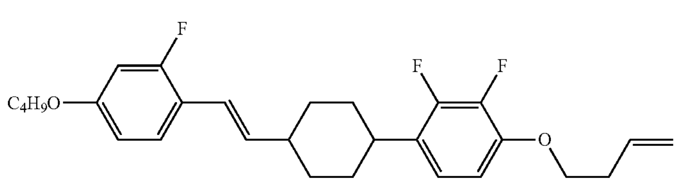 |

-continued
| No. | |
|---|---|
| 329 | 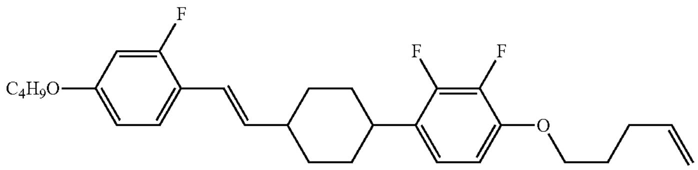 |
| 330 | 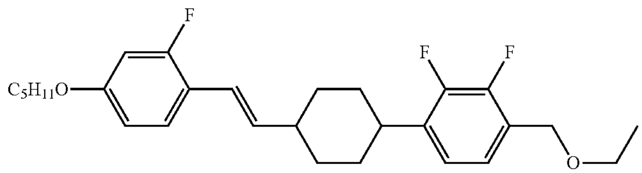 |
| 331 | 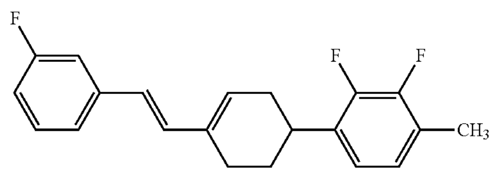 |
| 332 | 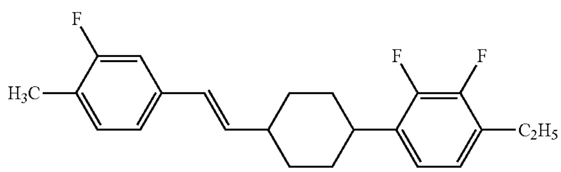 |
| 333 | 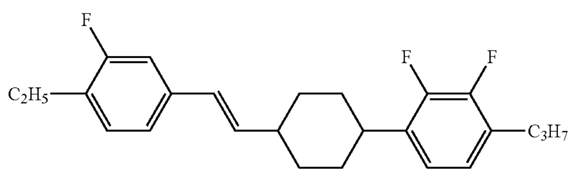 |
| 334 | 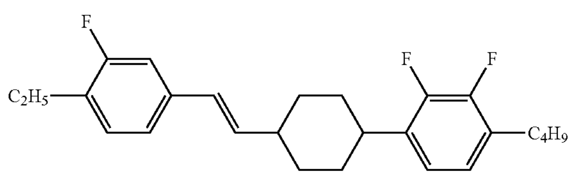 |
| 335 | 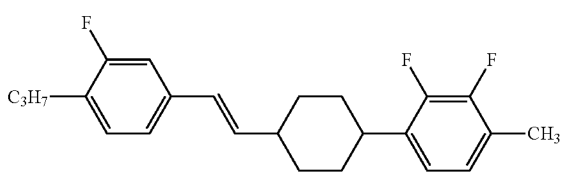 |
| 336 | 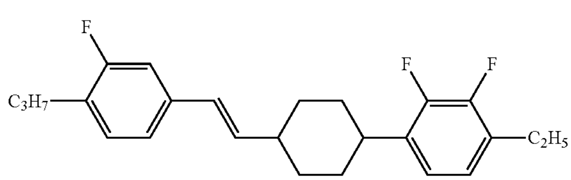 |
| 337 | 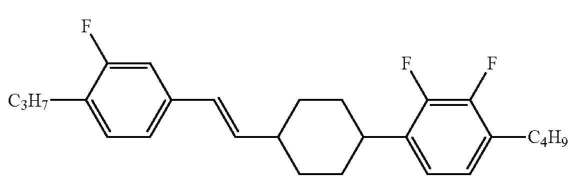 |

-continued
| No. | |
|---|---|
| 338 | 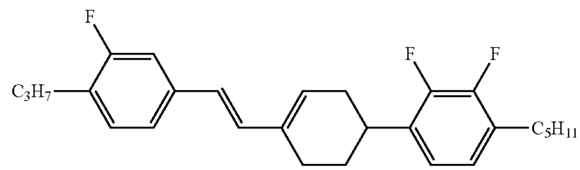 |
| 339 | 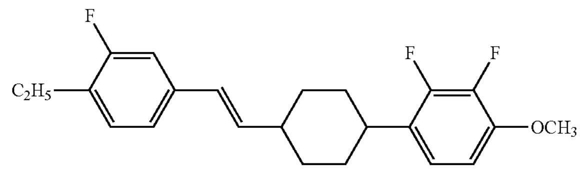 |
| 340 | 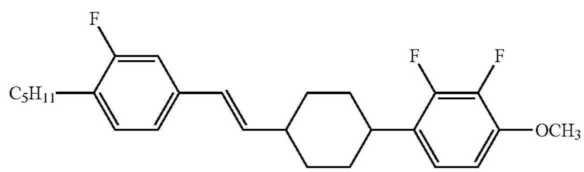 |
| 341 | 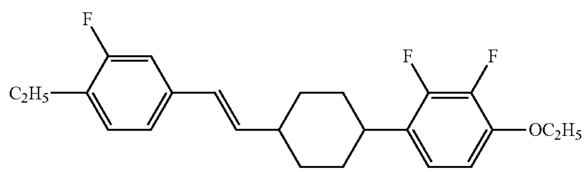 |
| 342 | 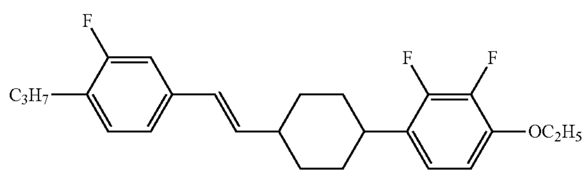 |
| 343 | 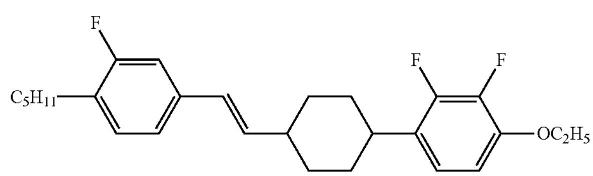 |
| 344 | 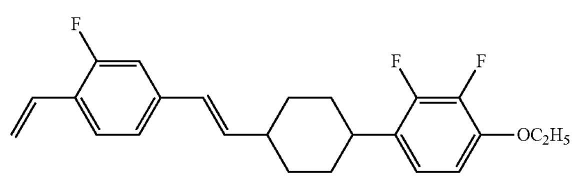 |
| 345 | 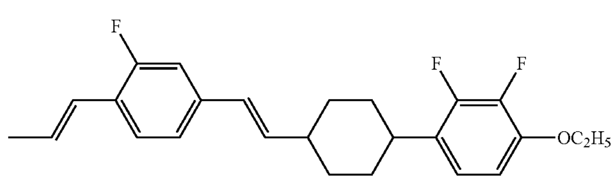 |
| 346 | 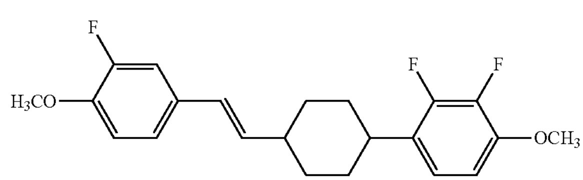 |

-continued
| No. | |
|---|---|
| 347 | 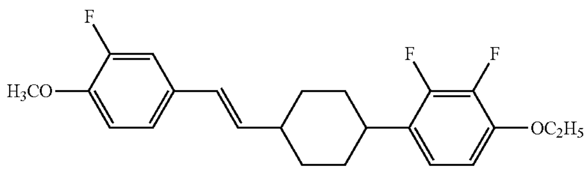 |
| 348 | 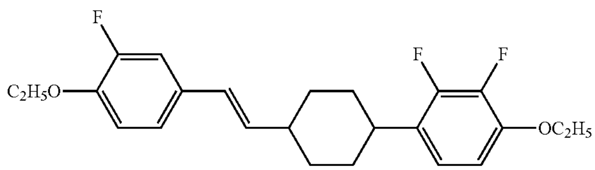 |
| 349 | 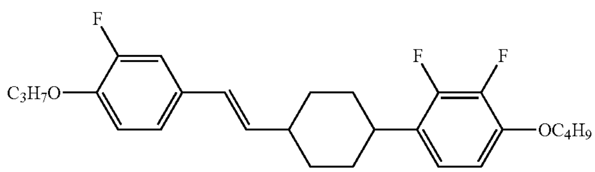 |
| 350 | 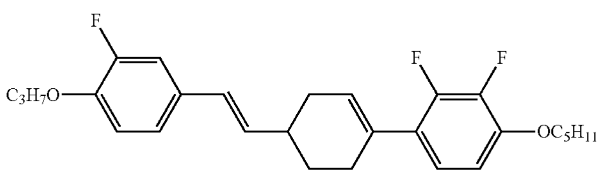 |
| 351 | 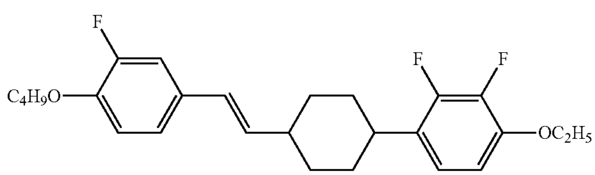 |
| 352 | 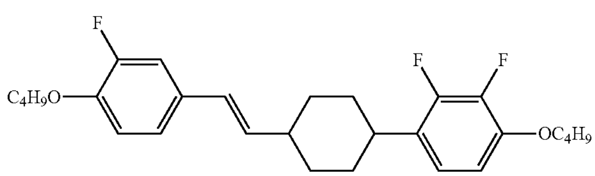 |
| 353 | 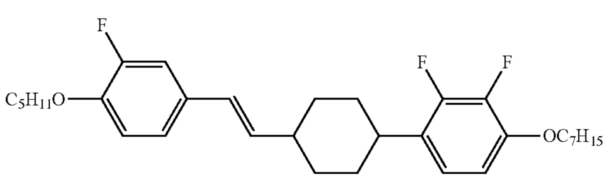 |
| 354 | 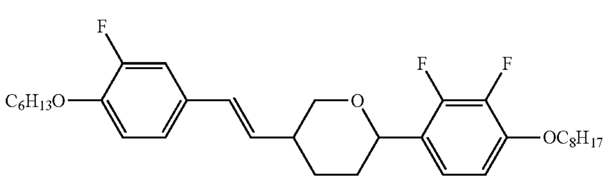 |
| 355 | 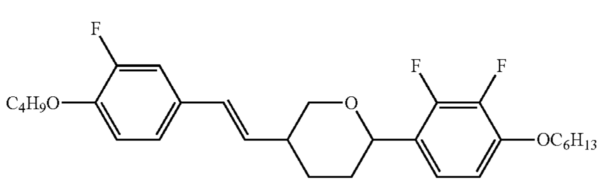 |

-continued
| No. | |
|---|---|
| 356 | 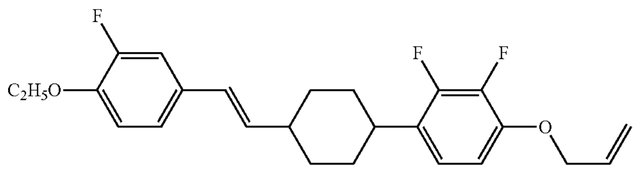 |
| 357 | 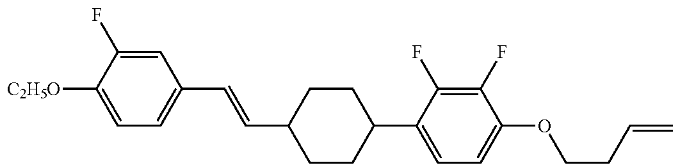 |
| 358 | 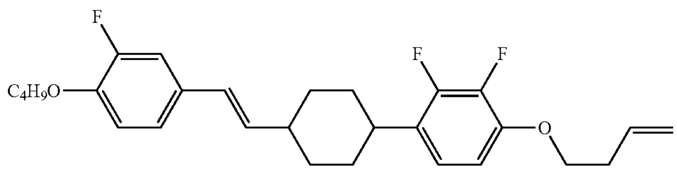 |
| 359 | 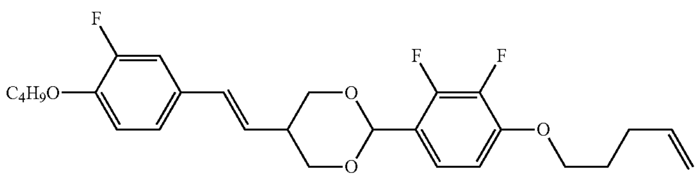 |
| 360 | 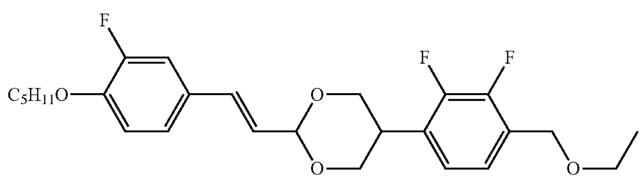 |
| 361 | 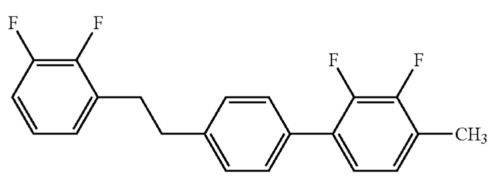 |
| 362 | 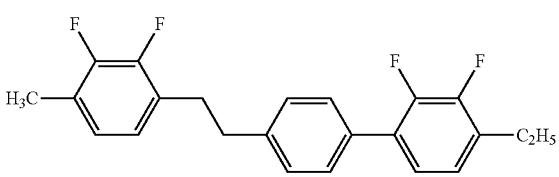 |
| 363 | 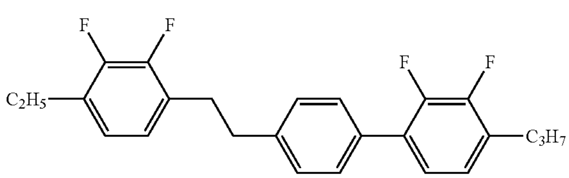 |
| 364 | 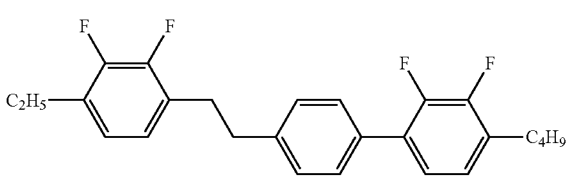 |

-continued
| No. | |
|---|---|
| 365 | 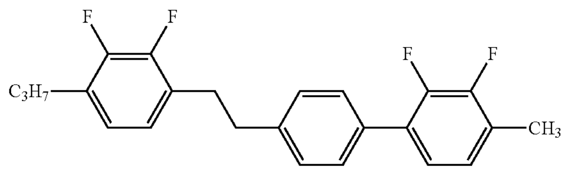 |
| 366 | 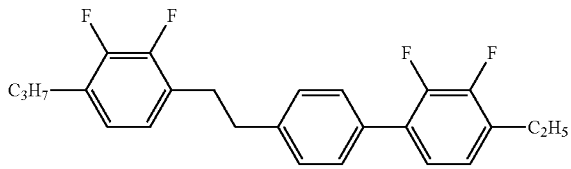 |
| 367 | 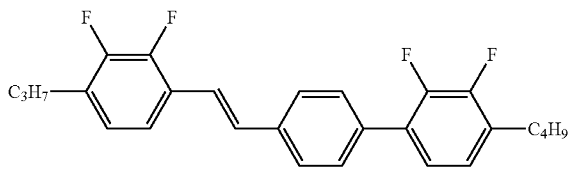 |
| 368 | 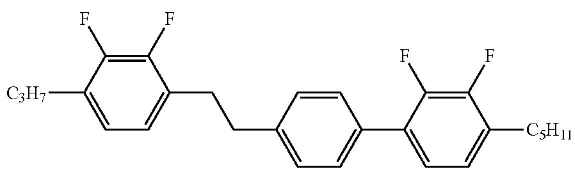 |
| 369 | 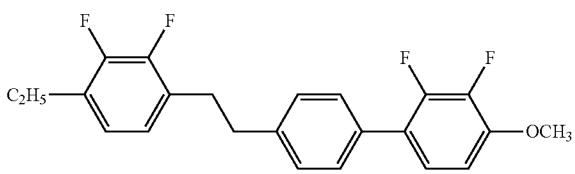 |
| 370 | 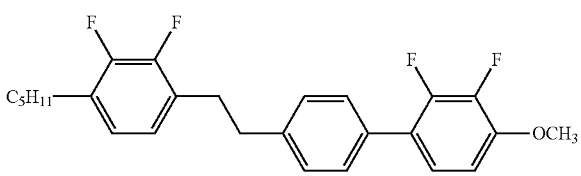 |
| 371 | 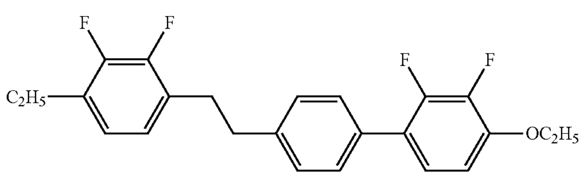 |
| 372 | 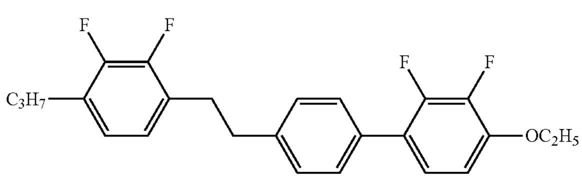 |
| 373 | 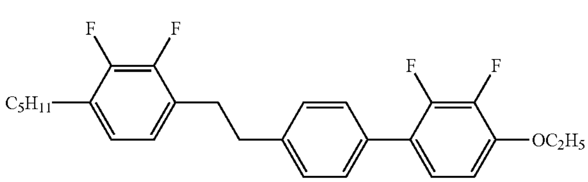 |

-continued
| No. | |
|---|---|
| 374 | 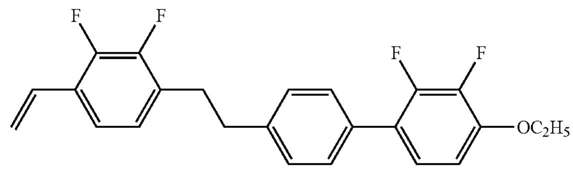 |
| 375 | 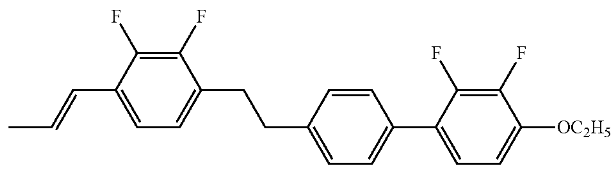 |
| 376 | 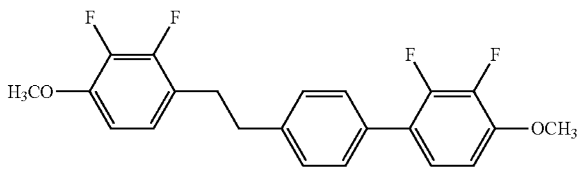 |
| 377 | 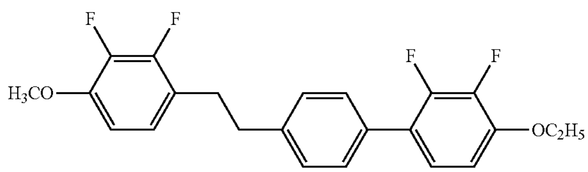 |
| 378 | 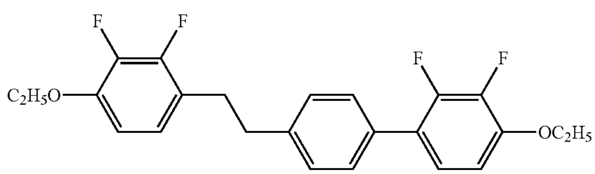 C 99.0 N 112.1 I<br>$T_{NI}$; 113.9° C., Δε; −9.82, Δn; 0.207 |
| 379 | 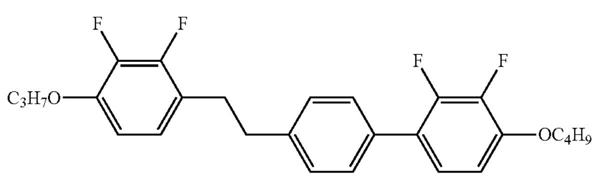 |
| 380 | 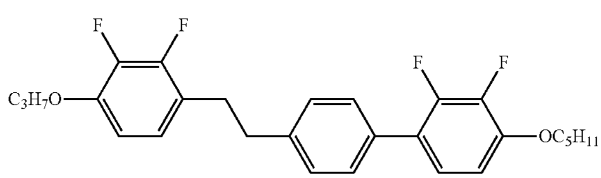 |
| 381 | 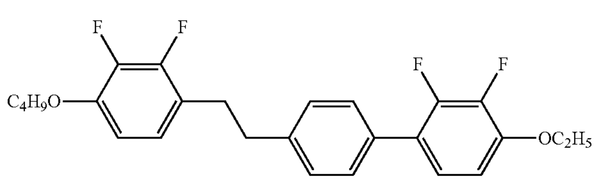 |

-continued
| No. | |
|---|---|
| 382 | 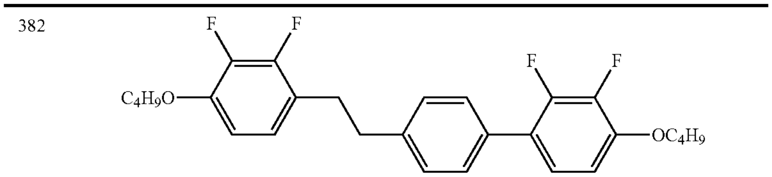 |
| 383 | 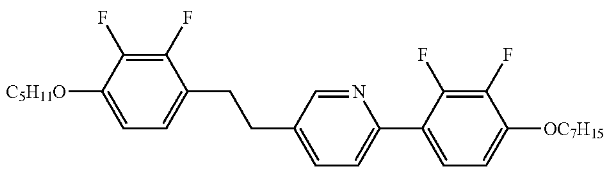 |
| 384 | 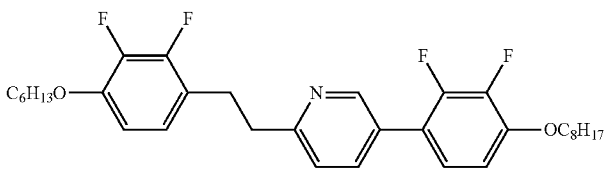 |
| 385 | 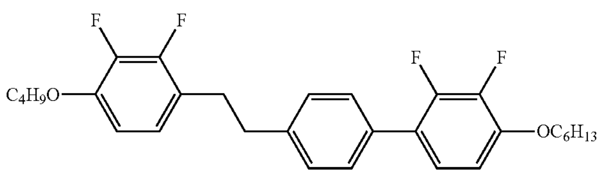 |
| 386 | 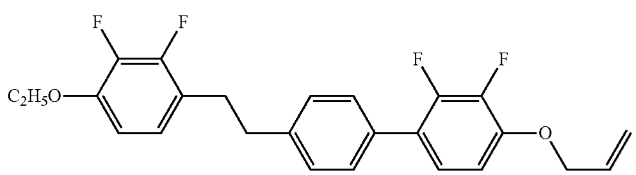 |
| 387 | 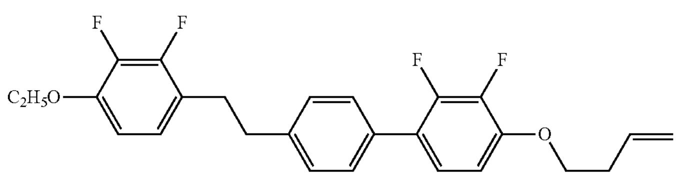 |
| 388 | 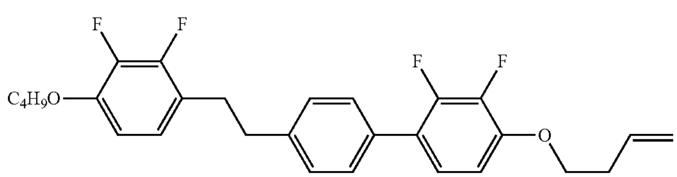 |
| 389 | 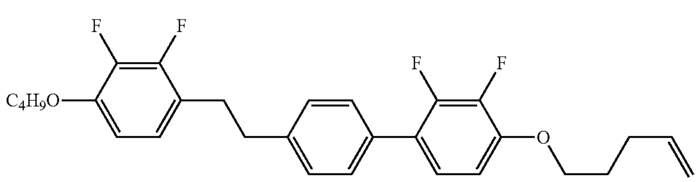 |
| 390 | 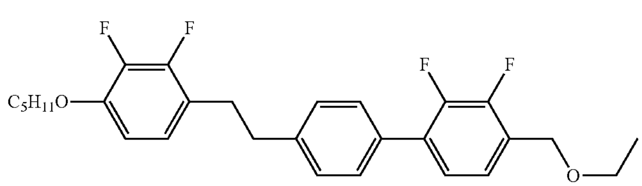 |

-continued
| No. | |
|---|---|
| 391 | 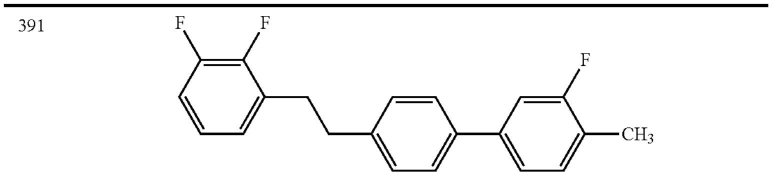 |
| 392 | 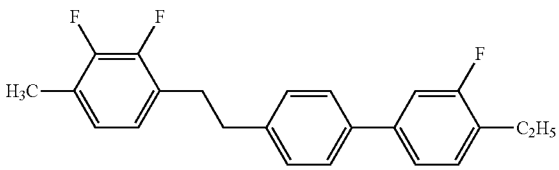 |
| 393 | 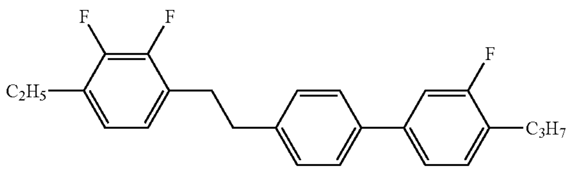 |
| 394 | 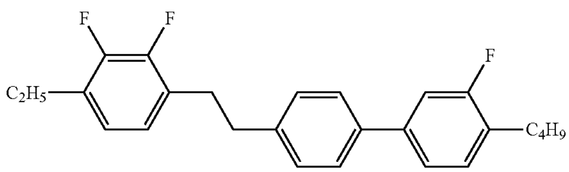 |
| 395 | 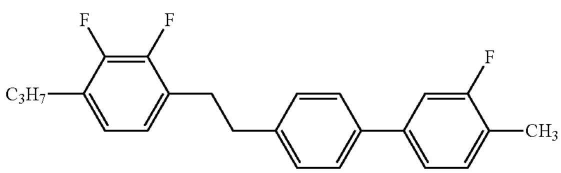 |
| 396 | 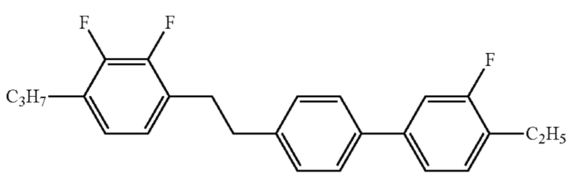 |
| 397 | 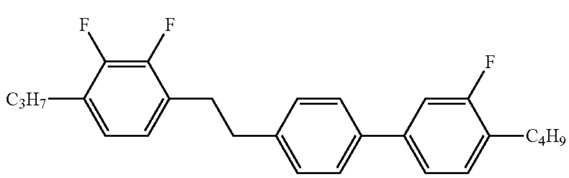 |
| 398 | 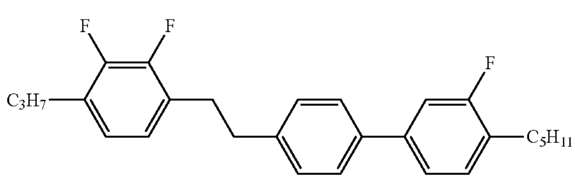 |
| 399 | 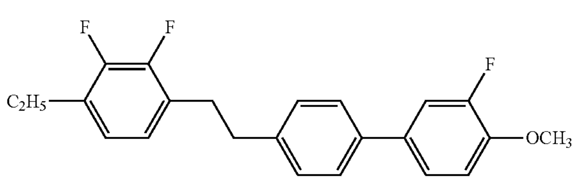 |

-continued
| No. | |
|---|---|
| 400 | 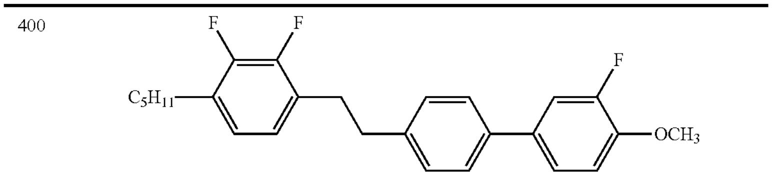 |
| 401 | 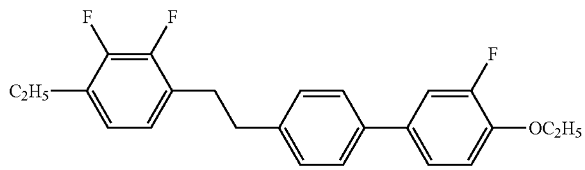 |
| 402 | 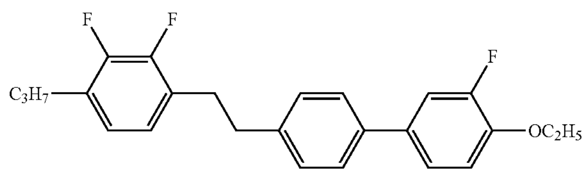 |
| 403 | 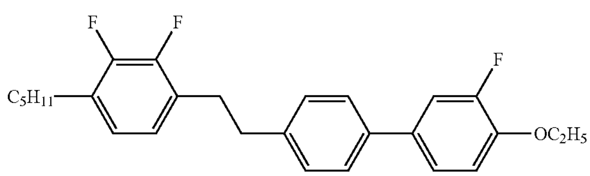 |
| 404 | 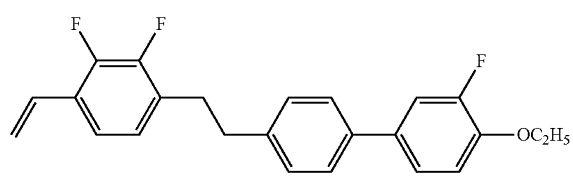 |
| 405 | 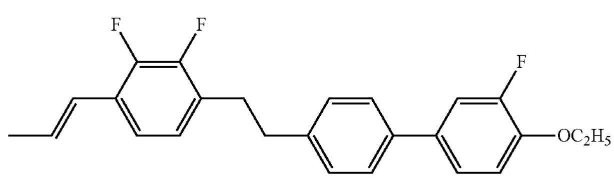 |
| 406 | 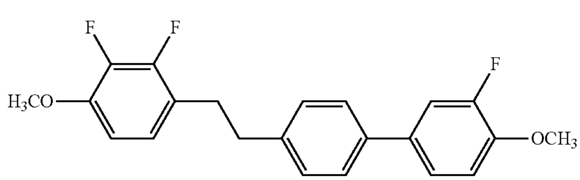 |
| 407 | 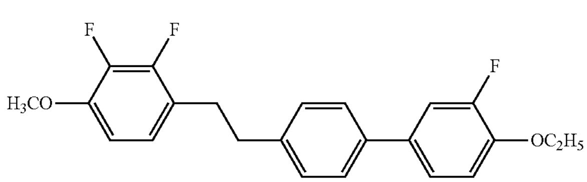 |
| 408 | 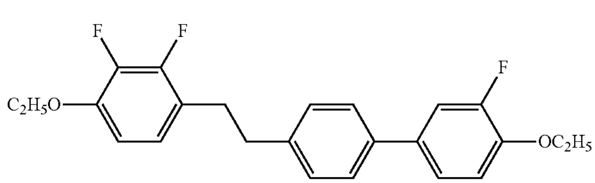 |

-continued
| No. | |
|---|---|
| 409 | 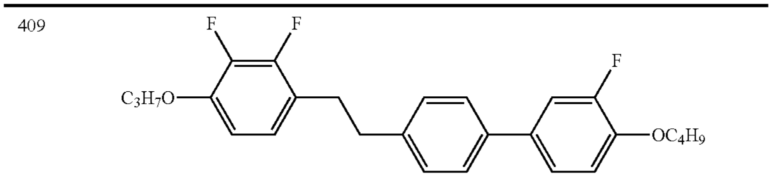 |
| 410 | 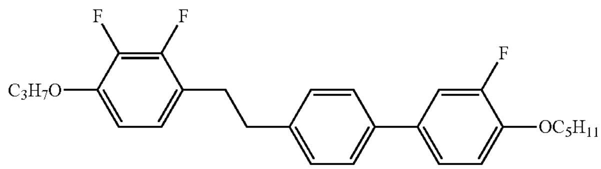 |
| 411 | 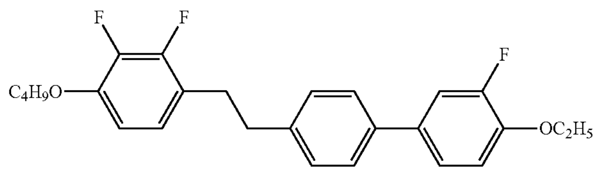 |
| 412 | 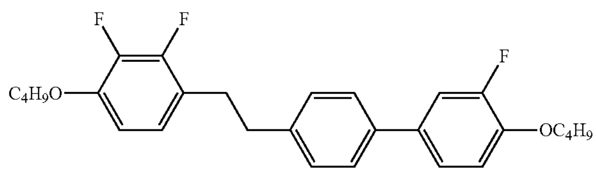 |
| 413 | 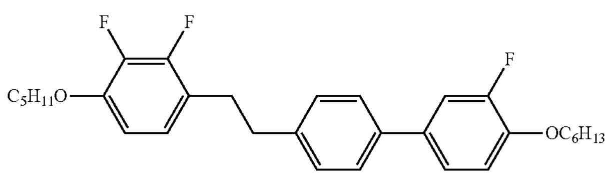 |
| 414 | 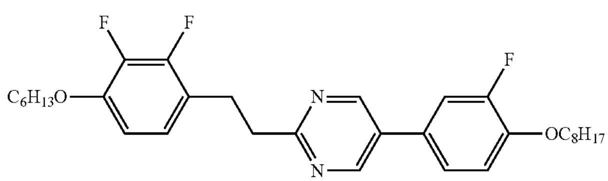 |
| 415 | 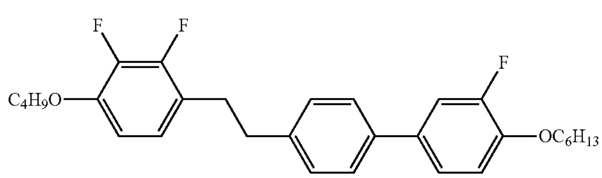 |
| 416 | 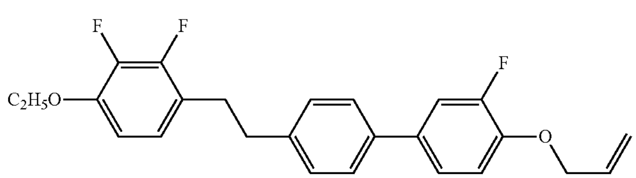 |
| 417 | 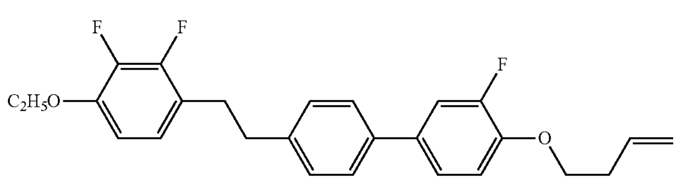 |

-continued
| No. | |
|---|---|
| 418 | 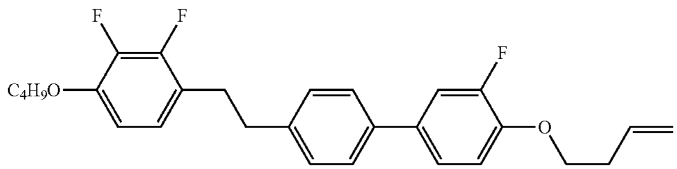 |
| 419 | 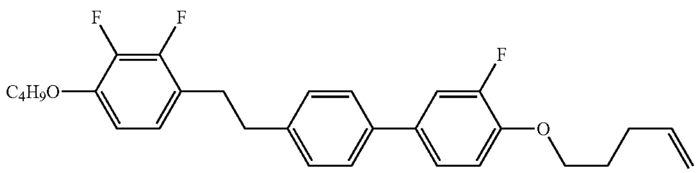 |
| 420 | 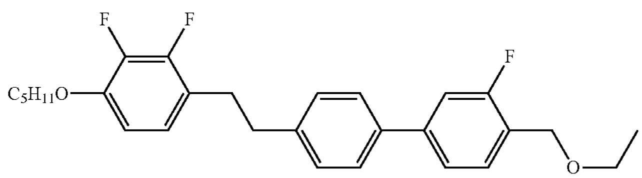 |
| 421 | 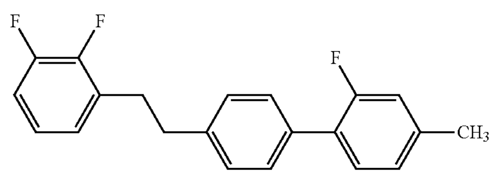 |
| 422 | 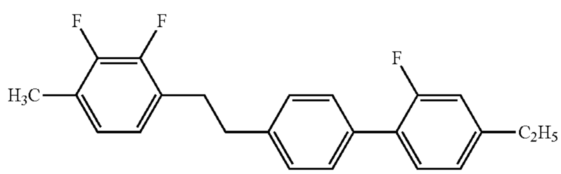 |
| 423 | 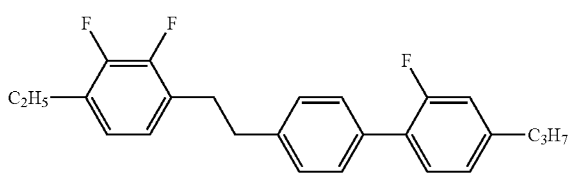 |
| 424 | 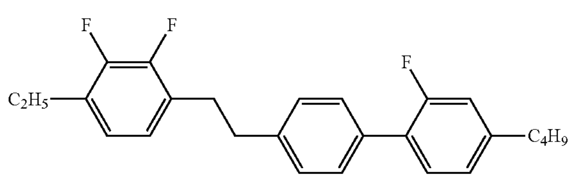 |
| 425 | 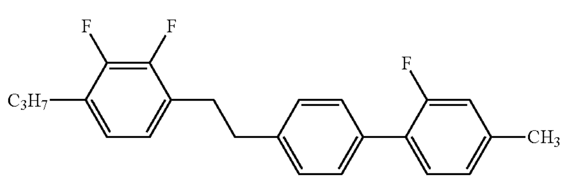 |
| 426 | 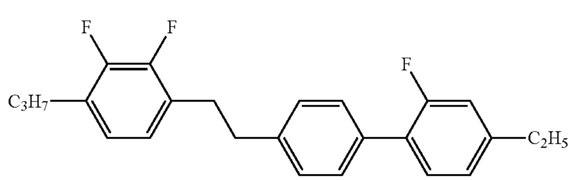 |

-continued
| No. | |
|---|---|
| 427 | 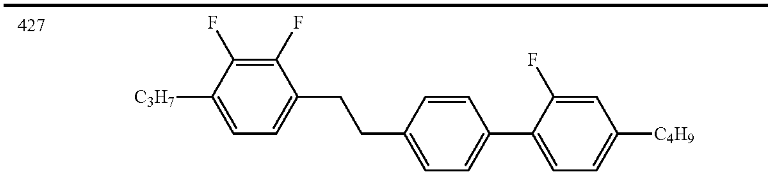 |
| 428 | 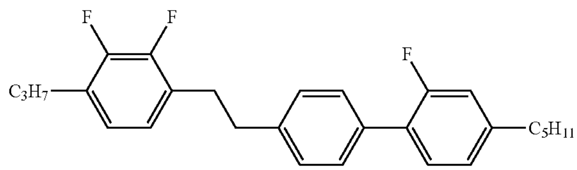 |
| 429 | 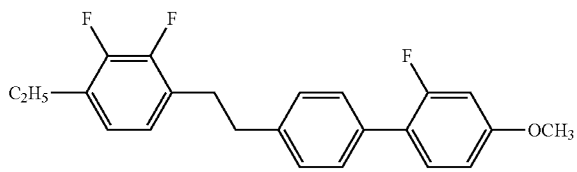 |
| 430 | 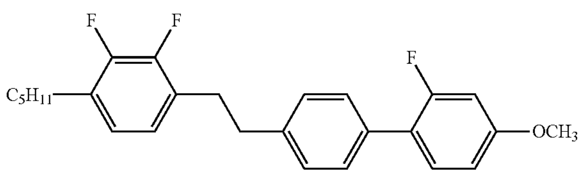 |
| 431 | 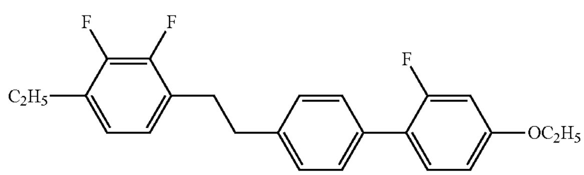 |
| 432 | 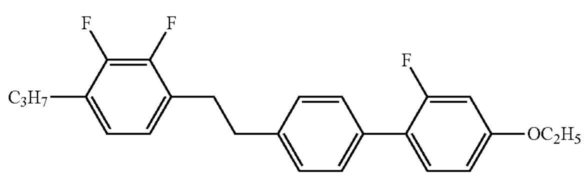 |
| 433 | 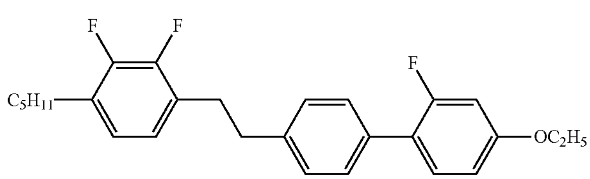 |
| 434 | 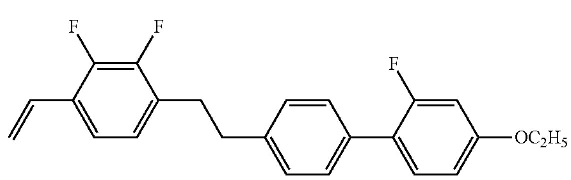 |
| 435 | 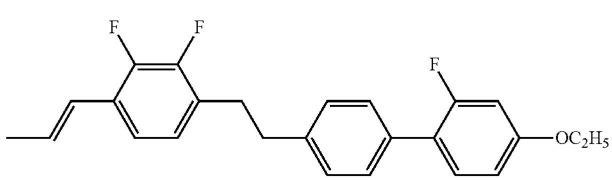 |

-continued
| No. | |
|---|---|
| 436 | 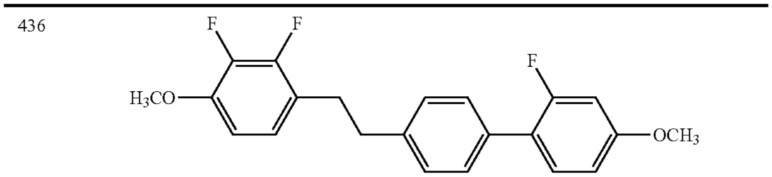 |
| 437 | 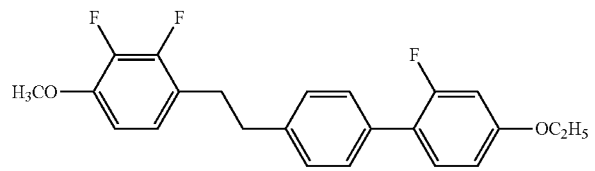 |
| 438 | 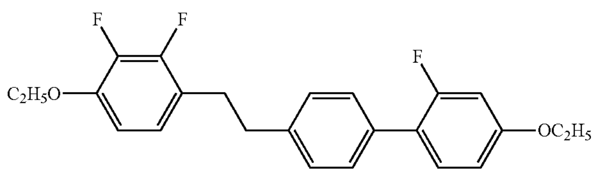 |
| 439 | 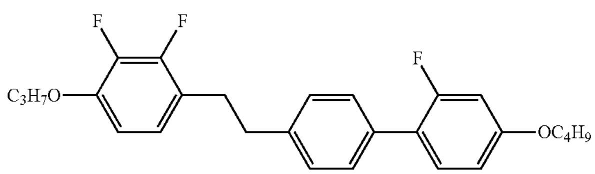 |
| 440 | 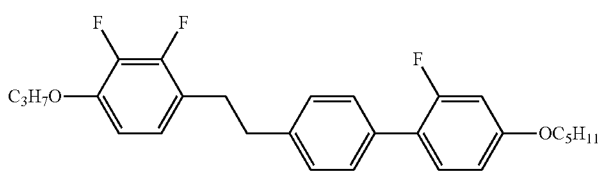 |
| 441 | 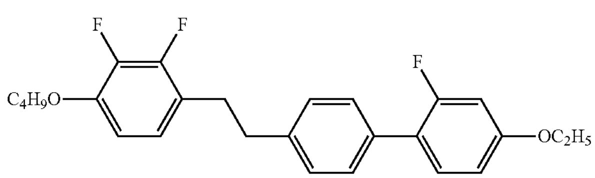 |
| 442 | 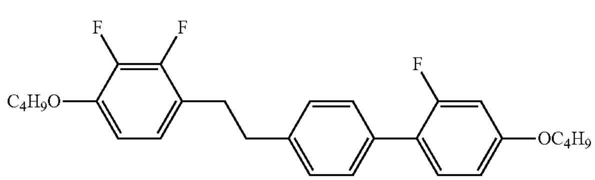 |
| 443 | 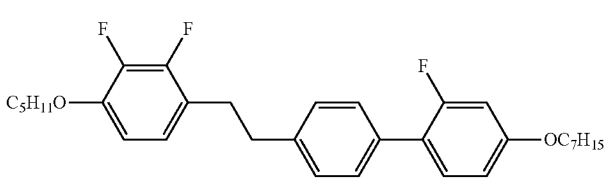 |
| 444 | 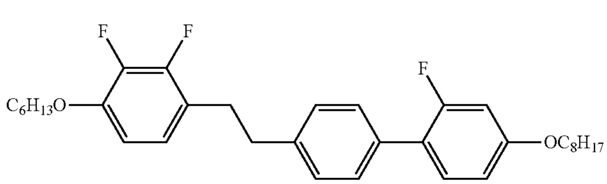 |

-continued
| No. | |
|---|---|
| 445 | 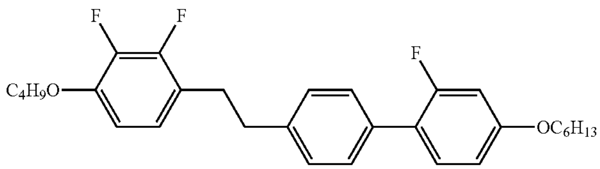 |
| 446 | 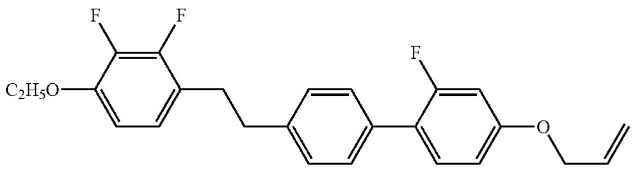 |
| 447 | 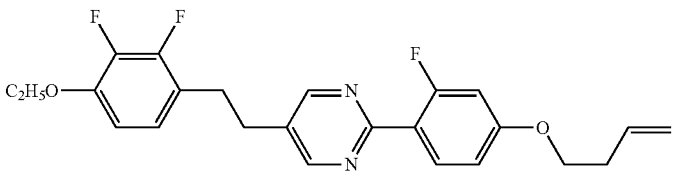 |
| 448 | 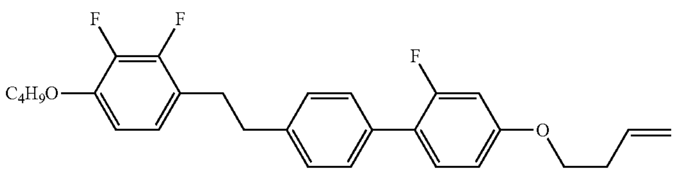 |
| 449 | 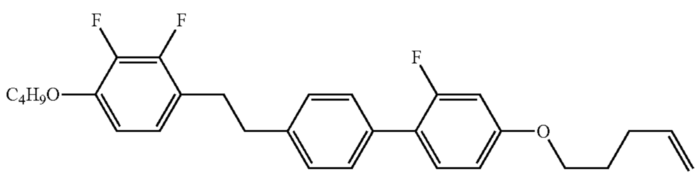 |
| 450 | 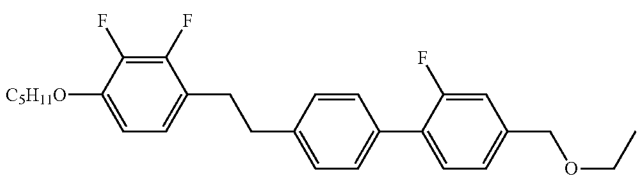 |
| 451 | 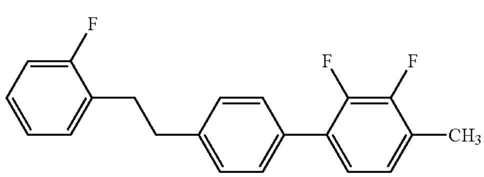 |
| 452 | 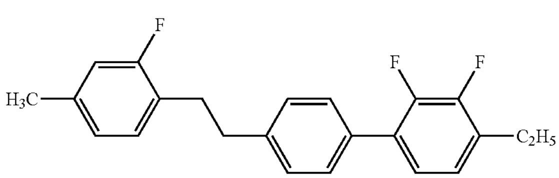 |
| 453 | 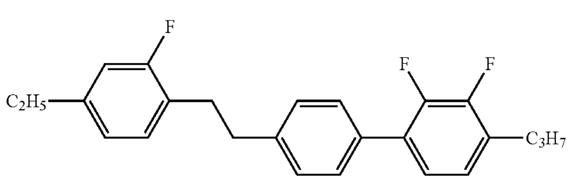 |

-continued
| No. | |
|---|---|
| 454 | 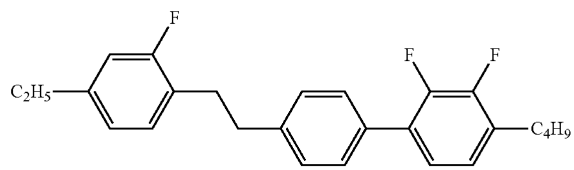 |
| 455 | 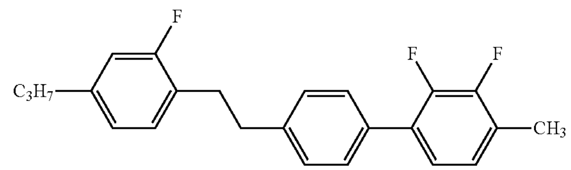 |
| 456 | 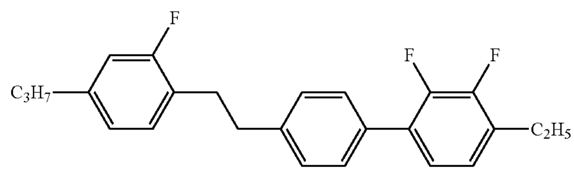 |
| 457 | 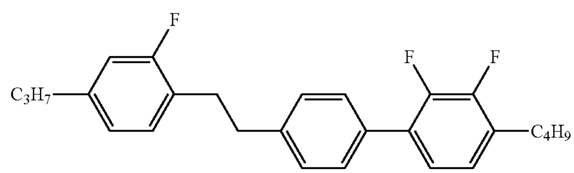 |
| 458 | 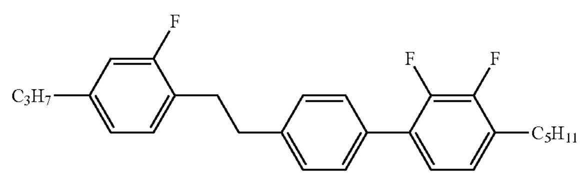 |
| 459 | 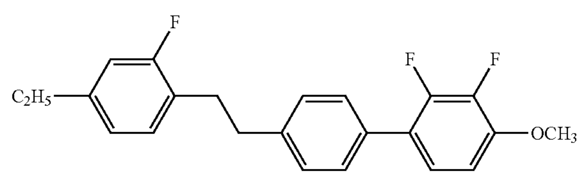 |
| 460 | 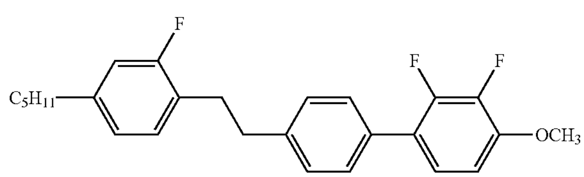 |
| 461 | 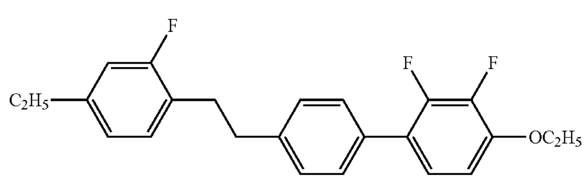 |
| 462 | 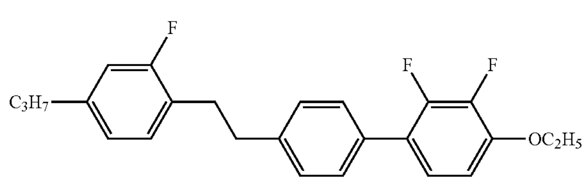 |

-continued
| No. | |
|---|---|
| 463 | 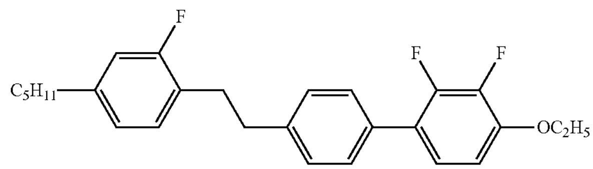 |
| 464 | 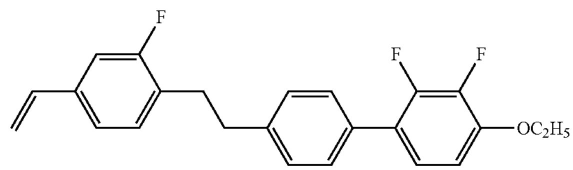 |
| 465 | 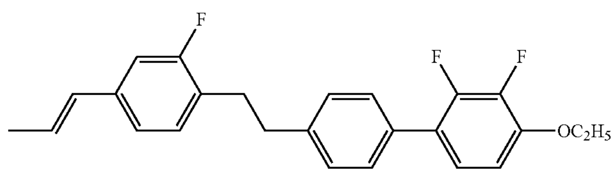 |
| 466 | 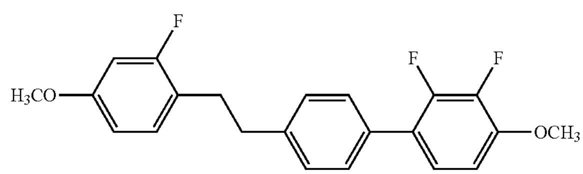 |
| 467 | 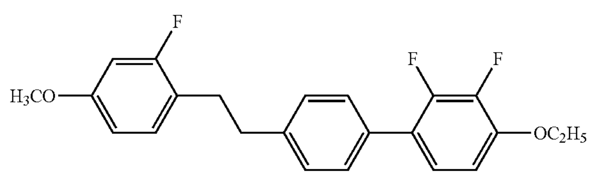 |
| 468 | 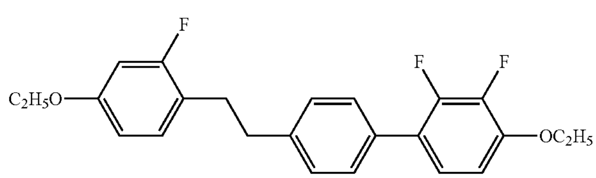 |
| 469 | 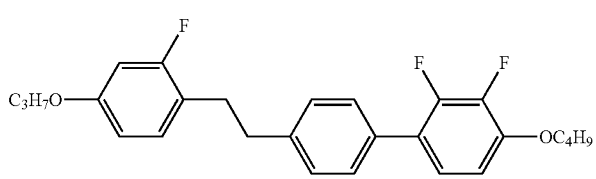 |
| 470 | 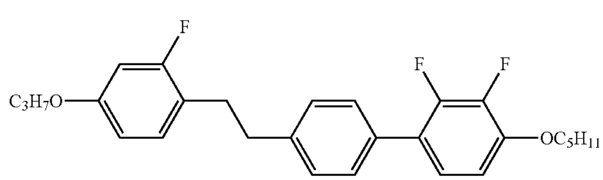 |
| 471 | 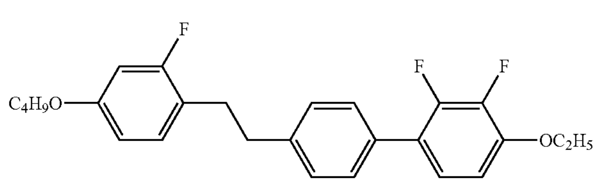 |

-continued
| No. | |
|---|---|
| 472 | 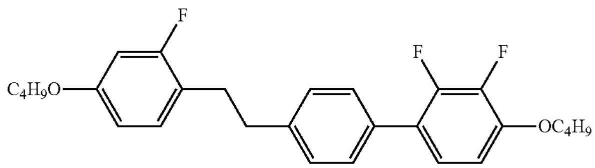 |
| 473 | 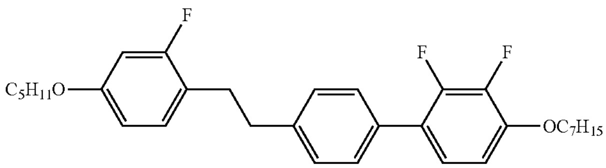 |
| 474 | 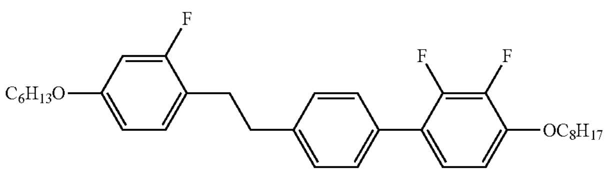 |
| 475 | 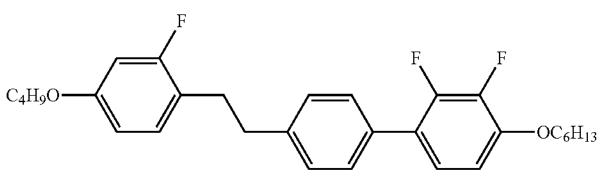 |
| 476 | 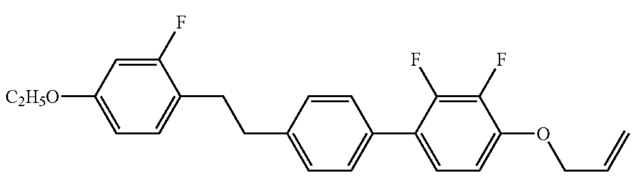 |
| 477 | 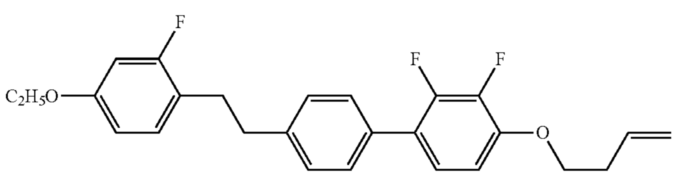 |
| 478 | 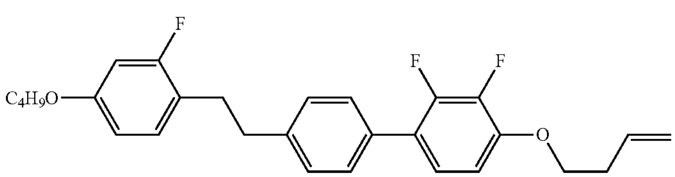 |
| 479 | 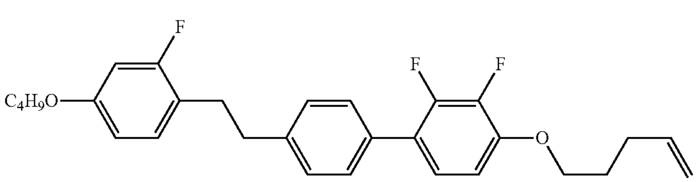 |
| 480 | 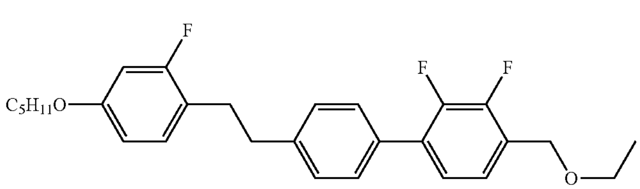 |

-continued
| No. | |
|---|---|
| 481 | 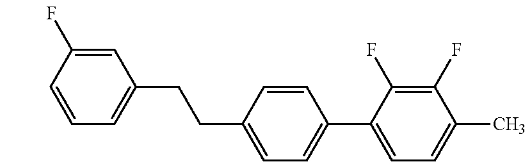 |
| 482 | 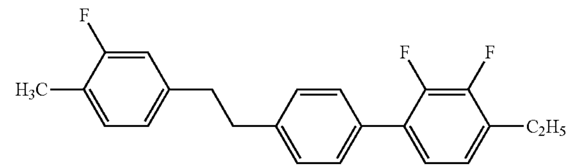 |
| 483 | 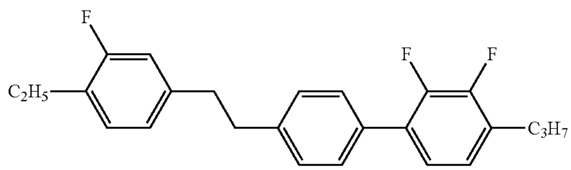 |
| 484 | 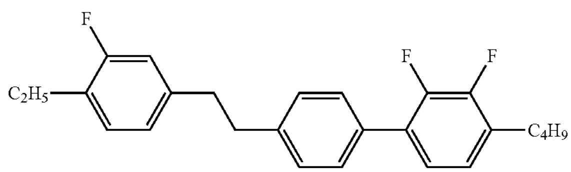 |
| 485 | 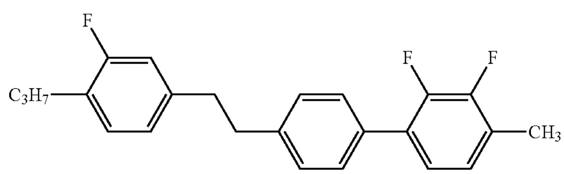 |
| 486 | 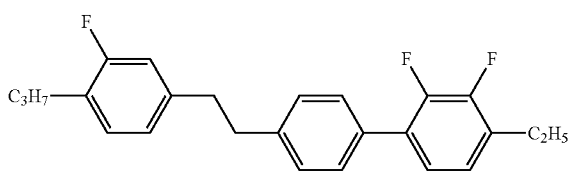 |
| 487 | 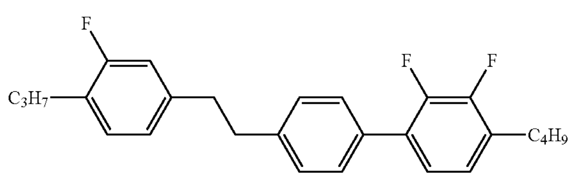 |
| 488 | 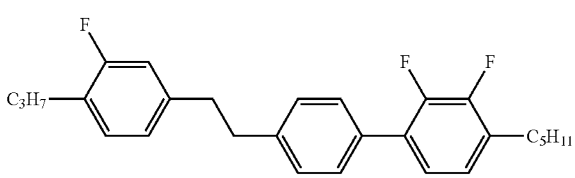 |
| 489 | 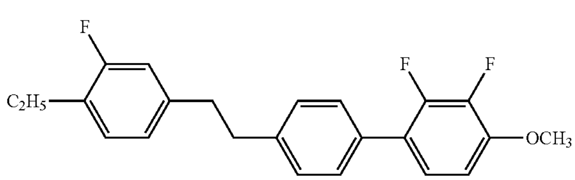 |

-continued
| No. | |
|---|---|
| 490 | 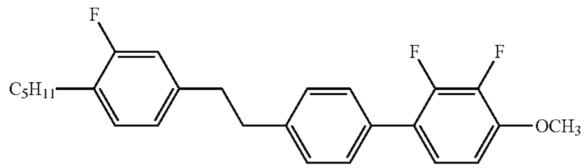 |
| 491 | 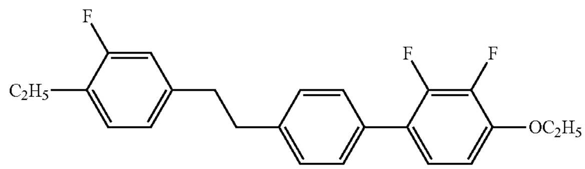 |
| 492 | 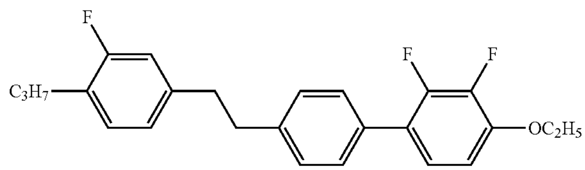 |
| 493 | 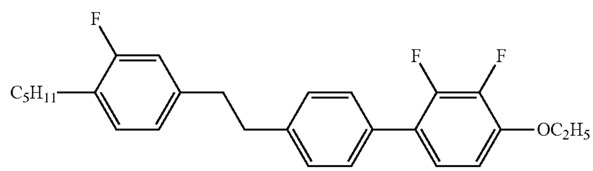 |
| 494 | 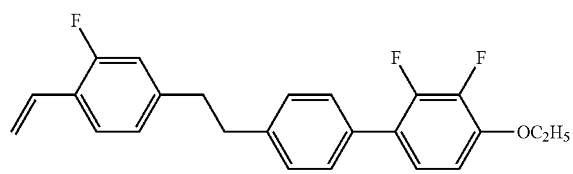 |
| 495 | 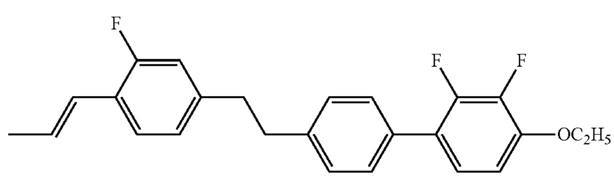 |
| 496 | 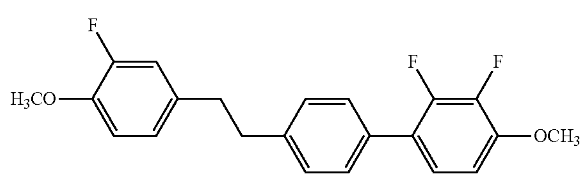 |
| 497 | 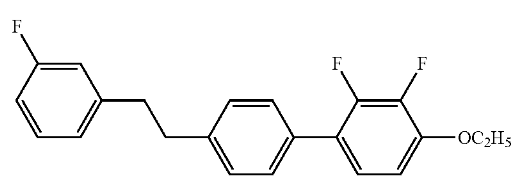 $C_1$ 59.0 $C_2$ 61.2 I $T_{NI}$; 39.3° C., Δε; −4.72, Δn; 0.174 |

-continued
| No. | |
|---|---|
| 498 | 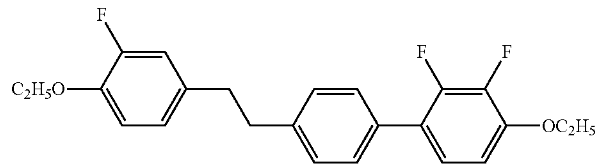 |
| 499 | 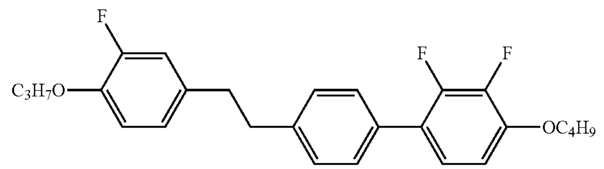 |
| 500 | 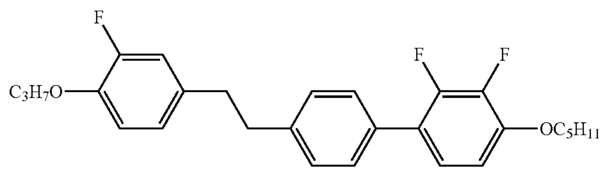 |
| 501 | 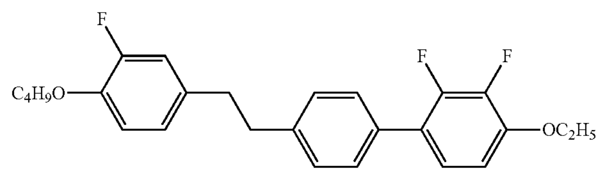 |
| 502 | 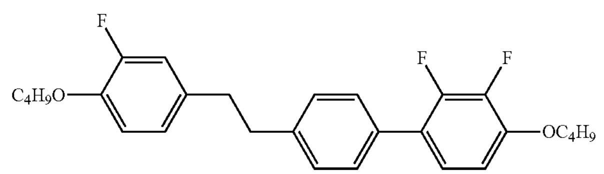 |
| 503 | 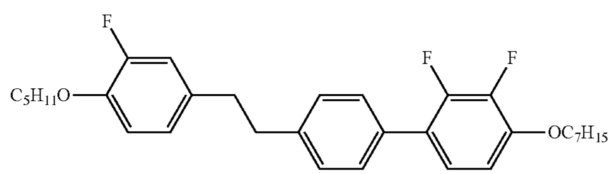 |
| 504 | 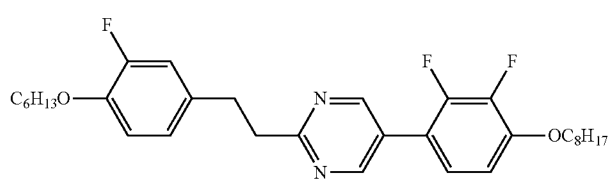 |
| 505 | 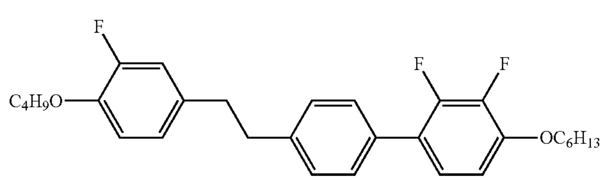 |
| 506 | 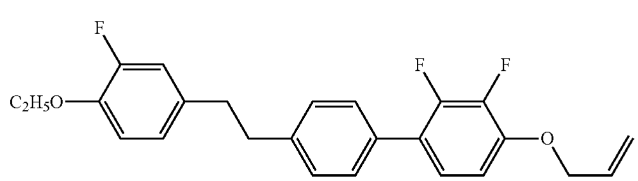 |

-continued
| No. | |
|---|---|
| 507 | 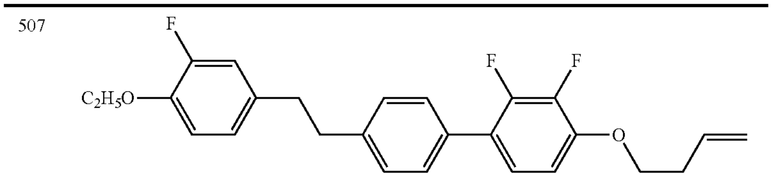 |
| 508 | 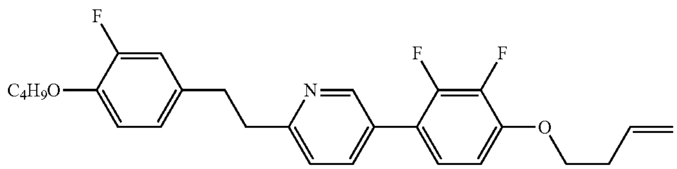 |
| 509 | 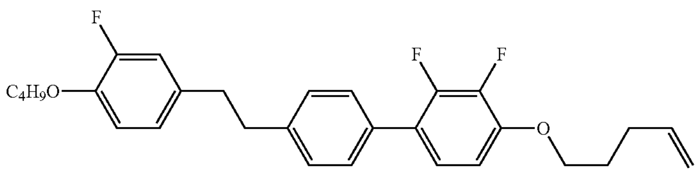 |
| 510 | 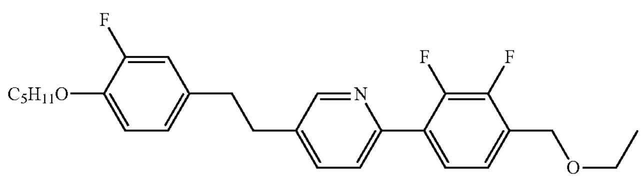 |
| 511 | 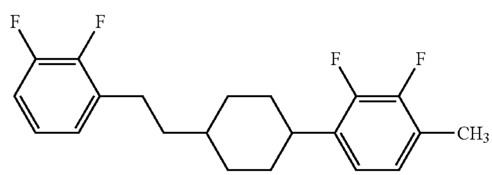 |
| 512 | 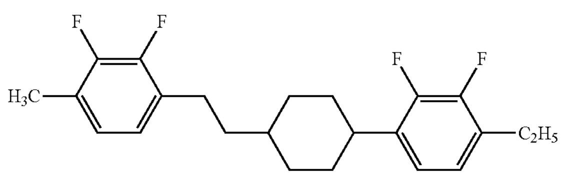 |
| 513 | 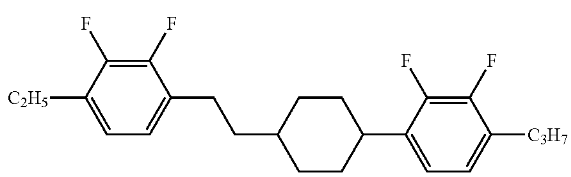 |
| 514 | 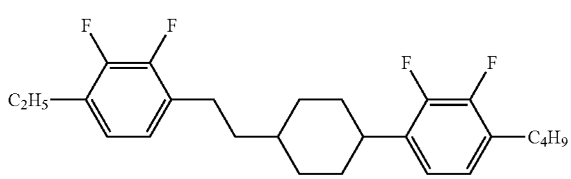 |
| 515 | 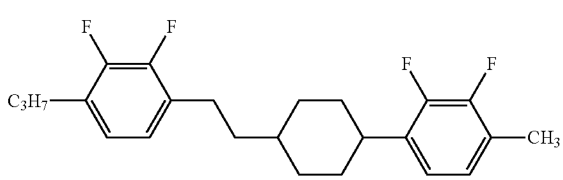 |

-continued
| No. |
| --- |
| 516 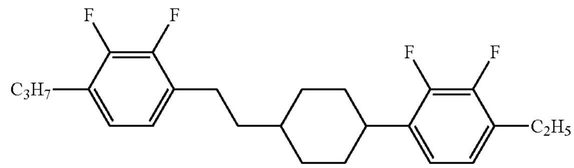 |
| 517 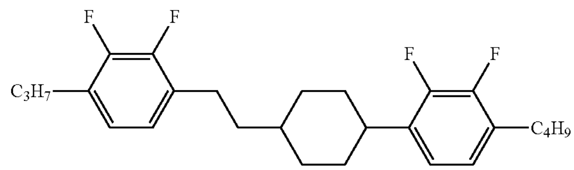 |
| 518 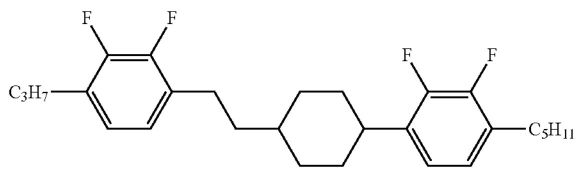 |
| 519 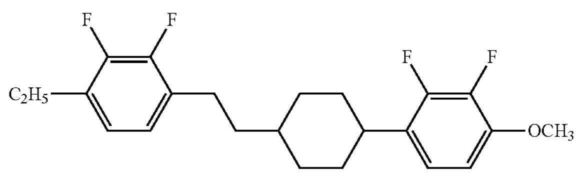 |
| 520 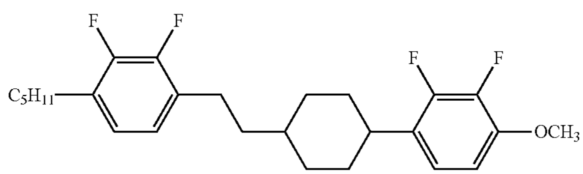 |
| 521 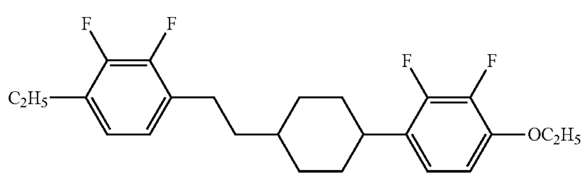 |
| 522 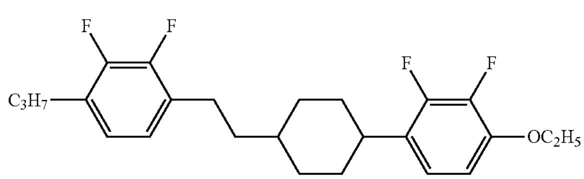 |
| 523 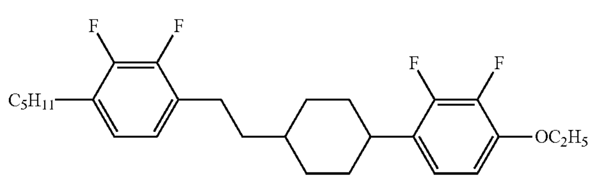 |
| 524 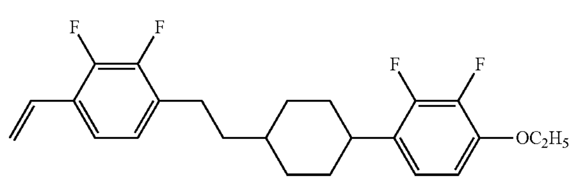 |

-continued
No.
525
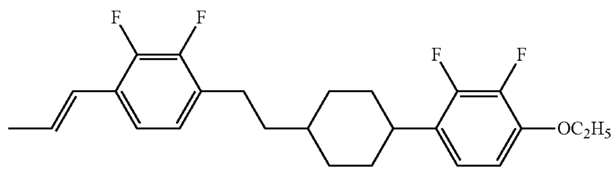
526
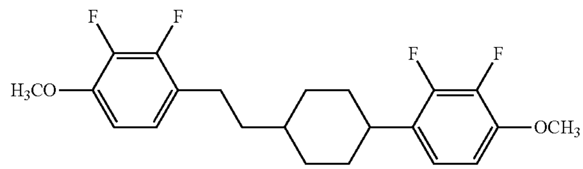
527
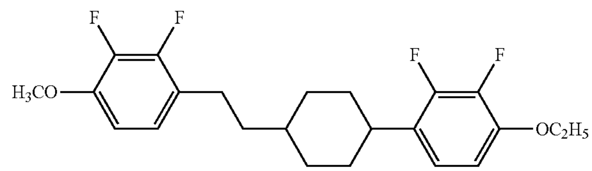
528
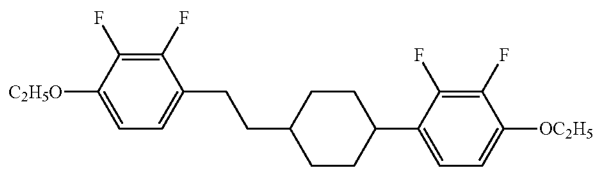
C 114.3 I
$T_{NI}$; 106.6° C., $\Delta\epsilon$; −8.97, $\Delta n$; 0.137
529
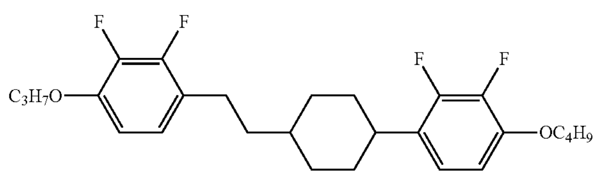
530
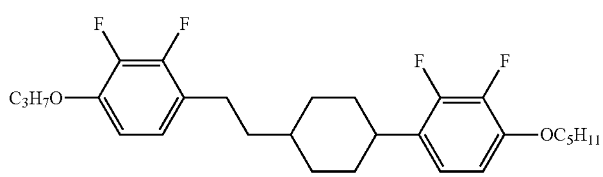
531
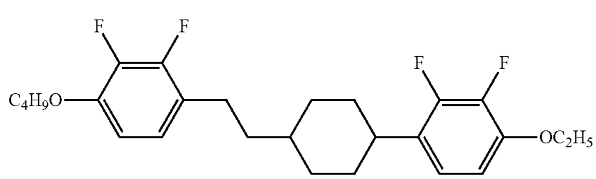
532
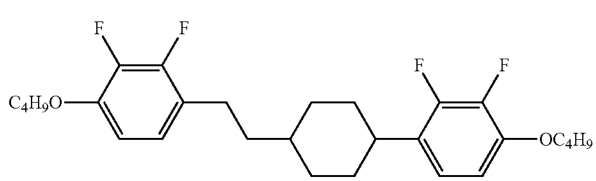

-continued
| No. | |
|---|---|
| 533 | 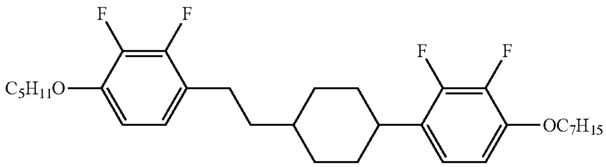 |
| 534 | 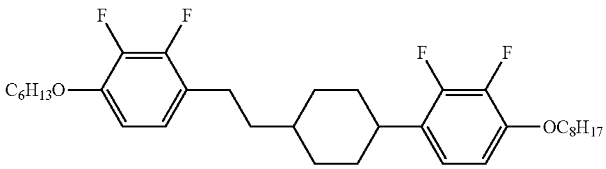 |
| 535 | 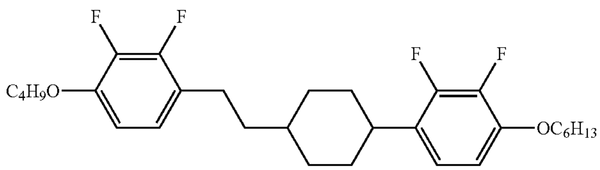 |
| 536 | 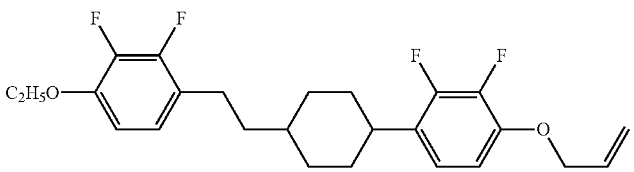 |
| 537 | 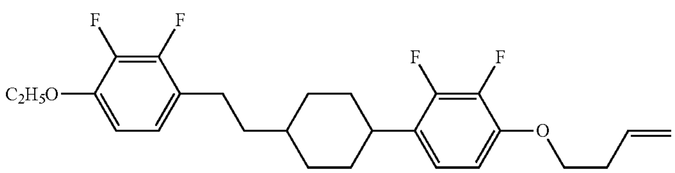 |
| 538 | 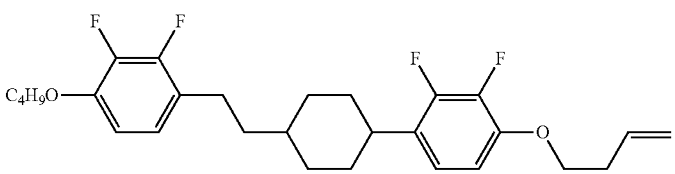 |
| 539 | 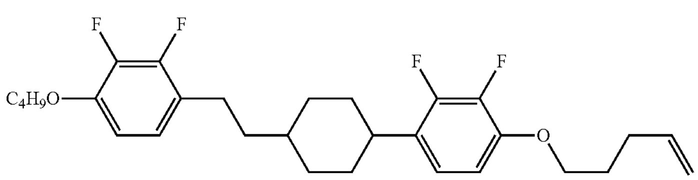 |
| 540 | 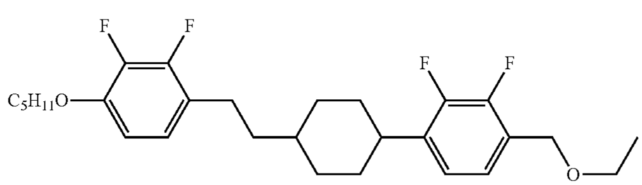 |
| 541 | 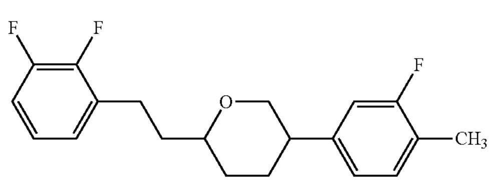 |

-continued
| No. | |
|---|---|
| 542 | 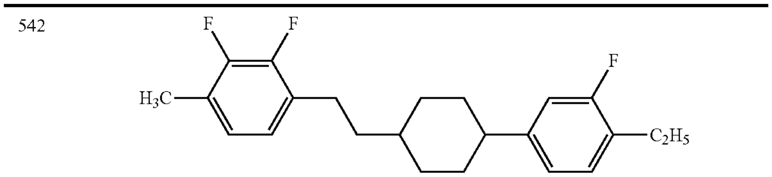 |
| 543 | 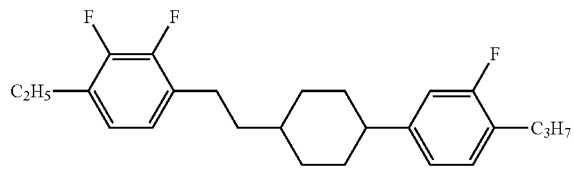 |
| 544 | 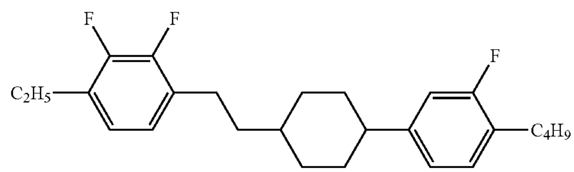 |
| 545 | 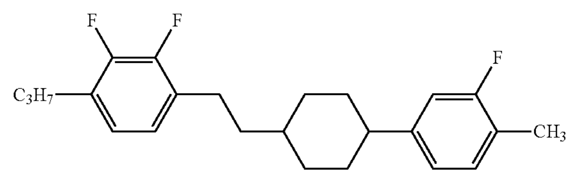 |
| 546 | 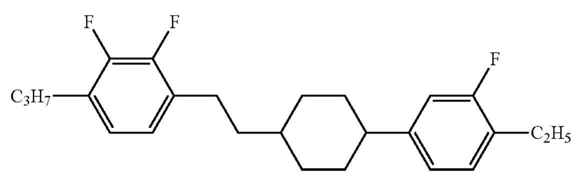 |
| 547 | 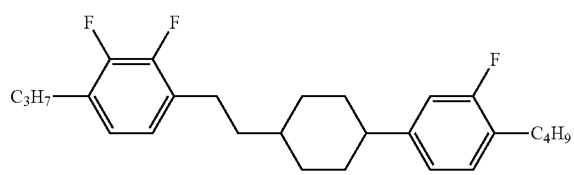 |
| 548 | 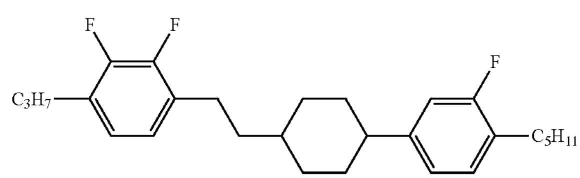 |
| 549 | 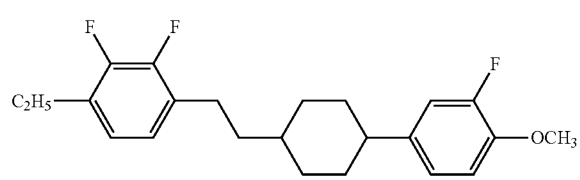 |
| 550 | 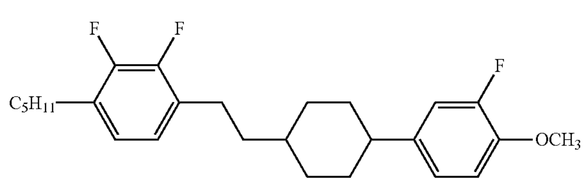 |

-continued
| No. | |
|---|---|
| 551 | 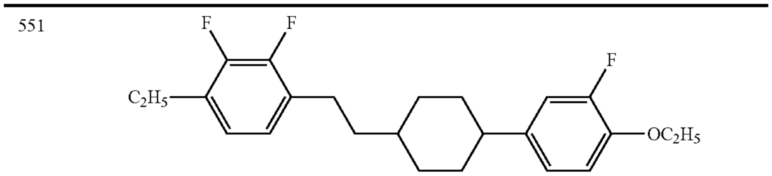 |
| 552 | 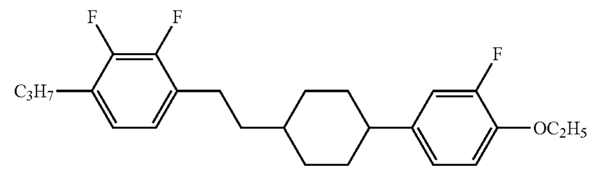 |
| 553 | 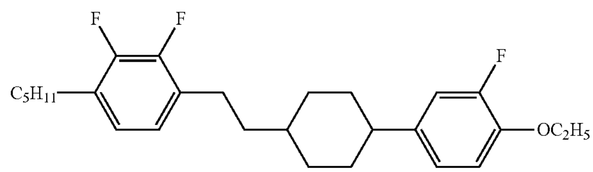 |
| 554 | 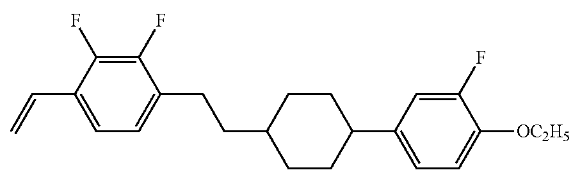 |
| 555 | 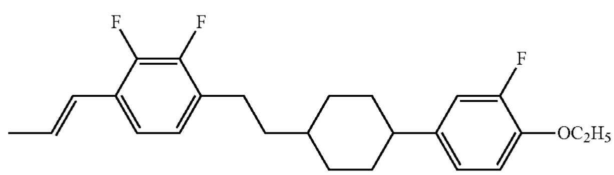 |
| 556 | 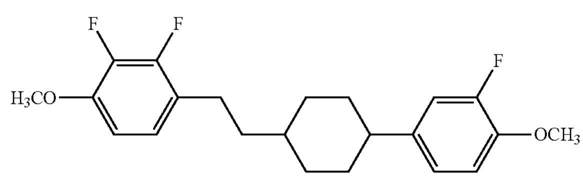 |
| 557 | 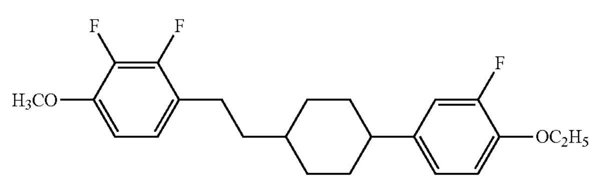 |
| 558 | 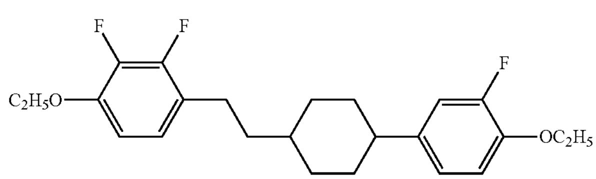 |
| 559 | 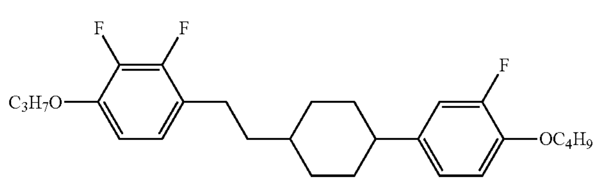 |

-continued
| No. | |
|---|---|
| 560 | 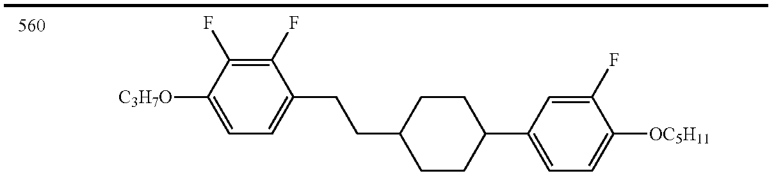 |
| 561 | 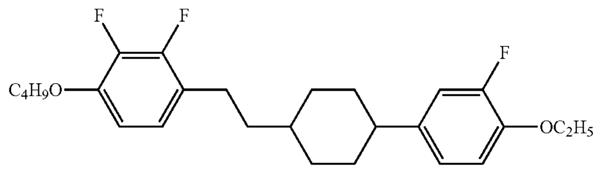 |
| 562 | 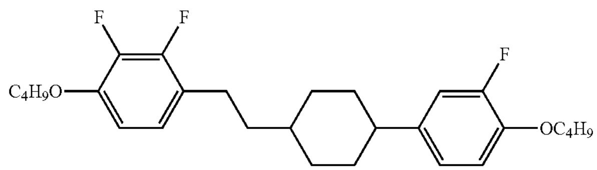 |
| 563 | 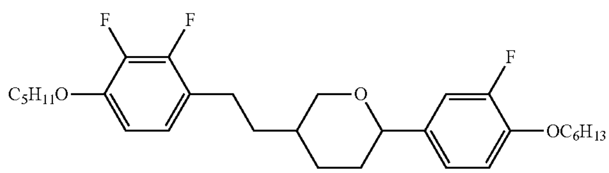 |
| 564 | 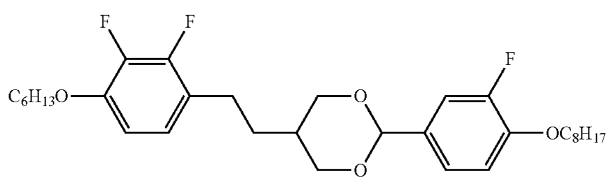 |
| 565 | 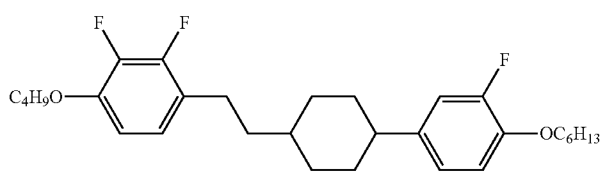 |
| 566 | 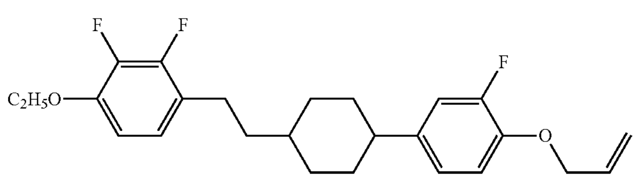 |
| 567 | 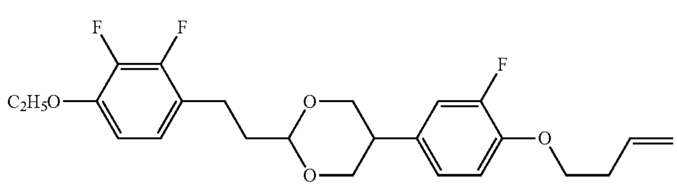 |
| 568 | 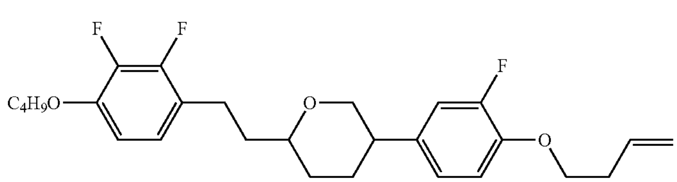 |

-continued
| No. | |
|---|---|
| 569 | 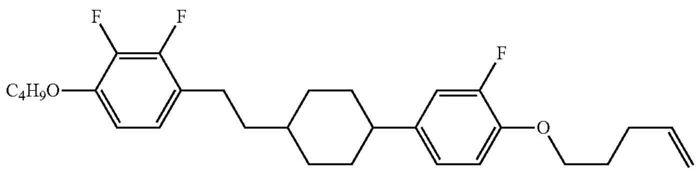 |
| 570 | 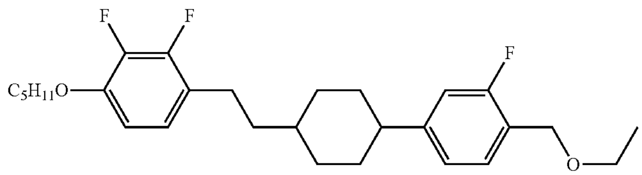 |
| 571 | 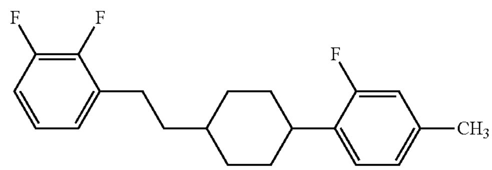 |
| 572 | 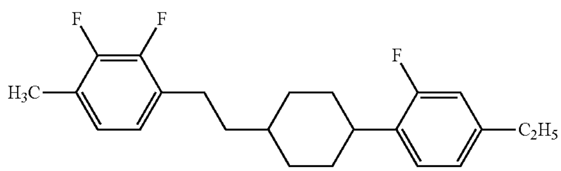 |
| 573 | 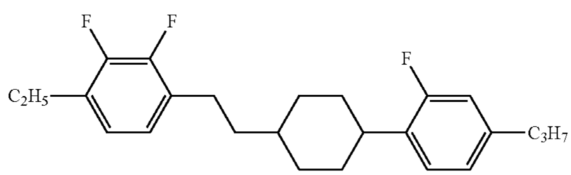 |
| 574 | 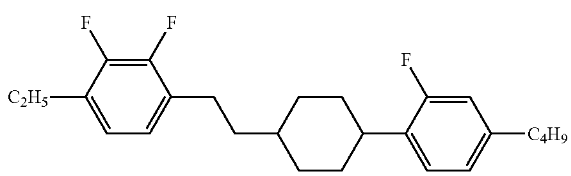 |
| 575 | 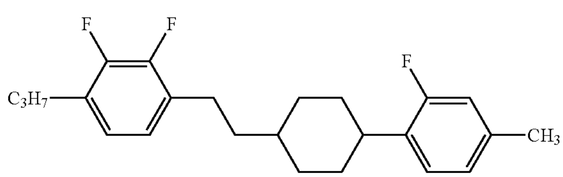 |
| 576 | 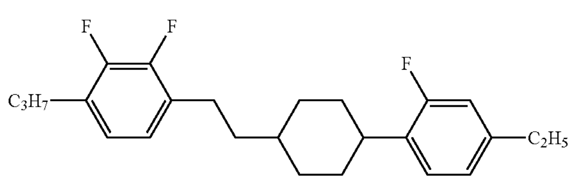 |
| 577 | 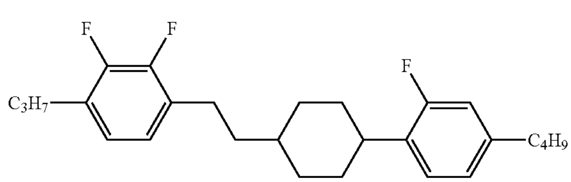 |

-continued
| No. | |
|---|---|
| 578 | 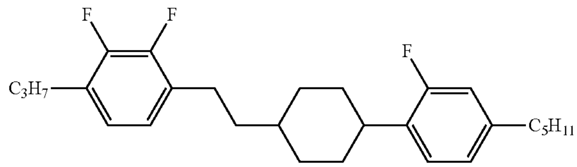 |
| 579 | 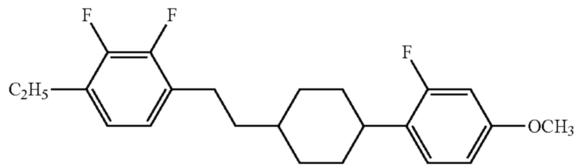 |
| 580 | 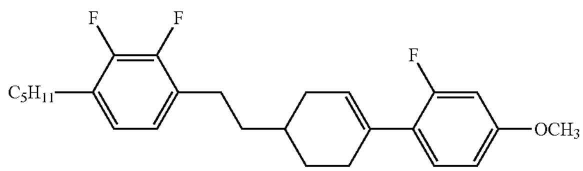 |
| 581 | 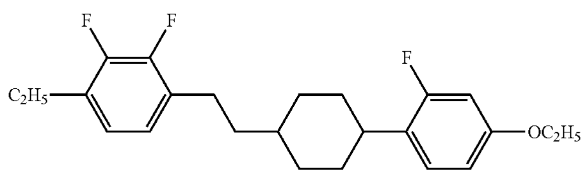 |
| 582 | 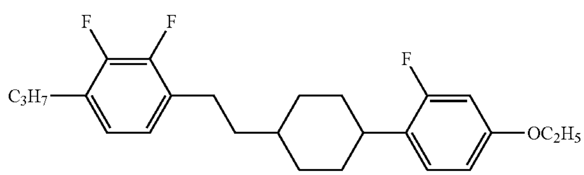 |
| 583 | 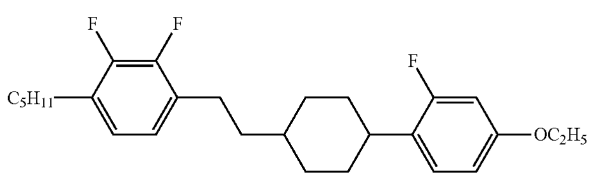 |
| 584 | 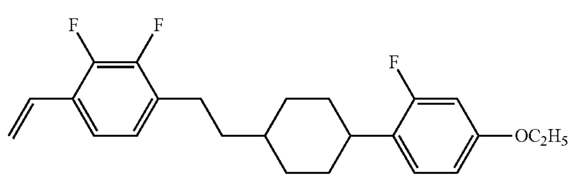 |
| 585 | 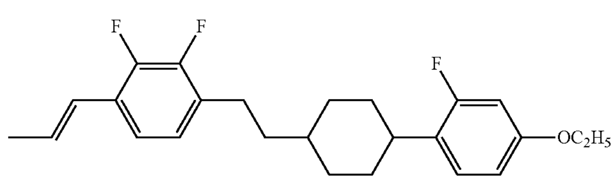 |
| 586 | 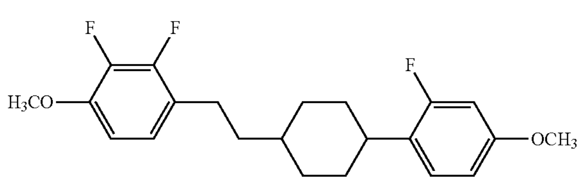 |

-continued
| No. | |
|---|---|
| 587 | 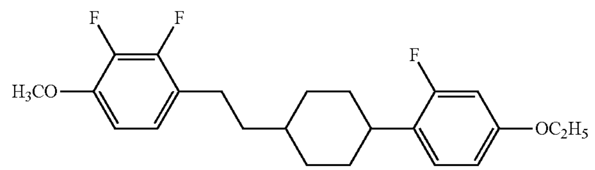 |
| 588 | 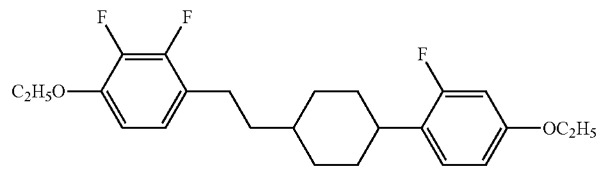 |
| 589 | 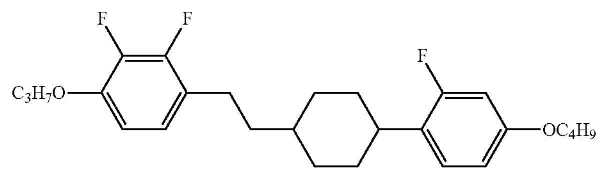 |
| 590 | 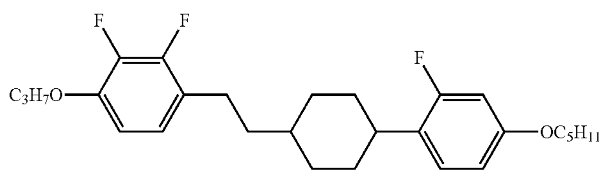 |
| 591 | 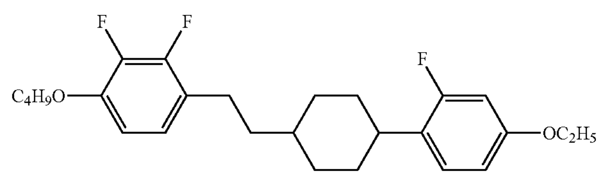 |
| 592 | 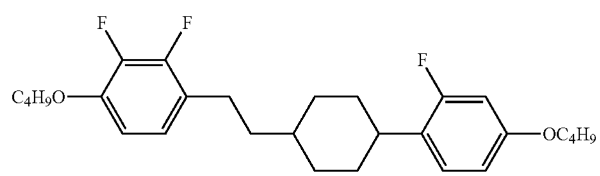 |
| 593 | 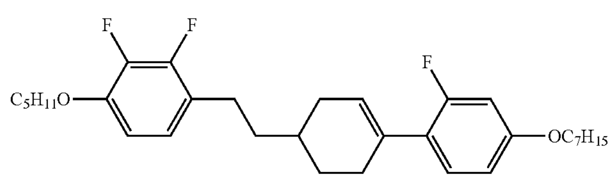 |
| 594 | 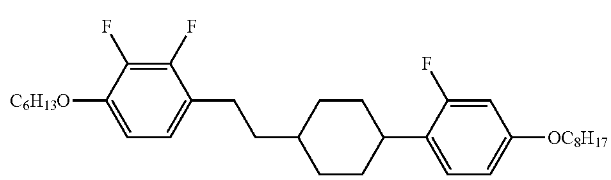 |
| 595 | 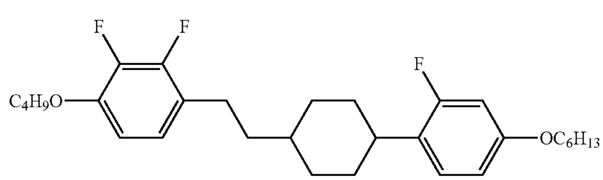 |

-continued
| No. | |
|---|---|
| 596 | 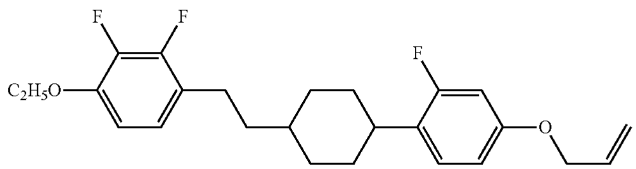 |
| 597 | 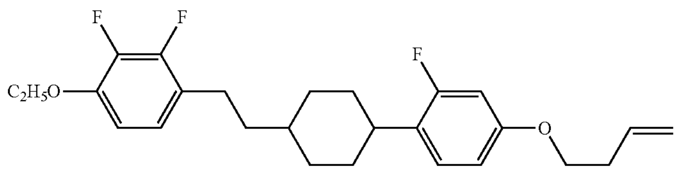 |
| 598 | 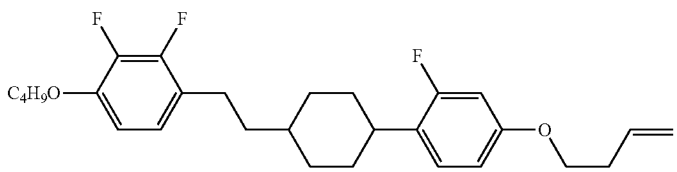 |
| 599 | 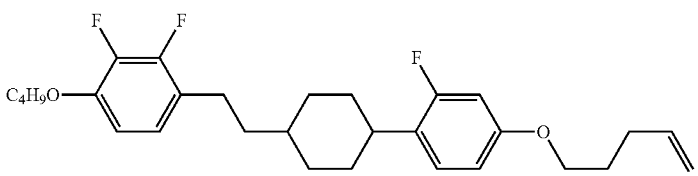 |
| 600 | 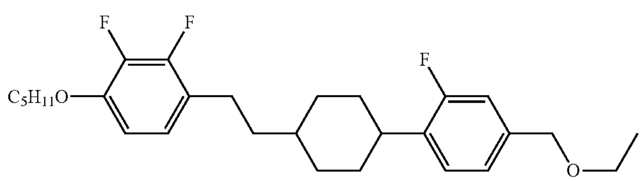 |
| 601 | 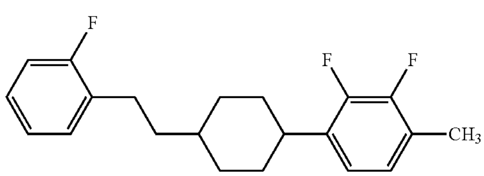 |
| 602 | 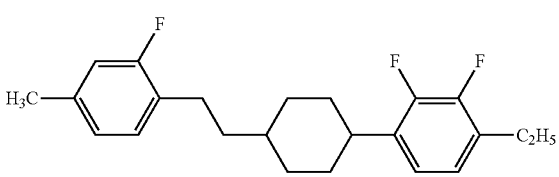 |
| 603 | 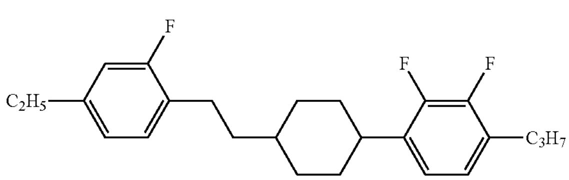 |
| 604 | 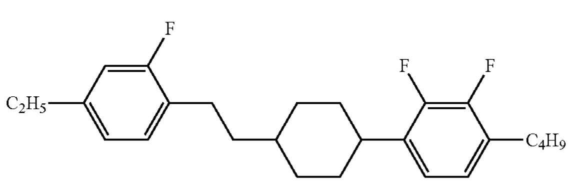 |

-continued
| No. | |
|---|---|
| 605 | 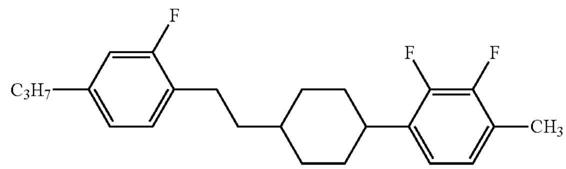 |
| 606 | 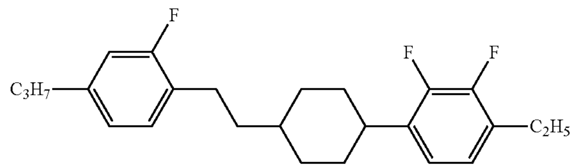 |
| 607 | 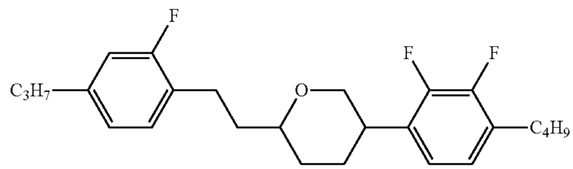 |
| 608 | 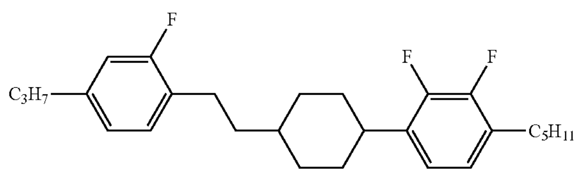 |
| 609 | 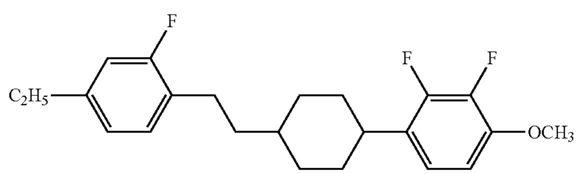 |
| 610 | 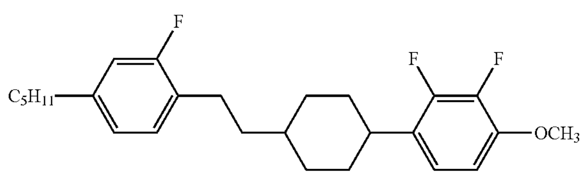 |
| 611 | 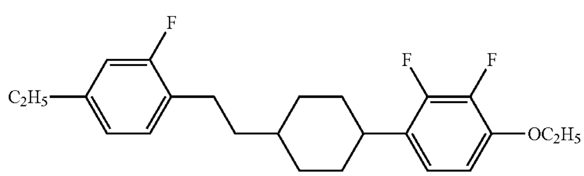 |
| 612 | 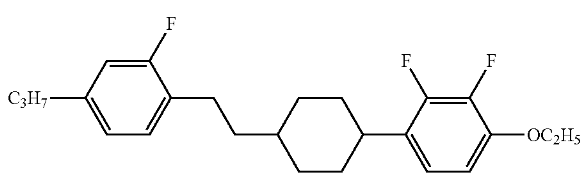 |
| 613 | 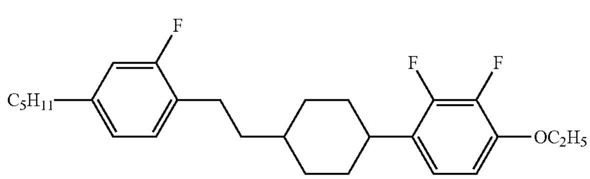 |

-continued
| No. | |
|---|---|
| 614 | 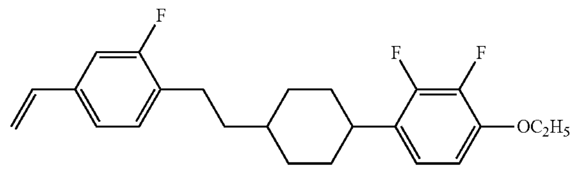 |
| 615 | 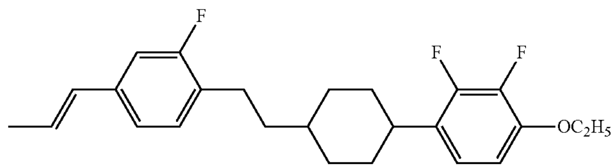 |
| 616 | 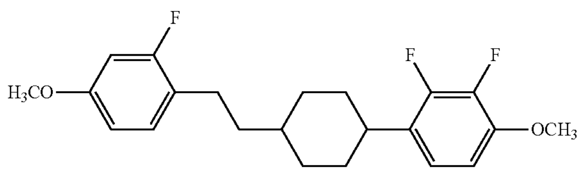 |
| 617 | 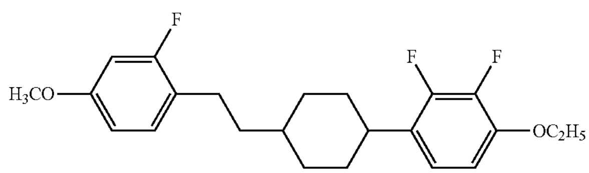 |
| 618 | 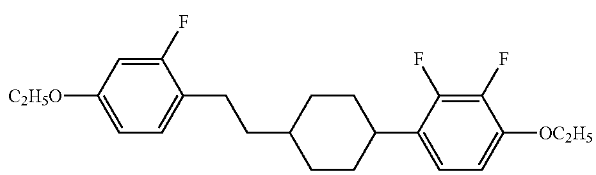 |
| 619 | 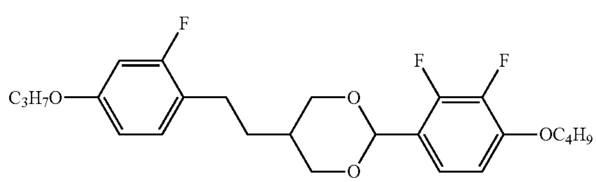 |
| 620 | 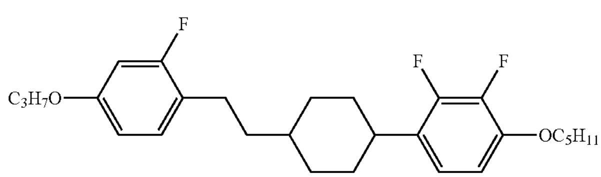 |
| 621 | 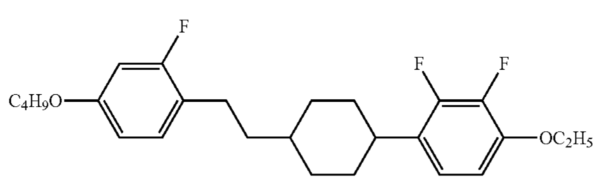 |
| 622 | 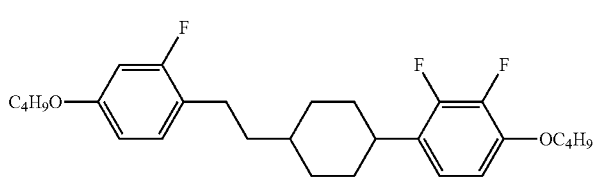 |

-continued
| No. |
| --- |
| 623 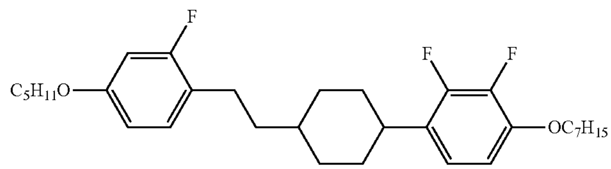 |
| 624 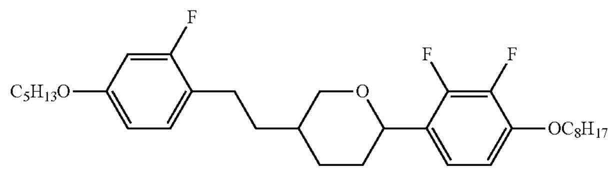 |
| 625 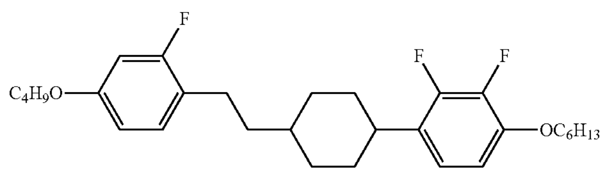 |
| 626 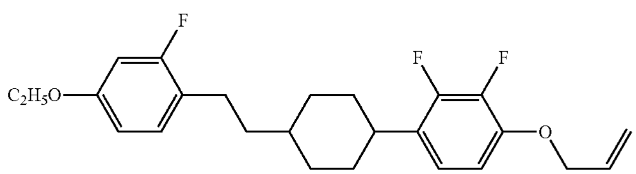 |
| 627 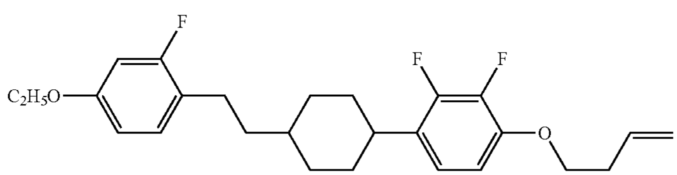 |
| 628 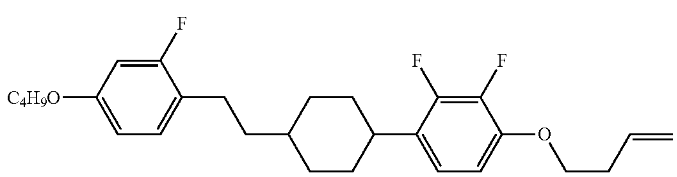 |
| 629 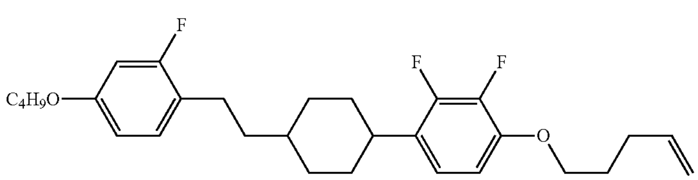 |
| 630 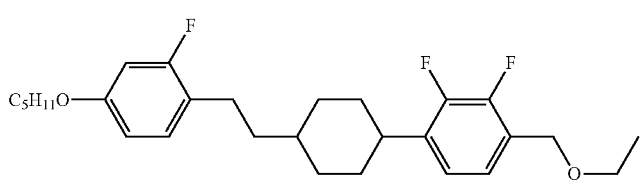 |
| 631 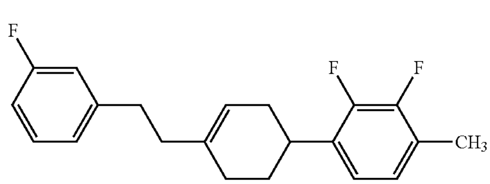 |

-continued
| No. |  |
|---|---|
| 632 | 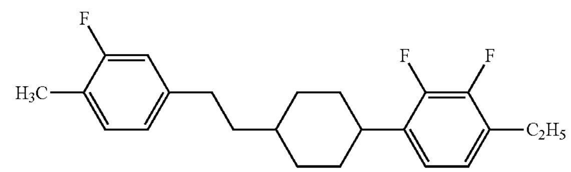 |
| 633 | 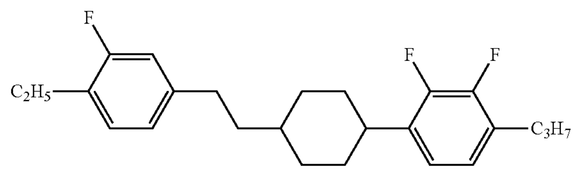 |
| 634 | 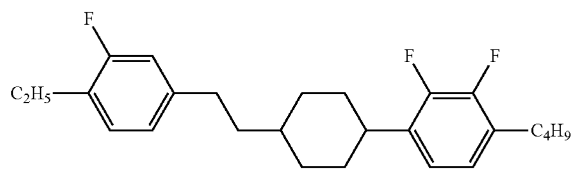 |
| 635 | 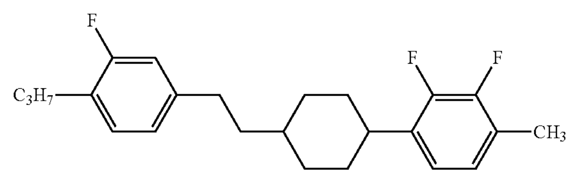 |
| 636 | 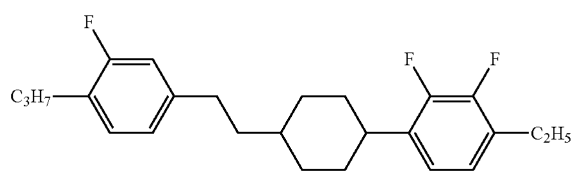 |
| 637 | 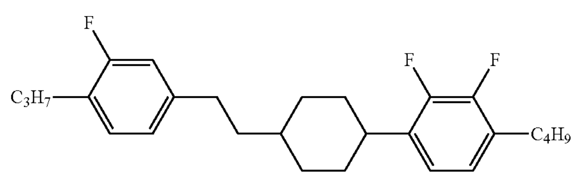 |
| 638 | 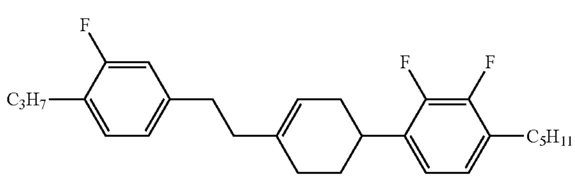 |
| 639 | 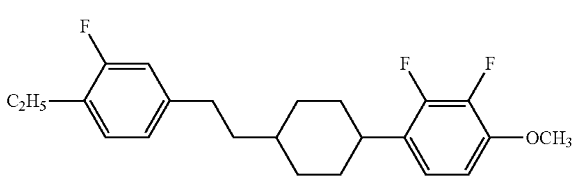 |
| 640 | 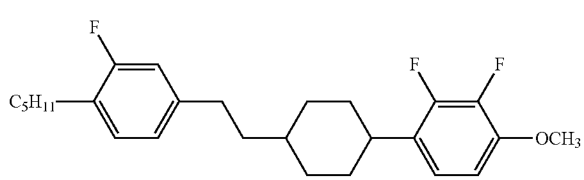 |

-continued
| No. | |
|---|---|
| 641 | 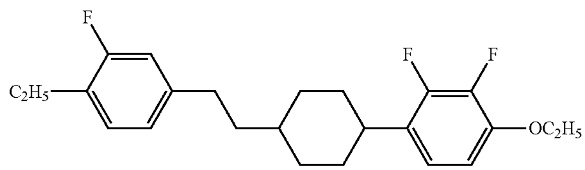 |
| 642 | 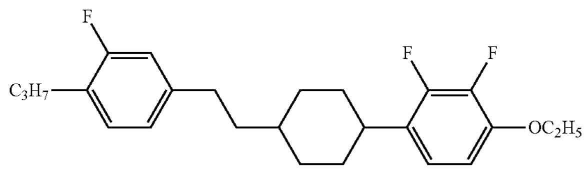 |
| 643 | 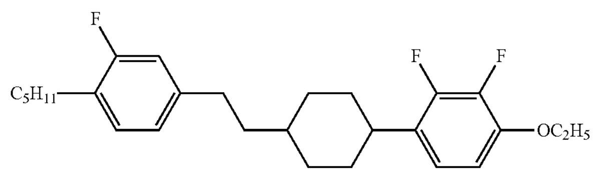 |
| 644 | 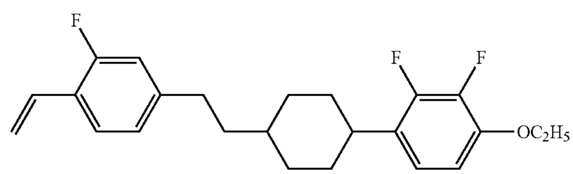 |
| 645 | 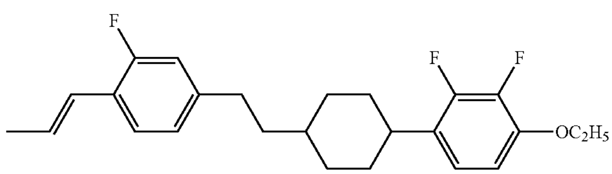 |
| 646 | 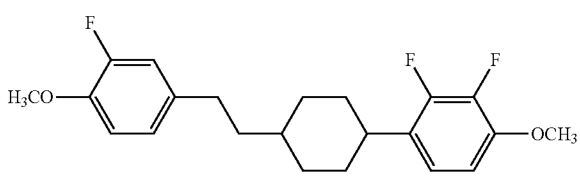 |
| 647 | 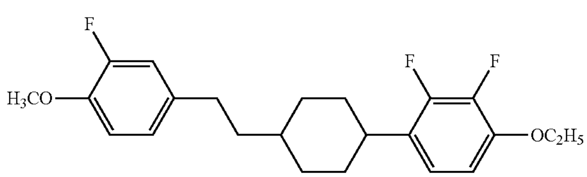 |
| 648 | 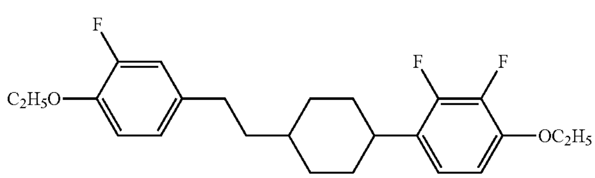 |
| 649 | 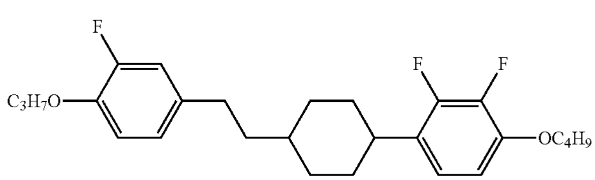 |

-continued
| No. |
| --- |
650
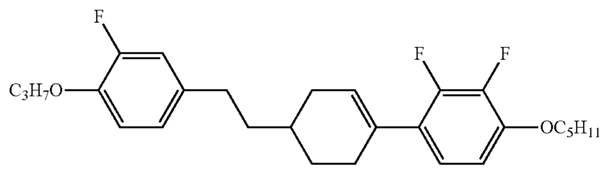
651
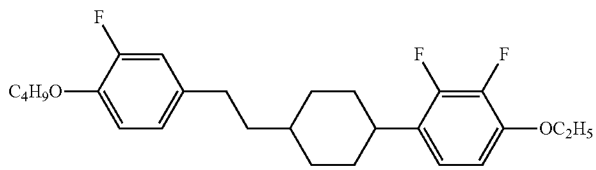
652
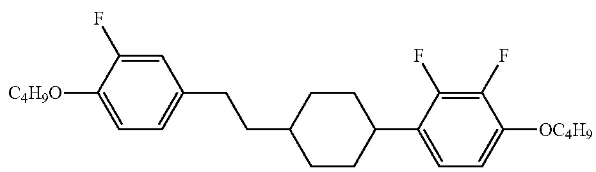
653
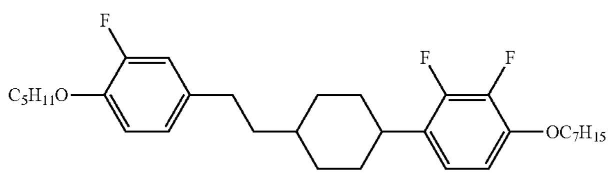
654
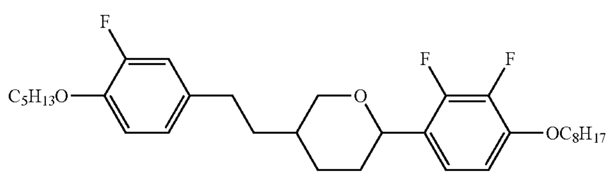
655
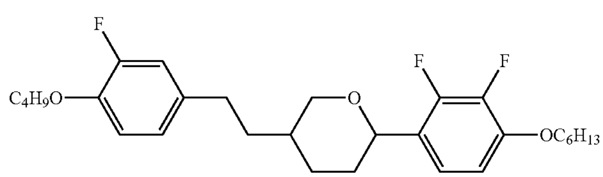
656
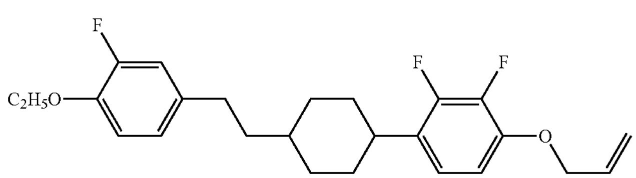
657
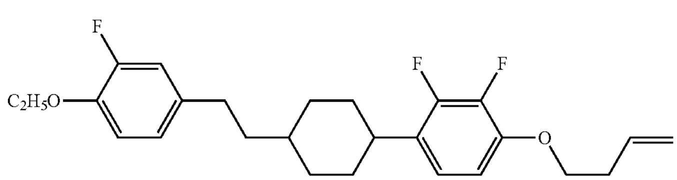
658
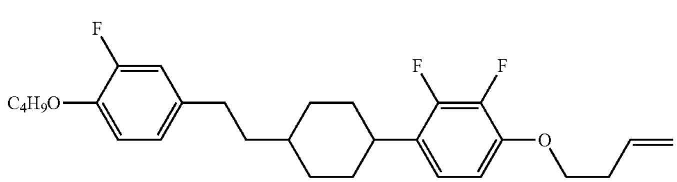

-continued
No.
659
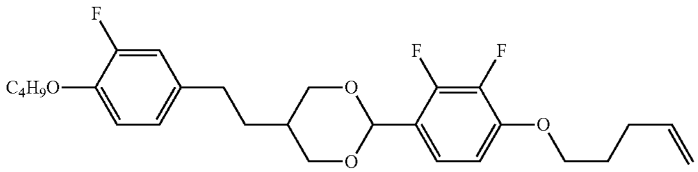
660
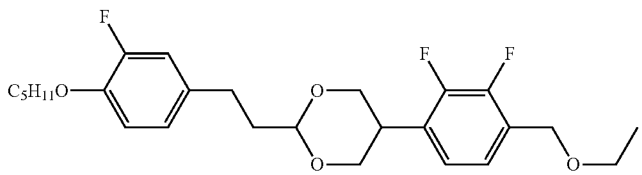
661
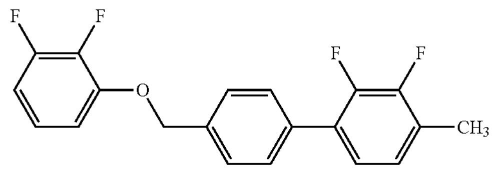
662
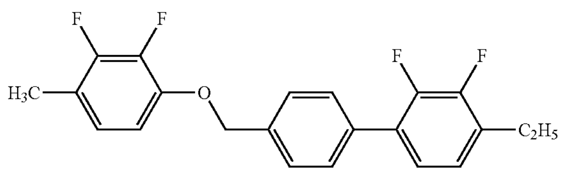
663
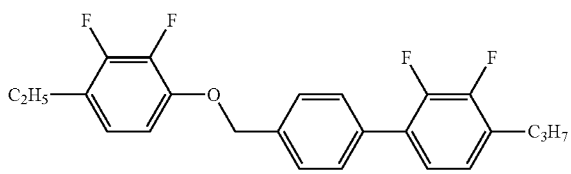
664
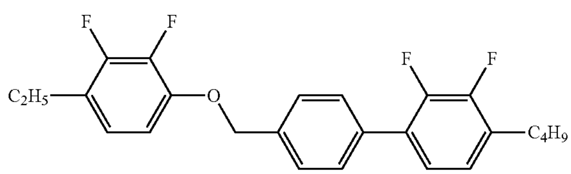
665
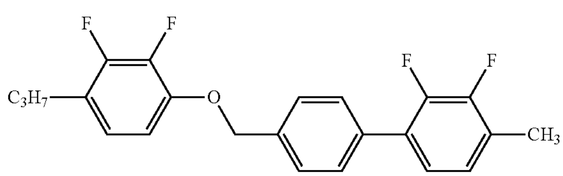
666
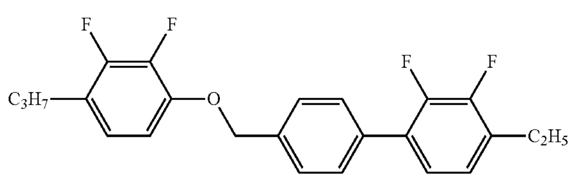
667
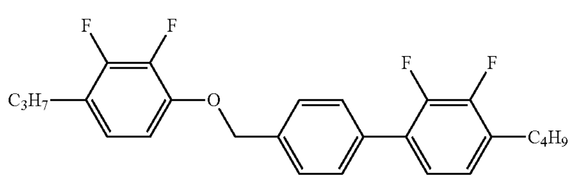

-continued
| No. | |
|---|---|
| 668 | 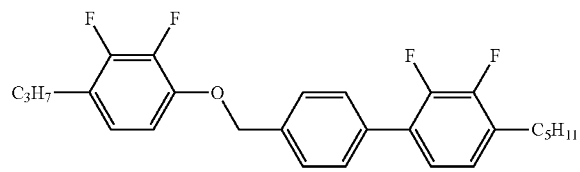 |
| 669 | 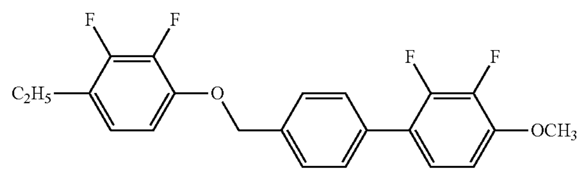 |
| 670 | 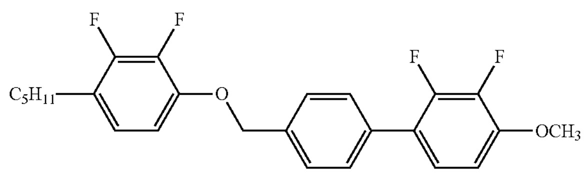 |
| 671 | 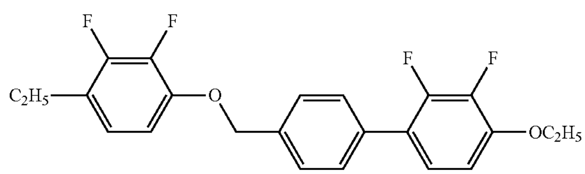 |
| 672 | 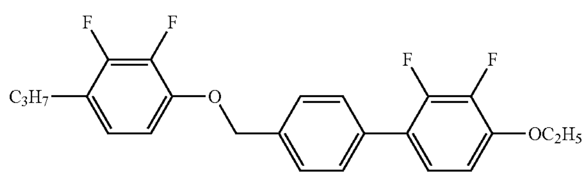 |
| 673 | 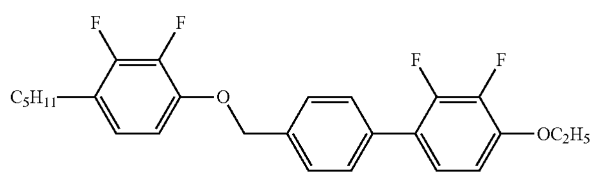 |
| 674 | 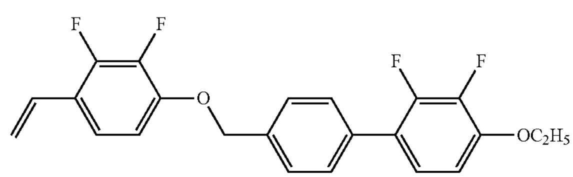 |
| 675 | 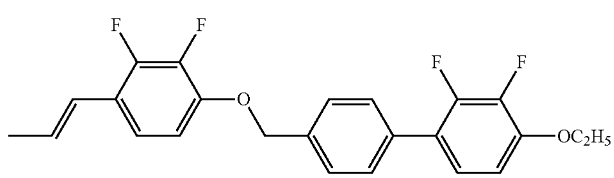 |
| 676 | 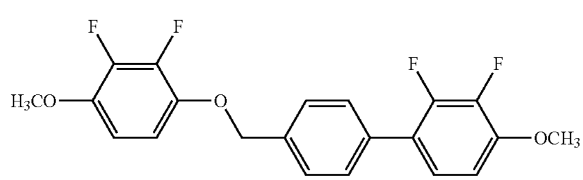 |

-continued
| No. |
|---|
677
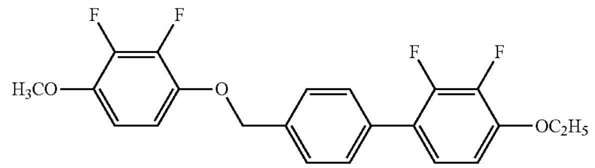
678
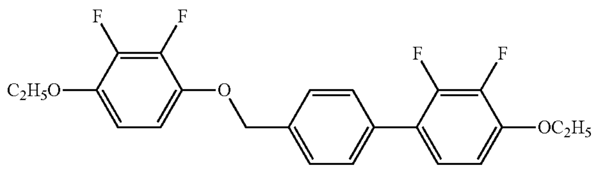
C 123.7 (N 113.4) I
$T_{NI}$; 106.6° C., $\Delta\epsilon$; −10.90, $\Delta n$; 0.187
679
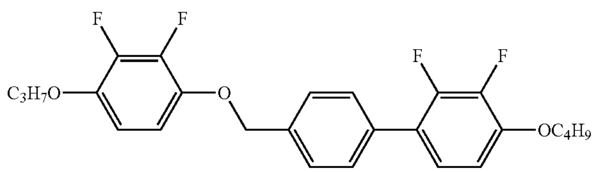
680
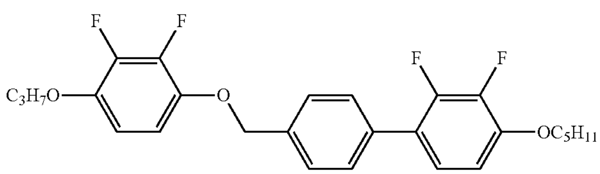
681
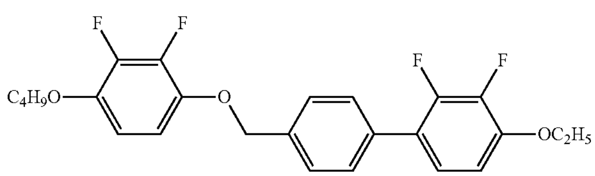
C 115.7 (N 106.7) I
$T_{NI}$; 104.6° C., $\Delta\epsilon$; −9.24, $\Delta n$; 0.207
682
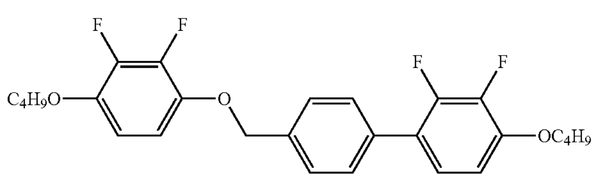
683
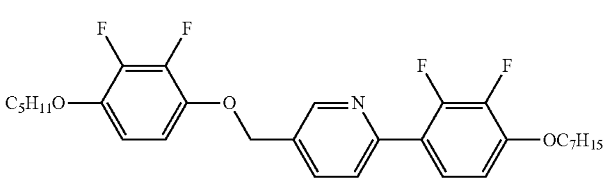
684
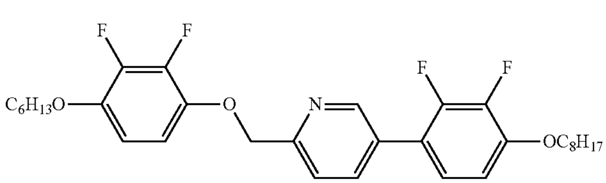

-continued
| No. | |
|---|---|
| 685 | 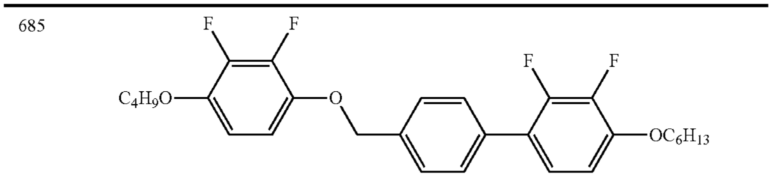 |
| 686 | 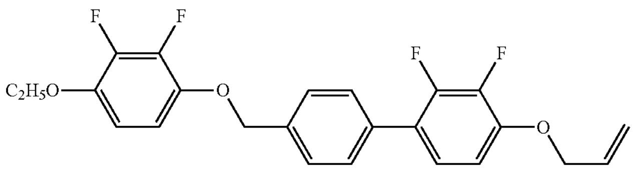 |
| 687 | 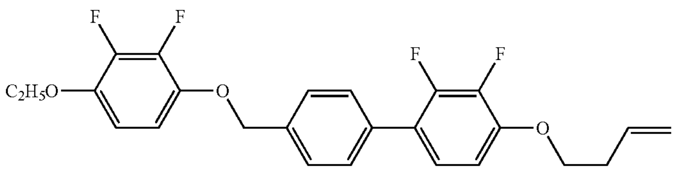 |
| 688 | 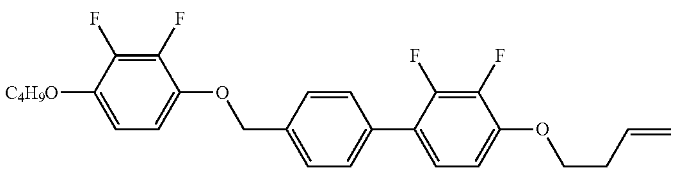 |
| 689 | 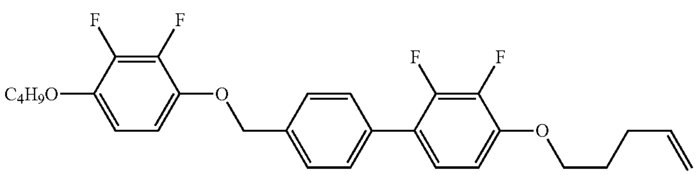 |
| 690 | 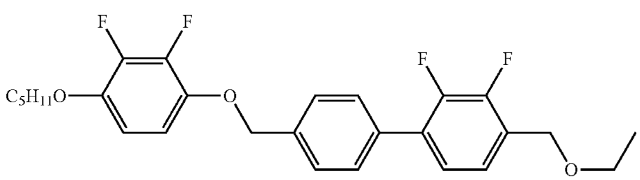 |
| 691 | 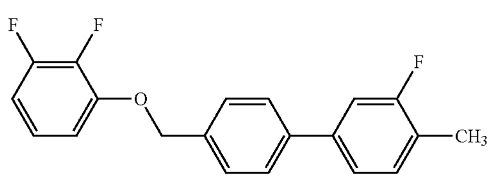 |
| 692 | 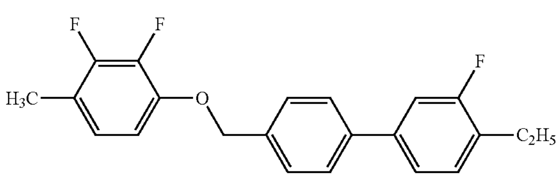 |
| 693 | 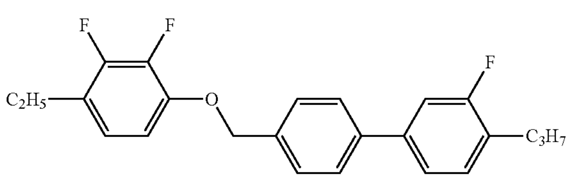 |

-continued
| No. | |
|---|---|
| 694 | 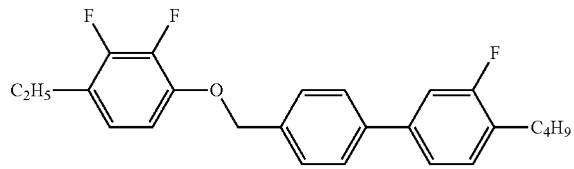 |
| 695 | 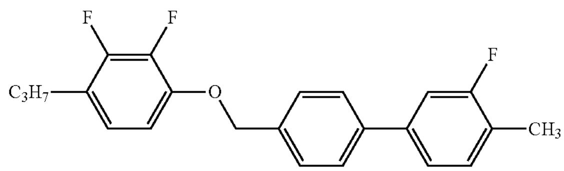 |
| 696 | 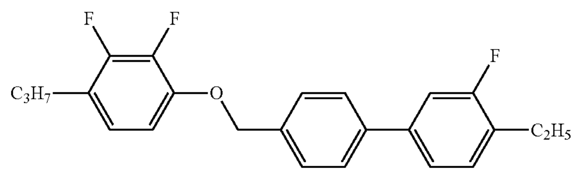 |
| 697 | 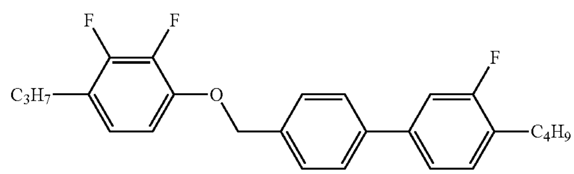 |
| 698 | 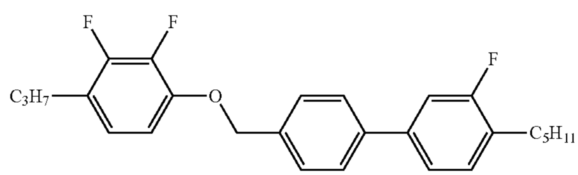 |
| 699 | 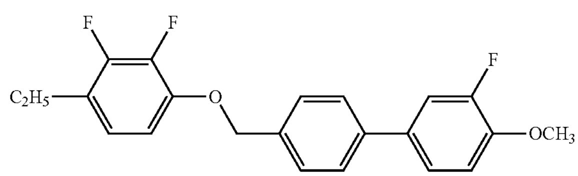 |
| 700 | 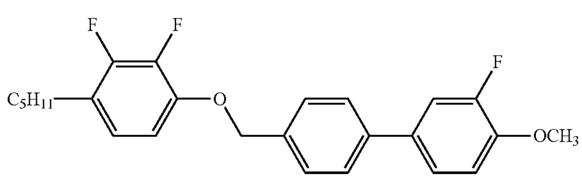 |
| 701 | 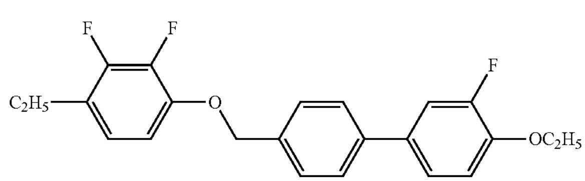 |
| 702 | 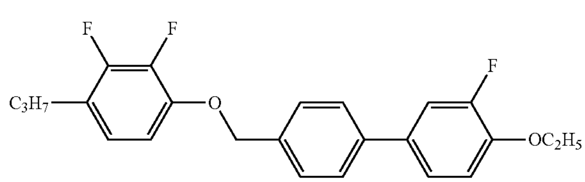 |

-continued
| No. | |
|---|---|
| 703 | 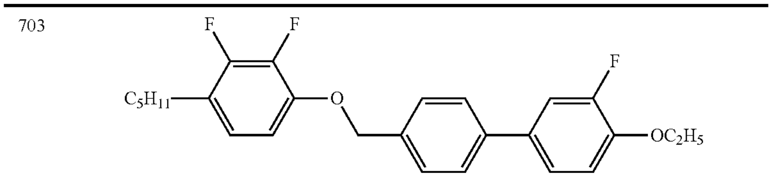 |
| 704 | 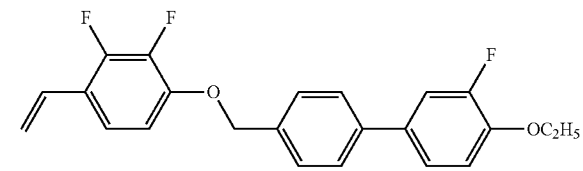 |
| 705 | 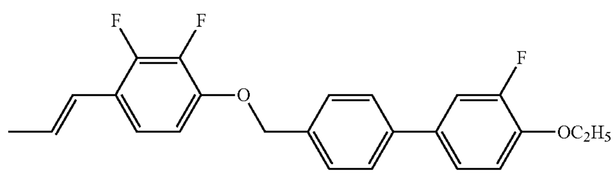 |
| 706 | 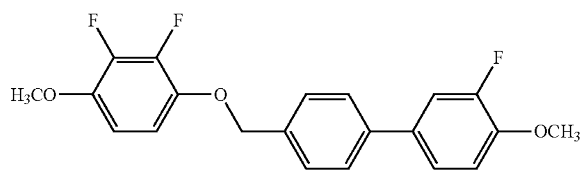 |
| 707 | 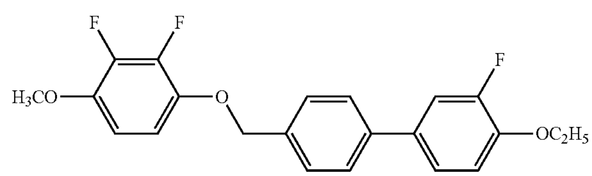 |
| 708 | 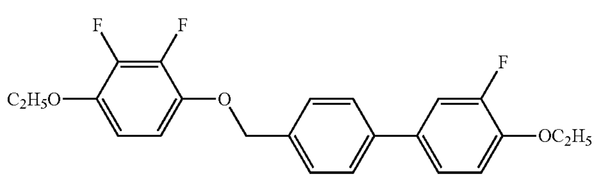 |
| 709 | 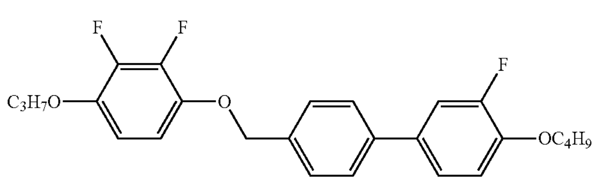 |
| 710 | 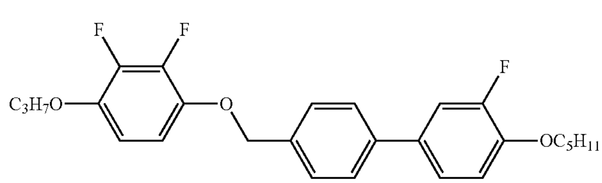 |
| 711 | 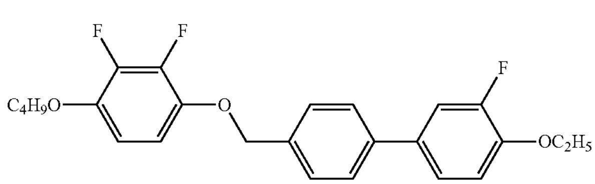 |

-continued
| No. | |
|---|---|
| 712 | 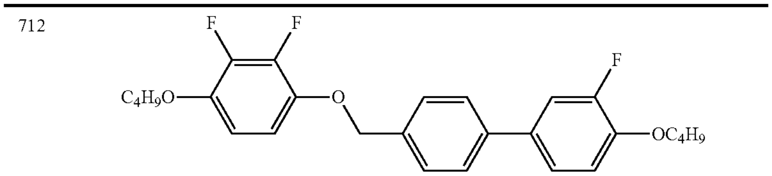 |
| 713 | 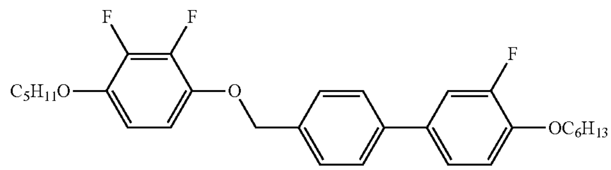 |
| 714 | 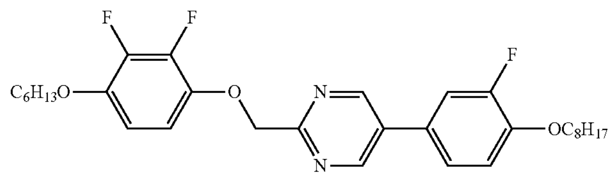 |
| 715 | 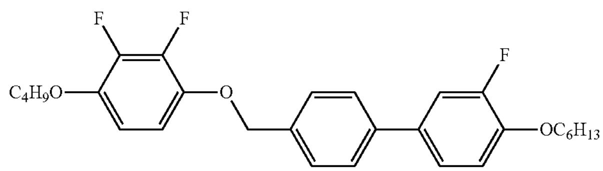 |
| 716 | 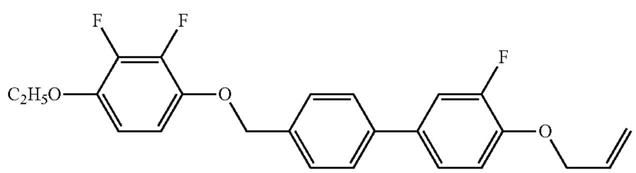 |
| 717 | 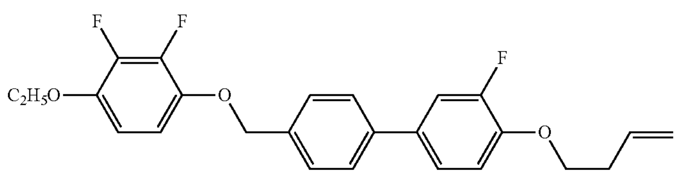 |
| 718 | 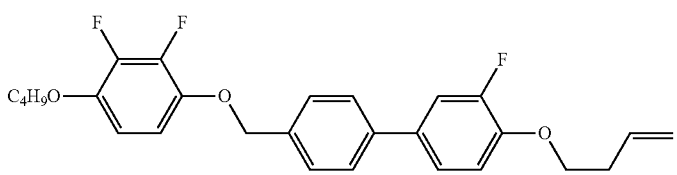 |
| 719 | 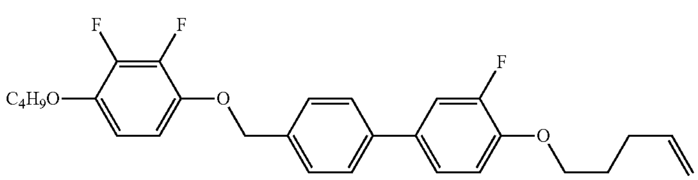 |
| 720 | 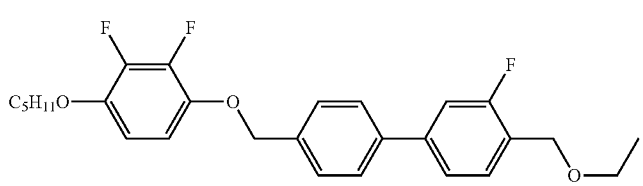 |

-continued
| No. | |
|---|---|
| 721 | 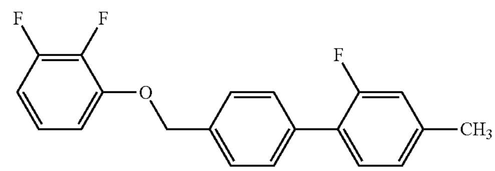 |
| 722 | 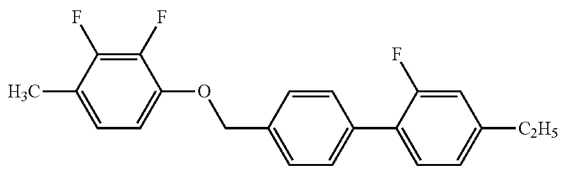 |
| 723 | 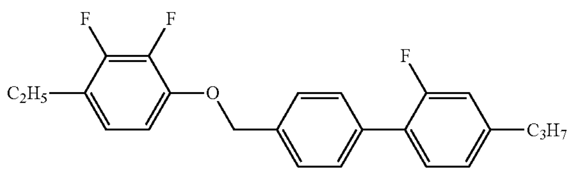 |
| 724 | 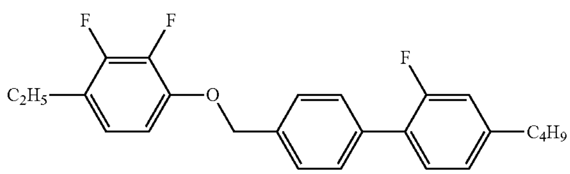 |
| 725 | 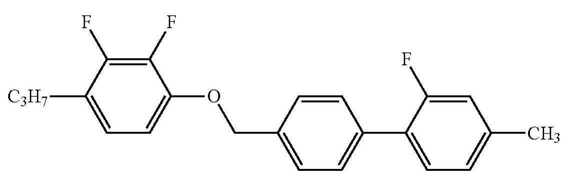 |
| 726 | 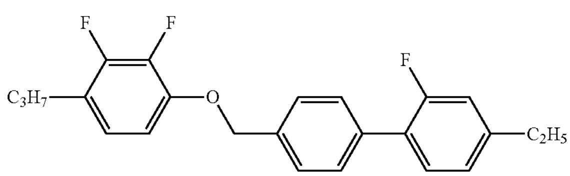 |
| 727 | 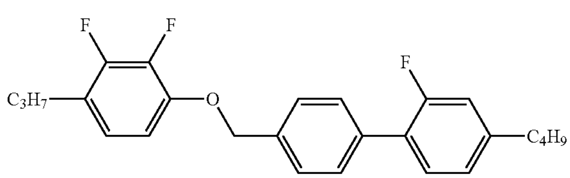 |
| 728 | 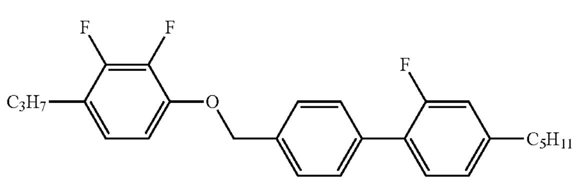 |
| 729 | 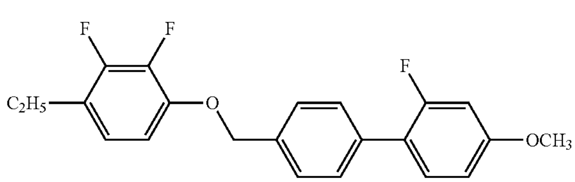 |

-continued
| No. | |
|---|---|
| 730 | 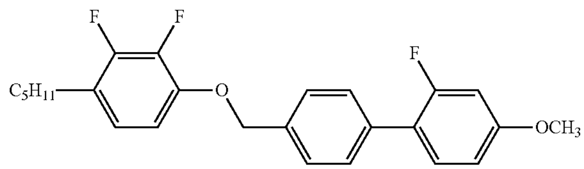 |
| 731 | 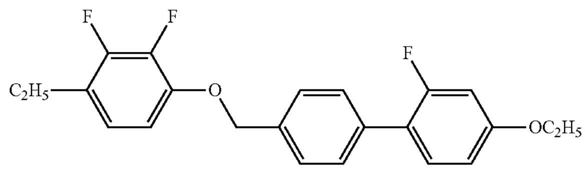 |
| 732 | 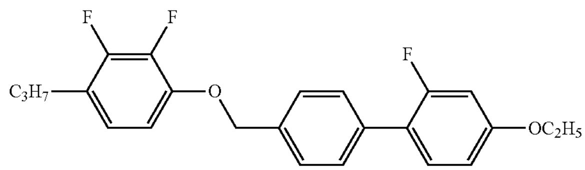 |
| 733 | 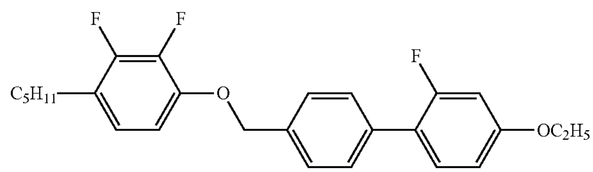 |
| 734 | 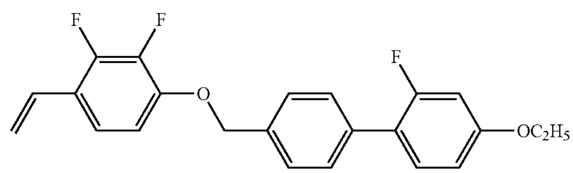 |
| 735 | 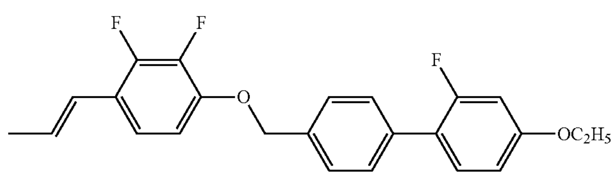 |
| 736 | 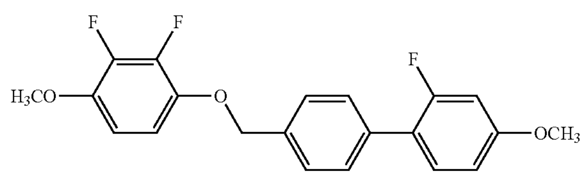 |
| 737 | 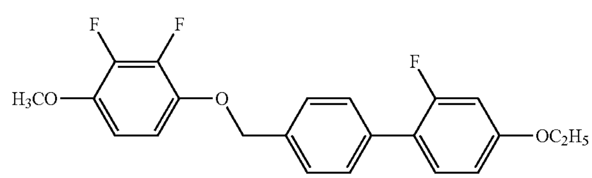 |
| 738 | 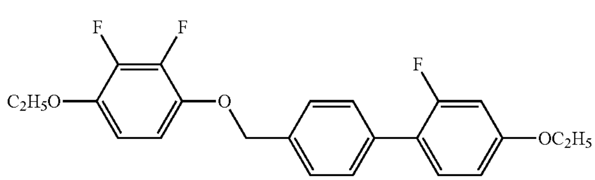 |

-continued
| No. | |
|---|---|
| 739 | 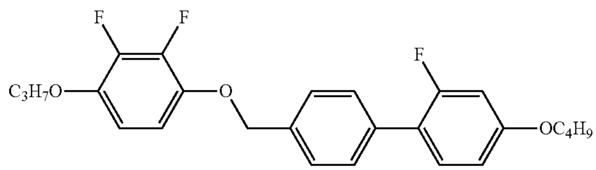 |
| 740 | 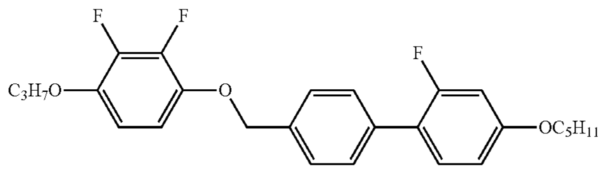 |
| 741 | 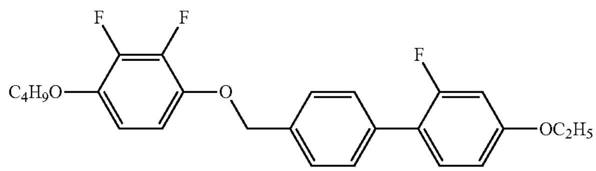 |
| 742 | 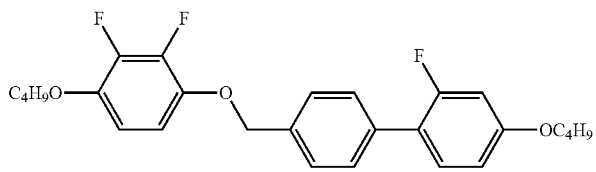 |
| 743 | 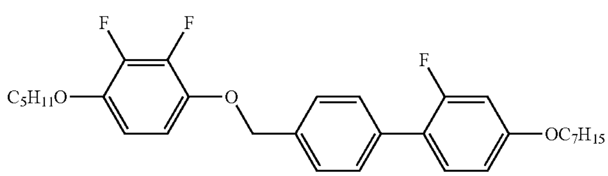 |
| 744 | 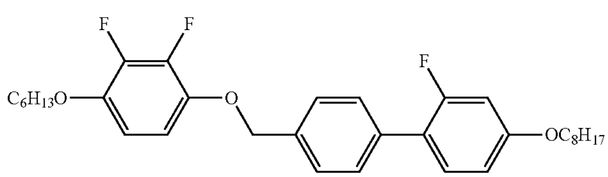 |
| 745 | 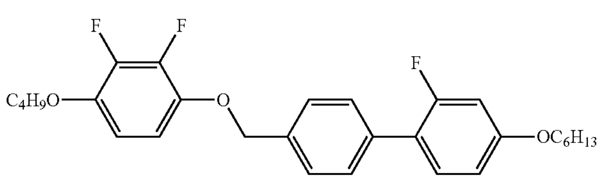 |
| 746 | 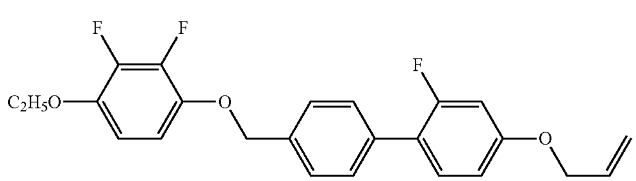 |
| 747 | 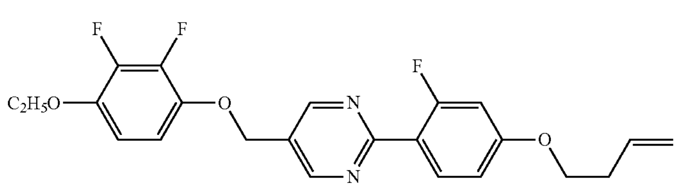 |

-continued
| No. |
|---|
| 748 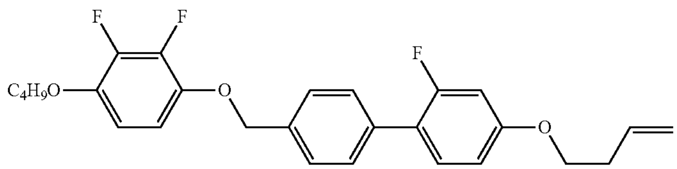 |
| 749 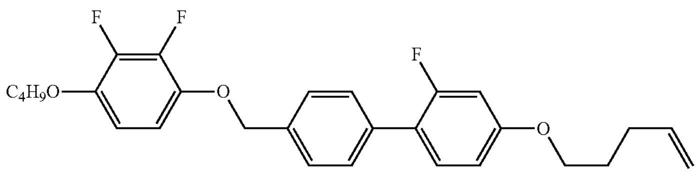 |
| 750 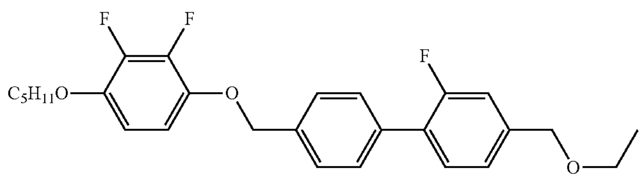 |
| 751 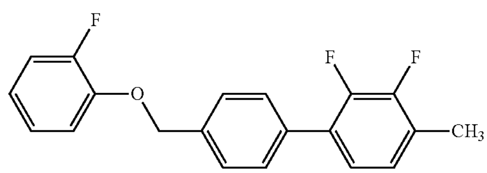 |
| 752 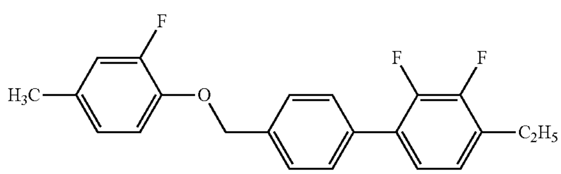 |
| 753 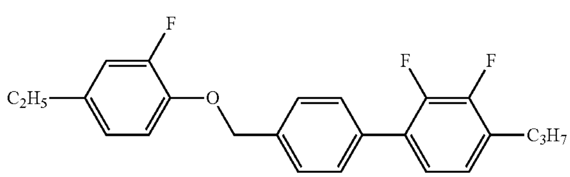 |
| 754 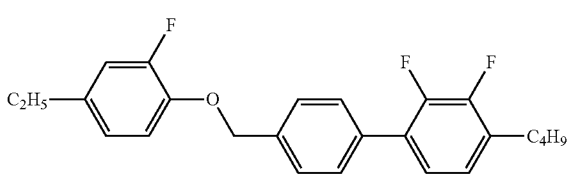 |
| 755 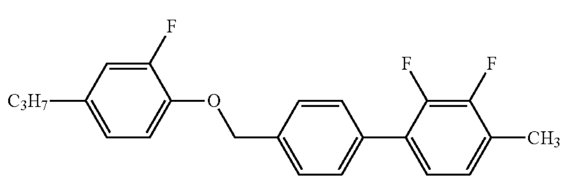 |
| 756 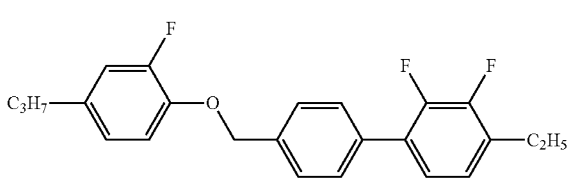 |

-continued
| No. | |
|---|---|
| 757 | 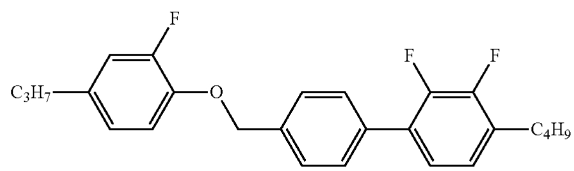 |
| 758 | 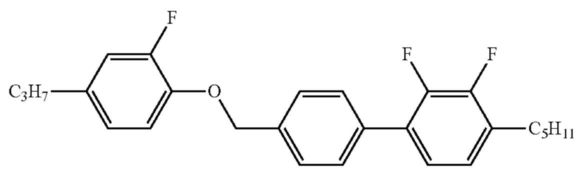 |
| 759 | 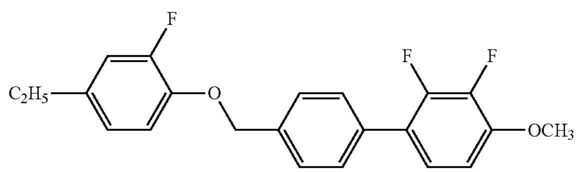 |
| 760 | 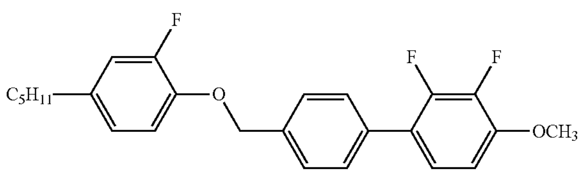 |
| 761 | 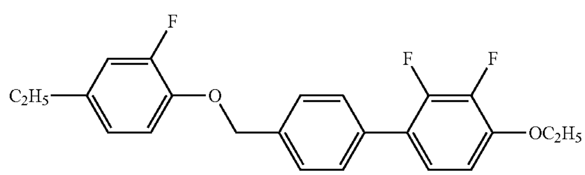 |
| 762 | 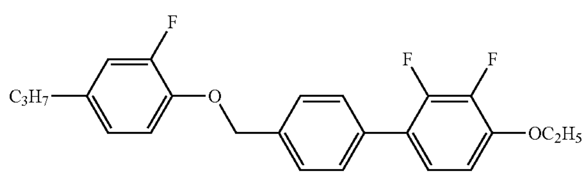 |
| 763 | 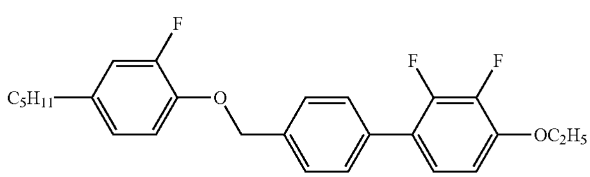 |
| 764 | 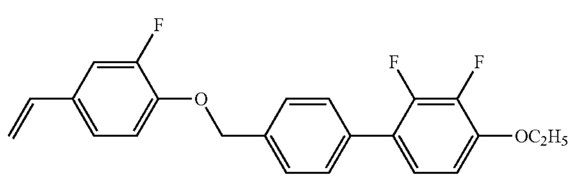 |
| 765 | 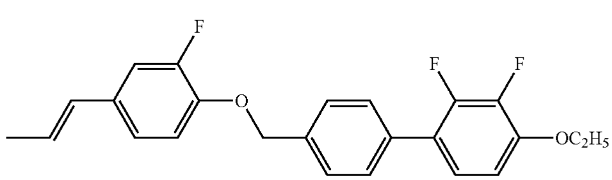 |

-continued
| No. |
| --- |
766
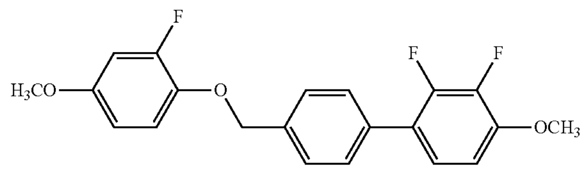
767
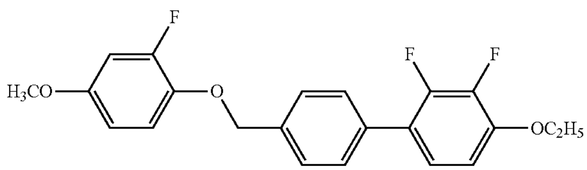
768
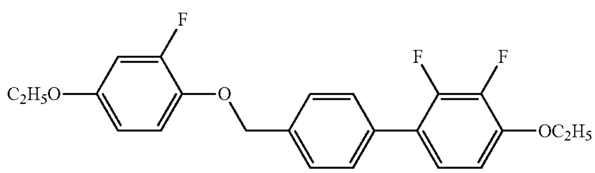
769
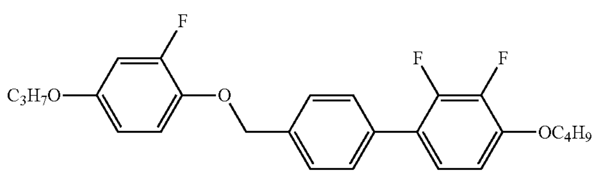
770
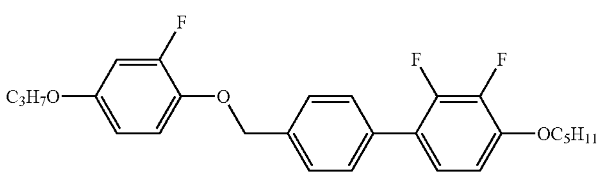
771
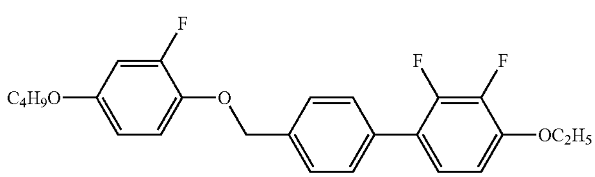
772
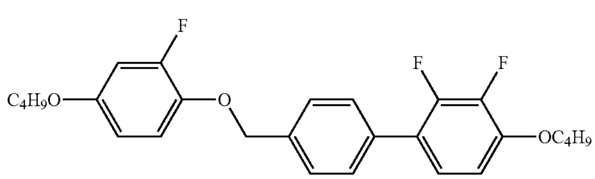
773
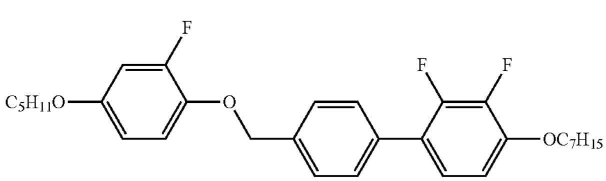
774
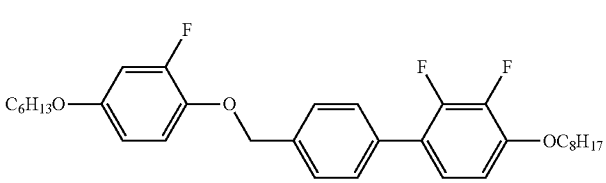

-continued
| No. | |
|---|---|
| 775 | 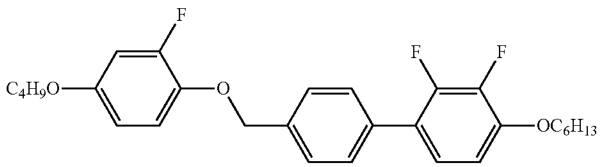 |
| 776 | 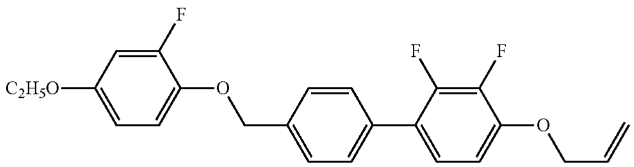 |
| 777 | 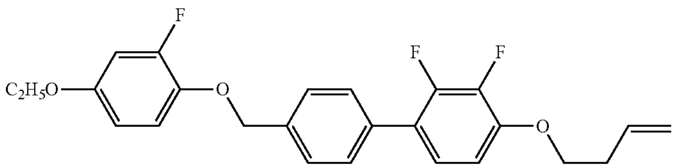 |
| 778 | 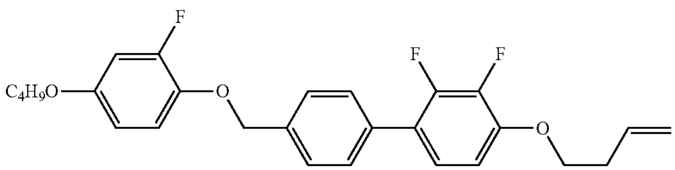 |
| 779 | 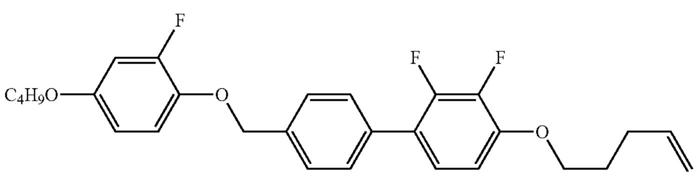 |
| 780 | 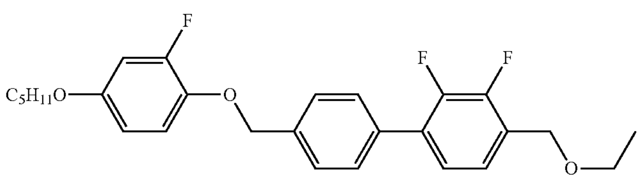 |
| 781 | 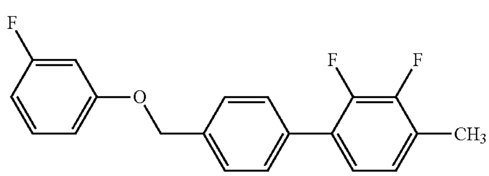 |
| 782 | 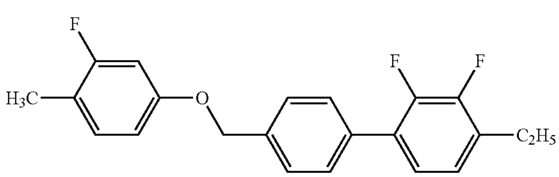 |
| 783 | 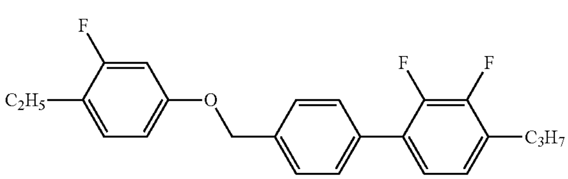 |

-continued
No.
784
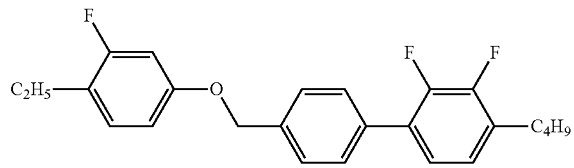
785
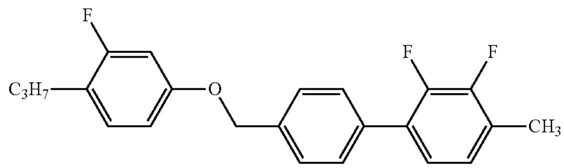
786
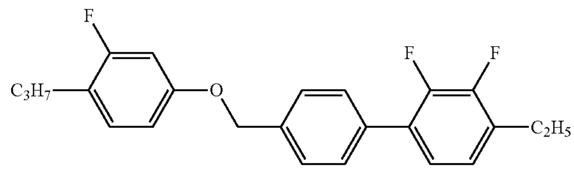
787
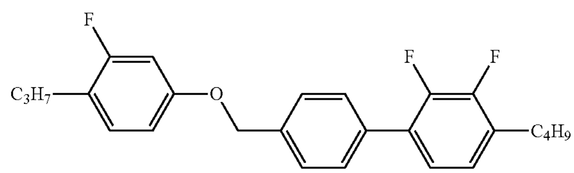
788
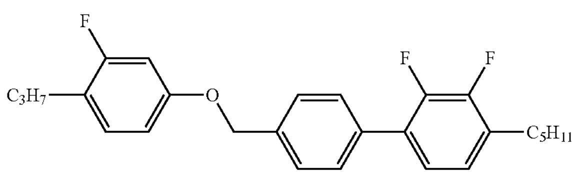
789
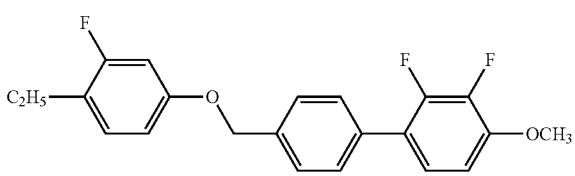
790
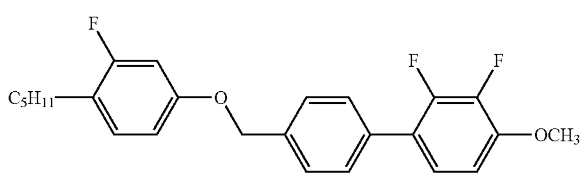
791
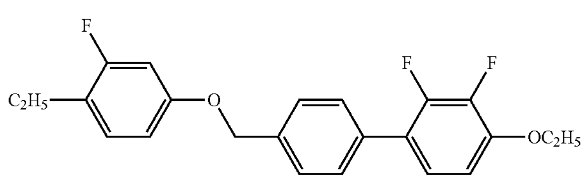
792
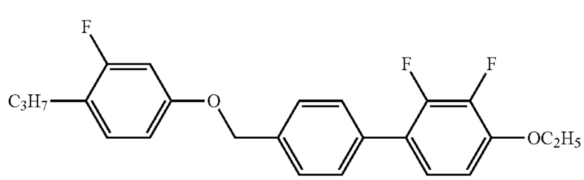

-continued
No.
793
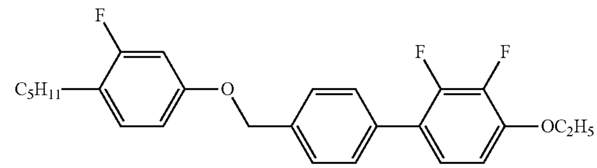
794
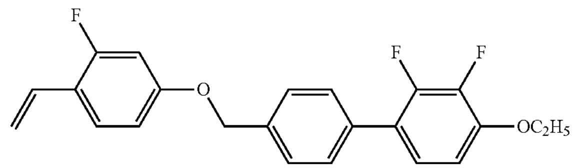
795
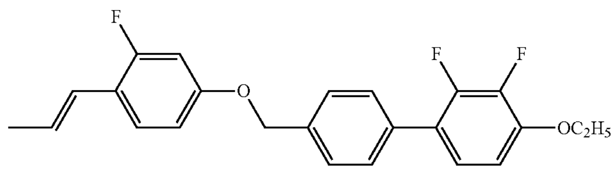
796
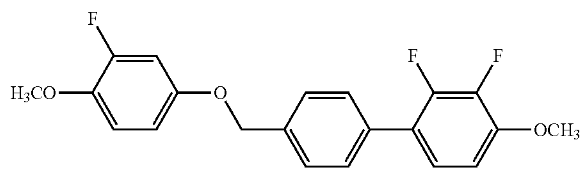
797
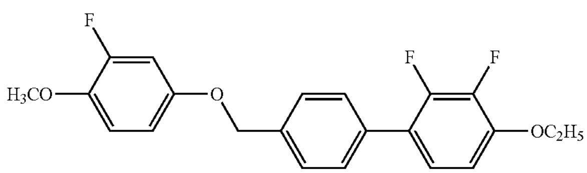
798
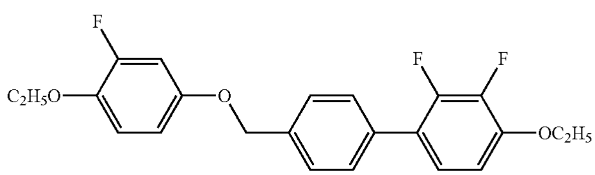
799
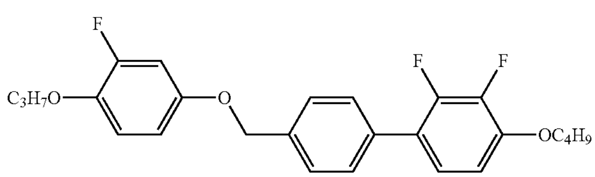
800
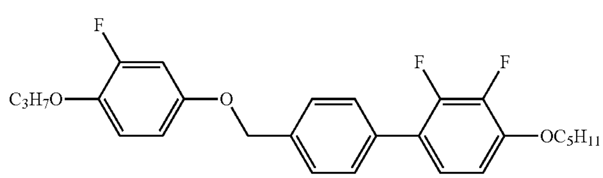
801
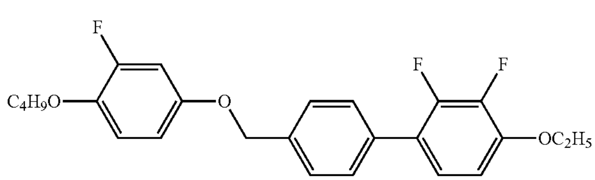

-continued
| No. |
|---|
| 802 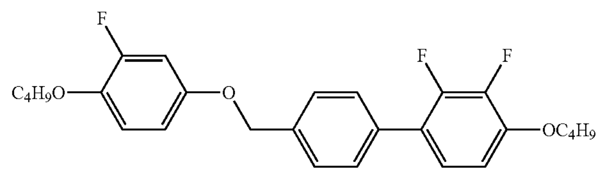 |
| 803 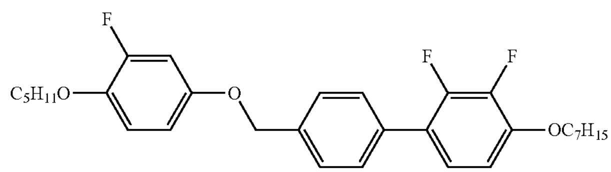 |
| 804 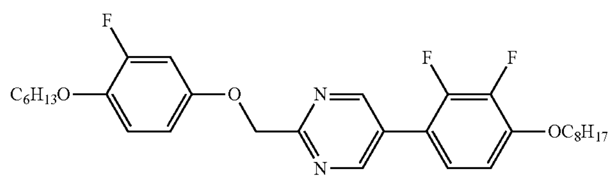 |
| 805 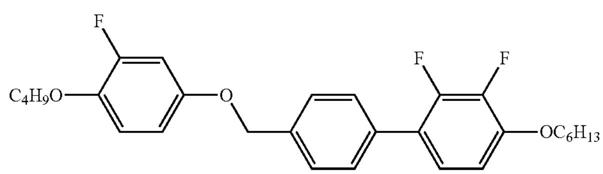 |
| 806 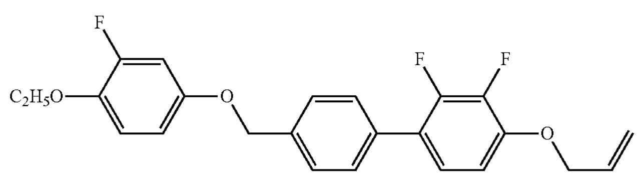 |
| 807 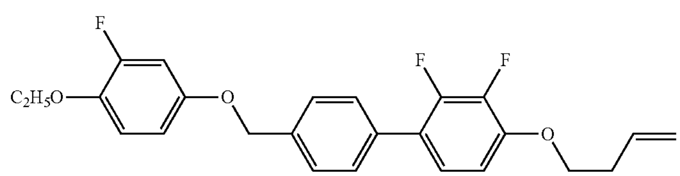 |
| 808 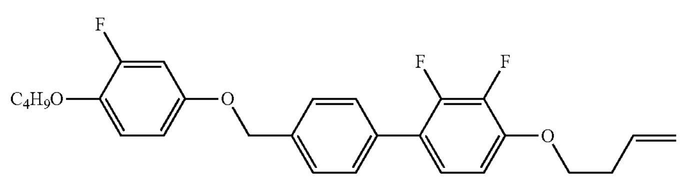 |
| 809 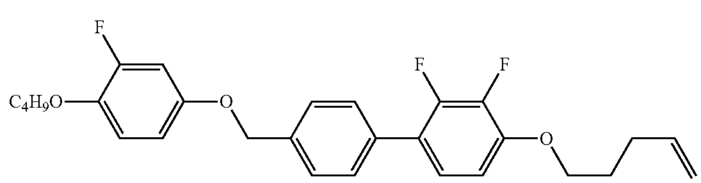 |

-continued
| No. | |
|---|---|
| 810 | 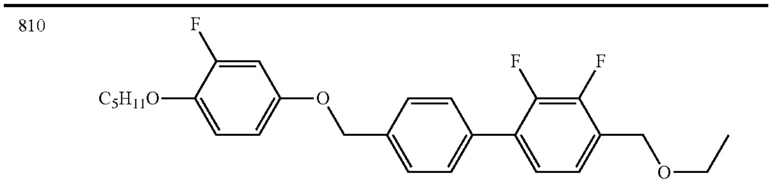 |
| 811 | 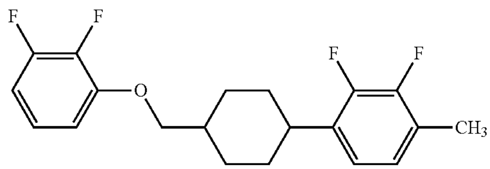 |
| 812 | 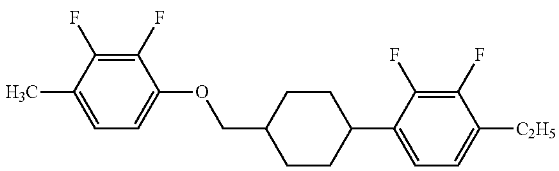 |
| 813 | 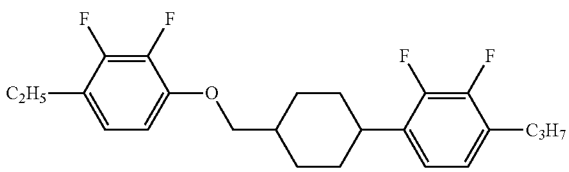 |
| 814 | 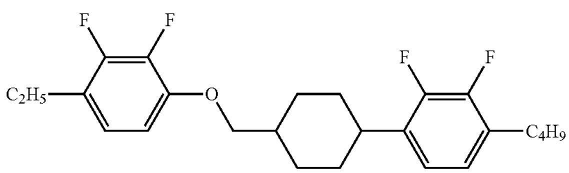 |
| 815 | 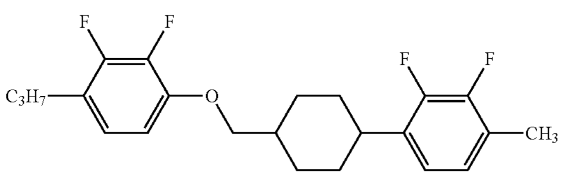 |
| 816 | 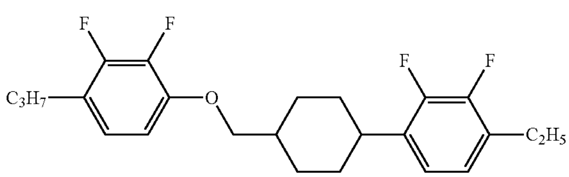 |
| 817 | 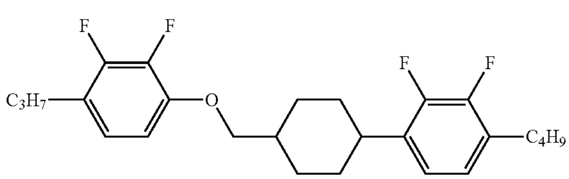 |
| 818 | 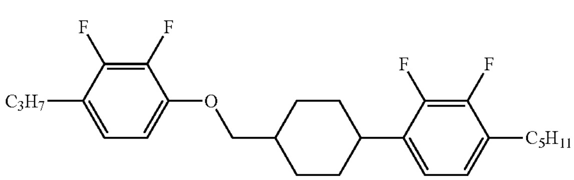 |

-continued
| No. | |
|---|---|
| 819 | 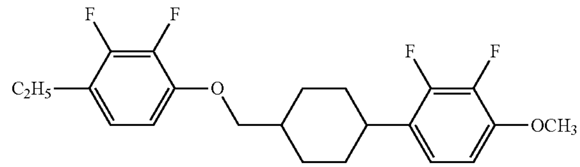 |
| 820 | 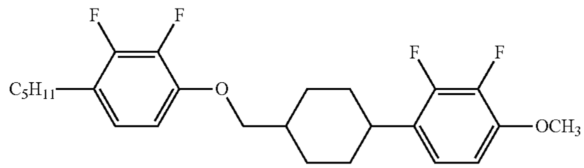 |
| 821 | 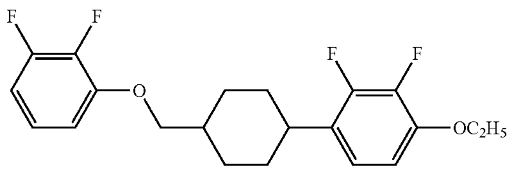<br>C 79.3 I<br>$T_{NI}$; 17.9° C., Δε; −6.58, Δn; 0.094 |
| 822 | 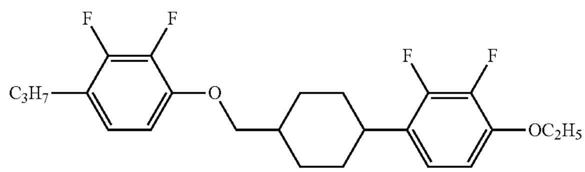 |
| 823 | 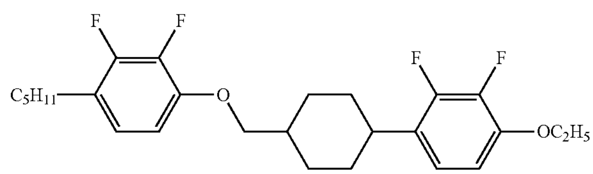<br>C 67.6 N 70.3 I<br>$T_{NI}$; 75.3° C., Δε; −6.39, Δn; 0.120 |
| 824 | 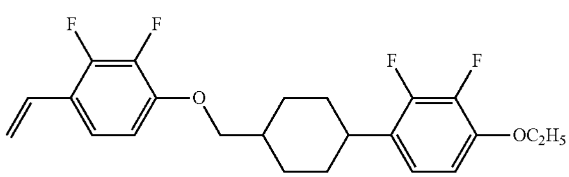 |
| 825 | 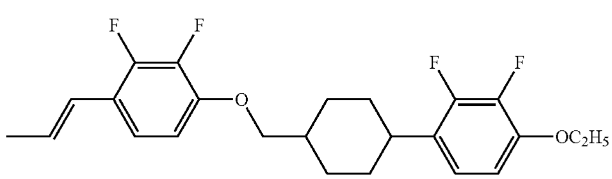 |
| 826 | 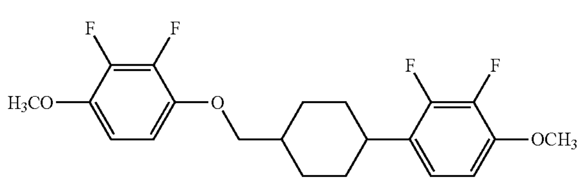 |

-continued
| No. | |
|---|---|
| 827 | 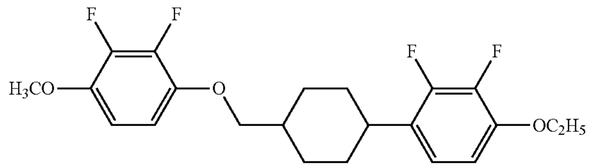 |
| 828 | 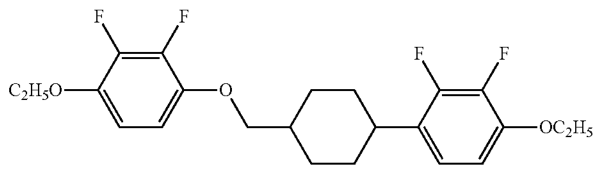<br>C 97.0 N 102.5 I<br>$T_{NI}$; 103.9° C., Δε; −9.42, Δn; 0.134 |
| 829 | 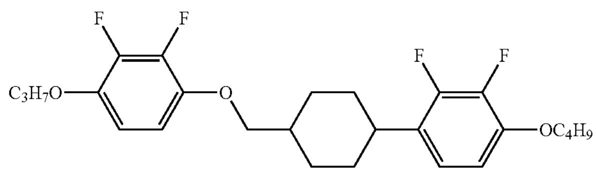 |
| 830 | 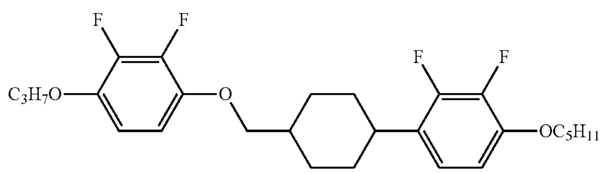 |
| 831 | 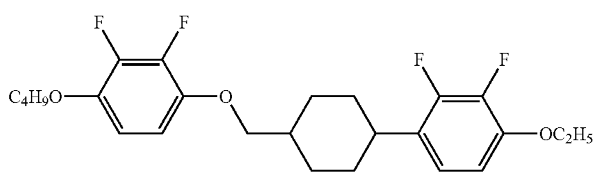<br>C 72.4 N 92.8 I<br>$T_{NI}$; 99.3° C., Δε; −8.53, Δn; 0.134 |
| 832 | 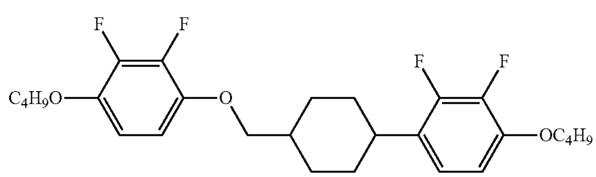 |
| 833 | 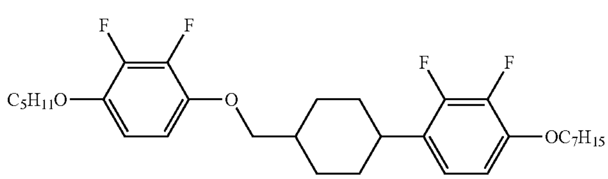 |
| 834 | 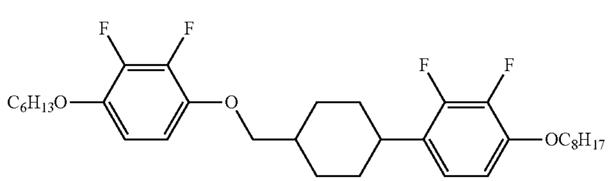 |

-continued
| No. | |
|---|---|
| 835 | 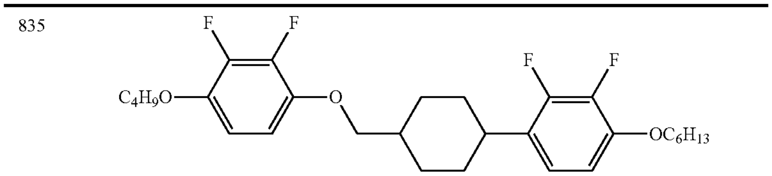 |
| 836 | 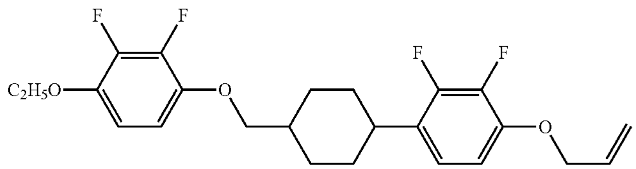 |
| 837 | 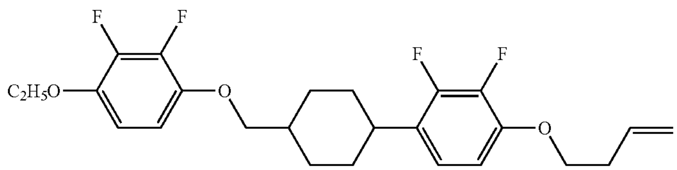 |
| 838 | 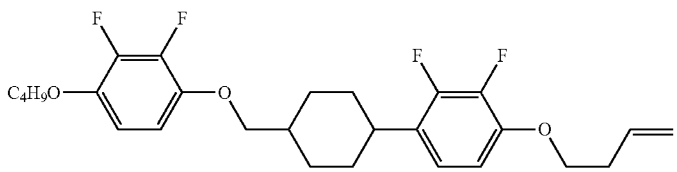 |
| 839 | 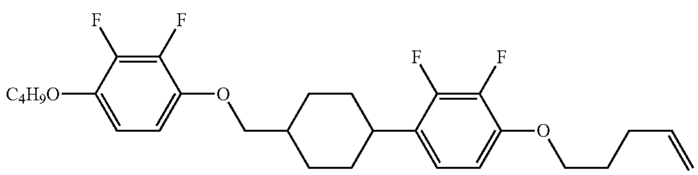 |
| 840 | 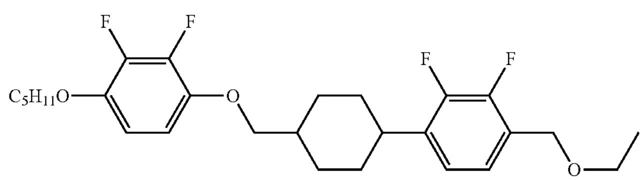 |
| 841 | 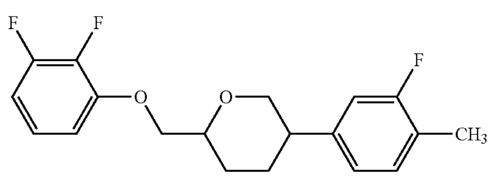 |
| 842 | 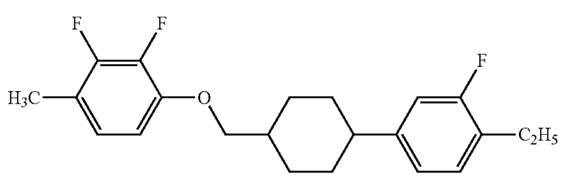 |
| 843 | 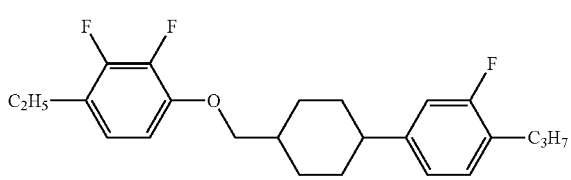 |

-continued
| No. | |
|---|---|
| 844 | 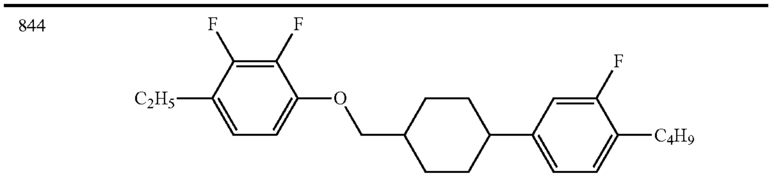 |
| 845 | 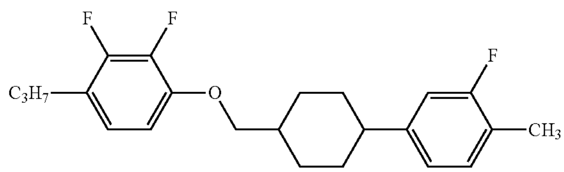 |
| 846 | 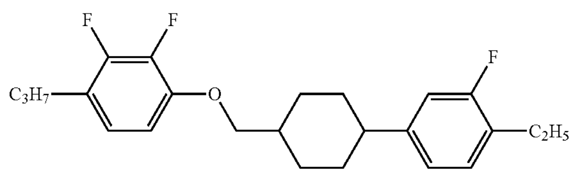 |
| 847 | 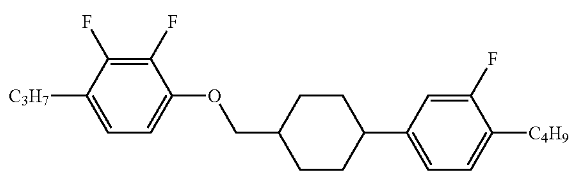 |
| 848 | 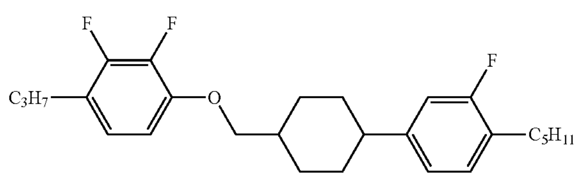 |
| 849 | 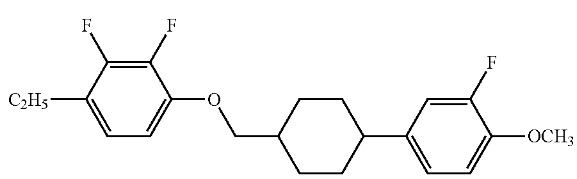 |
| 850 | 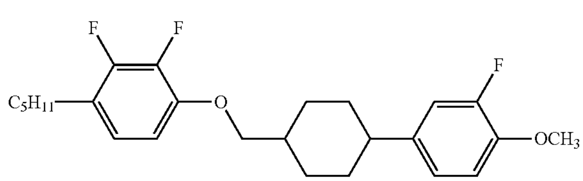 |
| 851 | 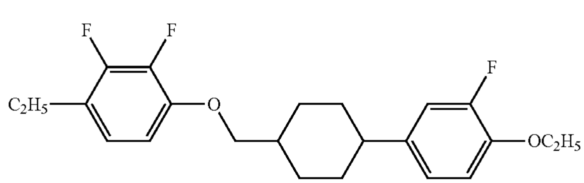 |
| 852 | 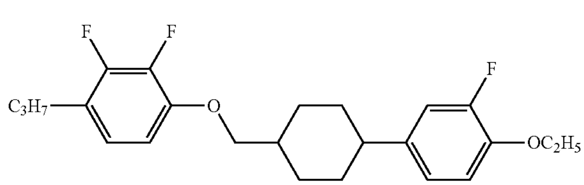 |

-continued
| No. | |
|---|---|
| 853 | 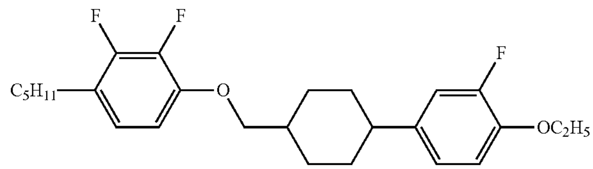 |
| 854 | 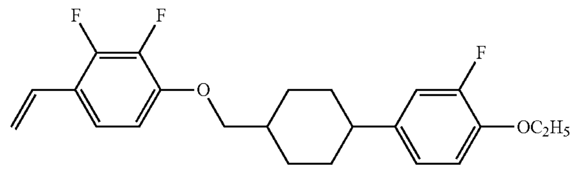 |
| 855 | 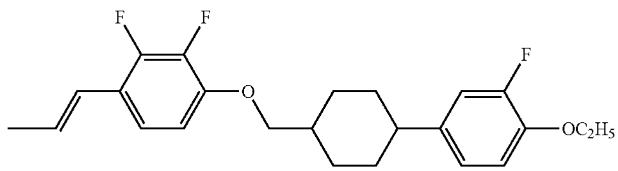 |
| 856 | 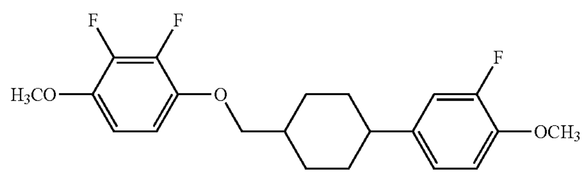 |
| 857 | 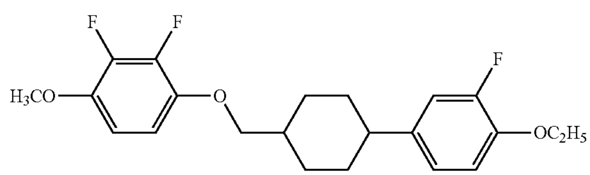 |
| 858 | 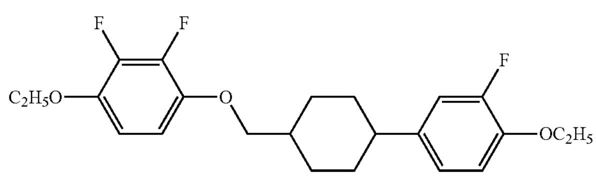 |
| 859 | 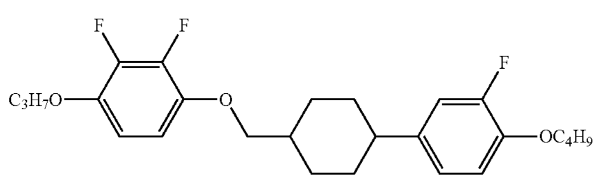 |
| 860 | 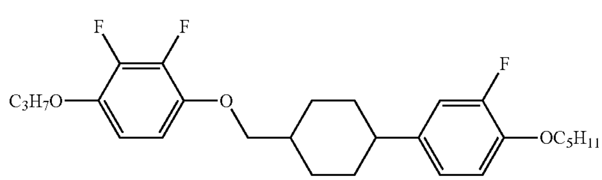 |
| 861 | 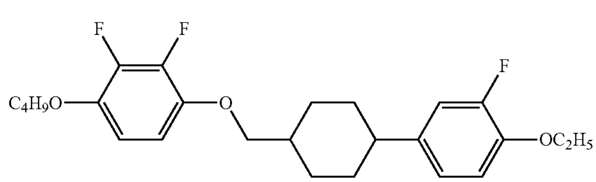 |

-continued
| No. | |
|---|---|
| 862 | 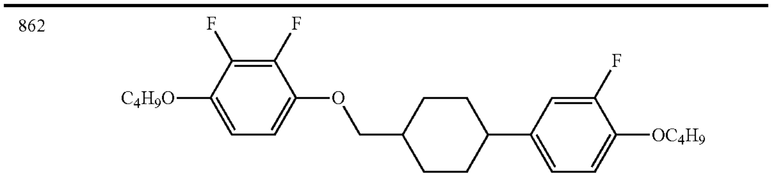 |
| 863 | 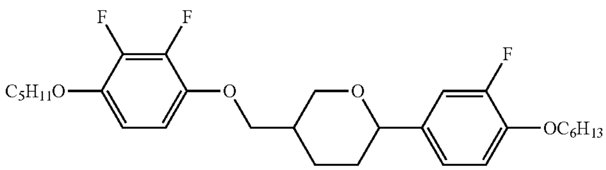 |
| 864 | 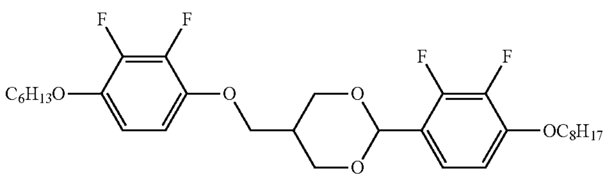 |
| 865 | 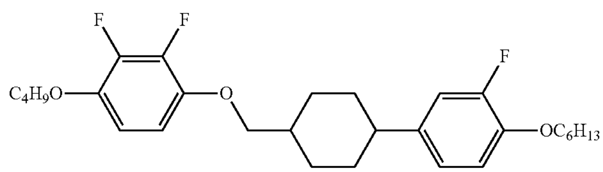 |
| 866 | 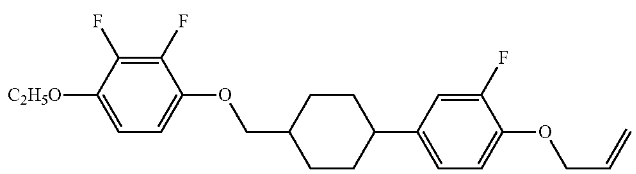 |
| 867 | 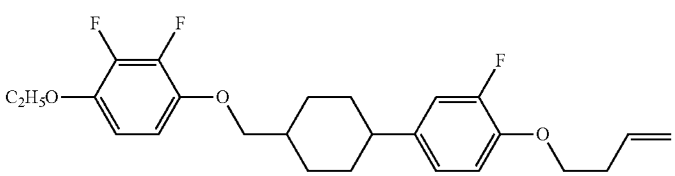 |
| 868 | 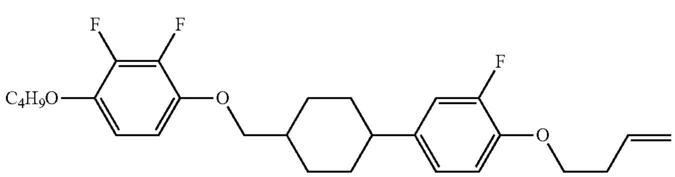 |
| 869 | 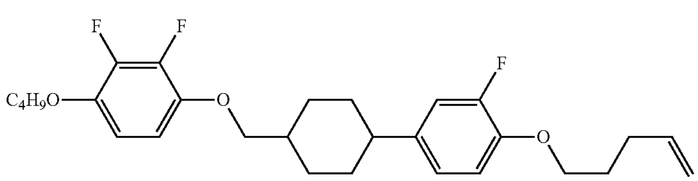 |
| 870 | 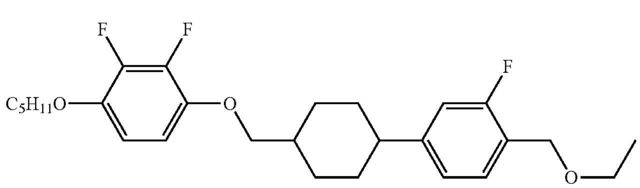 |

-continued
| No. | |
|---|---|
| 871 | 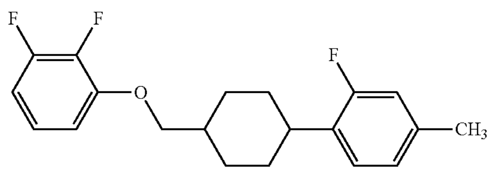 |
| 872 | 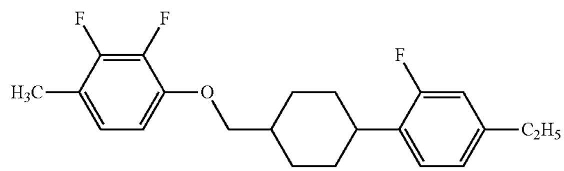 |
| 873 | 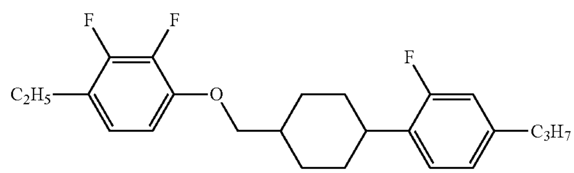 |
| 874 | 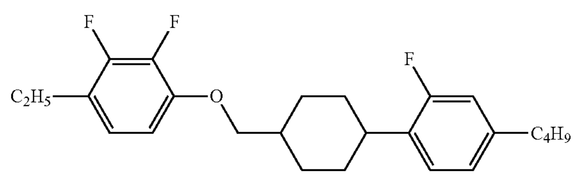 |
| 875 | 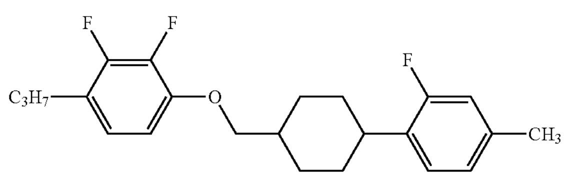 |
| 876 | 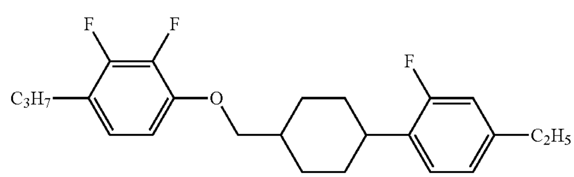 |
| 877 | 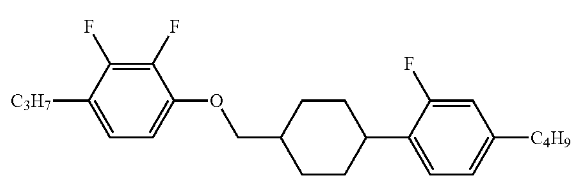 |
| 878 | 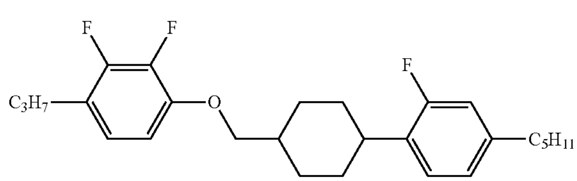 |
| 879 | 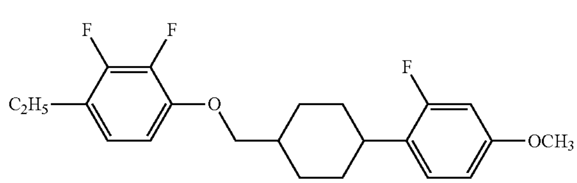 |

-continued
| No. | |
|---|---|
| 880 | 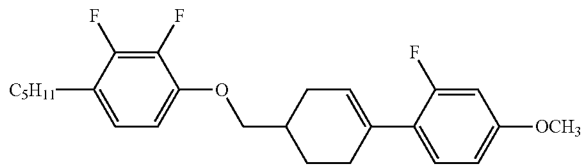 |
| 881 | 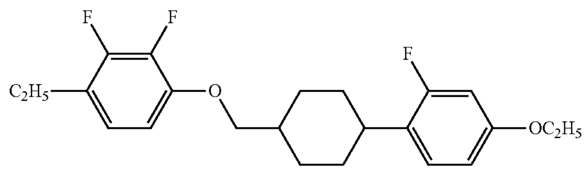 |
| 882 | 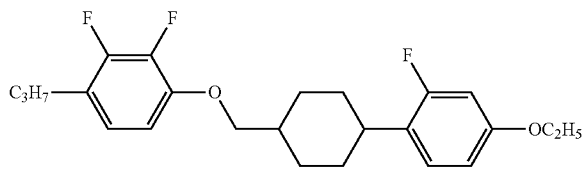 |
| 883 | 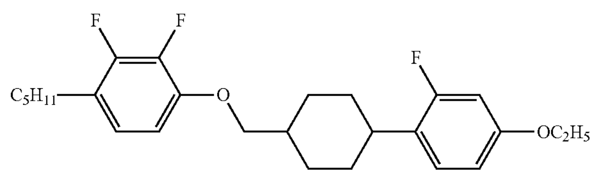 |
| 884 | 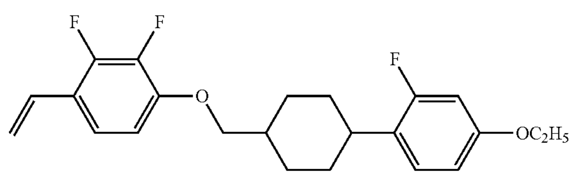 |
| 885 | 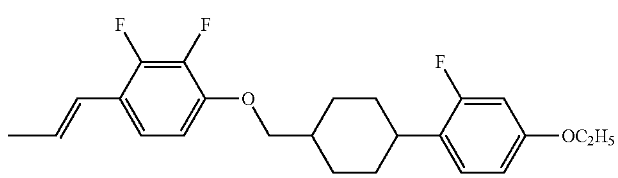 |
| 886 | 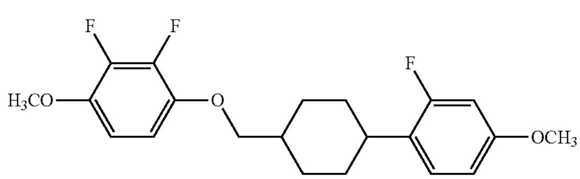 |
| 887 | 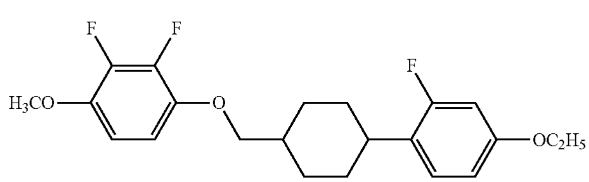 |
| 888 | 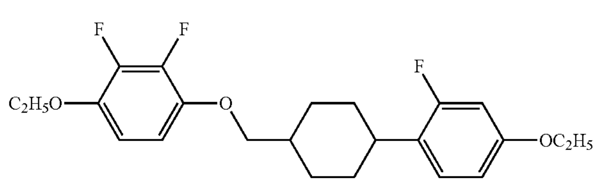 |

-continued
| No. | |
|---|---|
| 889 | 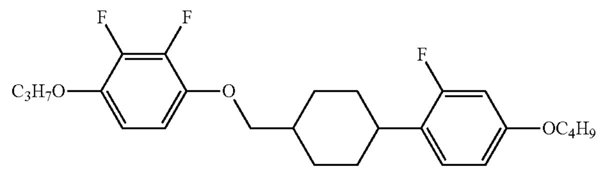 |
| 890 | 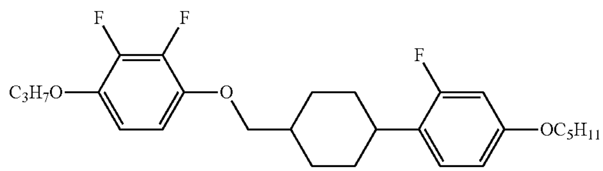 |
| 891 | 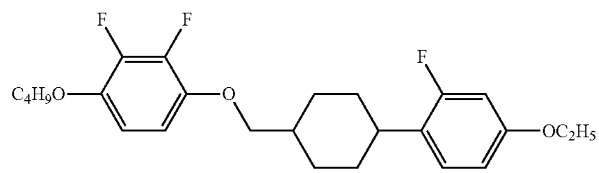 |
| 892 | 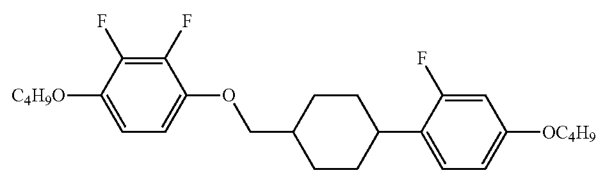 |
| 893 | 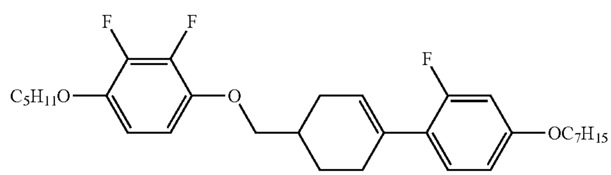 |
| 894 | 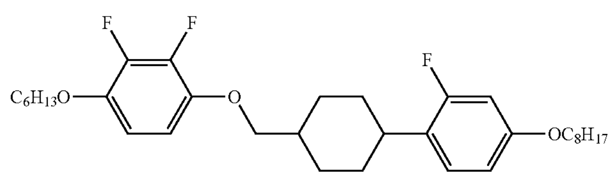 |
| 895 | 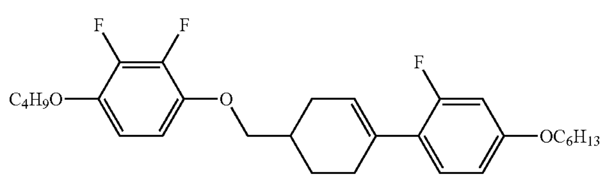 |
| 896 | 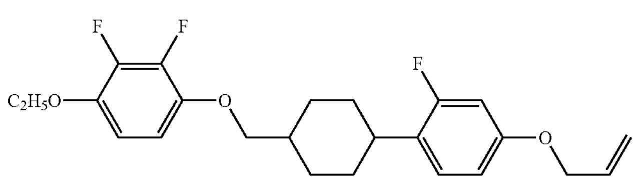 |
| 897 | 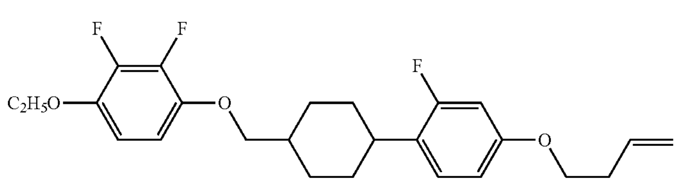 |

-continued
| No. | |
|---|---|
| 898 | 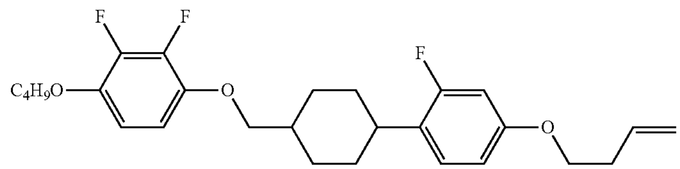 |
| 899 | 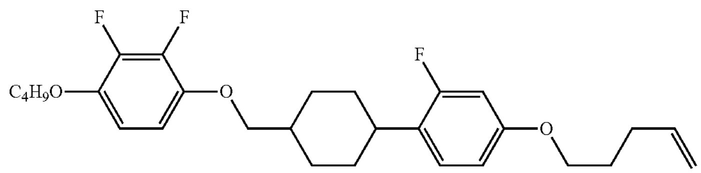 |
| 900 | 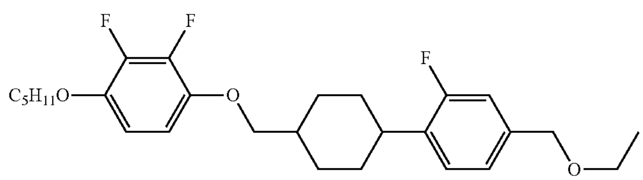 |
| 901 | 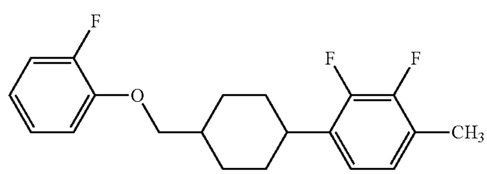 |
| 902 | 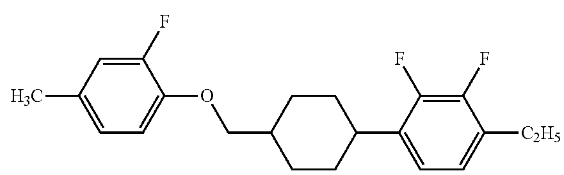 |
| 903 | 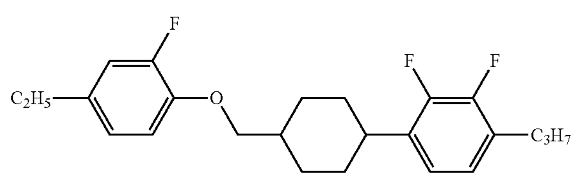 |
| 904 | 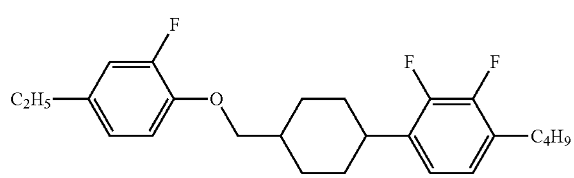 |
| 905 | 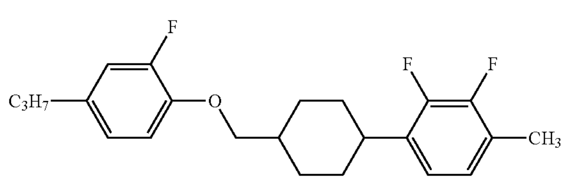 |
| 906 | 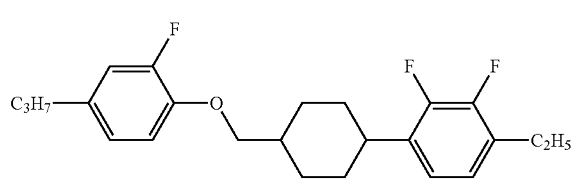 |

-continued
| No. | |
|---|---|
| 907 | 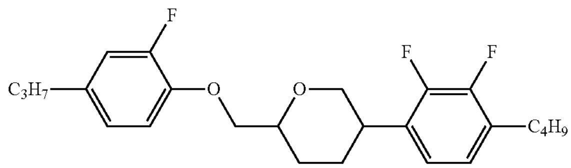 |
| 908 | 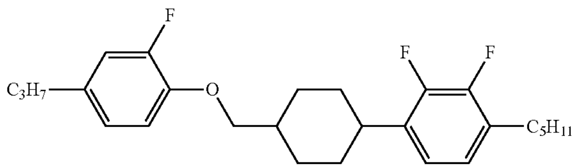 |
| 909 | 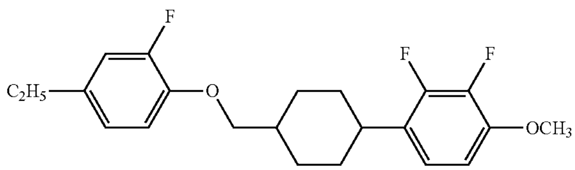 |
| 910 | 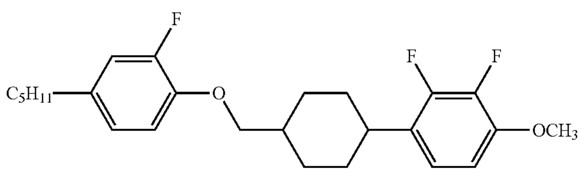 |
| 911 | 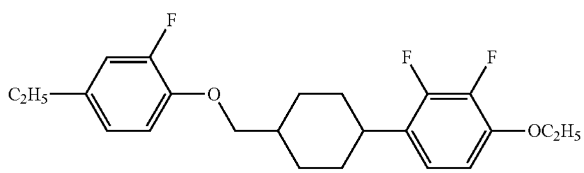 |
| 912 | 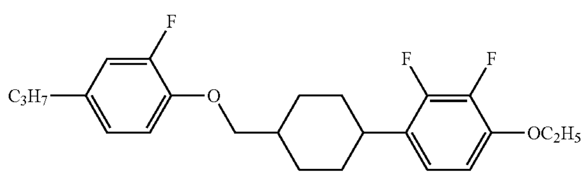 |
| 913 | 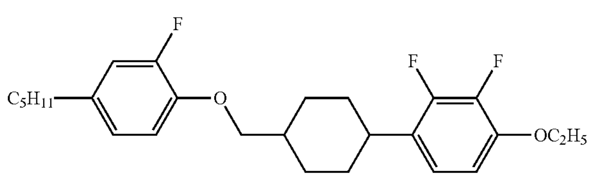 |
| 914 | 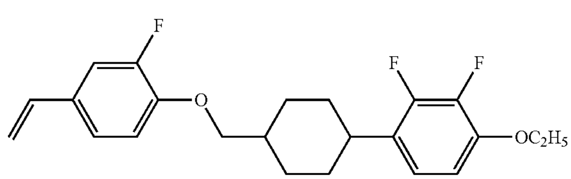 |
| 915 | 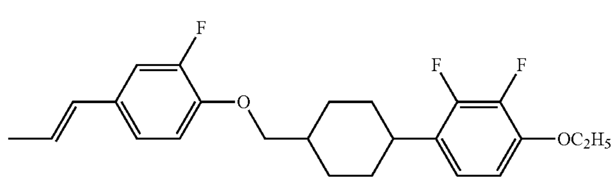 |

-continued
| No. |
|---|
916
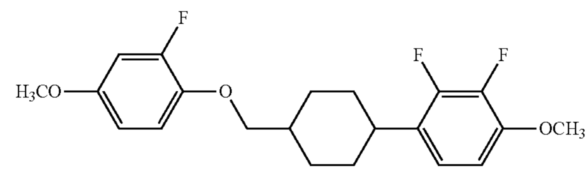
917
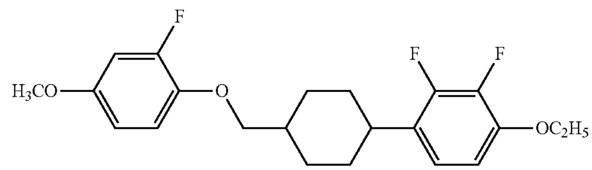
918
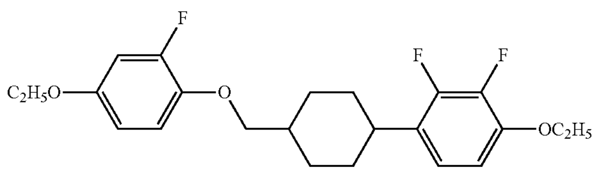
919
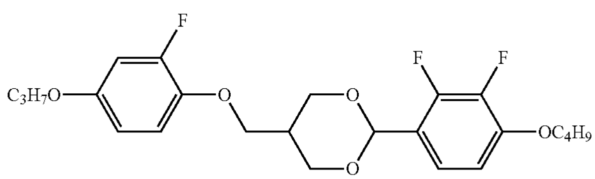
920
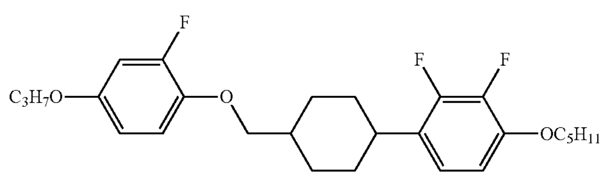
921
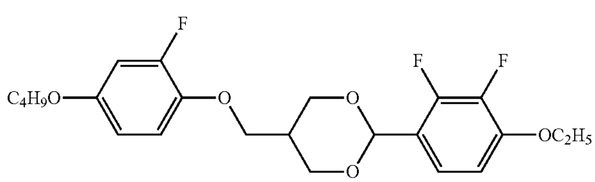
922
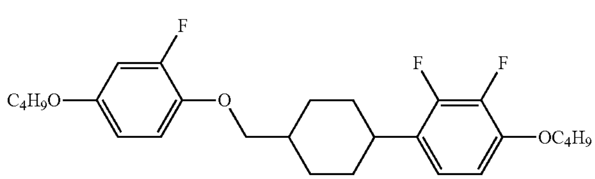
923
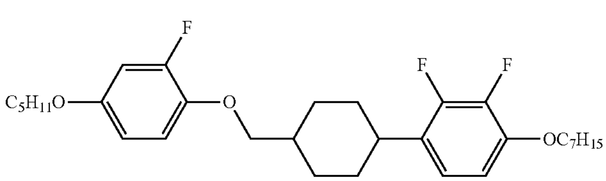
924
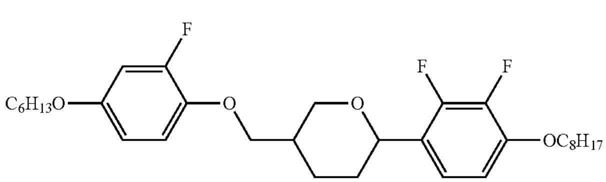

-continued
| No. | |
|---|---|
| 925 | 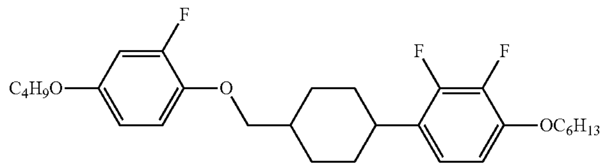 |
| 926 | 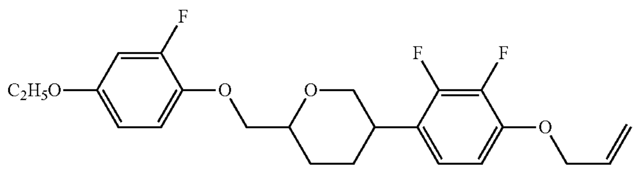 |
| 927 | 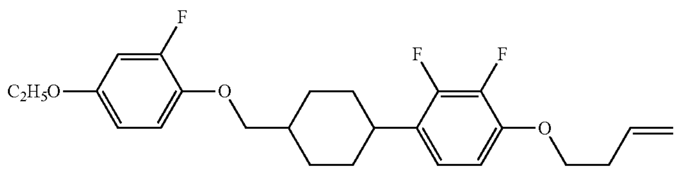 |
| 928 | 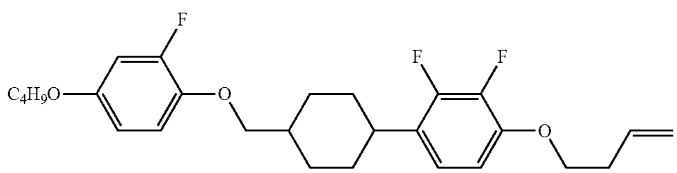 |
| 929 | 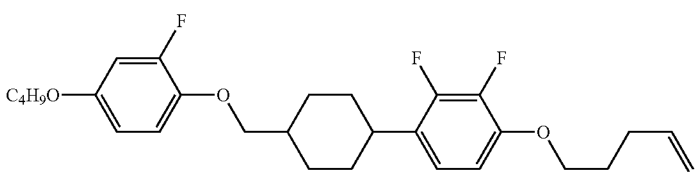 |
| 930 | 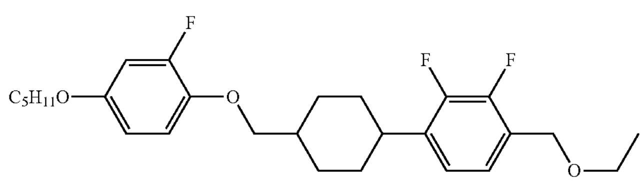 |
| 931 | 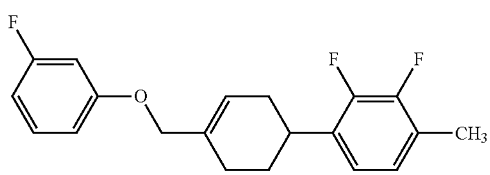 |
| 932 | 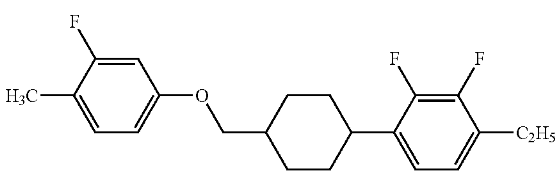 |
| 933 | 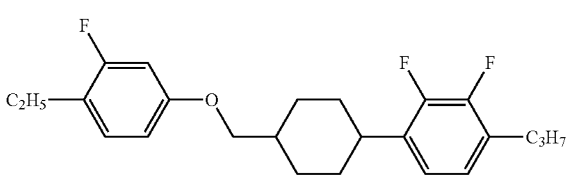 |

-continued
| No. | |
|---|---|
| 934 | 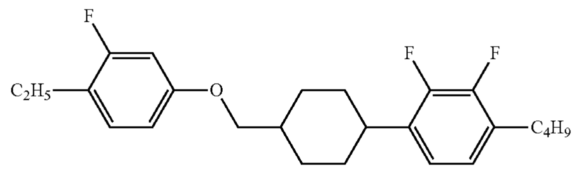 |
| 935 | 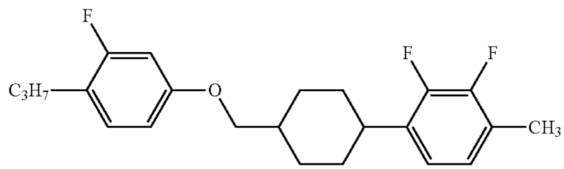 |
| 936 | 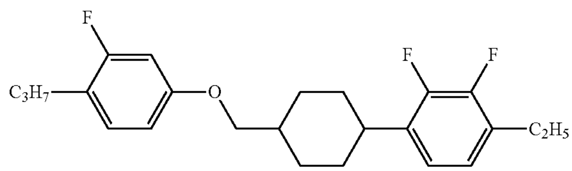 |
| 937 | 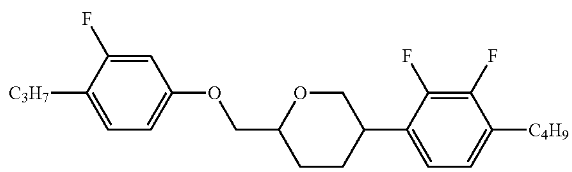 |
| 938 | 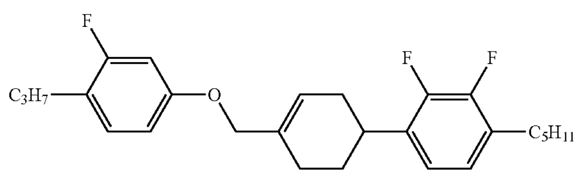 |
| 939 | 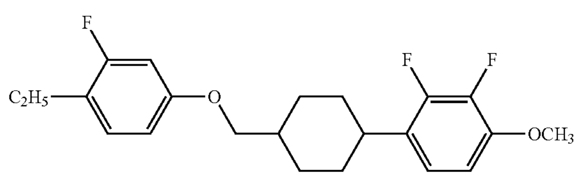 |
| 940 | 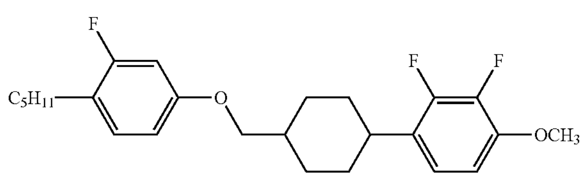 |
| 941 | 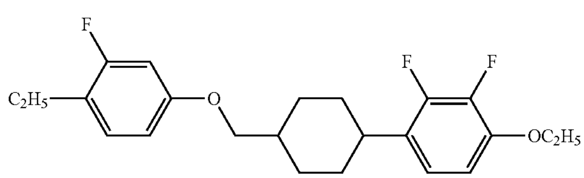 |
| 942 | 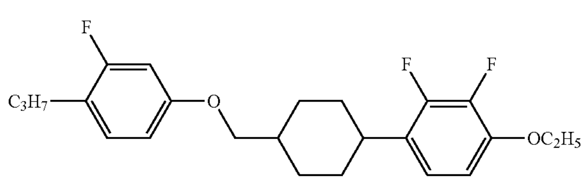 |

-continued
| No. | |
|---|---|
| 943 | 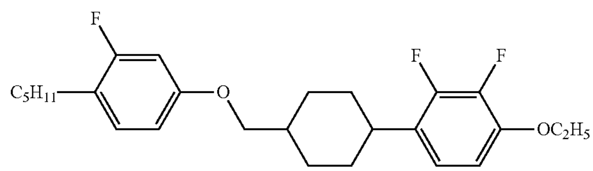 |
| 944 | 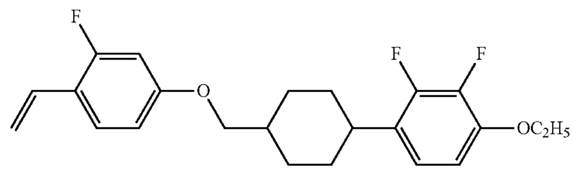 |
| 945 | 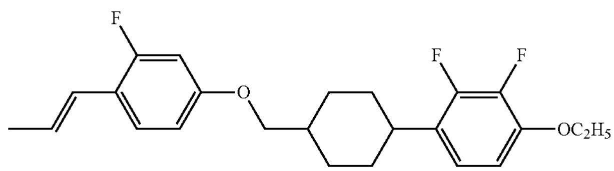 |
| 946 | 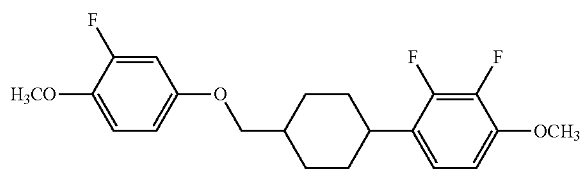 |
| 947 | 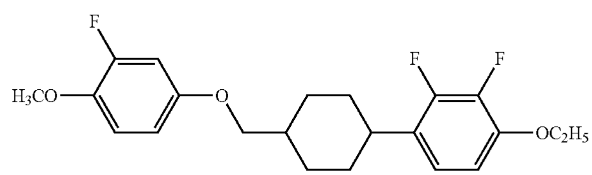 |
| 948 | 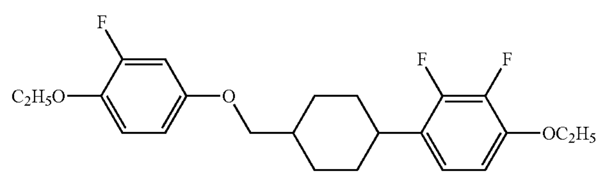 |
| 949 | 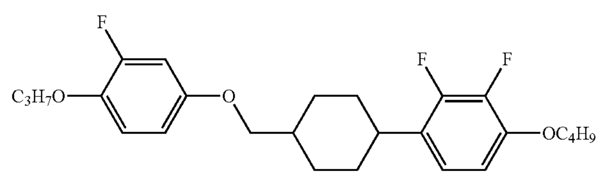 |
| 950 | 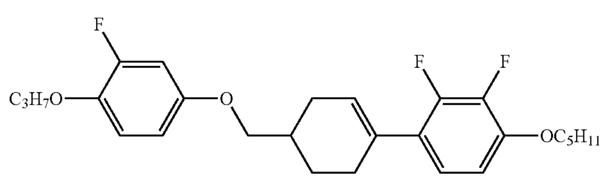 |
| 951 | 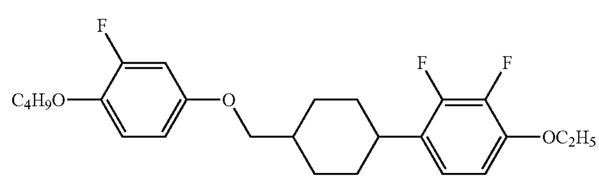 |

-continued
| No. | |
|---|---|
| 952 | 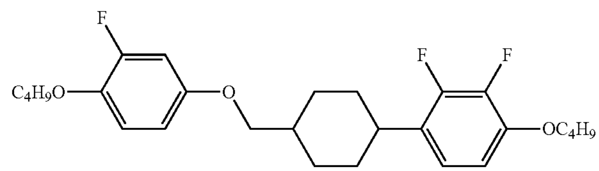 |
| 953 | 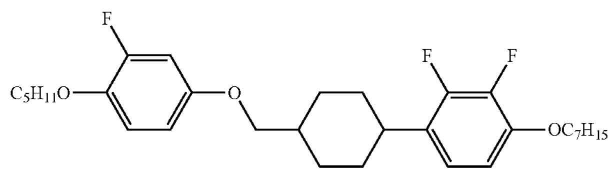 |
| 954 | 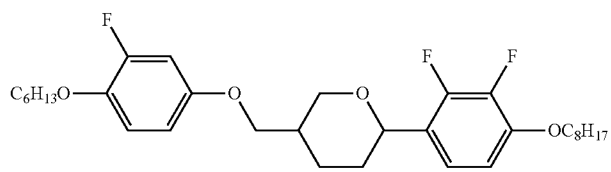 |
| 955 | 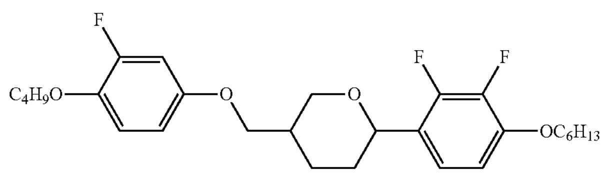 |
| 956 | 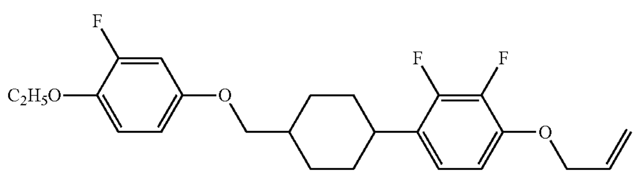 |
| 957 | 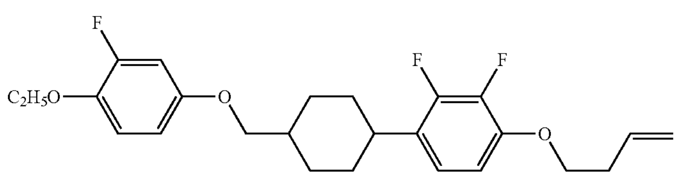 |
| 958 | 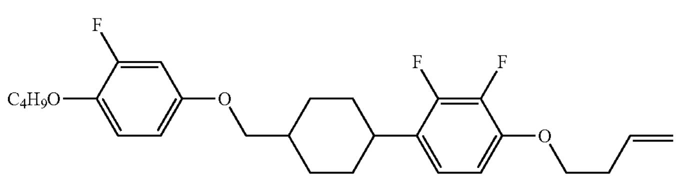 |
| 959 | 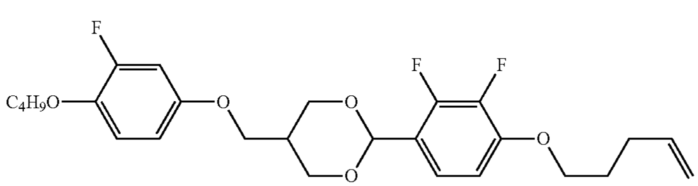 |

-continued
| No. | |
|---|---|
| 960 | 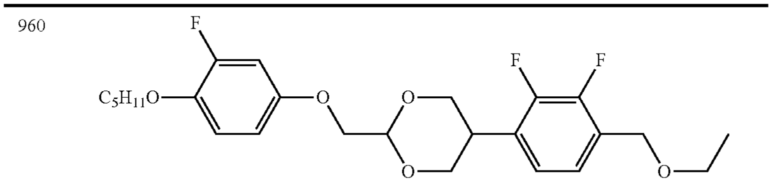 |
| 961 | 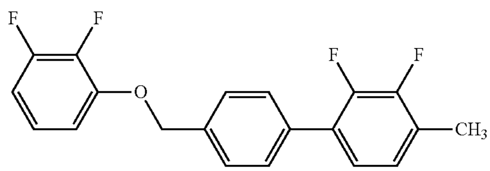 |
| 962 | 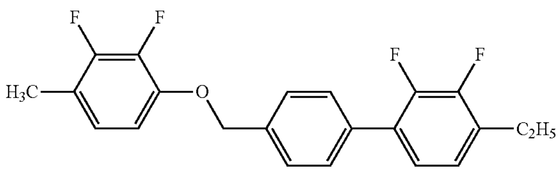 |
| 963 | 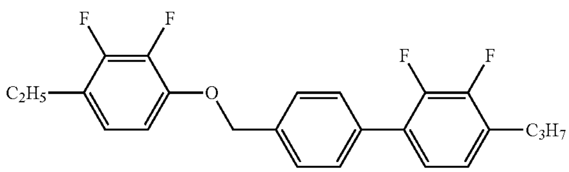 |
| 964 | 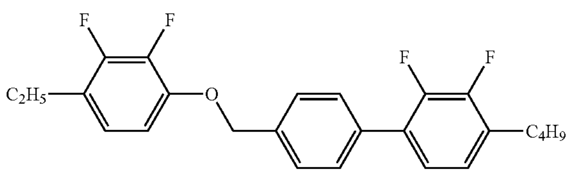 |
| 965 | 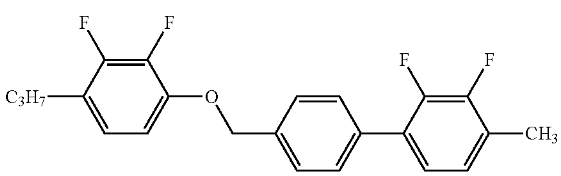 |
| 966 | 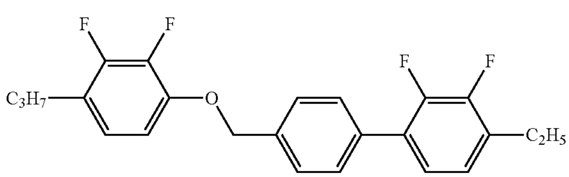 |
| 967 | 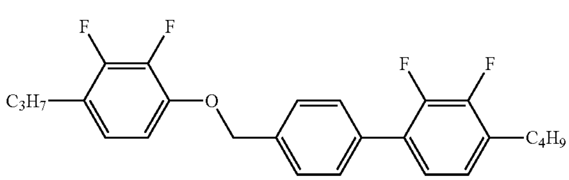 |
| 968 | 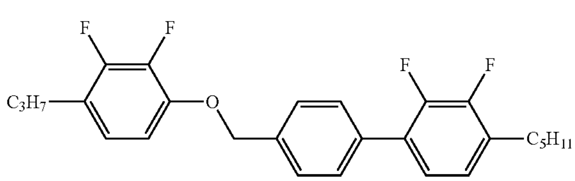 |

-continued
| No. | |
|---|---|
| 969 | 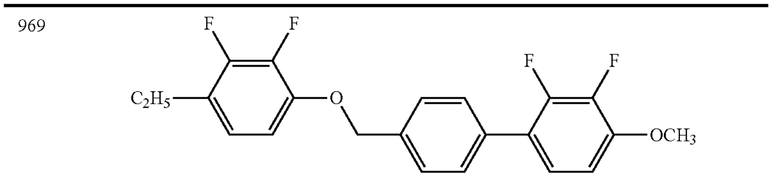 |
| 970 | 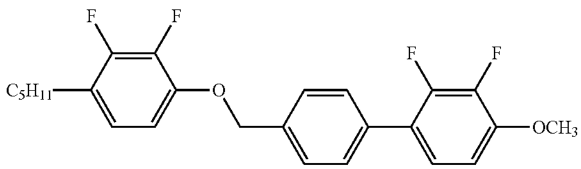 |
| 971 | 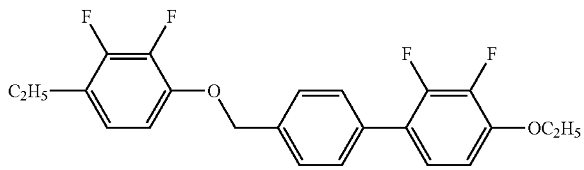 |
| 972 | 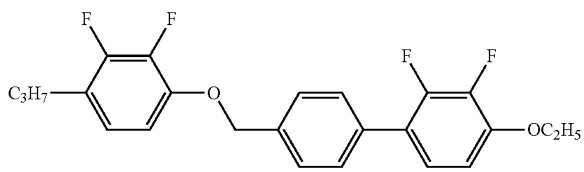 |
| 973 | 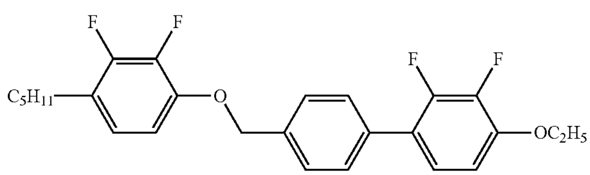 |
| 974 | 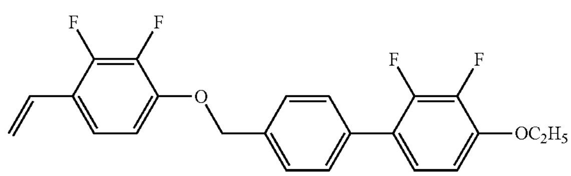 |
| 975 | 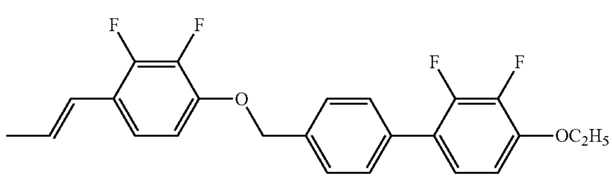 |
| 976 | 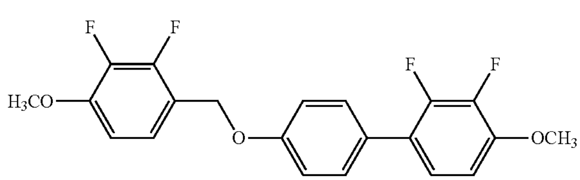 |
| 977 | 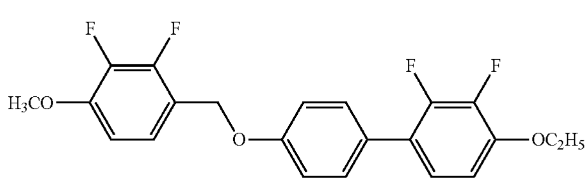 |

-continued
| No. | |
|---|---|
| 978 | 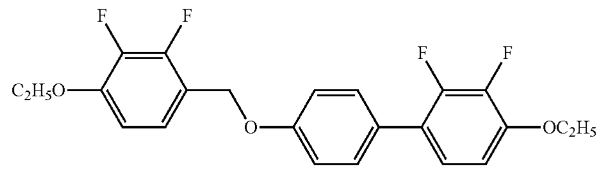 |
| 979 | 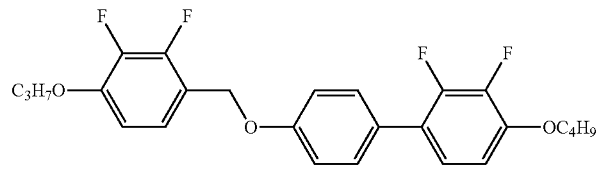 |
| 980 | 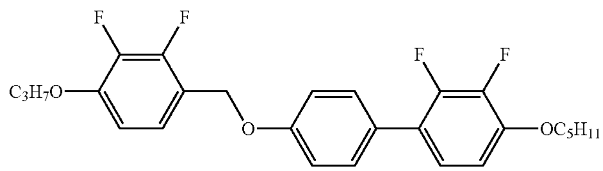 |
| 981 | 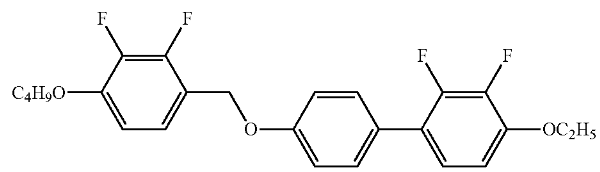 |
| 982 | 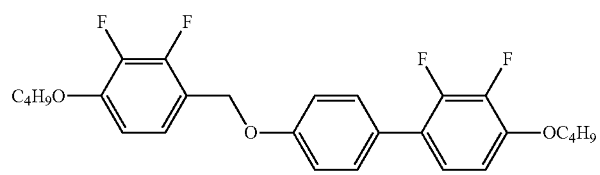 |
| 983 | 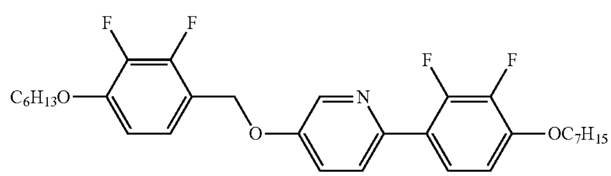 |
| 984 | 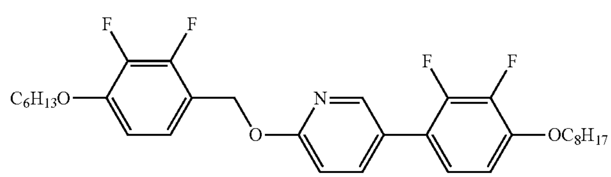 |
| 985 | 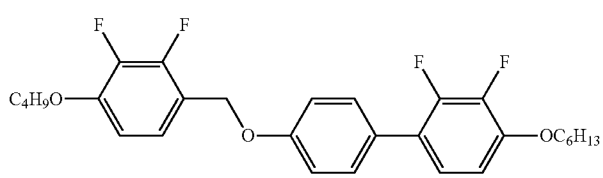 |
| 986 | 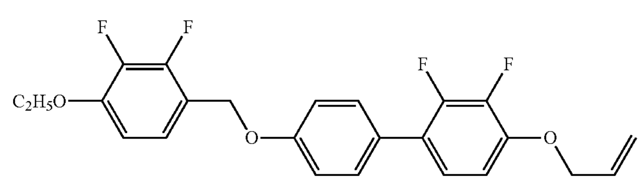 |

-continued
| No. | |
|---|---|
| 987 | 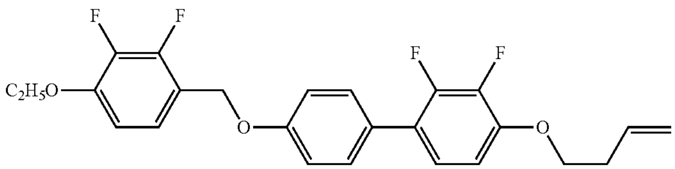 |
| 988 | 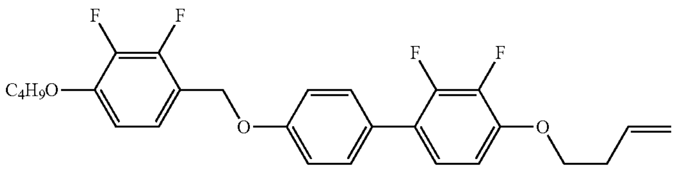 |
| 989 | 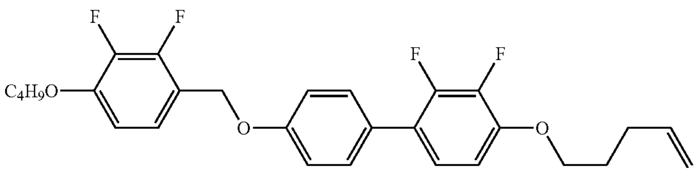 |
| 990 | 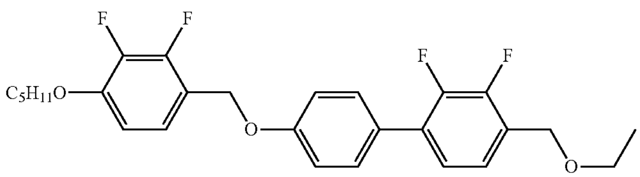 |
| 991 | 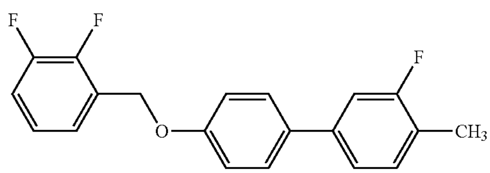 |
| 992 | 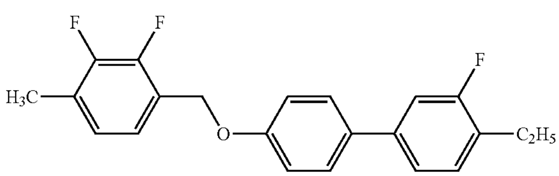 |
| 993 | 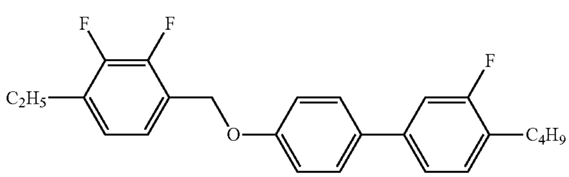 |
| 994 | 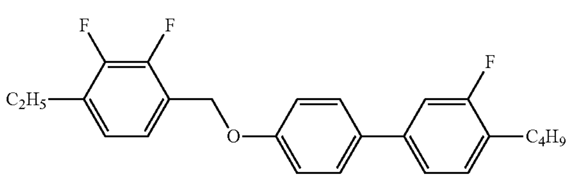 |
| 995 | 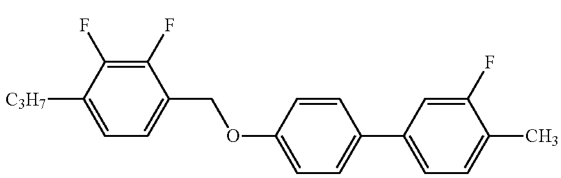 |

-continued
| No. | |
|---|---|
| 996 | 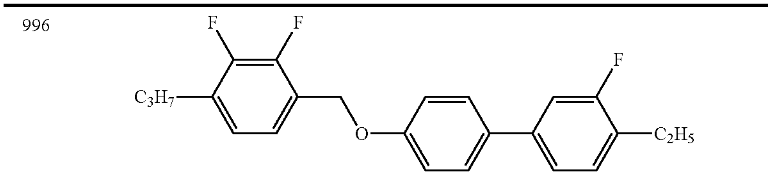 |
| 997 | 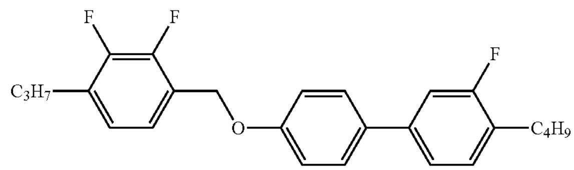 |
| 998 | 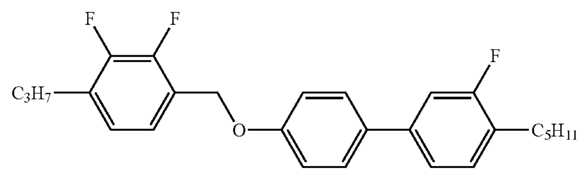 |
| 999 | 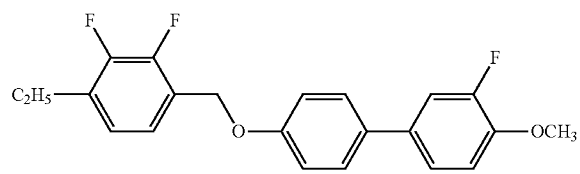 |
| 1000 | 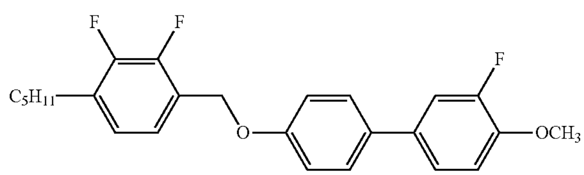 |
| 1001 | 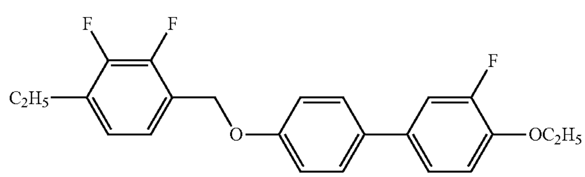 |
| 1002 | 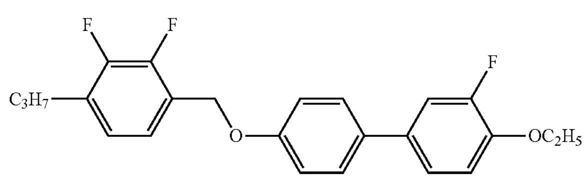 |
| 1003 | 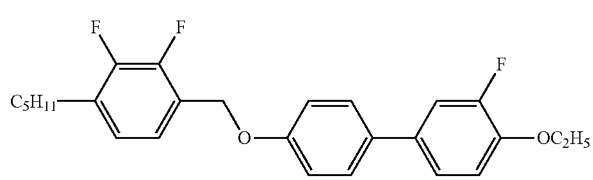 |
| 1004 | 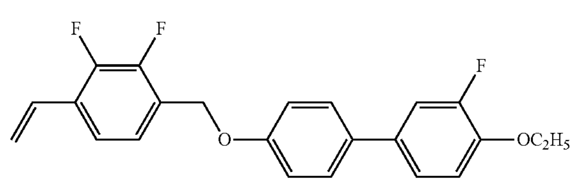 |

-continued
| No. | |
|---|---|
| 1005 | 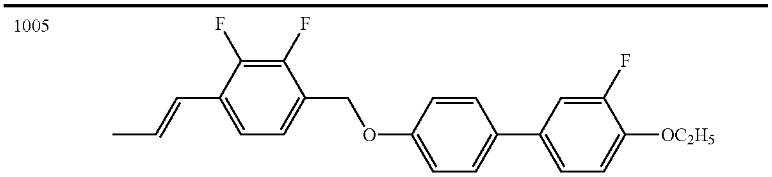 |
| 1006 | 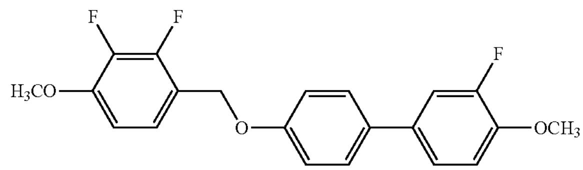 |
| 1007 | 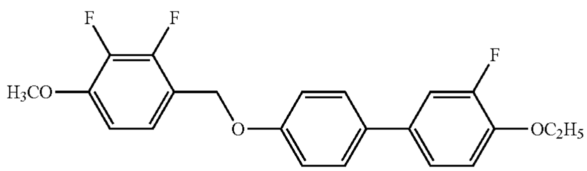 |
| 1008 | 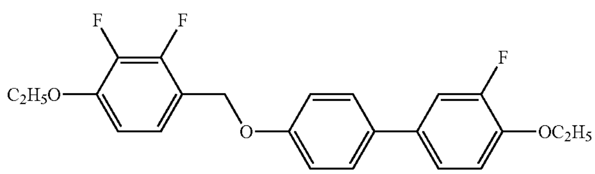 |
| 1009 | 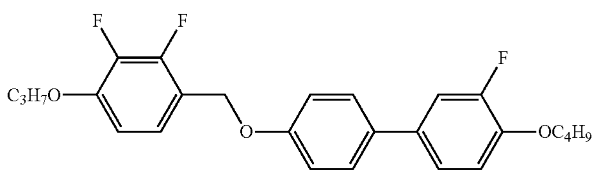 |
| 1010 | 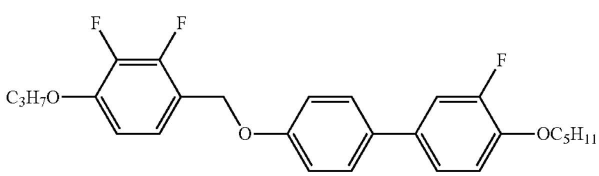 |
| 1011 | 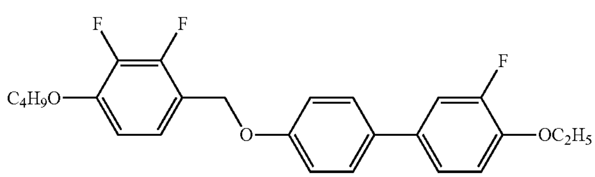 |
| 1012 | 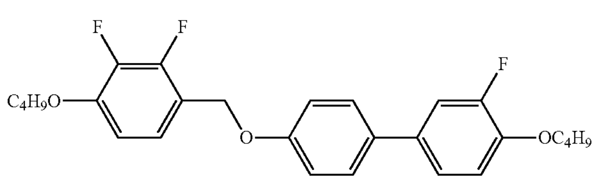 |
| 1013 | 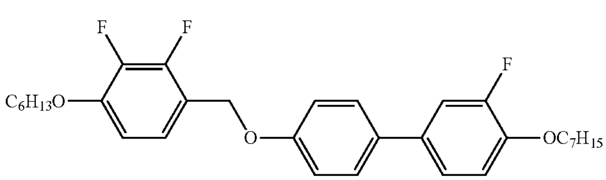 |

-continued
| No. | |
|---|---|
| 1014 | 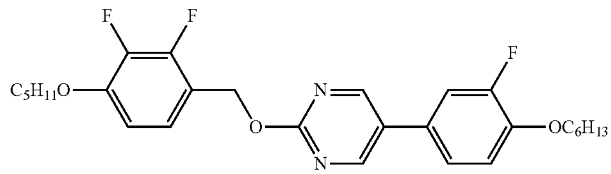 |
| 1015 | 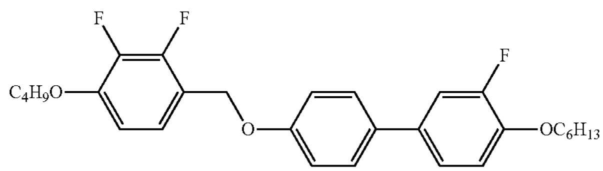 |
| 1016 | 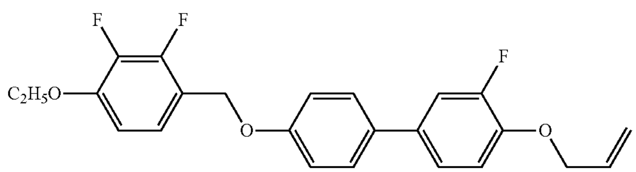 |
| 1017 | 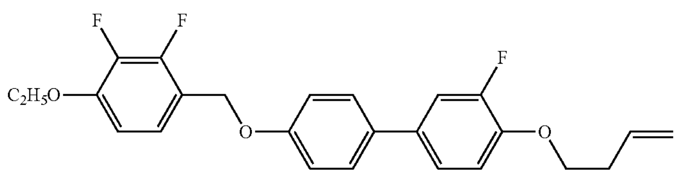 |
| 1018 | 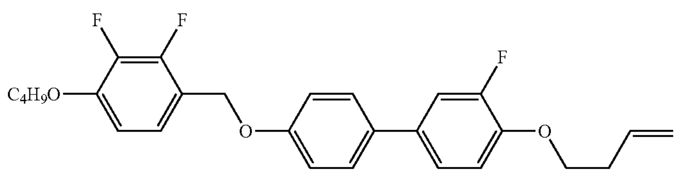 |
| 1019 | 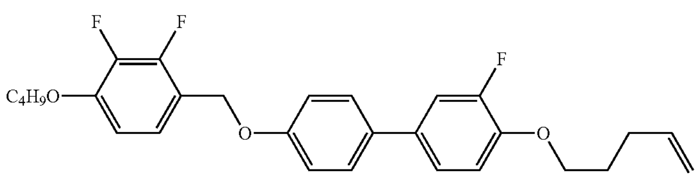 |
| 1020 | 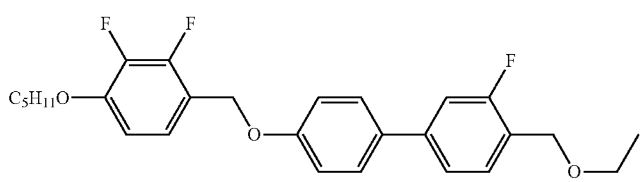 |
| 1021 | 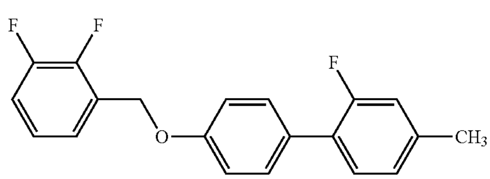 |
| 1022 | 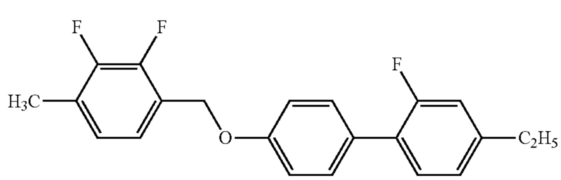 |

-continued
| No. | |
|---|---|
| 1023 | 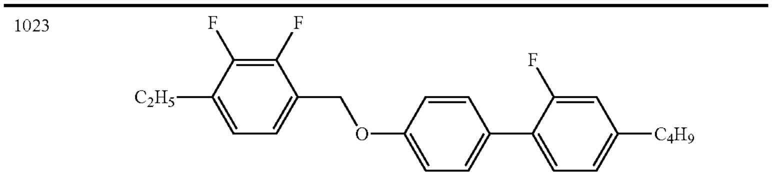 |
| 1024 | 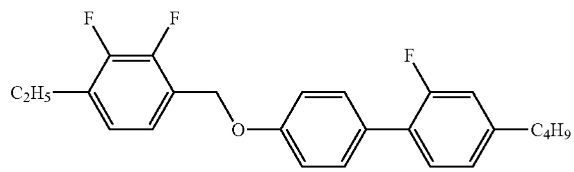 |
| 1025 | 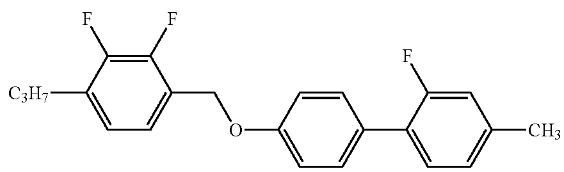 |
| 1026 | 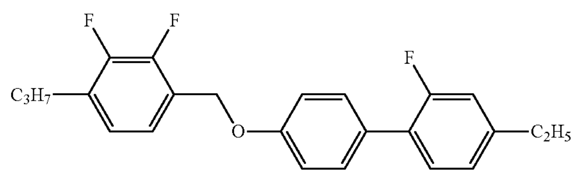 |
| 1027 | 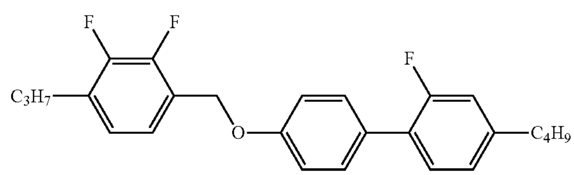 |
| 1028 | 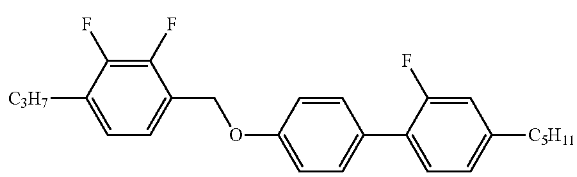 |
| 1029 | 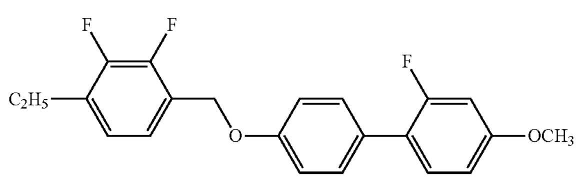 |
| 1030 | 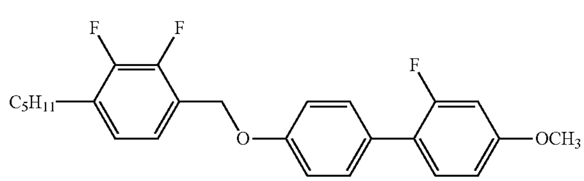 |
| 1031 | 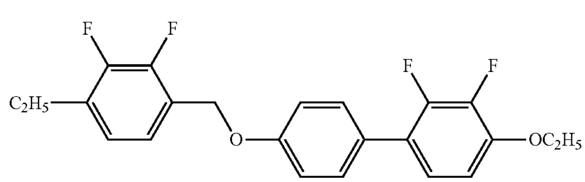 |

-continued
| No. | |
|---|---|
| 1032 | 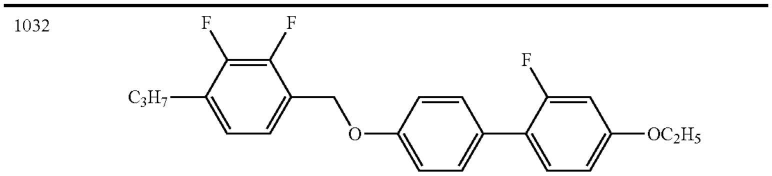 |
| 1033 | 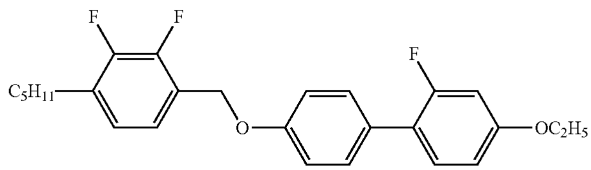 |
| 1034 | 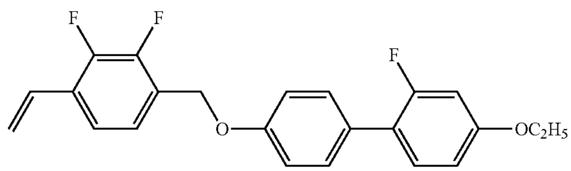 |
| 1035 | 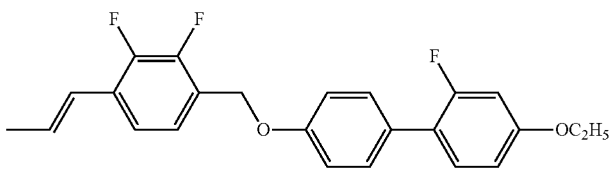 |
| 1036 | 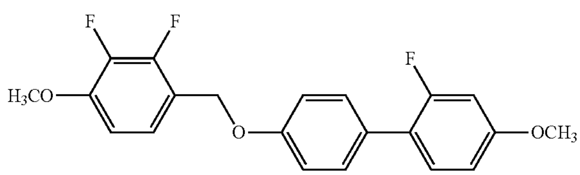 |
| 1037 | 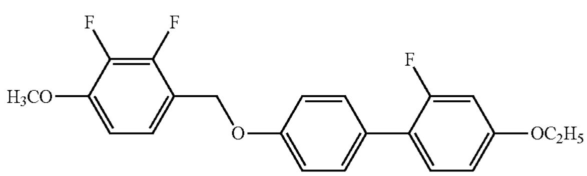 |
| 1038 | 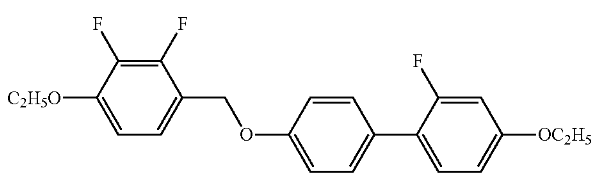 |
| 1039 | 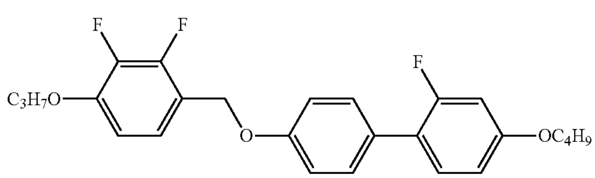 |
| 1040 | 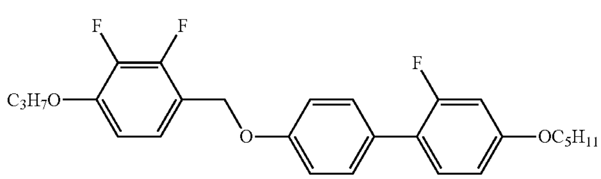 |

-continued
| No. | |
|---|---|
| 1041 | 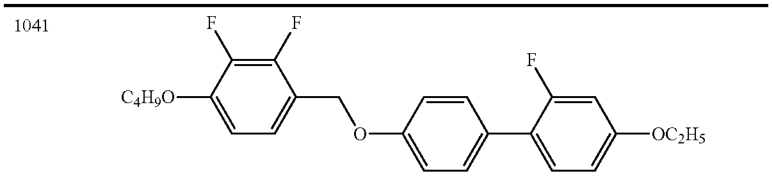 |
| 1042 | 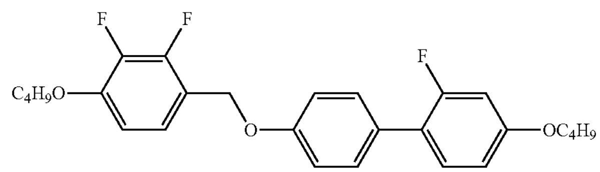 |
| 1043 | 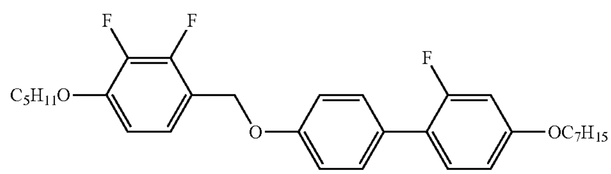 |
| 1044 | 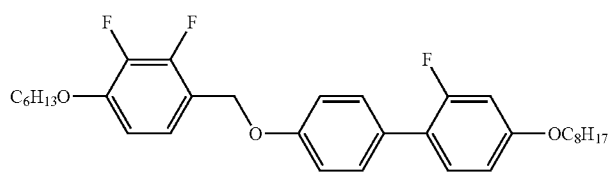 |
| 1045 | 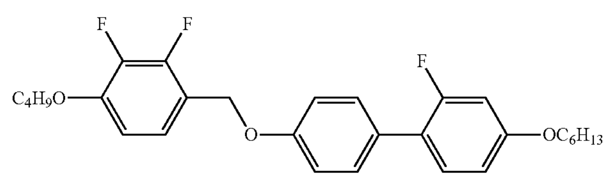 |
| 1046 | 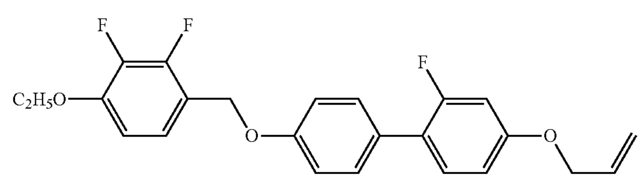 |
| 1047 | 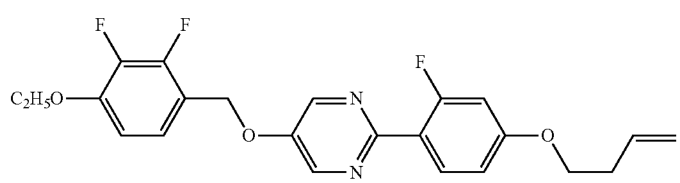 |
| 1048 | 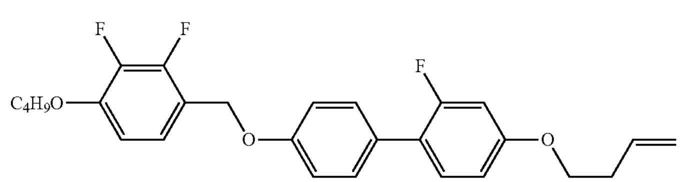 |
| 1049 | 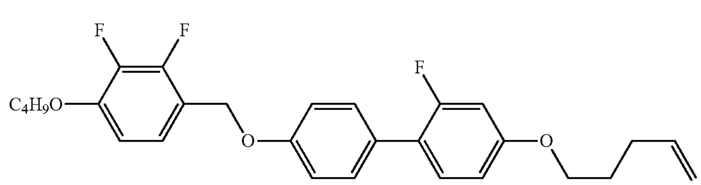 |

-continued
No.
1050
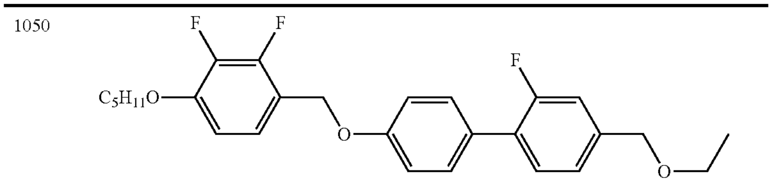
1051
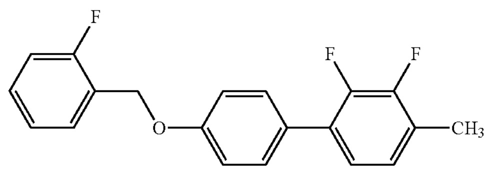
1052
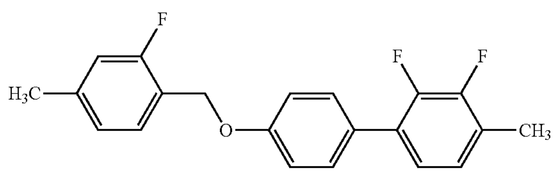
1053
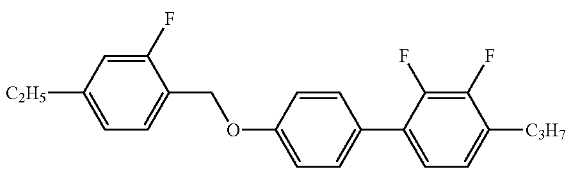
1054
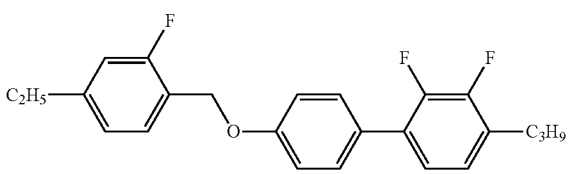
1055
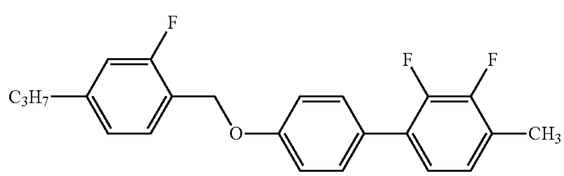
1056
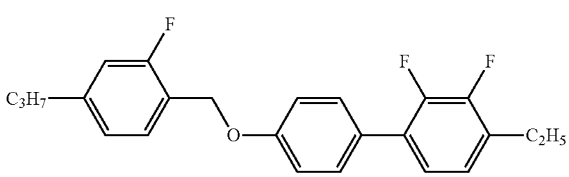
1057
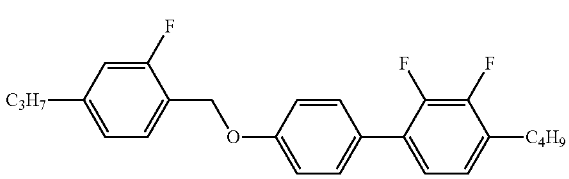
1058
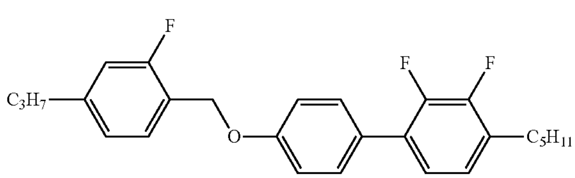

-continued
No.
1059
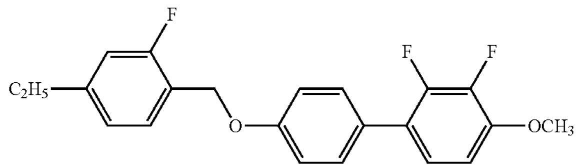
1060
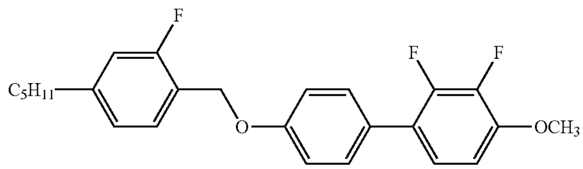
1061
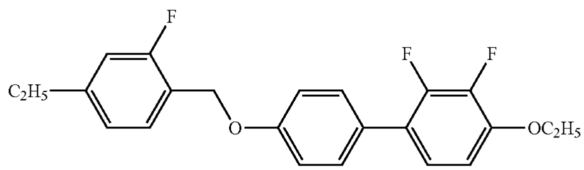
1062
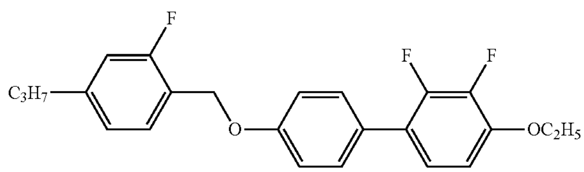
1063
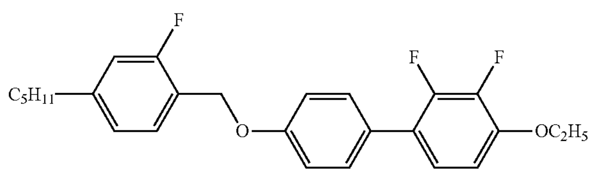
1064
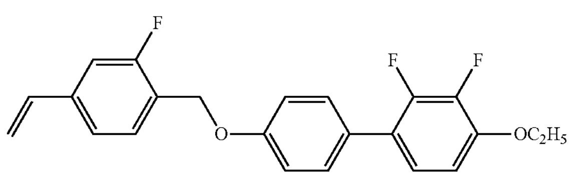
1065
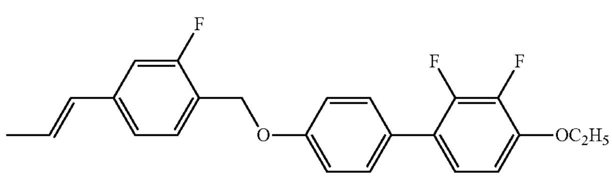
1066
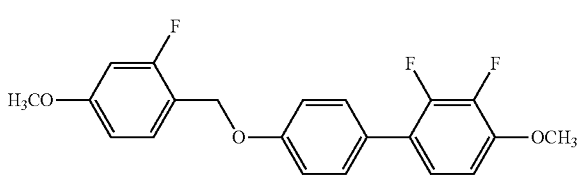
1067
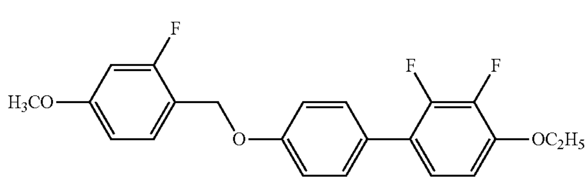

-continued
| No. | |
|---|---|
| 1068 | 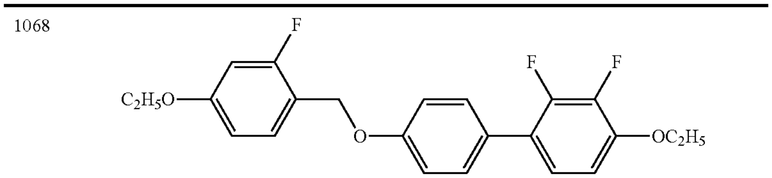 |
| 1069 | 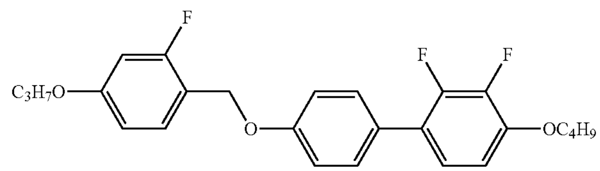 |
| 1070 | 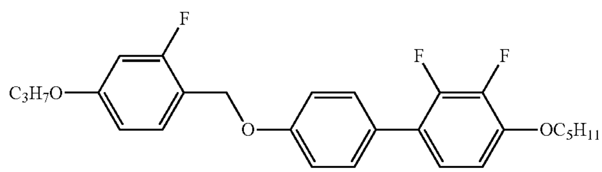 |
| 1071 | 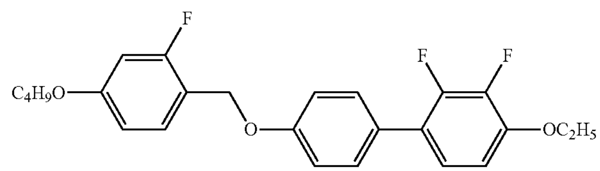 |
| 1072 | 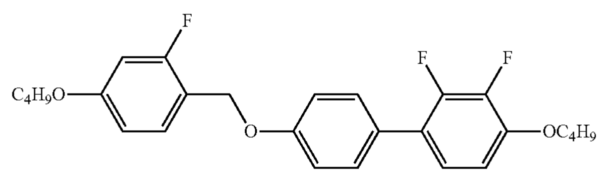 |
| 1073 | 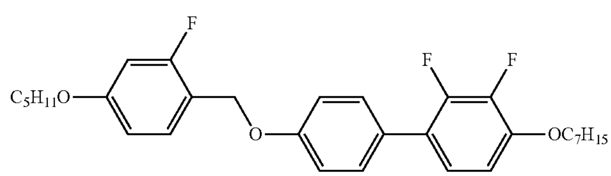 |
| 1074 | 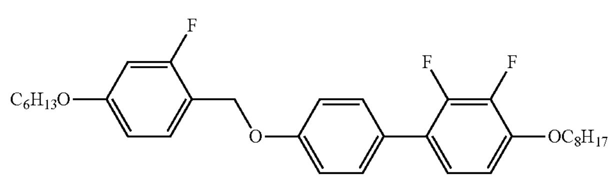 |
| 1075 | 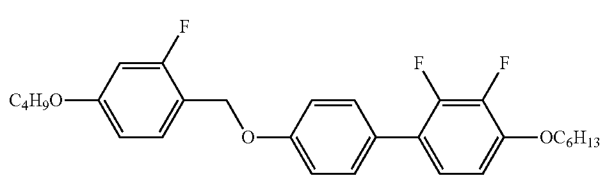 |
| 1076 | 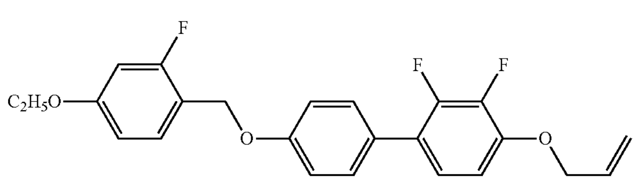 |

-continued
| No. | |
|---|---|
| 1077 | 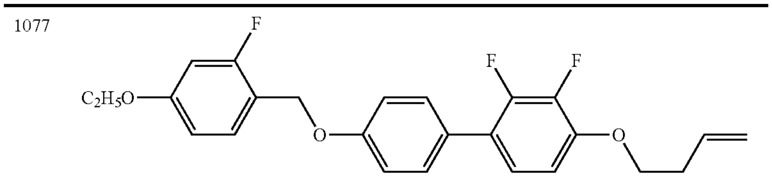 |
| 1078 | 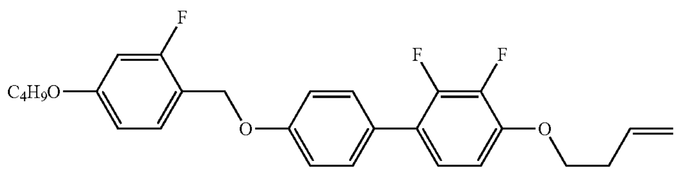 |
| 1079 | 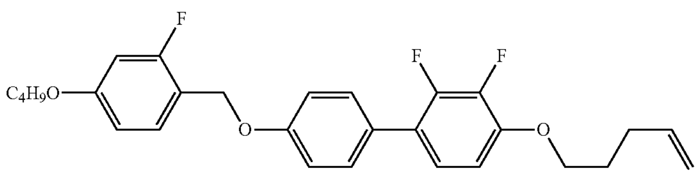 |
| 1080 | 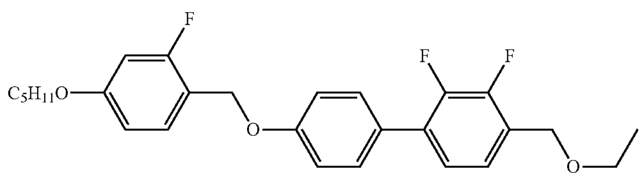 |
| 1081 | 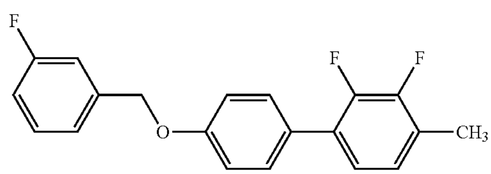 |
| 1082 | 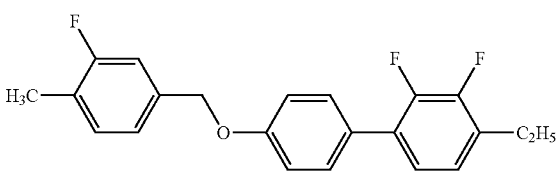 |
| 1083 | 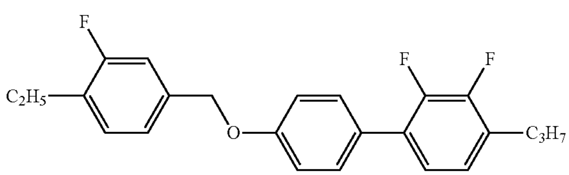 |
| 1084 | 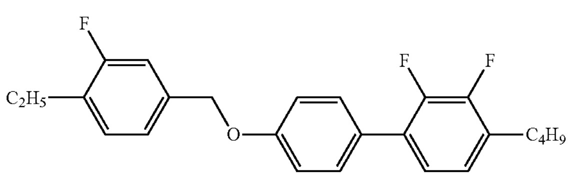 |
| 1085 | 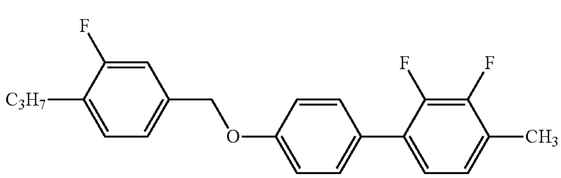 |

-continued
| No. | |
|---|---|
| 1086 | 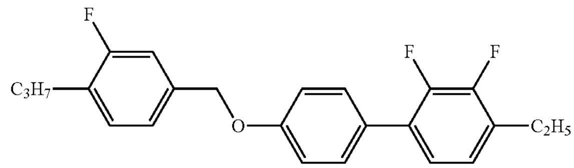 |
| 1087 | 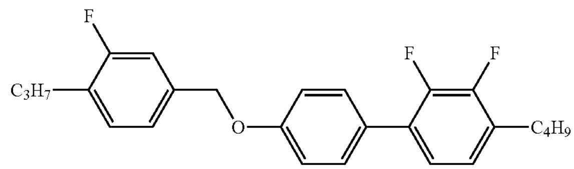 |
| 1088 | 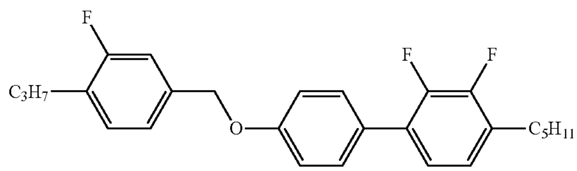 |
| 1089 | 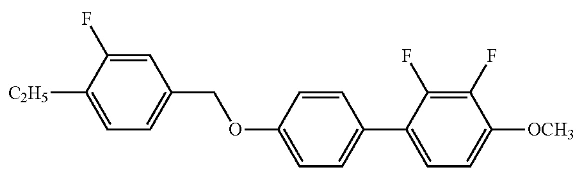 |
| 1090 | 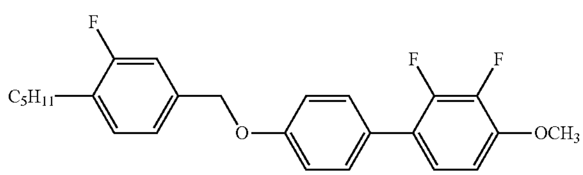 |
| 1091 | 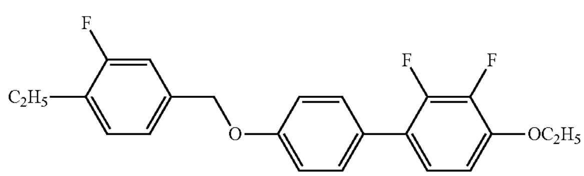 |
| 1092 | 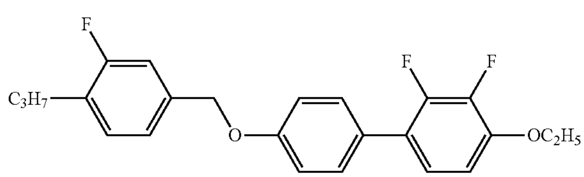 |
| 1093 | 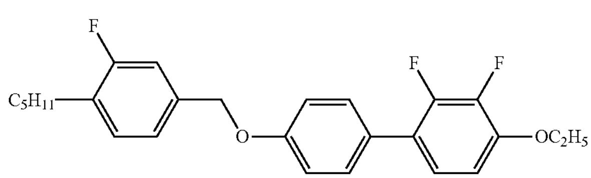 |
| 1094 | 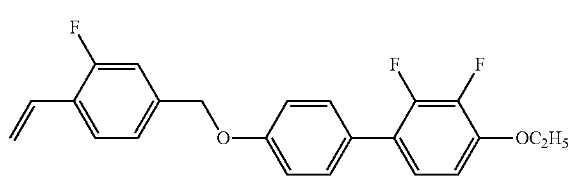 |

-continued
| No. | |
|---|---|
| 1095 | 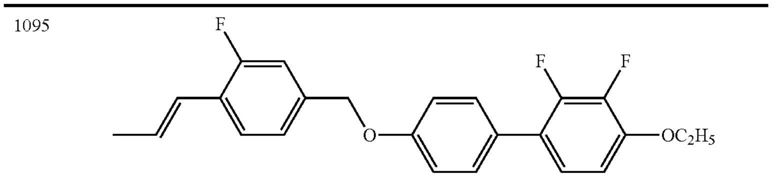 |
| 1096 | 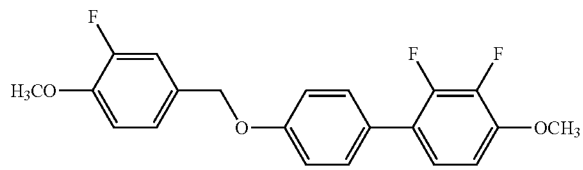 |
| 1097 | 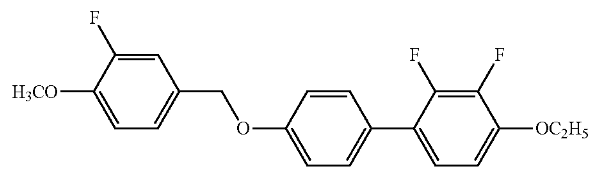 |
| 1098 | 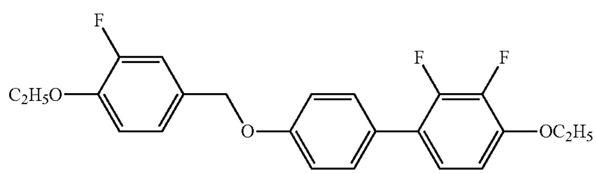 |
| 1099 | 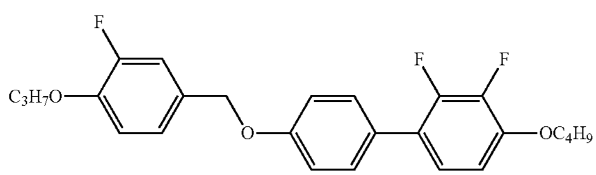 |
| 1100 | 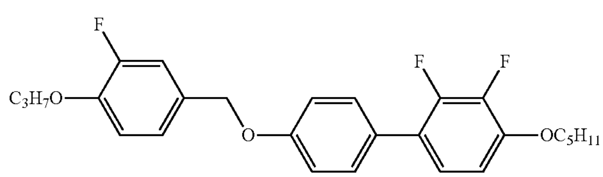 |
| 1101 | 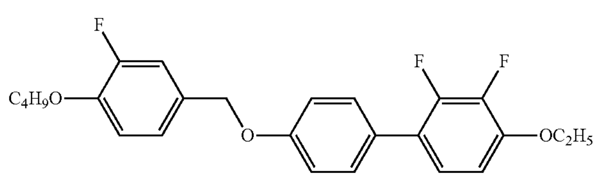 |
| 1102 | 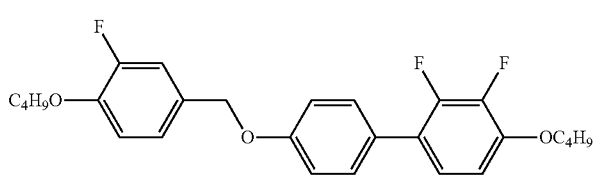 |
| 1103 | 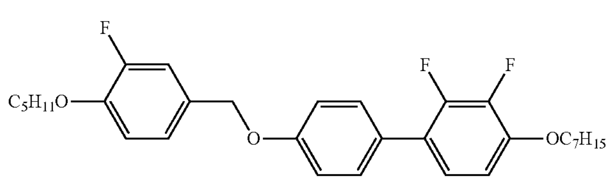 |

-continued
No.
1104
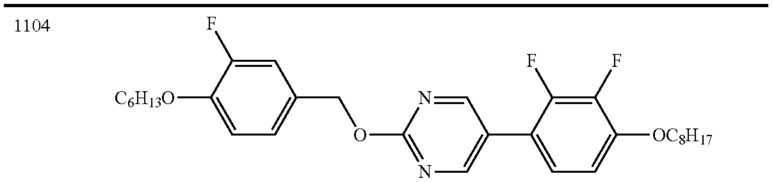
1105
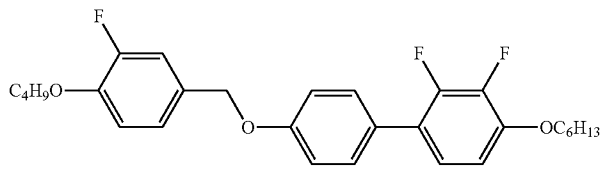
1106
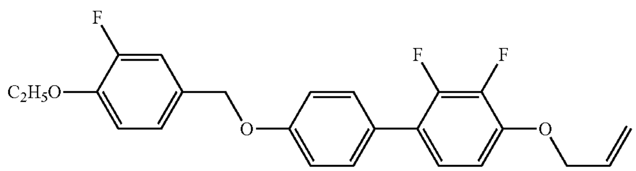
1107
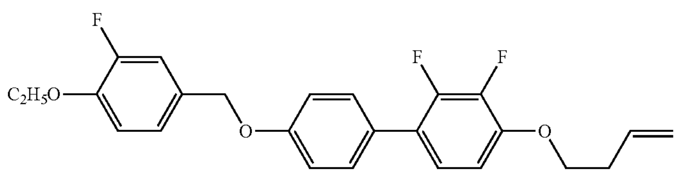
1108
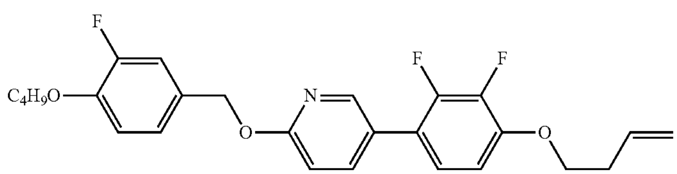
1109
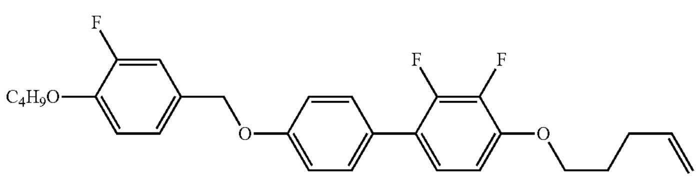
1110
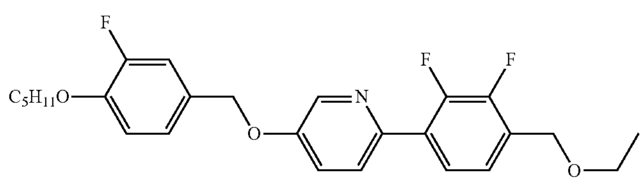
1111
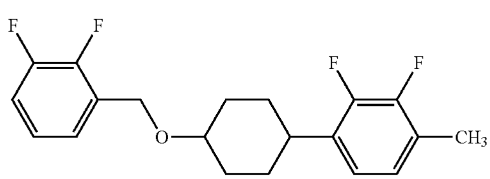
1112
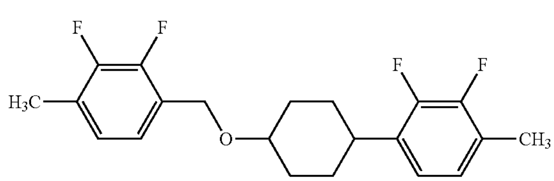

-continued
| No. | |
|---|---|
| 1113 | 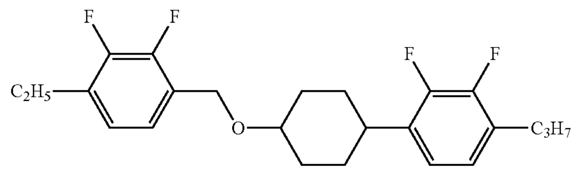 |
| 1114 | 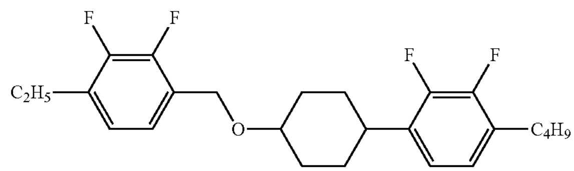 |
| 1115 | 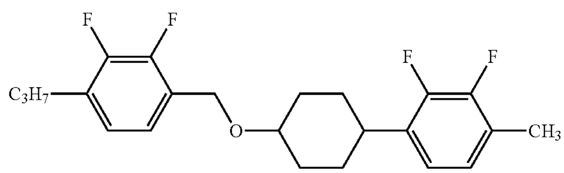 |
| 1116 | 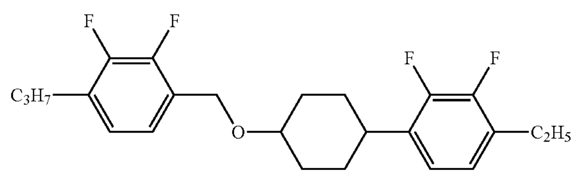 |
| 1117 | 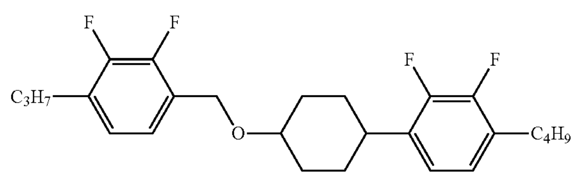 |
| 1118 | 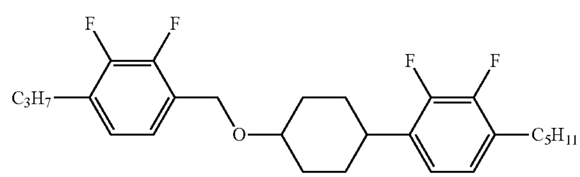 |
| 1119 | 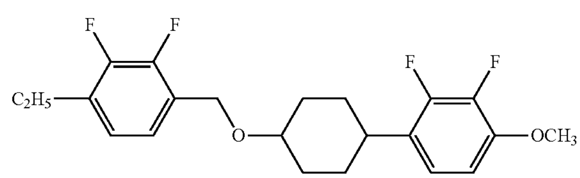 |
| 1120 | 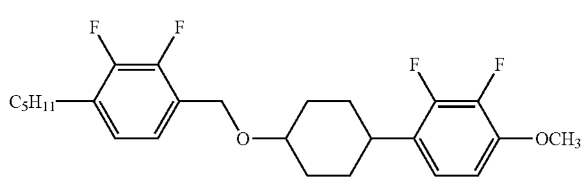 |
| 1121 | 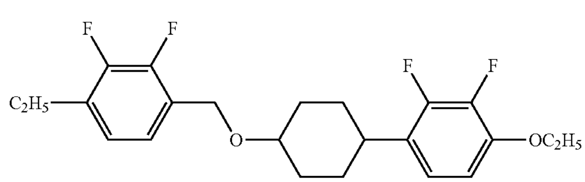 |

-continued
| No. | |
|---|---|
| 1122 | 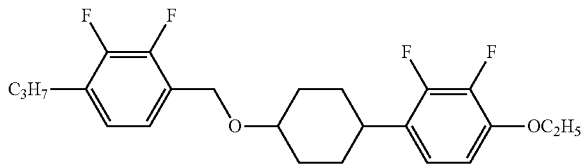 |
| 1123 | 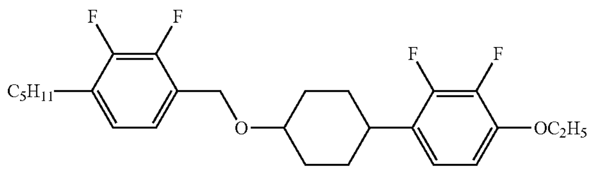 |
| 1124 | 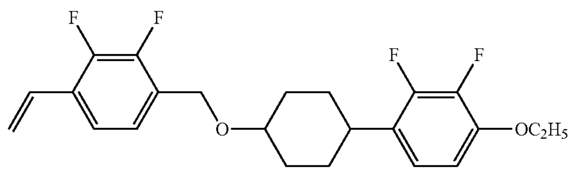 |
| 1125 | 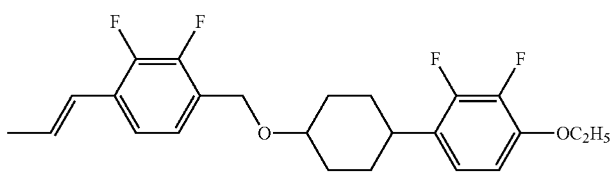 |
| 1126 | 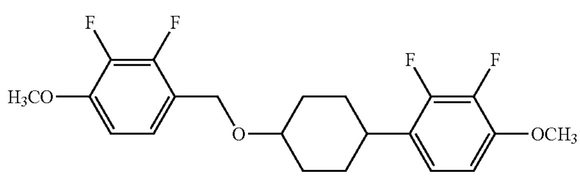 |
| 1127 | 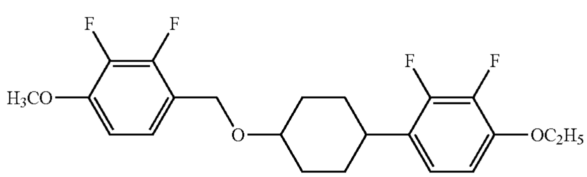 |
| 1128 | 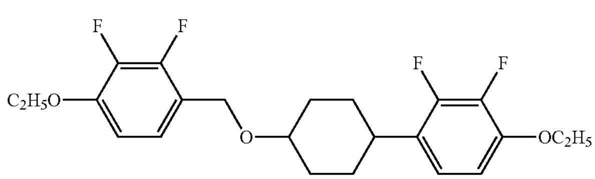 |
| 1129 | 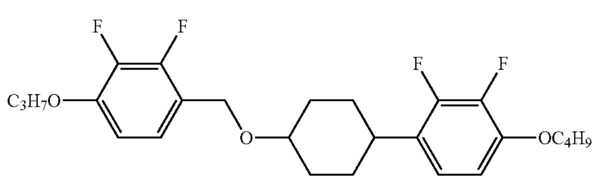 |
| 1130 | 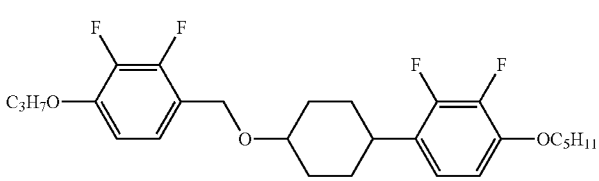 |

-continued
| No. | |
|---|---|
| 1131 | 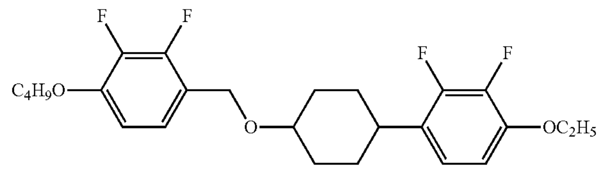 |
| 1132 | 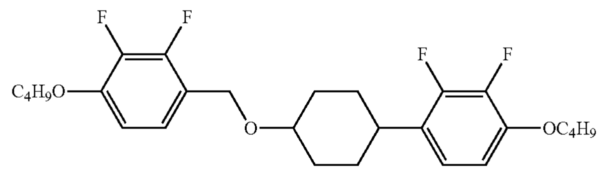 |
| 1133 | 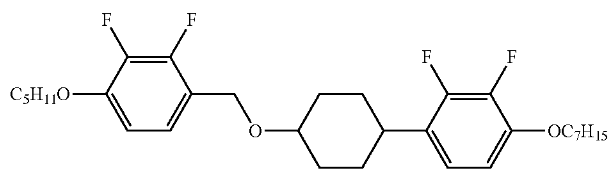 |
| 1134 | 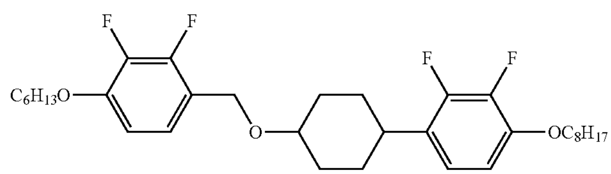 |
| 1135 | 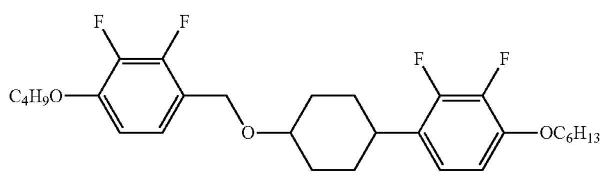 |
| 1136 | 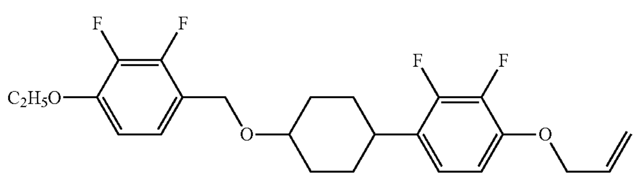 |
| 1137 | 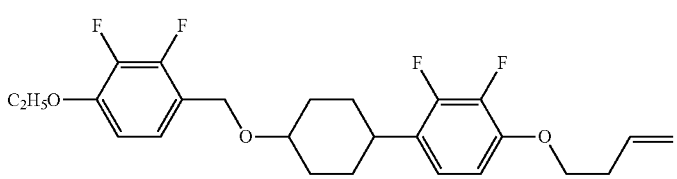 |
| 1138 | 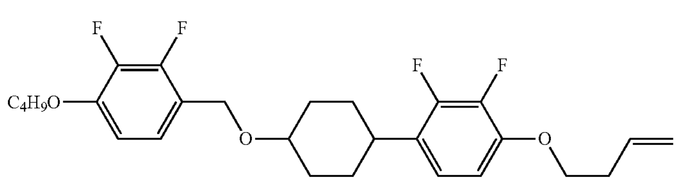 |
| 1139 | 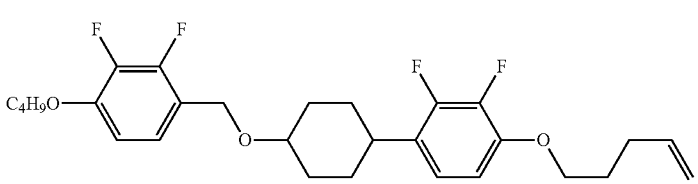 |

-continued
| No. |
|---|
| 1140 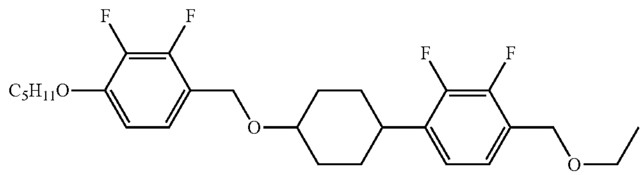 |
| 1141 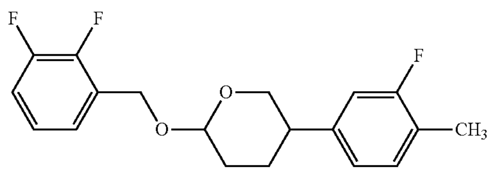 |
| 1142 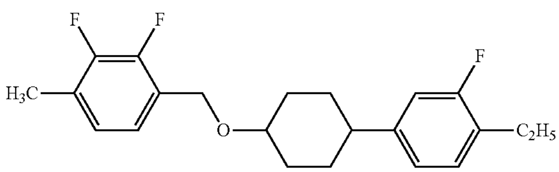 |
| 1143 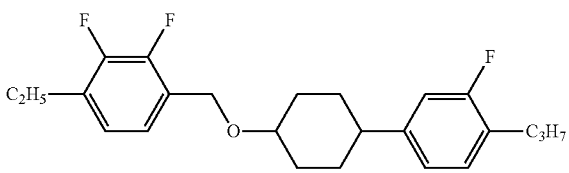 |
| 1144 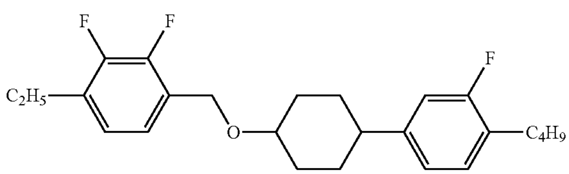 |
| 1145 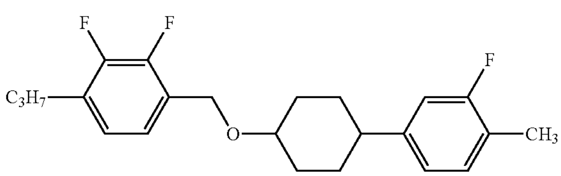 |
| 1146 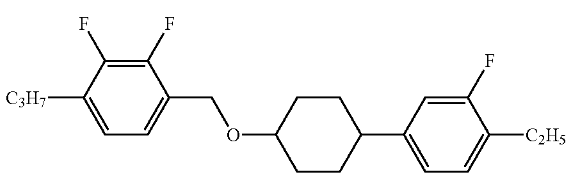 |
| 1147 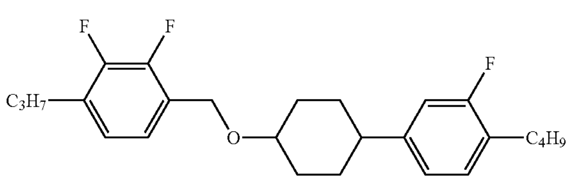 |
| 1148 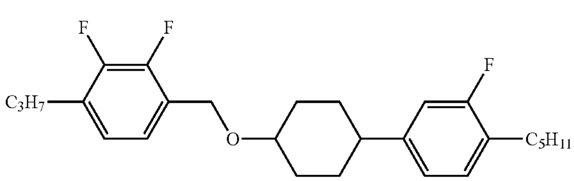 |

-continued
| No. | |
|---|---|
| 1149 | 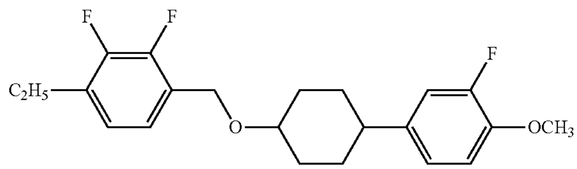 |
| 1150 | 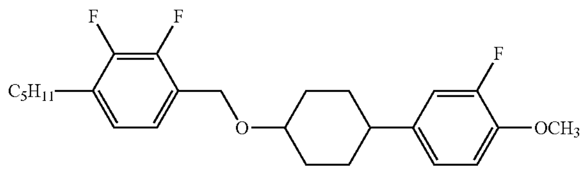 |
| 1151 | 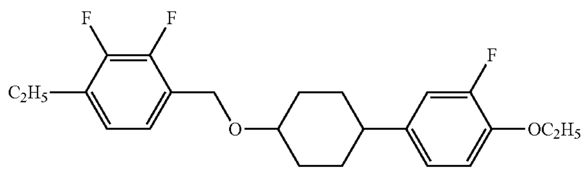 |
| 1152 | 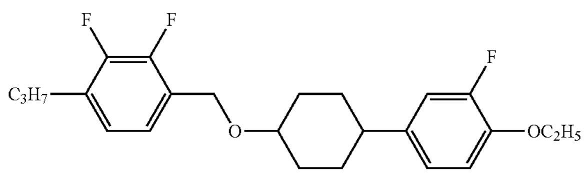 |
| 1153 | 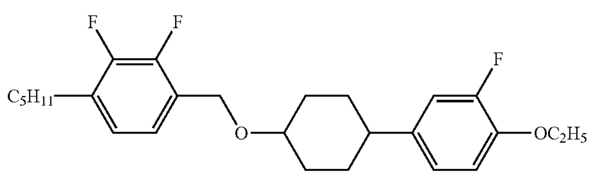 |
| 1154 | 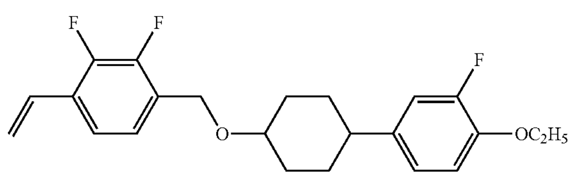 |
| 1155 | 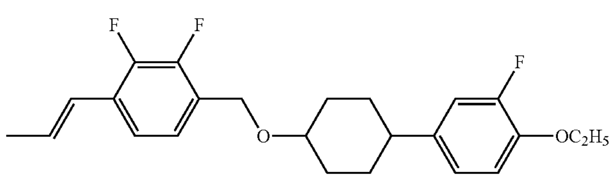 |
| 1156 | 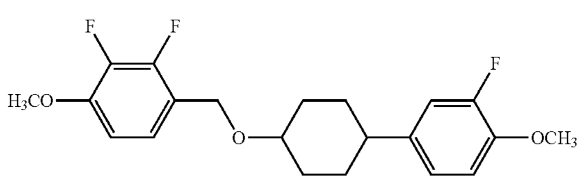 |
| 1157 | 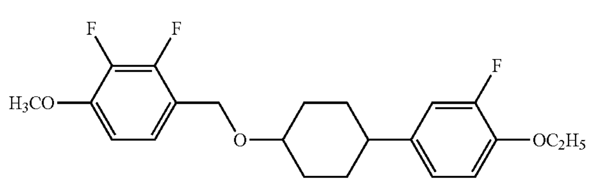 |

-continued
| No. | |
|---|---|
| 1158 | 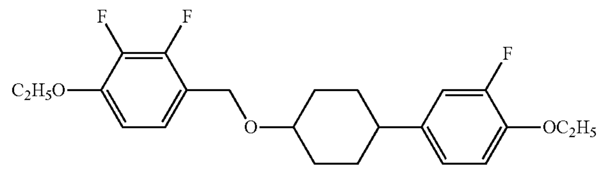 |
| 1159 | 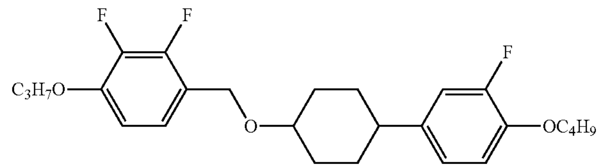 |
| 1160 | 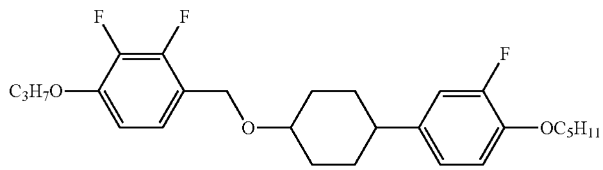 |
| 1161 | 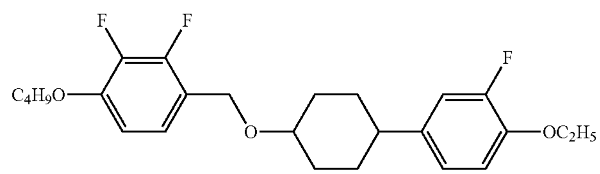 |
| 1162 | 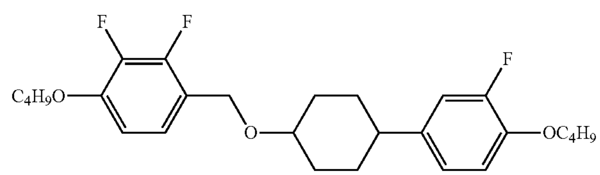 |
| 1163 | 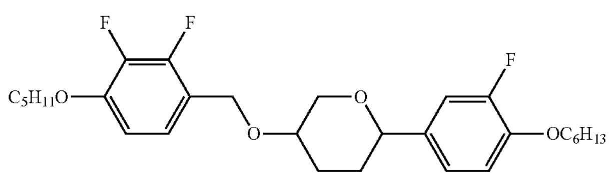 |
| 1164 | 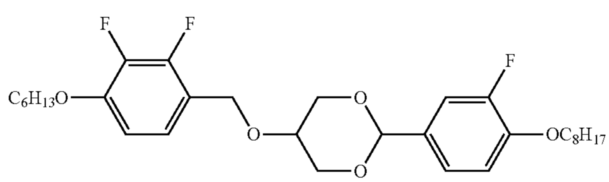 |
| 1165 | 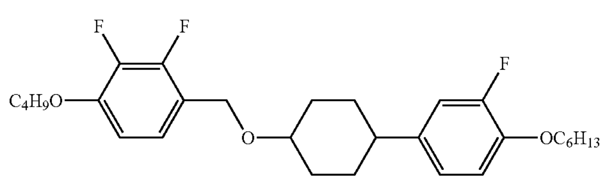 |
| 1166 | 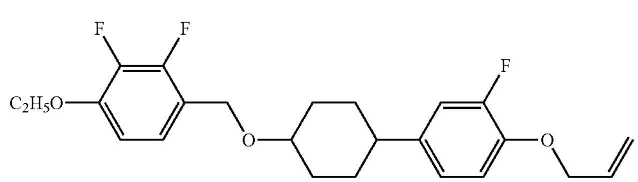 |

-continued
| No. | |
|---|---|
| 1167 | 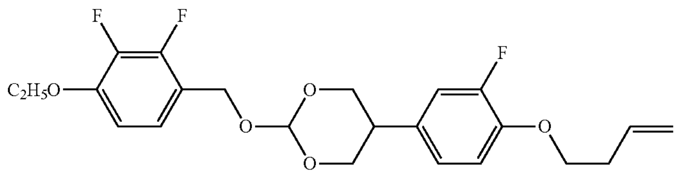 |
| 1168 | 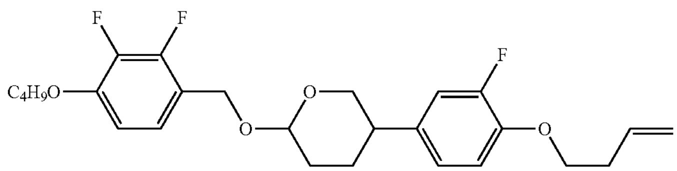 |
| 1169 | 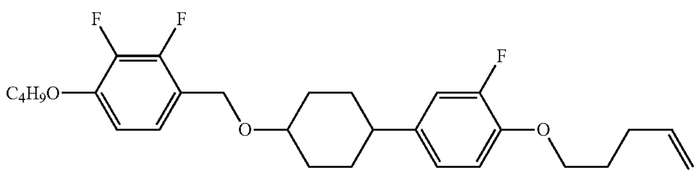 |
| 1170 | 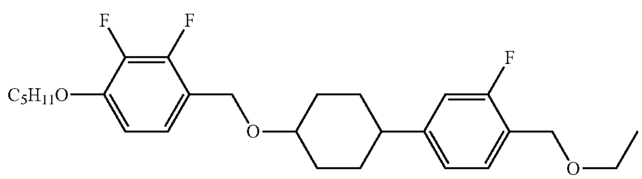 |
| 1171 | 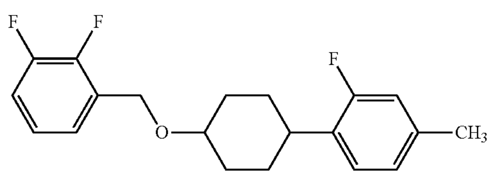 |
| 1172 | 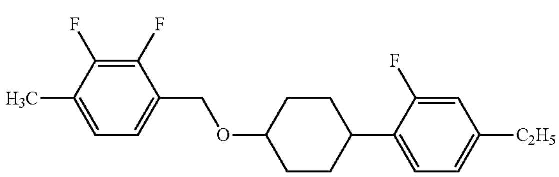 |
| 1173 | 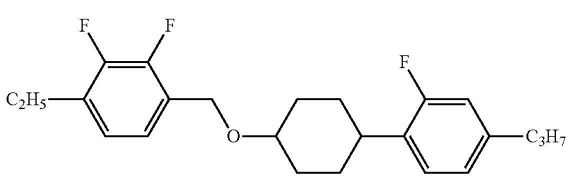 |
| 1174 | 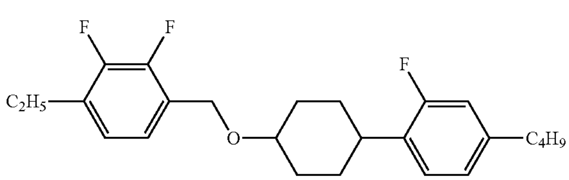 |

-continued
| No. | |
|---|---|
| 1175 | 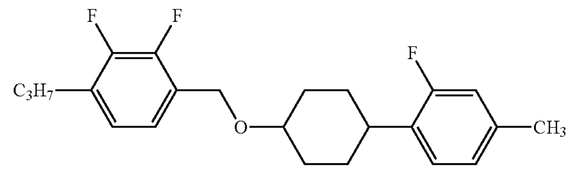 |
| 1176 | 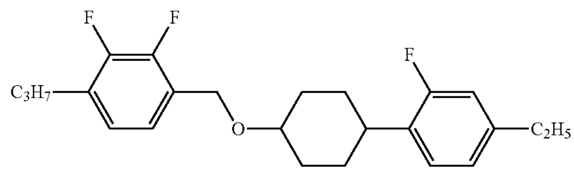 |
| 1177 | 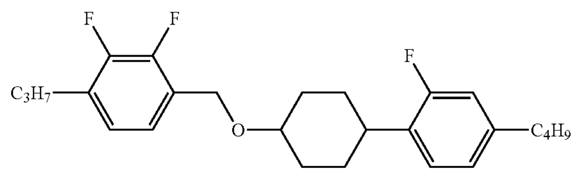 |
| 1178 | 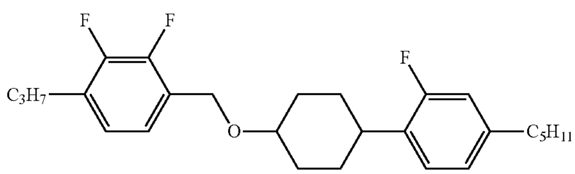 |
| 1179 | 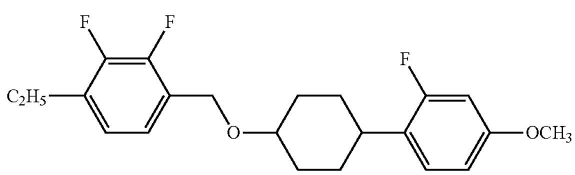 |
| 1180 | 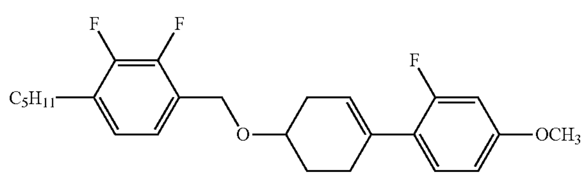 |
| 1181 | 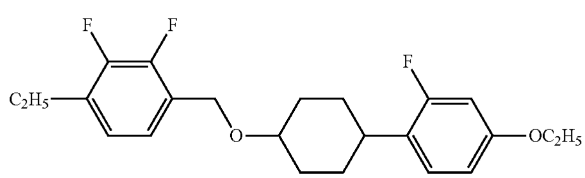 |
| 1182 | 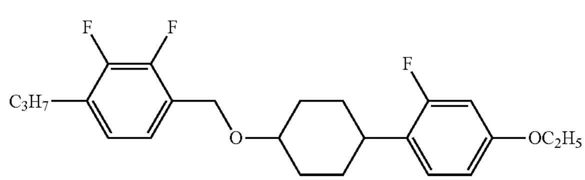 |
| 1183 | 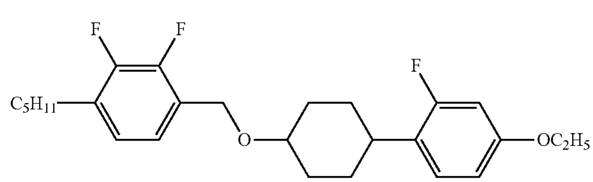 |

-continued
| No. | |
|---|---|
| 1184 | 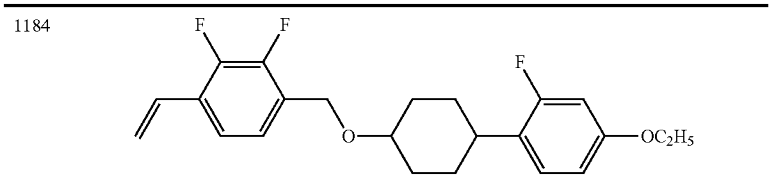 |
| 1185 | 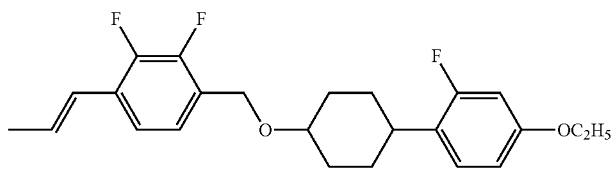 |
| 1186 | 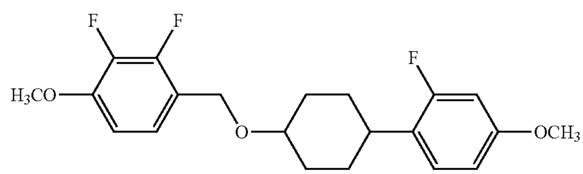 |
| 1187 | 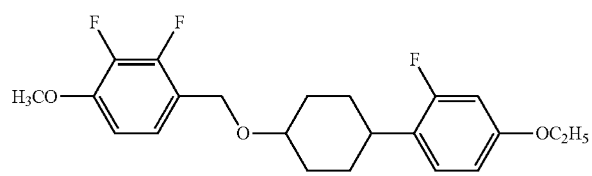 |
| 1188 | 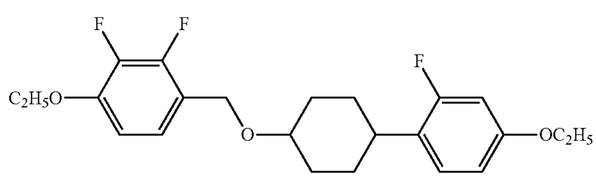 |
| 1189 | 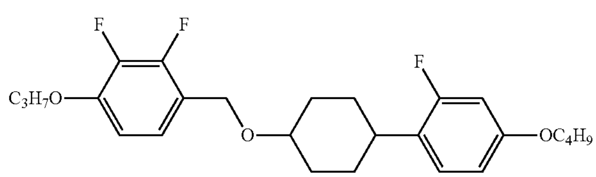 |
| 1190 | 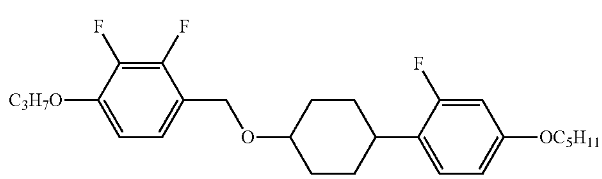 |
| 1191 | 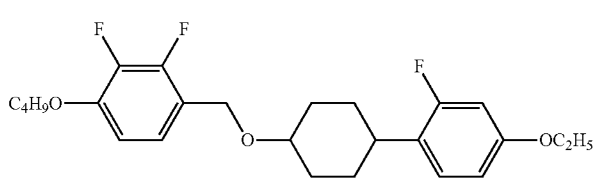 |
| 1192 | 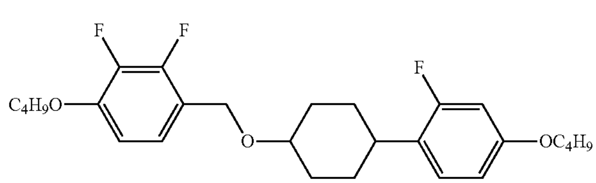 |

-continued
| No. | |
|---|---|
| 1193 | 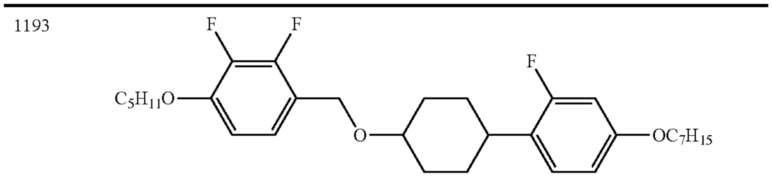 |
| 1194 | 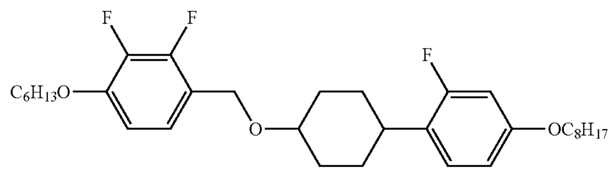 |
| 1195 | 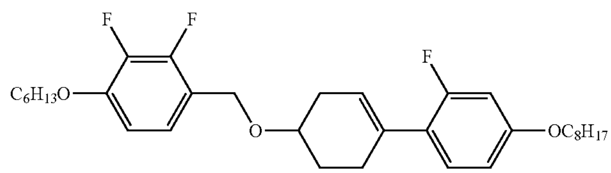 |
| 1196 | 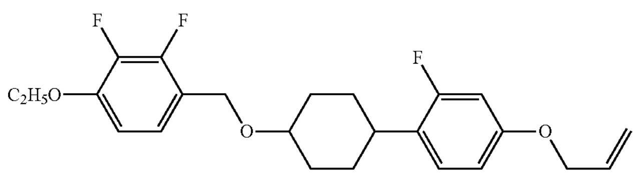 |
| 1197 | 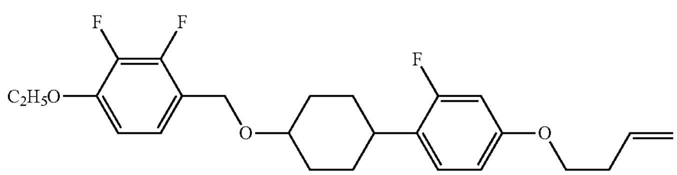 |
| 1198 | 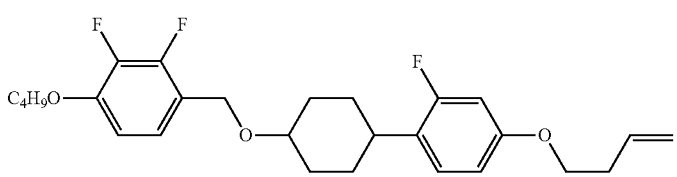 |
| 1199 | 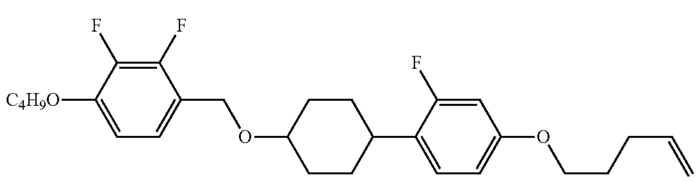 |
| 1200 | 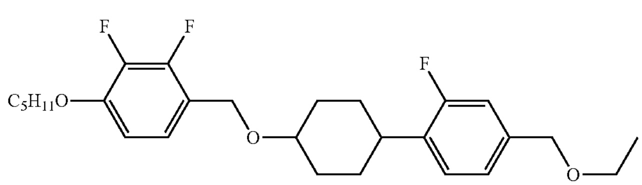 |
| 1201 | 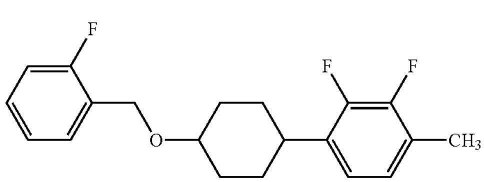 |

-continued
| No. | |
|---|---|
| 1202 | 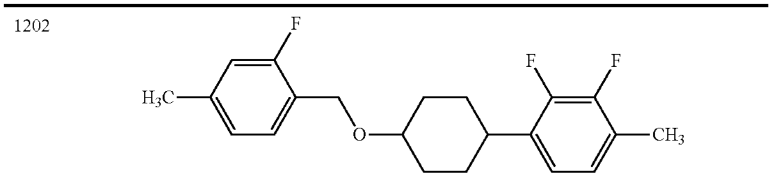 |
| 1203 | 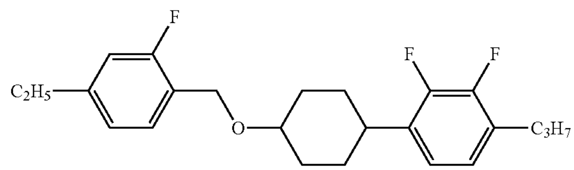 |
| 1204 | 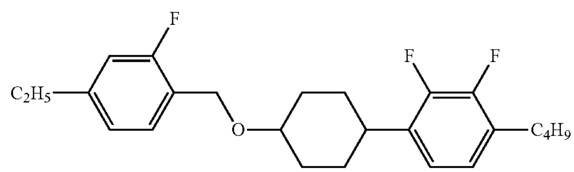 |
| 1205 | 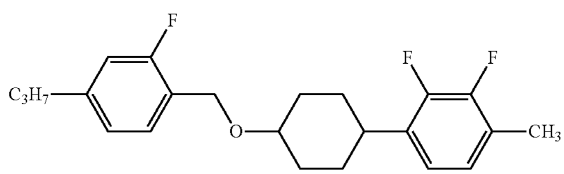 |
| 1206 | 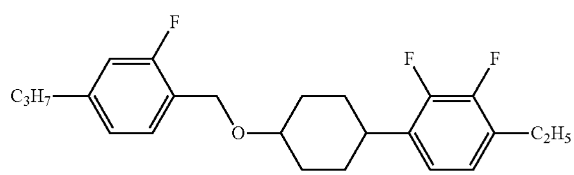 |
| 1207 | 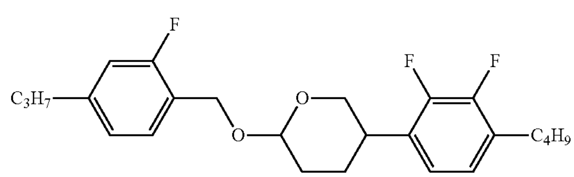 |
| 1208 | 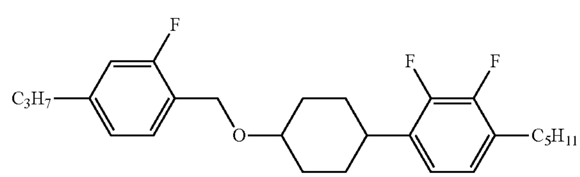 |
| 1209 | 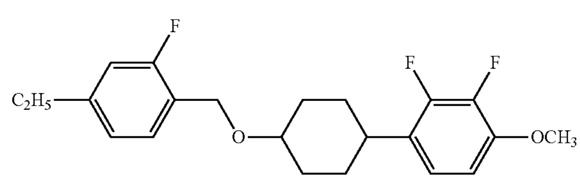 |
| 1210 | 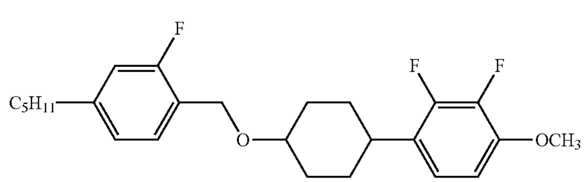 |

-continued
No.
1211
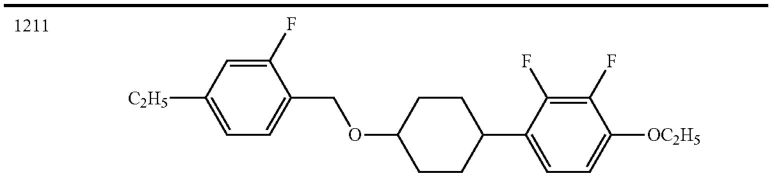
1212
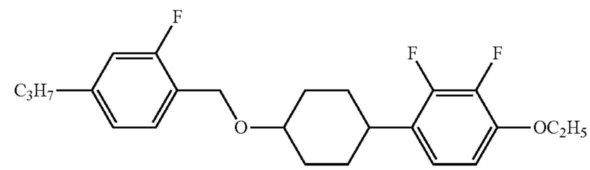
1213
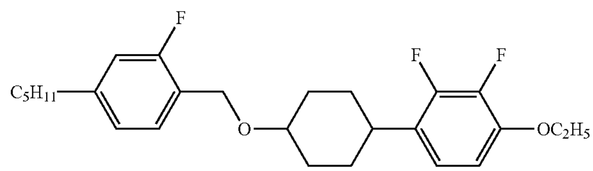
1214
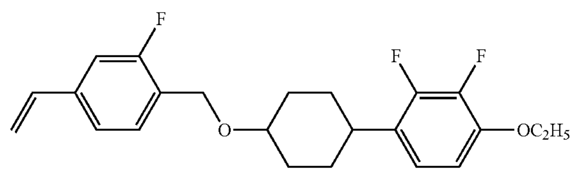
1215
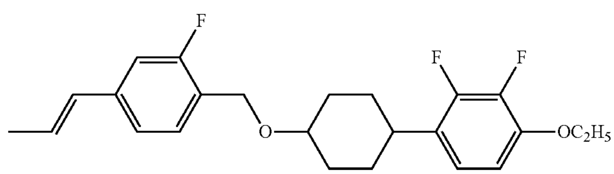
1216
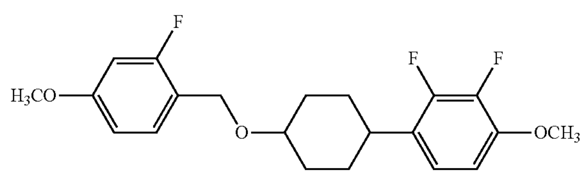
1217
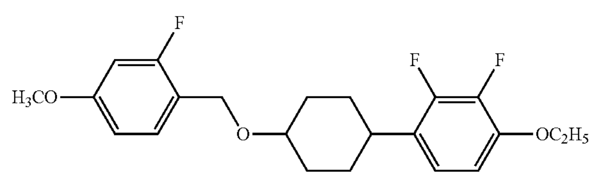
1218
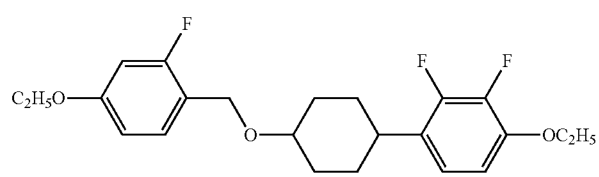
1219
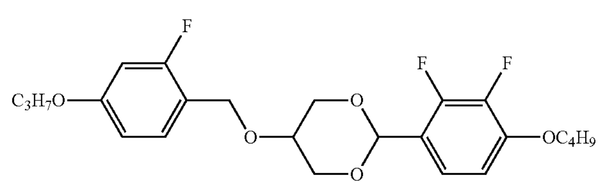

-continued
No.
1220
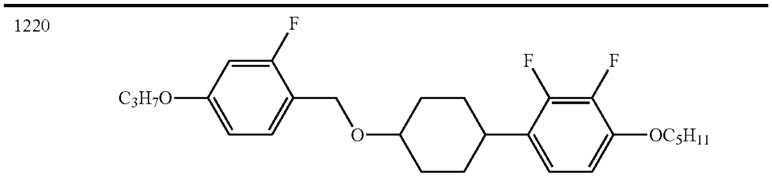
1221
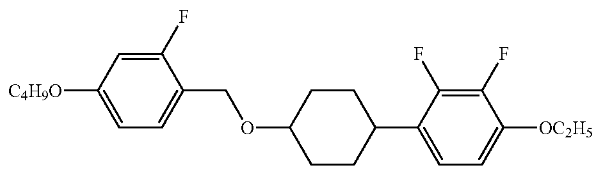
1222
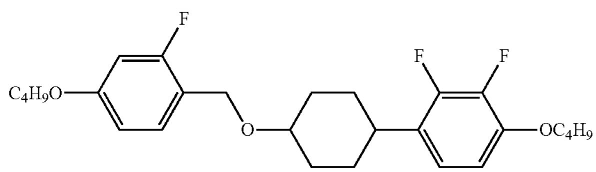
1223
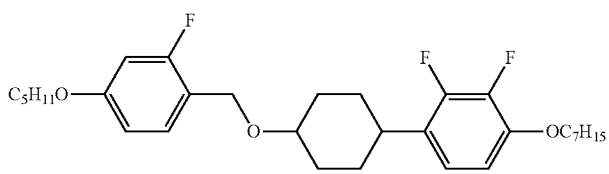
1224
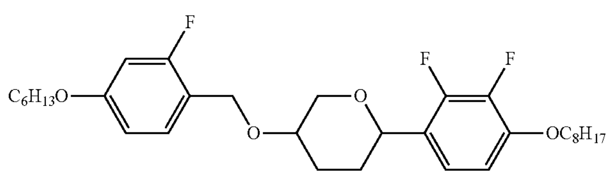
1225
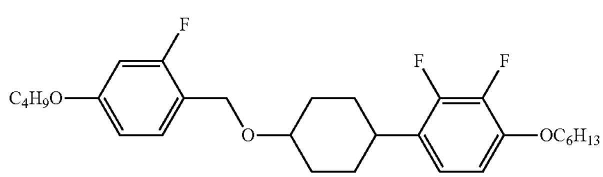
1226
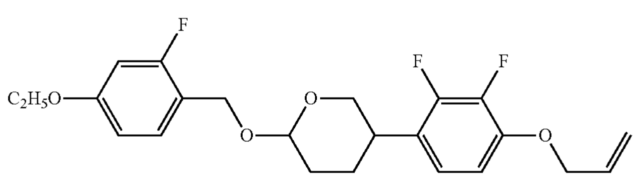
1227
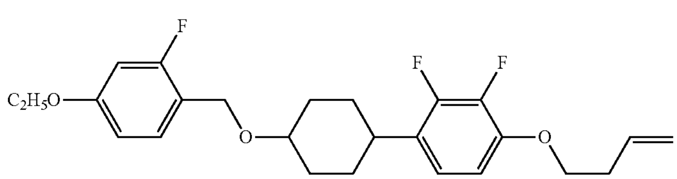
1228
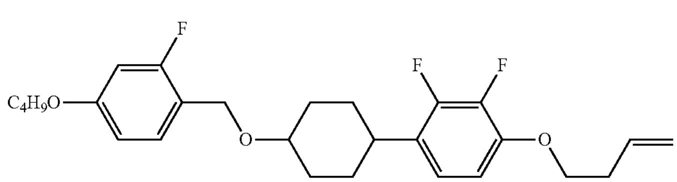

-continued
| No. | |
|---|---|
| 1229 | 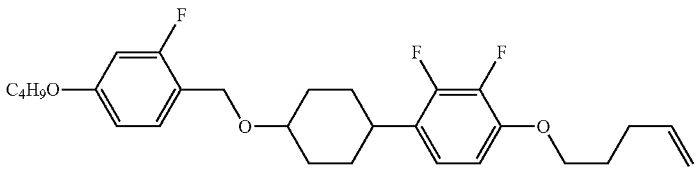 |
| 1230 | 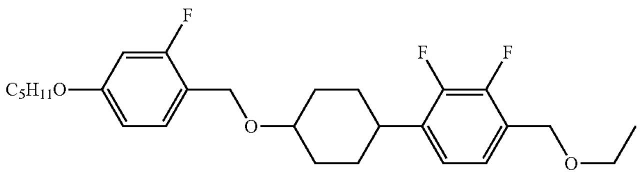 |
| 1231 | 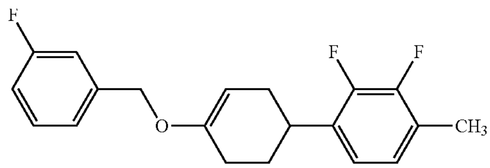 |
| 1232 | 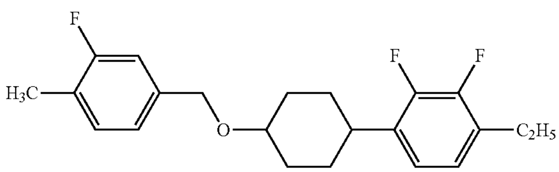 |
| 1233 | 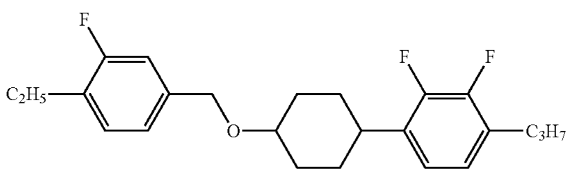 |
| 1234 | 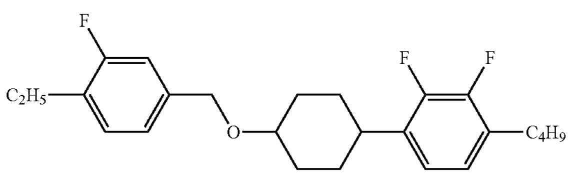 |
| 1235 | 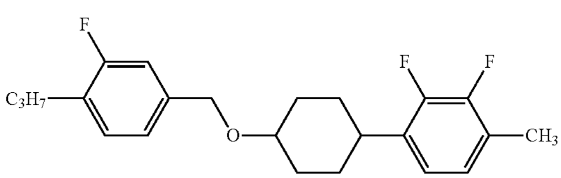 |
| 1236 | 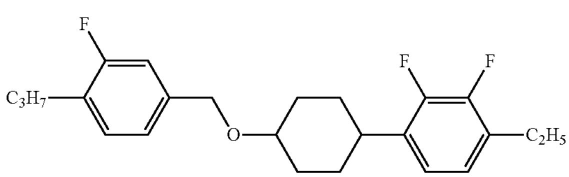 |
| 1237 | 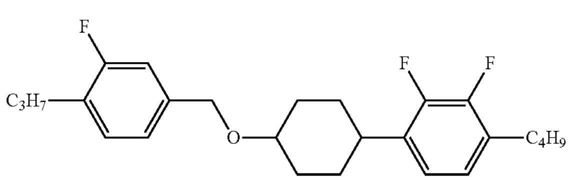 |

-continued
No.
1238
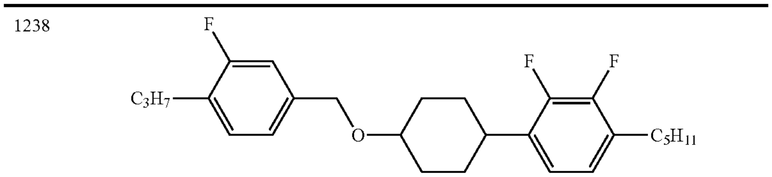
1239
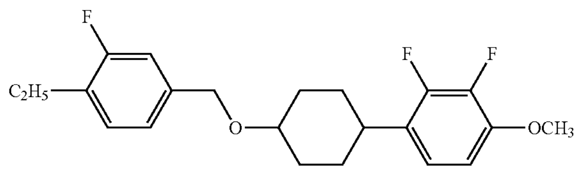
1240
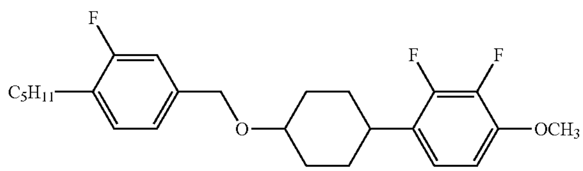
1241
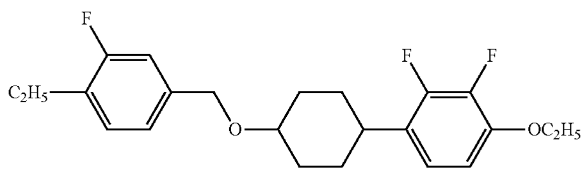
1242
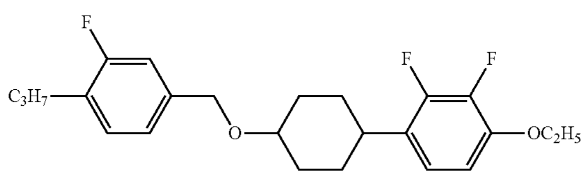
1243
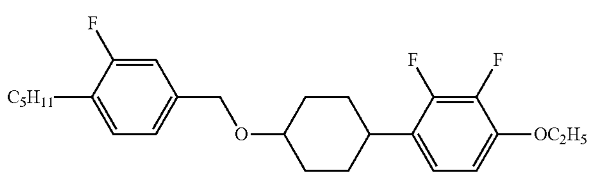
1244
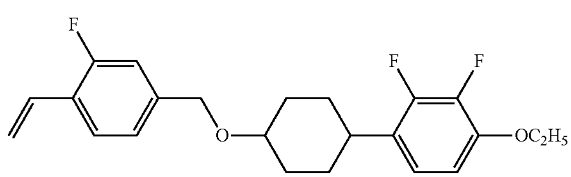
1245
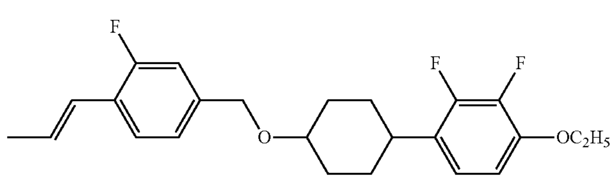
1246
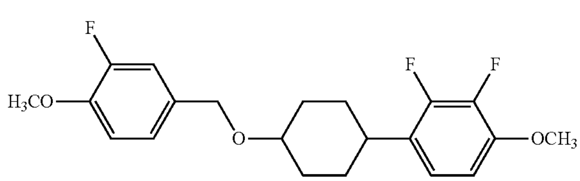

-continued
| No. |
| --- |
1247
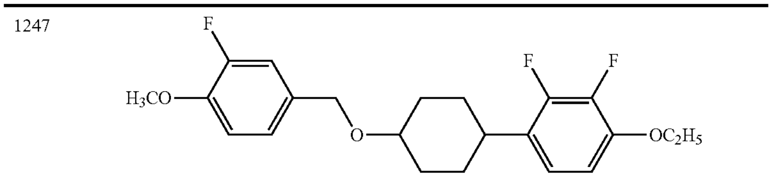
1248
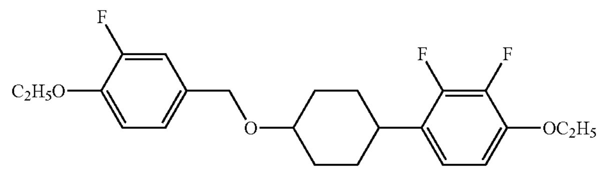
1249
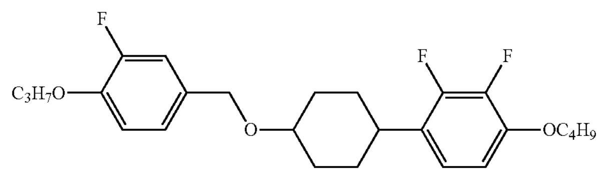
1250
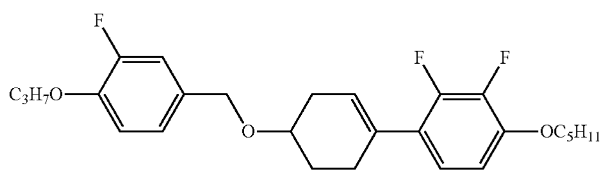
1251
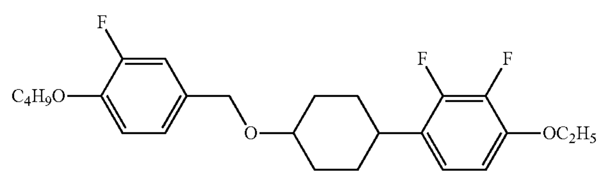
1252
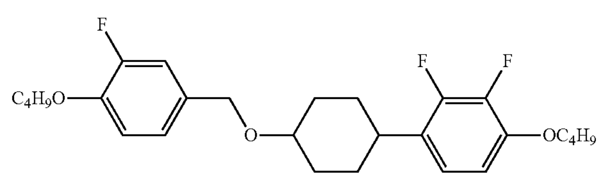
1253
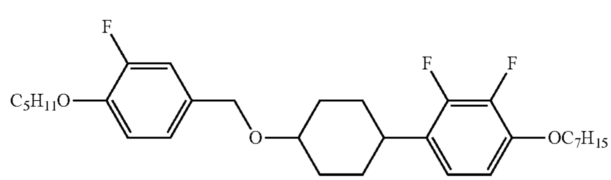
1254
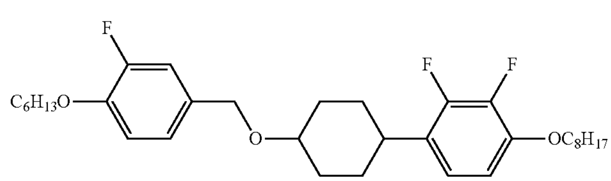
1255
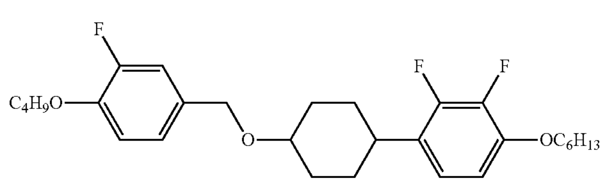

-continued
No.
1256
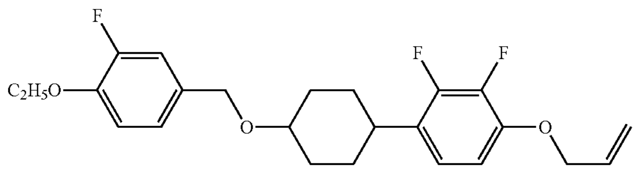
1257
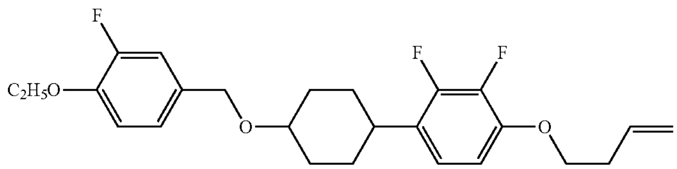
1258
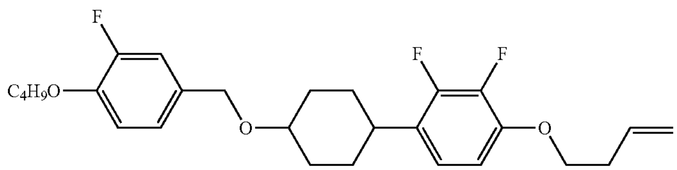
1259
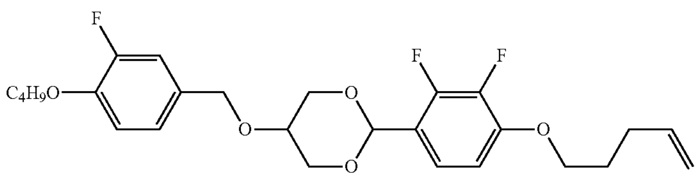
1260
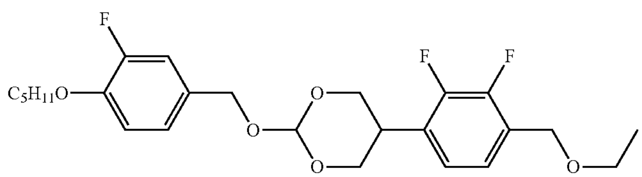
1261
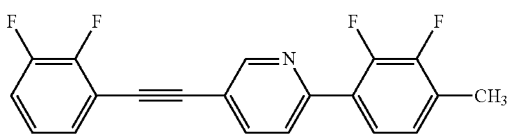
1262
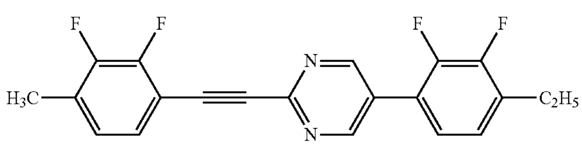
1263
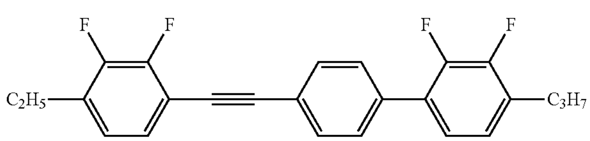
1264
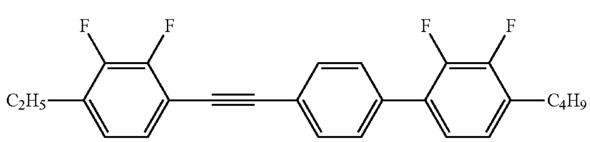
1265
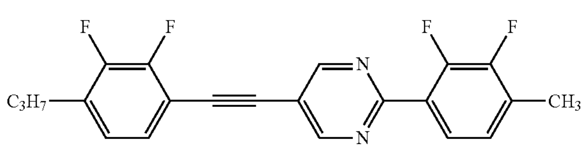

-continued
| No. | |
|---|---|
| 1266 | 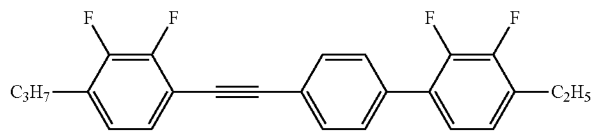 |
| 1267 | 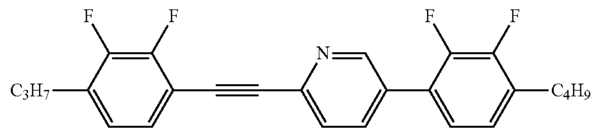 |
| 1268 | 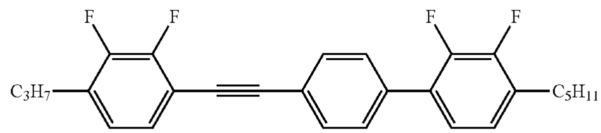 |
| 1269 | 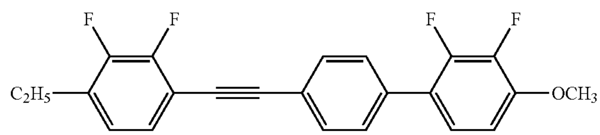 |
| 1270 | 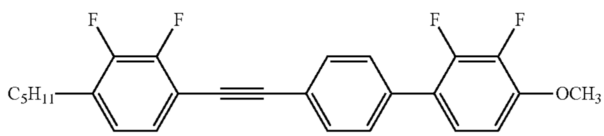 |
| 1271 | 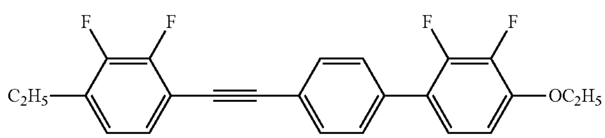 |
| 1272 | 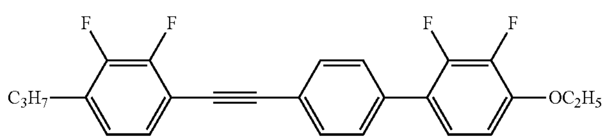 |
| 1273 | 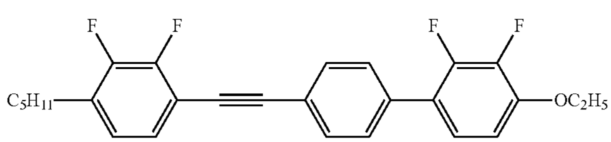 |
| 1274 | 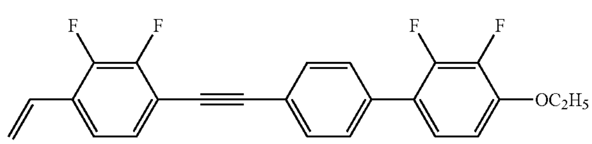 |
| 1275 | 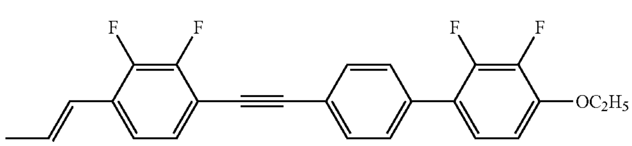 |
| 1276 | 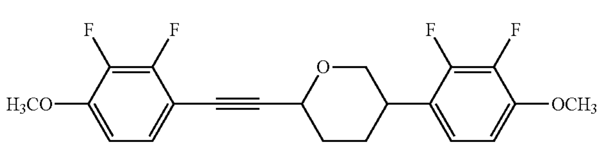 |

-continued
| No. | |
|---|---|
| 1277 | 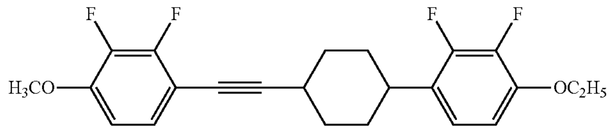 |
| 1278 | 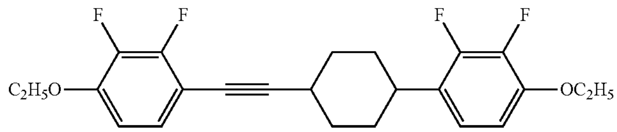 |
| 1279 | 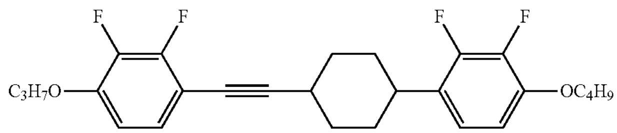 |
| 1280 | 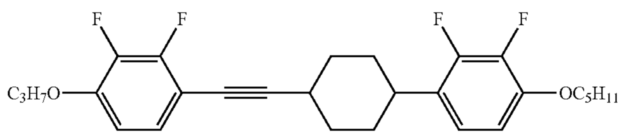 |
| 1281 | 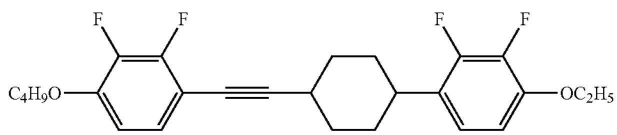 |
| 1282 | 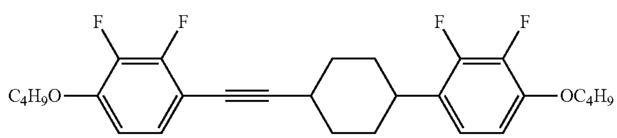 |
| 1283 | 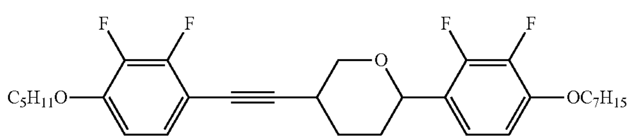 |
| 1284 | 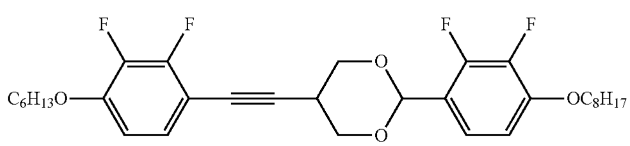 |
| 1285 | 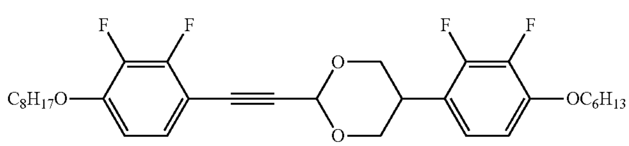 |
| 1286 | 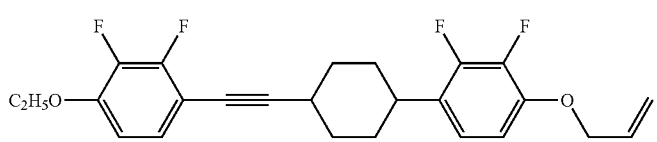 |
| 1287 | 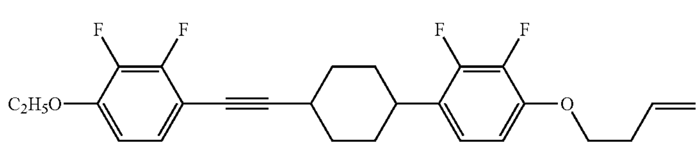 |

-continued
| No. | |
|---|---|
| 1288 | 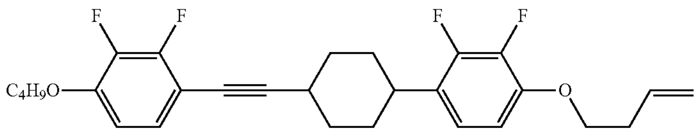 |
| 1289 | 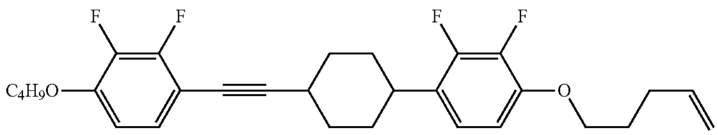 |
| 1290 | 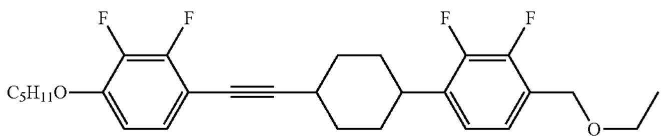 |
| 1291 | 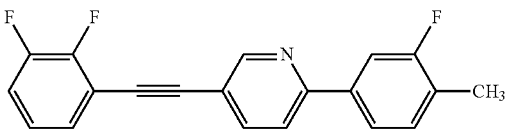 |
| 1292 | 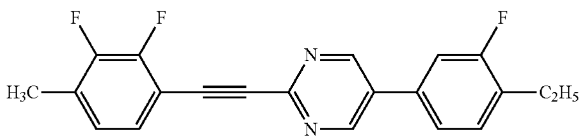 |
| 1293 | 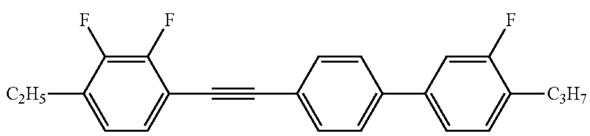 |
| 1294 | 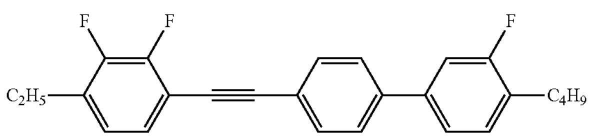 |
| 1295 | 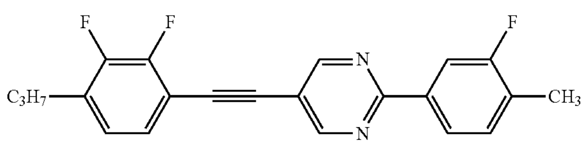 |
| 1296 | 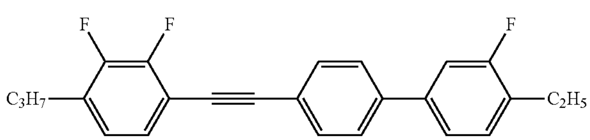 |
| 1297 | 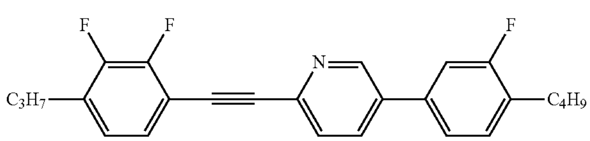 |
| 1298 | 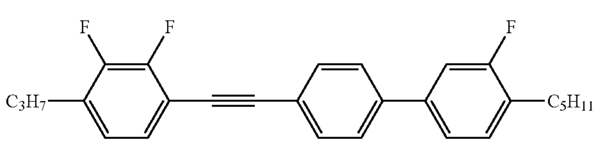 |

-continued
No.
1299
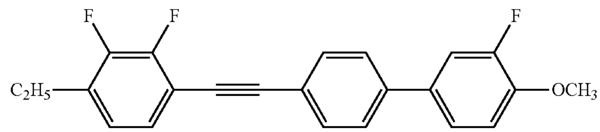
1300
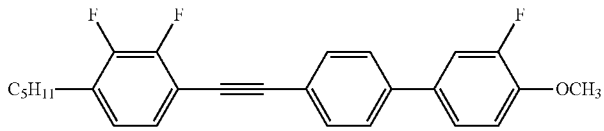
1301
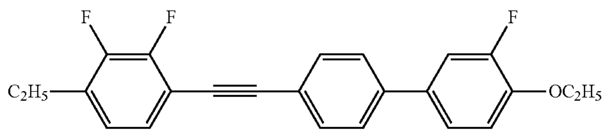
1302
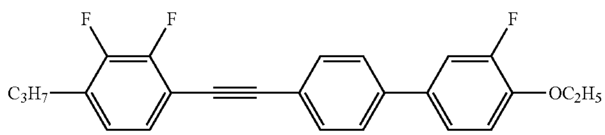
1303
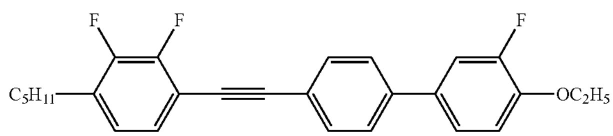
1304
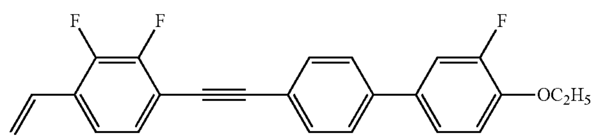
1305
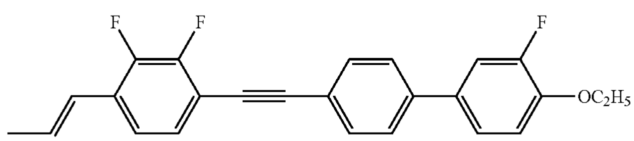
1306
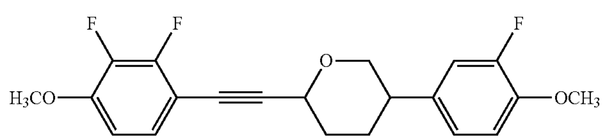
1307
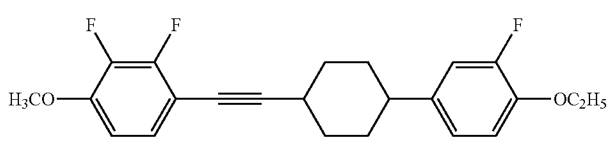
1308
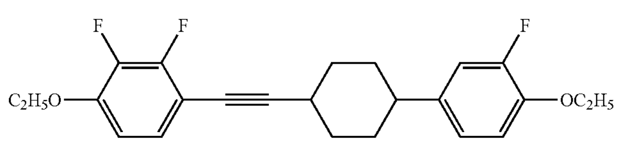
1309
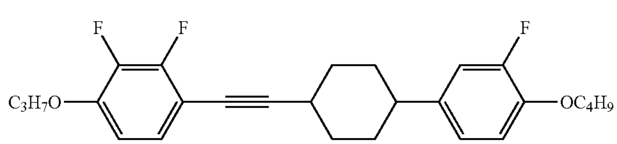

-continued
| No. | |
|---|---|
| 1310 | 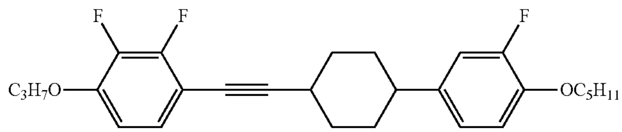 |
| 1311 | 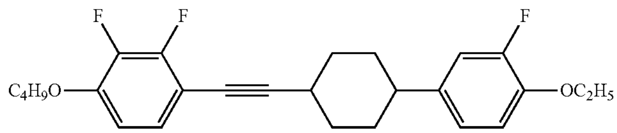 |
| 1312 | 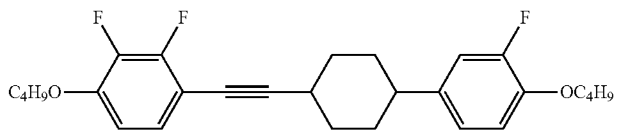 |
| 1313 | 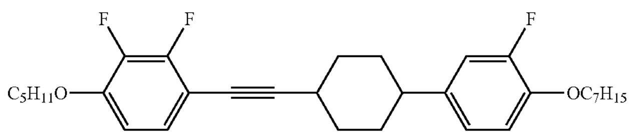 |
| 1314 | 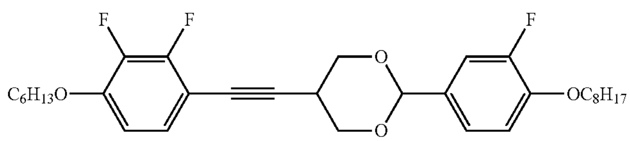 |
| 1315 | 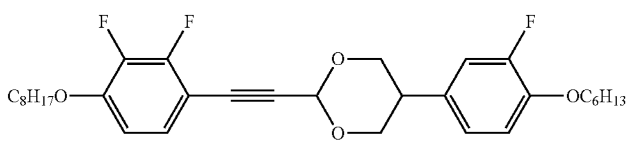 |
| 1316 | 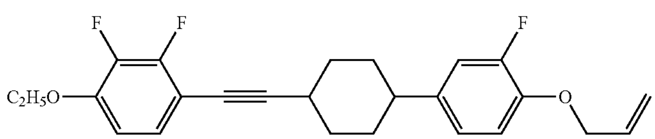 |
| 1317 | 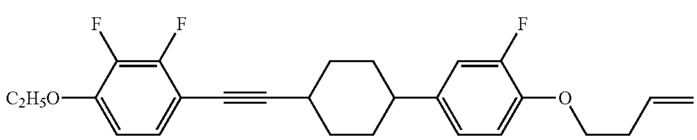 |
| 1318 | 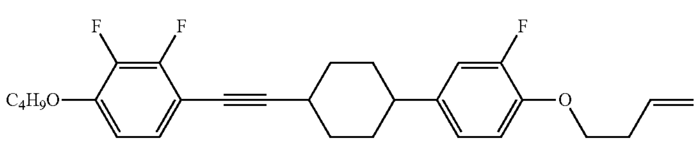 |
| 1319 | 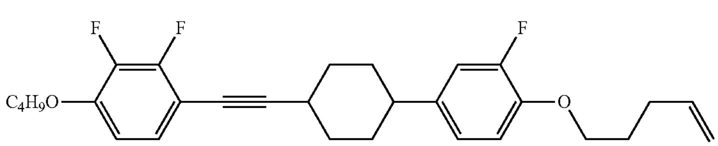 |
| 1320 | 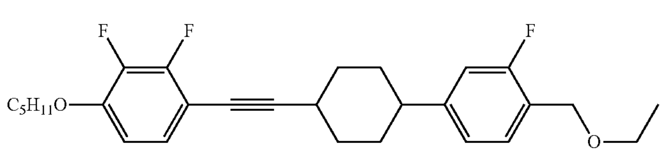 |

-continued
| No. | |
|---|---|
| 1321 | 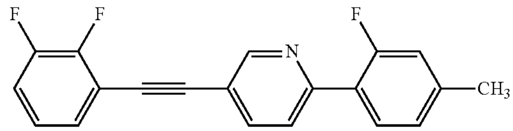 |
| 1322 | 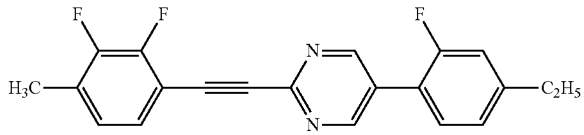 |
| 1323 | 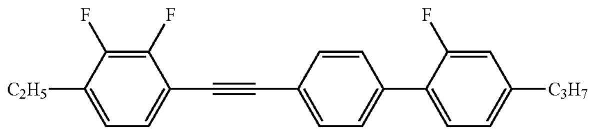 |
| 1324 | 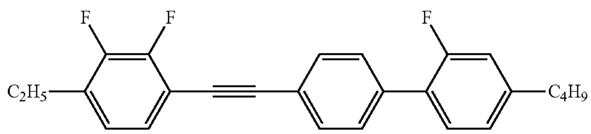 |
| 1325 | 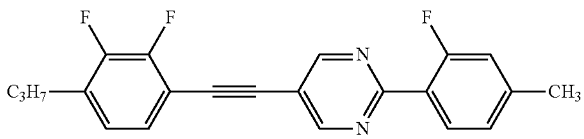 |
| 1326 | 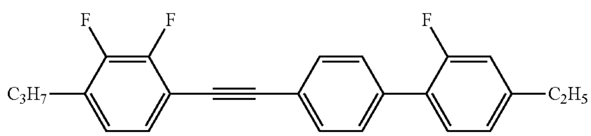 |
| 1327 | 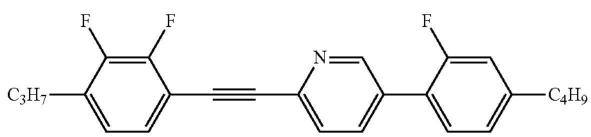 |
| 1328 | 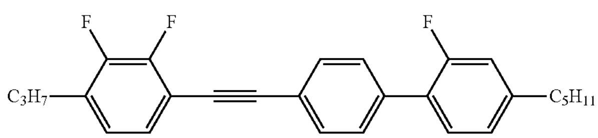 |
| 1329 | 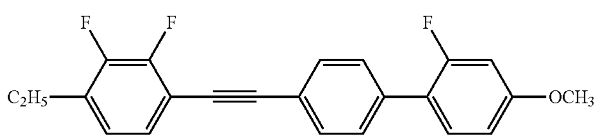 |
| 1330 | 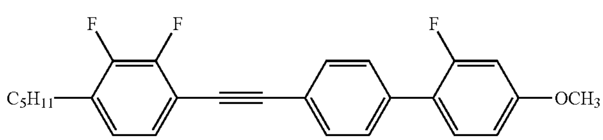 |
| 1331 | 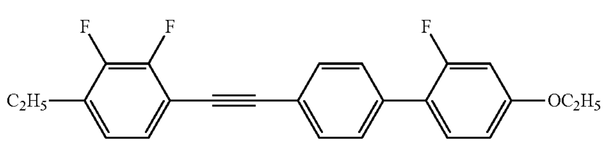 |

-continued
| No. | |
|---|---|
| 1332 | 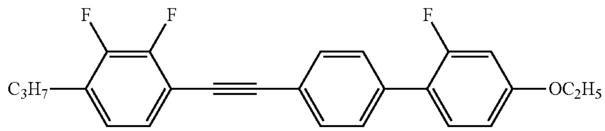 |
| 1333 | 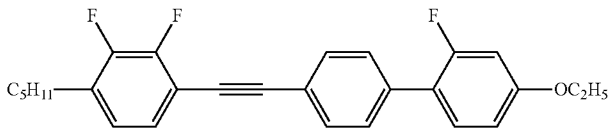 |
| 1334 | 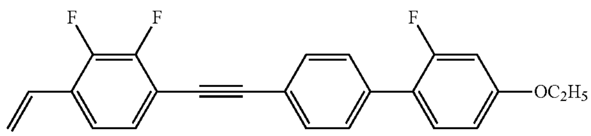 |
| 1335 | 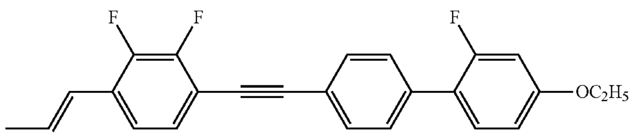 |
| 1336 | 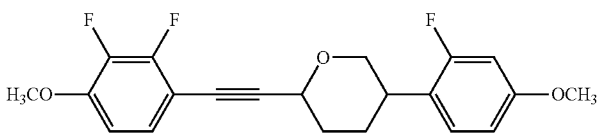 |
| 1337 | 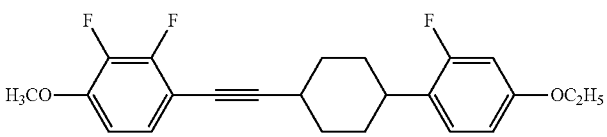 |
| 1338 | 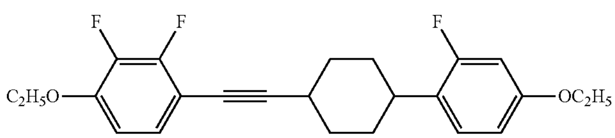 |
| 1339 | 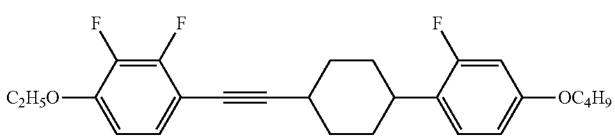 |
| 1340 | 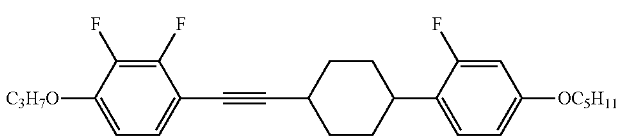 |
| 1341 | 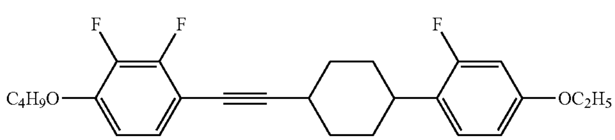 |
| 1342 | 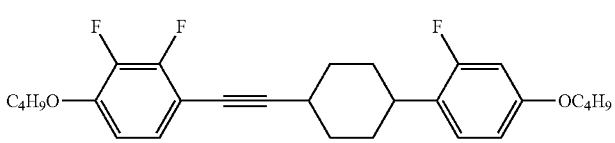 |

-continued
| No. | |
|---|---|
| 1343 | 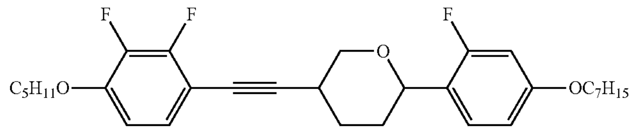 |
| 1344 | 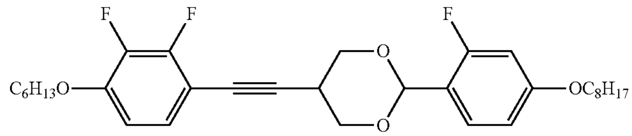 |
| 1345 | 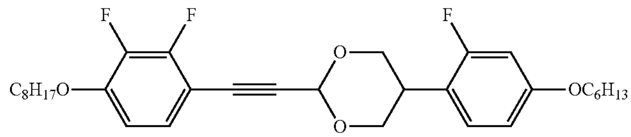 |
| 1346 | 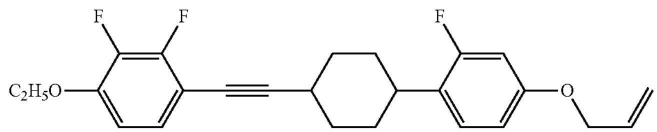 |
| 1347 | 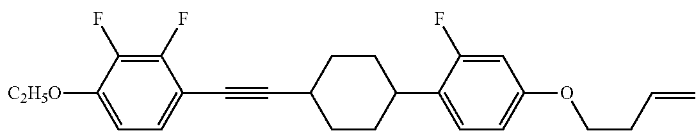 |
| 1348 | 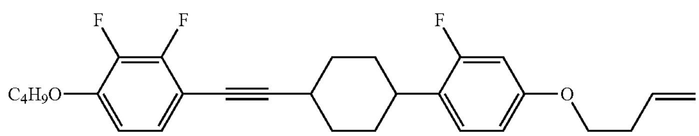 |
| 1349 | 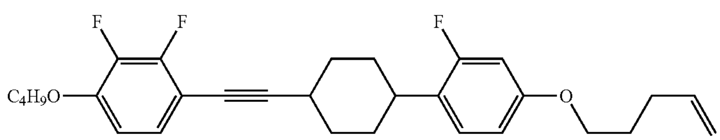 |
| 1350 | 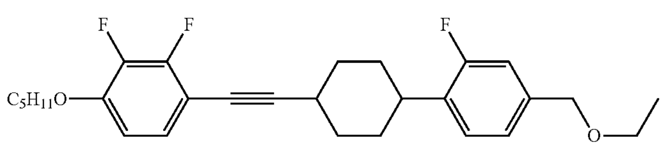 |
| 1351 | 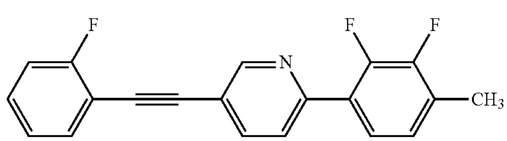 |
| 1352 | 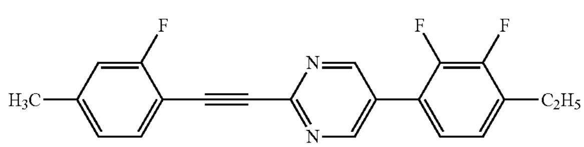 |
| 1353 | 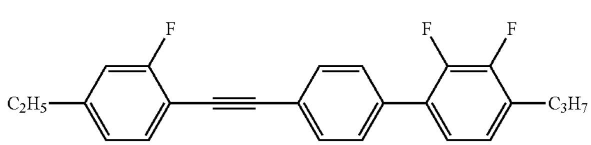 |

-continued
| No. | |
|---|---|
| 1354 | 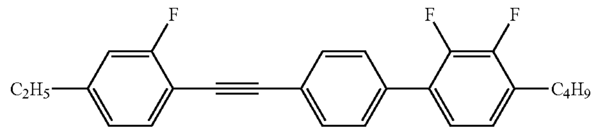 |
| 1355 | 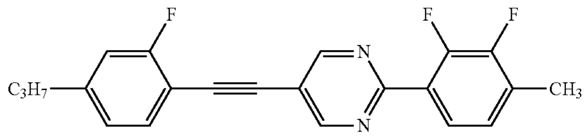 |
| 1356 | 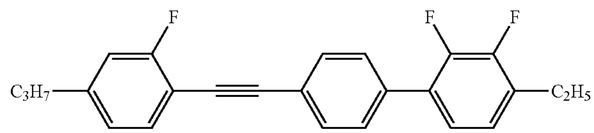 |
| 1357 | 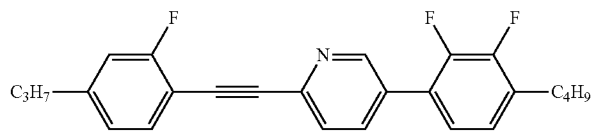 |
| 1358 | 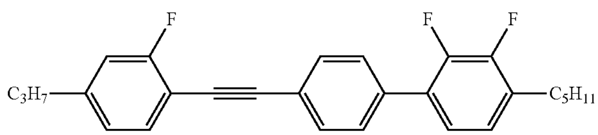 |
| 1359 | 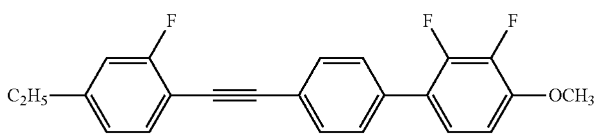 |
| 1360 | 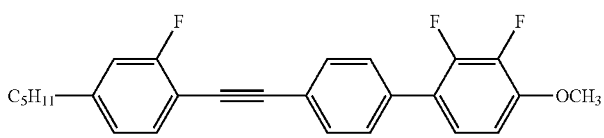 |
| 1361 | 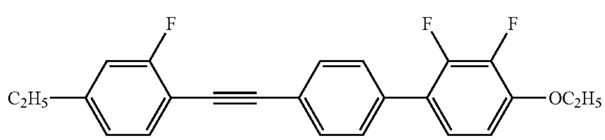 |
| 1362 | 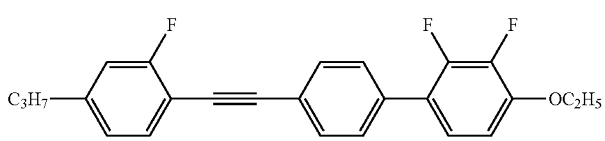 |
| 1363 | 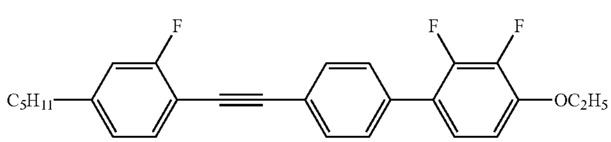 |
| 1364 | 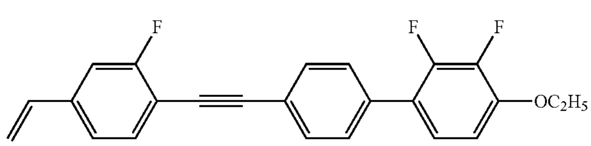 |

-continued
| No. | |
|---|---|
| 1365 | 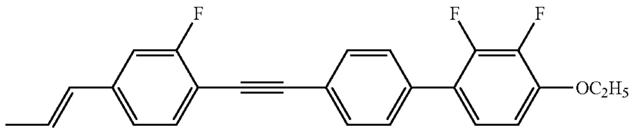 |
| 1366 | 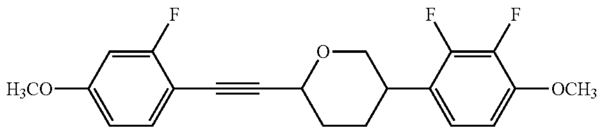 |
| 1367 | 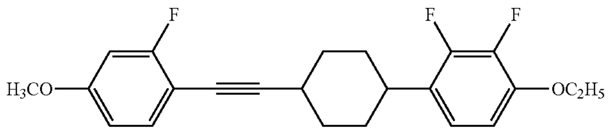 |
| 1368 | 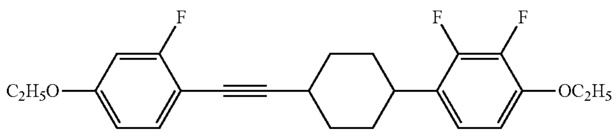 |
| 1369 | 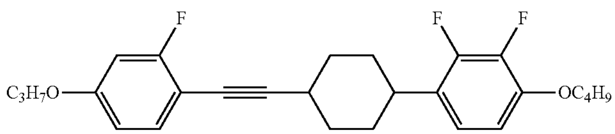 |
| 1370 | 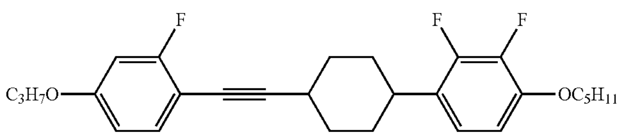 |
| 1371 | 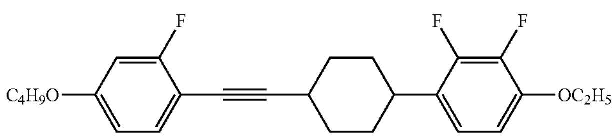 |
| 1372 | 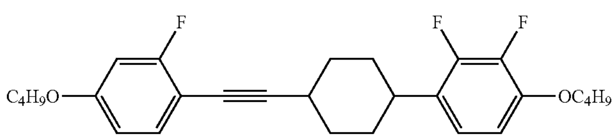 |
| 1373 | 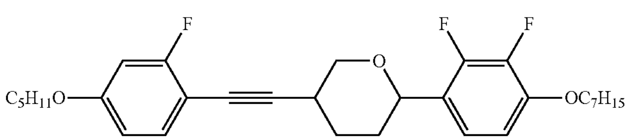 |
| 1374 | 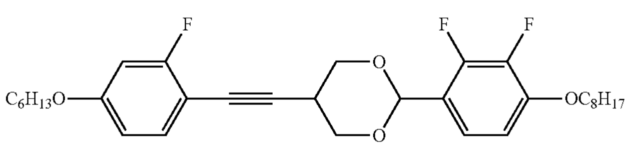 |
| 1375 | 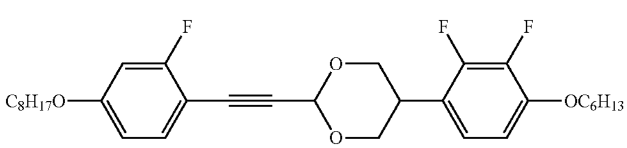 |

-continued
| No. | |
|---|---|
| 1376 | 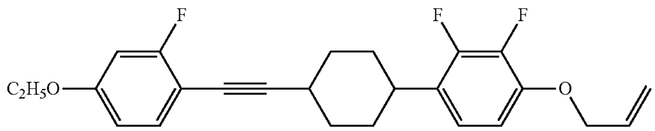 |
| 1377 | 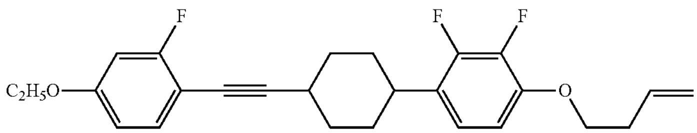 |
| 1378 | 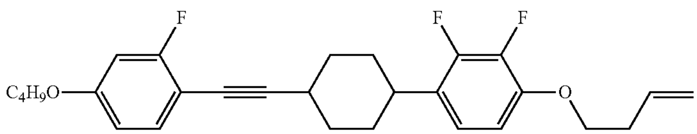 |
| 1379 | 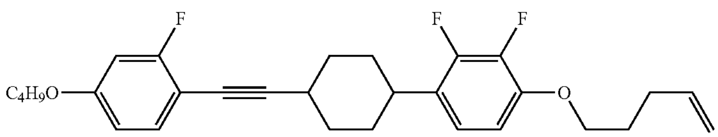 |
| 1380 | 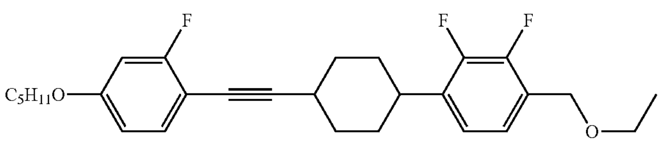 |
| 1381 | 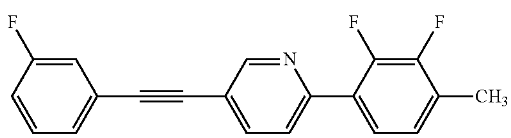 |
| 1382 | 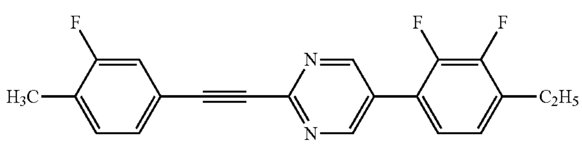 |
| 1383 | 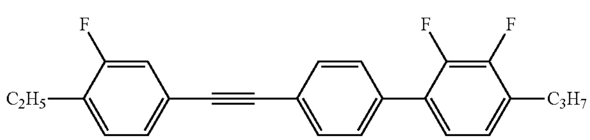 |
| 1384 | 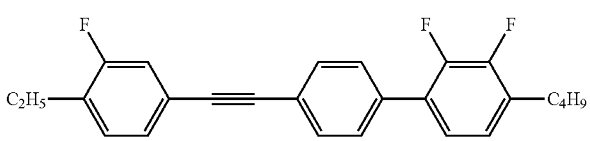 |
| 1385 | 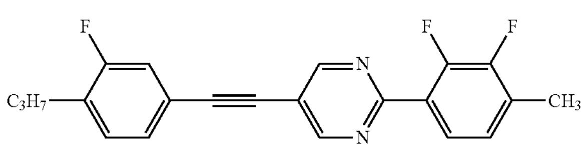 |
| 1386 | 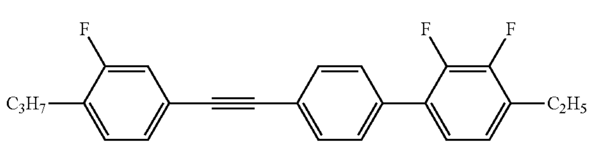 |

-continued
| No. | |
| --- | --- |
| 1387 | 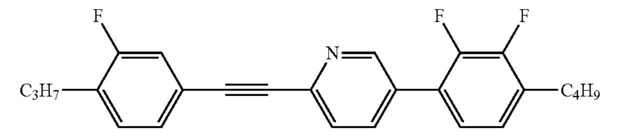 |
| 1388 | 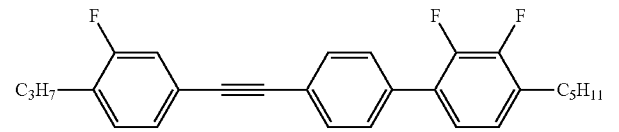 |
| 1389 | 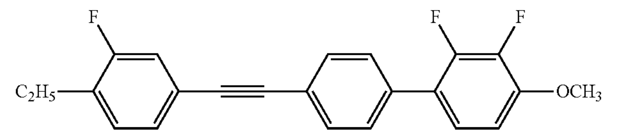 |
| 1390 | 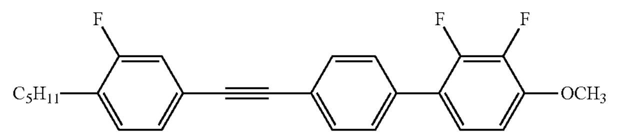 |
| 1391 | 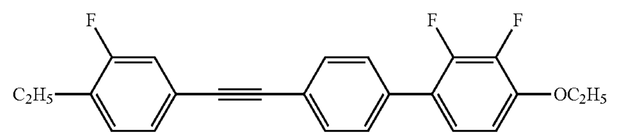 |
| 1392 | 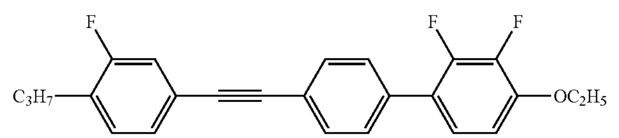 |
| 1393 | 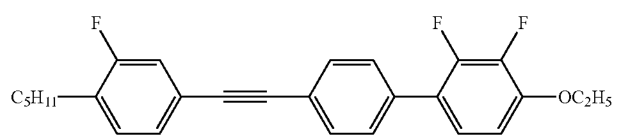 |
| 1394 | 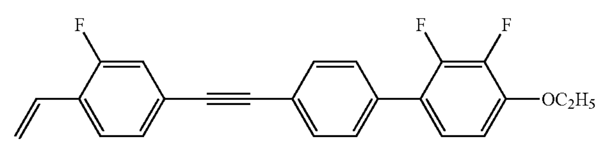 |
| 1395 | 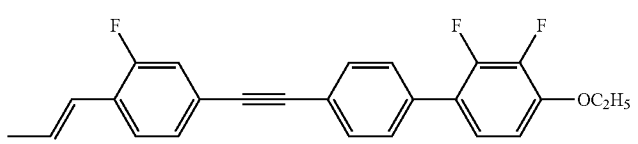 |
| 1396 | 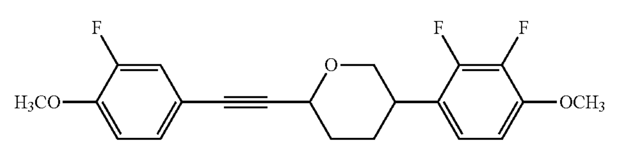 |
| 1397 | 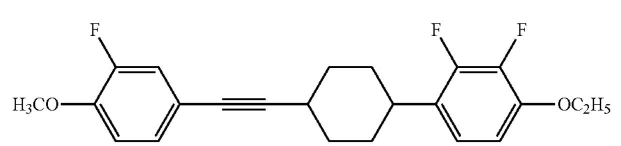 |

-continued
| No. | |
|---|---|
| 1398 | 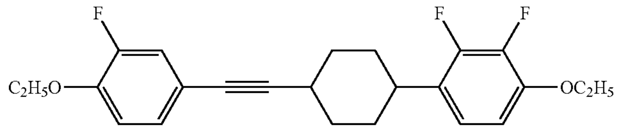 |
| 1399 | 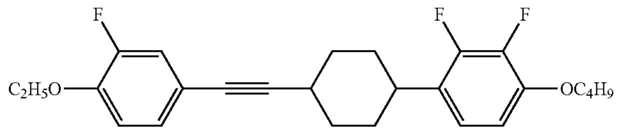 |
| 1400 | 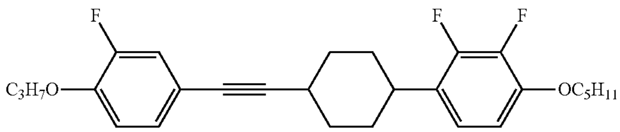 |
| 1401 | 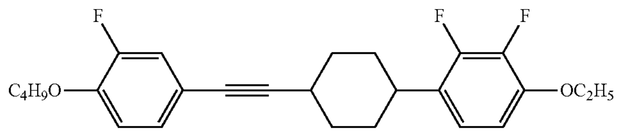 |
| 1402 | 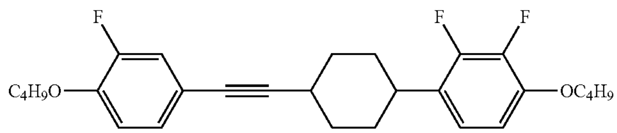 |
| 1403 | 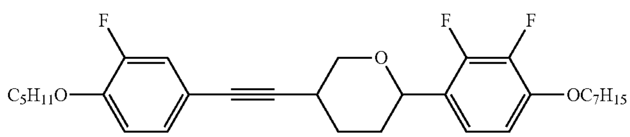 |
| 1404 | 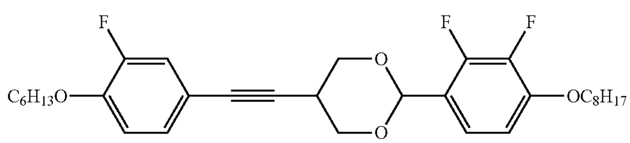 |
| 1405 | 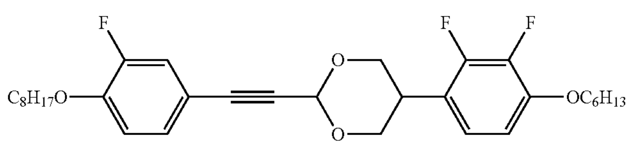 |
| 1406 | 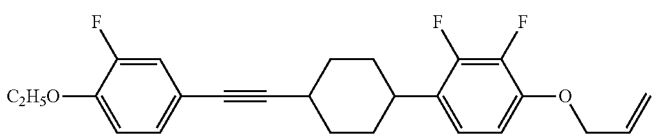 |
| 1407 | 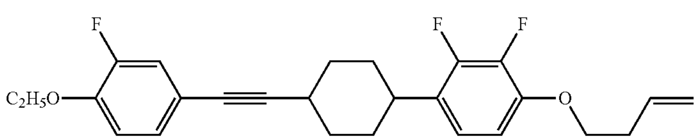 |
| 1408 | 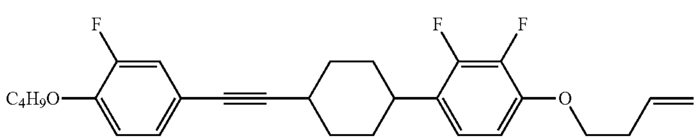 |

-continued

| No. | |
|---|---|
| 1409 | 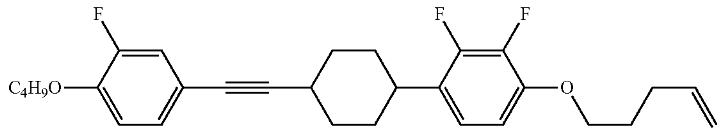 |
| 1410 | 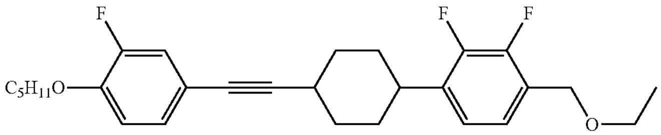 |

Comparative Example 1

As a comparative example, 4-ethoxy-4"-propyl-2,3,3"-trifluoro-1,1'-terphenyl (E), which was a compound similar to the compound C, was synthesized.

(E)

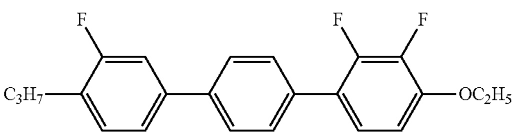

The chemical shift δ (ppm) in $^1$H-NMR analysis was described below, and the compound obtained was identified as 4-ethoxy-4"-propyl-2,3,3"-trifluoro-1,1'-terphenyl (E).

Chemical shift δ (ppm; $CDCl_3$); 7.63 (d, 2H), 7.58 (d, 2H), 7.34 (dd, 1H), 7.28 (dd, 1H), 7.26 (t, 1H), 6.82 (td, 2H), 4.17 (q, 2H), 2.66 (t, 2H), 1.68 (sex, 2H), 1.49 (t, 3H) and 0.99 (t, 3H).

The transition temperature of the compound (E) was as follows.

Transition temperature: C 131.3 N 132.4 I.

Five compounds referred to as the mother liquid crystals (i), which were described above, were mixed and the mother liquid crystals (i) having a nematic phase were prepared. The physical properties of the mother liquid crystals (i) were as follows.

Maximum temperature ($T_{NI}$)=74.6° C.; Viscosity ($\eta_{20}$)=18.9 mPa·s; Optical anisotropy (Δn)=0.087; Dielectric anisotropy ($\Delta\epsilon$=−1.3.

The liquid crystal composition (ii) consisting of 90% by weight of the mother liquid crystals (i) and 10% by weight of 4-ethoxy-4"-propyl-2,3,3"-trifluoro-1,1'-terphenyl (E) was prepared. Extrapolated values on the physical properties of the comparative example compound (E) were calculated on the basis of measurement on the physical properties of the liquid crystal composition (ii) obtained, and of the extrapolation of the measured values. The values were as follows.

Dielectric anisotropy ($\Delta\epsilon$=−5.38;

Viscosity (η)=77.8 mPa·s

Example 12

Physical Properties of the Compound (No. 528)

The liquid crystal composition (iii) consisting of 90% by weight of the mother liquid crystals (i) and 10% by weight of 2,3-difluoro-4-ethoxy-[trans-4-(2,3-difluoro-4-ethoxyphenylethenyl)cyclohexyl]benzene obtained in Example 3 (No. 528) was prepared. Extrapolated values on the physical properties of the compound (No. 528) were calculated on the basis of measurement on the physical properties of the liquid crystal composition (iii) obtained, and of the extrapolation of the measured values. The values were as follows.

Dielectric anisotropy ($\Delta\epsilon$)=−8.97;

Viscosity (η)=69.8 mPa·s

From these results, it was found that the liquid crystal compound (No. 528) had a low melting point, a large negative dielectric anisotropy ($\Delta\epsilon$) and a small viscosity.

Moreover, the compound (No. 528) was found to have a large negative dielectric anisotropy ($\Delta\epsilon$), a low melting point and a small viscosity as compared with those of the comparative example compound (E).

Comparative Example 2

As a Comparative Example, 4-ethoxy-4"-pentyl-2,2",3,3"-tetrafluoro-1,1'-terphenyl (F) was synthesized.

(F)

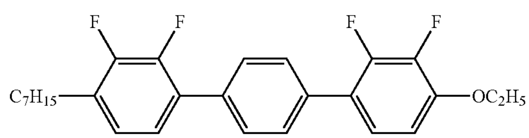

The chemical shift δ (ppm) in analysis was described below, and the compound obtained was identified as 4-ethoxy-4"-pentyl-2,2",3,3"-tetrafluoro-1,1'-terphenyl (F).

Chemical shift δ (ppm; $CDCl_3$); 7.60 (dd, 4H), 7.18-7.12 (m, 2H), 7.01 (td, 1H), 6.82 (td, 1H), 4.17 (q, 2H), 2.70 (t, 2H), 1.69-1.61 (m, 2H), 1.50 (t, 3H), 1.42-1.24 (m, 8H) and 0.89 (t, 3H).

The transition temperature of the compound (F) was as follows.

Transition temperature: C 124.3 N 132.4 I.

The liquid crystal composition (iv) consisting of 95% by weight of the mother liquid crystals (i) and 5% by weight of 4-ethoxy-4"-pentyl-2,2",3,3"-tetrafluoro-1,1'-terphenyl (F) synthesized was prepared. Extrapolated values on the physical properties of the comparative compound (F) were calculated on the basis of measurement on the physical properties of the liquid crystal composition (iv) obtained, and of the extrapolation of the measured values. The values were as follows.

Optical-anisotropy (Δn)=0.179;

Dielectric anisotropy ($\Delta\epsilon$)=−5.13;

The elastic constant $K_{33}$ of the liquid crystal composition (iv) was 14.70 pN.

Example 13

Physical Properties of the Compound (No. 678)

The liquid crystal composition (v) consisting of 95% by weight of the mother liquid crystals (i) and 5% by weight of 4-ethoxy-2,3-difluoro-4'-(4-ethoxy-2,3-difluorophenoxymethyl)-1,1'-biphenyl (No. 678) obtained in Example 6 was prepared. Extrapolated values on the physical properties of the compound (No. 678) were calculated on the basis of measurement on the physical property values of the liquid crystal composition (v) obtained, and of the extrapolation of the measured values. The values were as follows.

Optical anisotropy (Δn)=0.187;

Dielectric anisotropy (Δ∈)=−10.90;

The elastic constant $K_{33}$ of the liquid crystal composition (v) was 14.91 pN.

From these results, it was found that the liquid crystal compound (No. 678) had a low melting point, a large optical anisotropy (Δn) and a large negative dielectric anisotropy (Δ∈).

Moreover, the compound (No. 678) was found to have a low melting point, a large optical anisotropy (Δn), a large negative dielectric anisotropy (Δ∈) and a large elastic constant $K_{33}$ as compared with those of the comparative example compound (F).

[Examples of Compositions]

Hereinafter, the liquid crystal compositions obtained by means of the invention will be explained in detail on the basis of examples. Liquid crystal compounds used in the examples are expressed as symbols according to the notations in Table 1 below. In Table 1, 1,4-cyclohexylene has a trans-configuration. The ratio (percentage) of each compound means a weight percentage (% by weight) based on the total weight of the liquid crystal composition, unless otherwise indicated. Characteristics of the liquid crystal composition obtained are shown in the last part of each example.

A number described next to the name of a liquid crystal compound in each example corresponds to that of the formula of the liquid crystal compound used for the first to third components of the invention described above. When the symbol "–" is only given instead of the number of a formula, it means other compound which is different from the compounds of the components.

The notations using symbols for compounds are shown below.

TABLE

| Method of Description of Compound using Symbols R—(A$_1$)—Z$_1$— . . . —Z$_n$—(A$_n$) —R' | |
|---|---|
| 1) Left-terminal Group R— | Symbol |
| $C_nH_{2n+1}$— | n— |
| $C_nH_{2n+1}O$— | nO— |
| $C_mH_{2m+1}OC_nH_{2n}$— | mOn— |
| $CH_2$═CH— | V— |
| $C_nH_{2n+1}$—CH═CH— | nV— |
| $CH_2$═CH—$C_nH_{2n}$— | Vn— |
| $C_mH_{2m+1}$—CH═CH—$C_nH_{2n}$— | mVn— |
| $CF_2$═CH— | VFF— |
| $CF_2$═CH—$C_nH_{2n}$— | VFFn— |
| 2) Right-terminal Group —R' | Symbol |
| —$C_nH_{2n+1}$ | —n |
| —$OC_nH_{2n+1}$ | —On |
| —CH═$CH_2$ | —V |
| —CH═CH—$C_nH_{2n+1}$ | —Vn |
| —$C_nH_{2n}$—CH═$CH_2$ | —nV |
| —CH═$CF_2$ | —VFF |
| —$COOCH_3$ | —EMe |
| 3) Bonding Group —Z$_n$— | Symbol |
| —$C_nH_{2n}$— | n |
| —COO— | E |
| —CH═CH— | V |
| —$CH_2O$— | 1O |
| —$OCH_2$— | O1 |
| —$CF_2O$— | X |
| 4) Ring Structure —A$_n$— | Symbol |
| 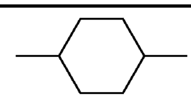 | H |
| 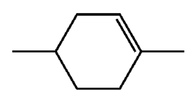 | Ch |
| 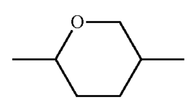 | Dh |
| 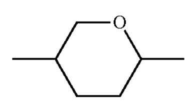 | dh |
| 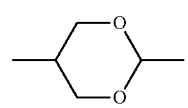 | G |
| 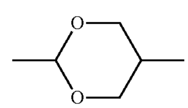 | g |
| 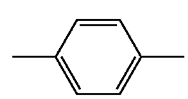 | B |
| 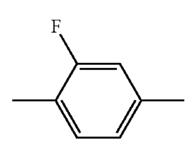 | B(2F) |
| 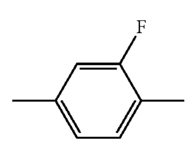 | B(3F) |
| 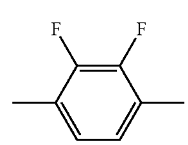 | B(2F,3F) |

TABLE-continued

| Method of Description of Compound using Symbols $R—(A_1)—Z_1— \ldots —Z_n—(A_n)—R'$ | |
|---|---|
| 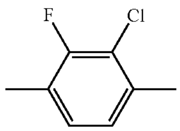 | B(2F,3Cl) |
| 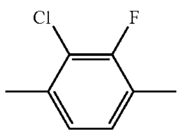 | B(2Cl,3F) |
| 5) Example of Description | |
| Example 1. 2O—B(2F,3F)2BB(2F,3F)—O2 | |
| 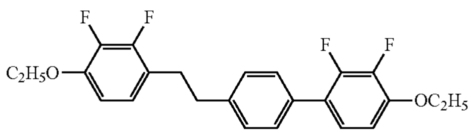 | |
| Example 2. 2O—B(2F,3F)O1HB(2F,3F)—O2 | |
| 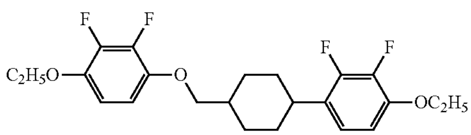 | |
| Example 3. 3-HHB-3 | |
| 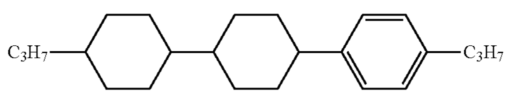 | |
| Example 4. 5-HBB(2F,3Cl)—O2 | |
| 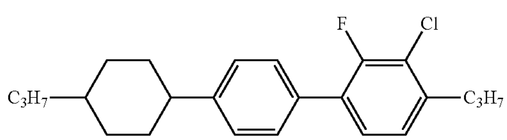 | |

Characteristics were measured according to the following methods. Most methods are described in the Standard of Electric Industries Association of Japan, EIAJ•ED-2521 A or those with some modifications.

(1) Maximum Temperature of Nematic Phase (NI; ° C.)

A sample was put on a hot plate in a melting point apparatus equipped with a polarizing microscope, and heated at the rate of 1° C. per minute. The temperature was measured when a part of the sample began to change from a nematic phase into an isotropic liquid. Hereinafter, the maximum temperature of a nematic phase may be abbreviated to "maximum temperature."

(2) Minimum Temperature of Nematic Phase (TC; ° C.)

The same samples having a nematic phase were kept in freezers at 0° C., −10° C., −20° C., −30° C. and −40° C. for ten days, and then liquid crystal phases were observed. For example, when the sample still remained in a nematic phase at −20° C., and changed to crystals (or a smectic phase) at −30° C., TC was expressed as ≦−20° C. Hereinafter, the minimum temperature of a nematic phase may be abbreviated to "minimum temperature."

(3) Optical anisotropy (Δn; measured at 25° C.)

The optical anisotropy was measured by use of an Abbe refractometer with a polarizing plate attached to the ocular, using light at a wavelength of 589 nm. The surface of the main prism was rubbed in one direction, and then a sample was dropped onto the main prism. A refractive index (n∥) when the direction of polarization was parallel to that of rubbing and a refractive index (n⊥) when the direction of polarization was perpendicular to that of rubbing were measured. The value (Δn) of optical anisotropy was calculated from the formula of Δn=n∥−n⊥.

(4) Viscosity (η; Measured at 20° C.; mPa·s)

An E type viscometer was used for measurement.

(5) Dielectric Anisotropy (Δ∈); measured at 25° C.)

An ethanol (20 mL) solution of octadecyltriethoxysilane (0.16 mL) was applied to well-washed glass substrates. The glass substrate was rotated with a spinner, and then heated at 150° C. for one hour. A VA device in which the distance (cell gap) was 20 μm was assembled from the two glass substrates.

A polyimide alignment film was prepared on glass substrates in a similar manner. After a rubbing-treatment to the alignment film obtained on the glass substrates, a TN device in which the distance between the two glass substrates was 9 μm and the twist angle was 80 degrees was assembled.

A sample (a liquid crystal composition, or a mixture of a liquid crystal compound and mother liquid crystals) was put in the VA device obtained, and applied with a voltage of 0.5 V (1 kHz, sine waves), and then a dielectric constant (∈∥) in a major axis direction of the liquid crystal molecules was measured.

The sample (the liquid crystal composition, or the mixture of the liquid crystal compound and the mother liquid crystals) was put in the TN device obtained, and applied with a voltage of 0.5 V (1 kHz, sine waves), and then the dielectric constant (∈⊥) in a minor axis direction of liquid crystal molecules was measured.

The value of dielectric anisotropy was calculated from the equation of Δ∈=−∥−∈⊥.

A composition in which this value is negative has negative dielectric anisotropy.

(6) Voltage Holding Ratio (VHR; Measured at 25° C. and 100° C.; %)

A sample was put in a cell having a polyimide alignment film in which the distance between two glass substrates (cell gap) was 6 μm, giving TN device. The TN device was charged at 25° C. by applying pulse voltage (60 microseconds at 5V). The waveforms of the voltage applied to the TN device were observed with a cathode ray oscilloscope and an area between a voltage curve and a horizontal axis in a unit period (16.7 milliseconds) was measured. An area was similarly measured based on the waveform of the applied voltage after the TN device had been removed. The value of the voltage holding ratio (%) was calculated from the equation: (voltage holding ratio)=(value of the area in the presence of a TN device)/(value of the area in the absence of TN device)×100.

The voltage holding ratio thus obtained was referred to as "VHR-1". Then, the TN device was heated at 100° C. for 250 hours. After the TN device had been allowed to come to 25° C., the voltage holding ratio was measured by a method similar to that described above. The voltage holding ratio obtained after the heating test was referred to as "VHR-2." The heating test means an acceleration test and was used as a test corresponding to a long-term durability test for the TN device.

Comparative Example 3

This composition was selected because the composition comprised the compound (C) which was described in patent document No. 3 and its homolog. The component and the characteristics of this composition were as follows.

| | |
|---|---|
| 5-B(2F)BB(2F,3F)-O8 (C) | 5% |
| 3-B(2F)BB(2F,3F)-O4 homolog of (C) | 5% |
| 5-HB-3 | 7% |
| 3-HB-O1 | 7% |
| 3-HB-O2 | 12% |
| 3-HHB-1 | 10% |
| 3-HHB-3 | 10% |
| 3-H2B(2F,3F)-O2 | 12% |
| 5-H2B(2F,3F)-O2 | 12% |
| 3-HBB(2F,3F)-O2 | 10% |
| 3-HHB(2F,3Cl)-O2 | 4% |
| 4-HHB(2F,3Cl)-O2 | 3% |
| 5-HHB(2F,3Cl)-O2 | 3% |

NI = 81.4° C.; Δn = 0.111; η = 26.8 mPa · s; Δϵ = −2.8.

Example 14

The composition of Example 14 was found to be quite excellent in view of the fact that it had a large negative dielectric anisotropy (Δ∈) and small viscosity (η), as compared with that of Comparative Example 3.

| | |
|---|---|
| 2O-B(2F,3F)2BB(2F,3F)-O2 (a-11) | 5% |
| 4O-B(2F,3F)2BB(2F,3F)-O2 (a-11) | 5% |
| 5-HB-3 | 7% |
| 3-HB-O1 | 7% |
| 3-HB-O2 | 12% |
| 3-HHB-1 | 10% |
| 3-HHB-3 | 10% |
| 3-H2B(2F,3F)-O2 | 12% |
| 5-H2B(2F,3F)-O2 | 12% |
| 3-HBB(2F,3F)-O2 | 10% |
| 3-HHB(2F,3Cl)-O2 | 4% |
| 4-HHB(2F,3Cl)-O2 | 3% |
| 5-HHB(2F,3Cl)-O2 | 3% |

NI = 79.5° C.; TC ≦ −20° C.; Δn = 0.107; η = 25.8 mPa · s; Δϵ = −3.2.

Example 15

| | |
|---|---|
| 2O-B(2F,3F)O1HB(2F,3F)-O2 (a-6) | 5% |
| 2O-B(2F,3F)O1BB(2F,3F)-O2 (a-11) | 5% |
| 3-HB-O2 | 14% |
| 5-HB-O2 | 15% |
| 3-HHB-1 | 10% |
| 3-HHB-3 | 10% |
| 3-HB(2F,3F)-O2 | 12% |
| 5-HB(2F,3F)-O2 | 12% |
| 3-HHB(2F,3F)-O2 | 8% |
| 5-HHB(2F,3F)-O2 | 9% |

NI = 82.3° C.; Δn = 0.099; η = 25.4 mPa · s; Δϵ = −3.3.

Example 16

| | |
|---|---|
| 4O-B(2F,3F)O1BB(3F)-O2 (a-9) | 4% |
| 4O-B(2F,3F)O1BB(2F)-O2 (a-10) | 4% |
| 4O-B(2F,3F)O1BB(2F,3F)-O2 (a-11) | 3% |
| 3-HB-O2 | 15% |
| 5-HB-O2 | 15% |
| 3-HHB-3 | 7% |
| 3-HHB-O1 | 3% |
| 3-HHEH-5 | 5% |
| 5-H2B(2F,3F)-O2 | 15% |
| 3-HB(2F,3Cl)-O2 | 5% |
| 2-HHB(2F,3F)-1 | 10% |
| 3-HHB(2F,3F)-O2 | 7% |
| 5-HHB(2F,3F)-O2 | 7% |

NI = 83.8° C.; Δn = 0.103; η = 25.6 mPa · s; Δϵ = −3.2.

Example 17

| | |
|---|---|
| 4O-B(2F,3F)O1HB(3F)-O2 (a-4) | 7% |
| 4O-B(2F,3F)O1HB(2F,3F)-O2 (a-6) | 5% |
| 2-H2H-3 | 6% |
| 3-HB-O1 | 16% |
| 3-HB-O2 | 10% |
| 3-HHB-O1 | 3% |
| 2-BB(3F)B-3 | 6% |
| 5-HBB(3F)B-2 | 5% |
| 3-HHEBH-3 | 4% |
| 3-HHEBH-5 | 3% |
| 3-H2B(2F,3F)-O2 | 20% |
| 3-HB(2Cl,3F)-O2 | 3% |
| 5-HH2B(2F,3F)-O2 | 5% |
| 3-HBB(2F,3F)-O2 | 7% |

NI = 82.2° C.; TC ≦ −20° C.; Δn = 0.111; η = 25.6 mPa · s; Δϵ = −3.1.

Example 18

| | |
|---|---|
| 2O-B(2F,3F)VHB(2F,3F)-O2 (a-6) | 3% |
| 4O-B(2F,3F)VHB(2F,3F)-O2 (a-6) | 3% |
| 4O-B(2F,3F)VHB(2F,3F)-O4 (a-6) | 5% |
| 3-HH-4 | 5% |
| 3-HB-O2 | 15% |
| 5-HB-O2 | 15% |
| 3-HHB-1 | 5% |
| 3-HHB-3 | 7% |
| 2-BB(3F)B-5 | 5% |
| V-HB(2F,3F)-O2 | 15% |
| V-HHB(2F,3F)-O2 | 10% |
| 2-HBB(2F,3F)-O2 | 7% |
| 3-HBB(2F,3Cl)-O2 | 5% |

NI = 83.2° C.; Δn = 0.113; η = 25.6 mPa · s; Δϵ = −3.1.

Example 19

| | |
|---|---|
| 2O-B(2F,3F)2HB(2F,3F)-O2 (a-6) | 4% |
| 4O-B(2F,3F)O1HB(2F,3F)-O2 (a-6) | 8% |
| 2-H2H-3 | 5% |
| 3-HB-O1 | 12% |
| 3-HB-O2 | 3% |
| 3-HHB-1 | 7% |
| 3-HHB-3 | 7% |
| 3-HBB-2 | 5% |
| 2-BBB(2F)-5 | 5% |
| 3-HHEBH-3 | 5% |
| 3-H2B(2F,3F)-O2 | 14% |
| 5-H2B(2F,3F)-O2 | 14% |
| 3-HBB(2F,3F)-O2 | 5% |

-continued

| | |
|---|---|
| 2-BB(2F,3F)B-3 | 3% |
| 3-HBB(2Cl,3F)-O2 | 3% |

NI = 81.9° C.; Δn = 0.110; η = 25.7 mPa · s; Δε = −3.1.

Example 20

| | |
|---|---|
| 4O-B(2F,3F)O1HB(3F)-O2 (a-4) | 7% |
| 4O-B(2F,3F)O1HB(2F)-O2 (a-5) | 7% |
| 3-HB-O1 | 11% |
| 5-HB-O2 | 20% |
| 3-HHB-1 | 3% |
| 3-HBBH-5 | 5% |
| 1O1-HBBH-4 | 5% |
| 3-H2B(2F,3F)-O2 | 15% |
| 5-H2B(2F,3F)-O2 | 15% |
| 5-HHB(2F,3F)-O2 | 12% |

NI = 81.9° C.; TC ≦ −20° C.; Δn = 0.101; η = 25.8 mPa · s; Δε = −3.3.

Example 21

| | |
|---|---|
| 4O-B(2F,3F)1ODhB(2F,3F)-O2 (a-1) | 7% |
| 4O-B(2F,3F)O1DhB(2F,3F)-O2 (a-1) | 7% |
| 3-HH-5 | 5% |
| 3-HB-O1 | 17% |
| 3-HB-O2 | 10% |
| 3-HHB-1 | 10% |
| 3-HHB-3 | 10% |
| 5-H2B(2F,3F)-O2 | 16% |
| 3-HH2B(2F,3F)-O2 | 9% |
| 5-HH2B(2F,3F)-O2 | 9% |

NI = 81.8° C.; Δn = 0.091; η = 25.6 mPa · s; Δε = −3.1.

Example 22

| | |
|---|---|
| 2O-B(2F,3F)2HB(2F,3F)-O2 (a-6) | 5% |
| 2O-B(2F,3F)2BB(2F,3F)-O2 (a-11) | 5% |
| 3-HB-O2 | 15% |
| 5-HB-O2 | 15% |
| 3-HHB-3 | 10% |
| 3-HHEBH-3 | 5% |
| 3-HHEBH-5 | 3% |
| 3-H2B(2F,3F)-O2 | 15% |
| 5-H2B(2F,3F)-O2 | 15% |
| 3-HBB(2F,3F)-O2 | 6% |
| 5-HBB(2F,3Cl)-O2 | 6% |

NI = 82.0° C.; TC ≦ −20° C.; Δn = 0.106; η = 25.4 mPa · s; Δε = −3.4.

Example 23

| | |
|---|---|
| 2O-B(2F,3F)O1HB(2F,3F)-O2 (a-6) | 5% |
| 2O-B(2F,3F)2BB(2F,3F)-O2 (a-11) | 5% |
| 2O-B(2F,3F)O1BB(2F,3F)-O2 (a-11) | 3% |
| 5-HB-3 | 10% |
| 3-HB-O1 | 13% |
| 3-HHB-1 | 10% |
| 3-HHB-3 | 7% |

-continued

| | |
|---|---|
| 2-BB(3F)B-3 | 5% |
| 3-H2B(2F,3F)-O2 | 10% |
| 5-H2B(2F,3F)-O2 | 10% |
| 3-HHB(2F,3F)-O2 | 10% |
| 3-HH2B(2F,3F)-O2 | 12% |

NI = 83.1° C.; Δn = 0.107; η = 25.5 mPa · s; Δε = −3.3.

A pitch measured when 0.25 part of the optically active compound (Op-5) was added to 100 parts of compositions described just above was 61.2 μm.

INDUSTRIAL APPLICABILITY

The liquid crystal compound of the invention is new and has stability to heat, light and so forth, a wide temperature range of a nematic phase, a small viscosity, a large optical anisotropy and a suitable elastic constant $K_{33}$, and further has a suitable and negative dielectric anisotropy and an excellent compatibility with other liquid crystal compounds. When the compound is used as a composition for a liquid crystal display device, the device can be widely used for the display of a clock, a calculator, a word processor or the like, because of a short response time, a small power consumption, a small driving voltage, a large contrast and wide temperature range in which the device can be used.

What is claimed is:

1. A liquid crystal compound represented by formula (a-1):

(a-1)

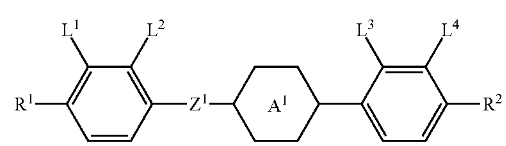

wherein $R^1$ and $R^2$ are each independently hydrogen, alkyl having 1 to 10 carbons, alkenyl having 2 to 10 carbons, alkoxy having 1 to 9 carbons, alkoxyalkyl having 2 to 9 carbons or alkenyloxy having 2 to 9 carbons;

ring $A^1$ is trans-1,4-cyclohexylene, 1,4-cyclohexenylene, 1,4-phenylene, tetrahydropyran-2,5-diyl, 1,3-dioxane-2,5-diyl, pyrimidine-2,5-diyl or pyridine-2,5-diyl;

$L^1$, $L^2$, $L^3$ and $L^4$ are each independently hydrogen or fluorine, and at least three of them are fluorine; and $Z^1$ is a single bond, —$(CH_2)_2$—, —CH═CH—, —C≡C—, —$CH_2O$— or —$OCH_2$— when ring $A^1$ is trans-1,4-cyclohexylene, 1,4-cyclohexenylene, tetrahydropyran-2,5-diyl, 1,3-dioxane-2,5-diyl, pyrimidine-2,5-diyl or pyridine-2,5-diyl, and $Z^1$ is —$(CH_2)_2$—, —CH═CH—, —C≡C—, —$CH_2O$— or —$OCH_2$- when ring $A^1$ is 1,4-phenylene.

2. The compound according to claim 1, wherein in formula (a-1), $R^1$ and $R^2$ are each independently alkyl having 1 to 10 carbons, alkenyl having 2 to 10 carbons, alkoxy having 1 to 9 carbons, alkoxyalkyl having 2 to 9 carbons or alkenyloxy having 2 to 9 carbons;

ring $A^1$ is 1,4-phenylene; and $Z^1$ is —$(CH_2)_2$—, —CH═CH—, —C≡C—, —$CH_2O$— or —$OCH_2$—.

3. The compound according to claim 1, wherein in formula (a-1), $R^1$ and $R^2$ are each independently alkyl having 1 to 10 carbons, alkenyl having 2 to 10 carbons, alkoxy having 1 to 9 carbons, alkoxyalkyl having 2 to 9 carbons or alkenyloxy having 2 to 9 carbons; and ring $A^1$ is trans-1,4-cyclohexylene.

4. The compound according to claim 1, wherein the compound is represented by formula (a-2) or (a-3):

(a-2)

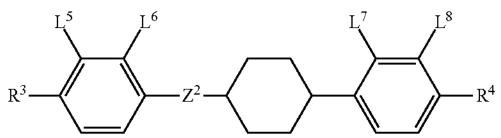

(a-3)

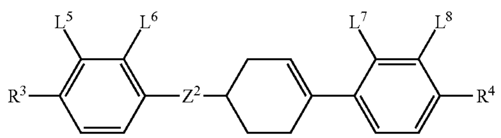

wherein, $R^3$ and $R^4$ are each independently alkyl having 1 to 10 carbons, alkenyl having 2 to 10 carbons, alkoxy having 1 to 9 carbons, alkoxyalkyl having 2 to 9 carbons or alkenyloxy having 2 to 9 carbons;

$L^5$, $L^6$, $L^7$ and $L^8$ are each independently hydrogen or fluorine, and at least three of them are fluorine; and $Z^2$ is a single bond, —$(CH_2)_2$—, —CH═CH—, —$CH_2O$— or —$OCH_2$—.

5. The compound according to claim 1, wherein the compound is represented by any one of formulas (a-4) to (a-13):

(a-4)

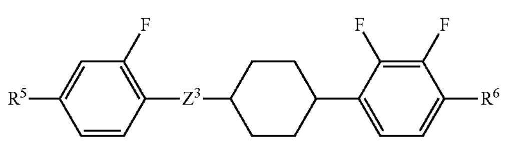

(a-5)

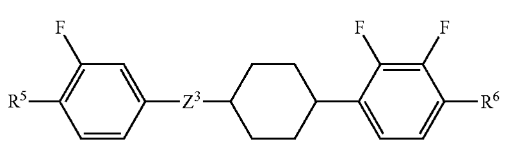

(a-6)

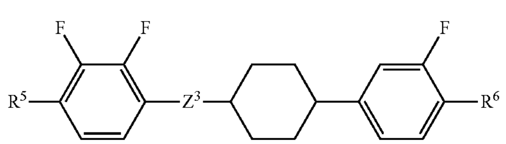

(a-7)

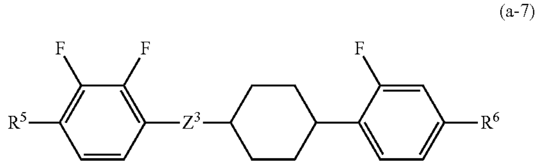

-continued (a-8)

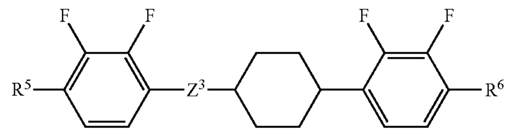

(a-9)

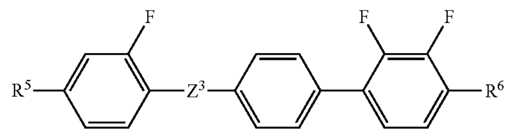

(a-10)

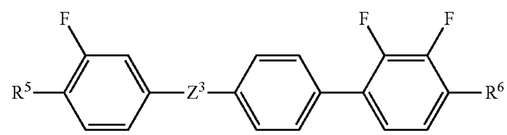

(a-11)

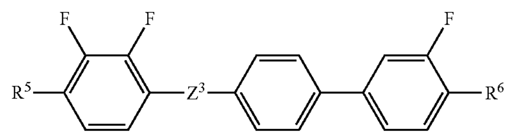

(a-12)

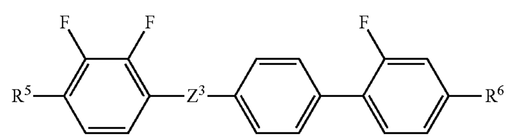

(a-13)

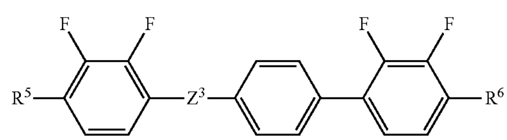

wherein $R^5$ and $R^6$ are each independently alkyl having 1 to 10 carbons, alkenyl having 2 to 10 carbons, alkoxy having 1 to 9 carbons, alkoxyalkyl having 2 to 9 carbons or alkenyloxy having 2 to 9 carbons; and $Z^3$ is —$(CH_2)_2$—, —CH═CH—, —$CH_2O$— or —$OCH_2$—.

6. The compound according to claim 5, wherein in formulas (a-4) to (a-13), $Z^3$ is —$OCH_2$—.

7. The compound according to claim 5, wherein in formulas (a-4) to (a-13), $Z^3$ is —$(CH_2)_2$—.

8. A liquid crystal composition which has negative dielectric anisotropy, comprising a first component consisting of at least one compound selected from the group of compounds represented by formula (a-1), (a-2) or (a-3), and a second component consisting of at least one compound selected from the group of compounds represented by formulas (e-1) to (e-3):

(a-1)

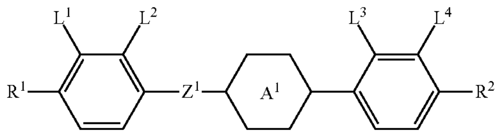

wherein $R^1$ and $R^2$ are each independently hydrogen, alkyl having 1 to 10 carbons, alkenyl having 2 to 10 carbons, alkoxy having 1 to 9 carbons, alkoxyalkyl having 2 to 9 carbons or alkenyloxy having 2 to 9 carbons;

ring $A^1$ is trans-1,4-cyclohexylene, 1,4-cyclohexenylene, 1,4-phenylene, tetrahydropyran-2,5-diyl, 1,3-dioxane-2,5-diyl, pyrimidine-2,5-diyl or pyridine-2,5-diyl;

$L^1$, $L^2$, $L^3$ and $L^4$ are each independently hydrogen or fluorine, and at least three of them are fluorine; and $Z^1$ is a single bond, —$(CH_2)_2$—, —CH═CH—, —C≡C—, —$CH_2O$— or —$OCH_2$— when ring $A^1$ is trans-1,4-cyclohexylene, 1,4-cyclohexenylene, tetrahydropyran-2,5-diyl, 1,3-dioxane-2,5-diyl, pyrimidine-2,5-diyl or pyridine-2,5-diyl, and $Z^1$ is —$(CH_2)_2$—, —CH═CH—, —C≡C—, —$CH_2O$— or —$OCH_2$— when ring $A^1$ is 1,4-phenylene, (a-2)

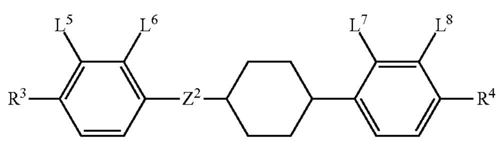

(a-3)

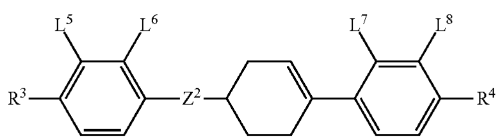

wherein, $R^3$ and $R^4$ are each independently alkyl having 1 to 10 carbons, alkenyl having 2 to 10 carbons, alkoxy having 1 to 9 carbons, alkoxyalkyl having 2 to 9 carbons or alkenyloxy having 2 to 9 carbons;

$L^5$, $L^6$, $L^7$ and $L^8$ are each independently hydrogen or fluorine, and at least three of them are fluorine; and $Z^2$ is a single bond, —$(CH_2)_2$—, —CH═CH—, —$CH_2O$— or —$OCH_2$—, (e-1)

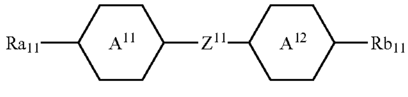

(e-2)

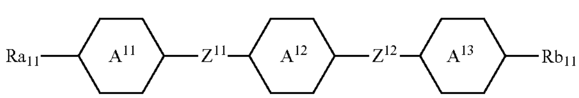

(e-3)

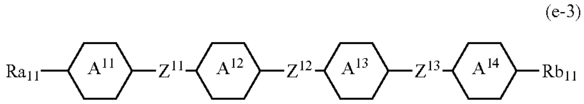

wherein $Ra_{11}$ and $Rb_{11}$ are each independently alkyl having 1 to 10 carbons, and in the alkyl, arbitrary —$CH_2$— may be nonadjacently replaced by —O—, and arbitrary —$(CH_2)_2$— may be nonadjacently replaced by —CH═CH—, and arbitrary hydrogen may be replaced by fluorine;

ring $A^{11}$, ring $A^{12}$, ring $A^{13}$ and ring $A^{14}$ are each independently trans-1,4-cyclohexylene, 1,4-phenylene, 2-fluoro-1,4-phenylene, 3-fluoro-1,4-phenylene, pyrimidine-2,5-diyl, 1,3-dioxane-2,5-diyl or tetrahydropyran-2,5-diyl; and $Z^{11}$, $Z^{12}$ and $Z^{13}$ are each independently a single bond, —$CH_2$—$CH_2$—, —CH═CH—, —C≡C—, —COO— or —$CH_2O$—.

9. A liquid crystal composition which has negative dielectric anisotropy, comprising a first component consisting of at least one compound selected from the group of compounds represented by formulas (a-4) to (a-13), and a second component consisting of at least one compound selected from the group of compounds represented by formulas (e-1) to (e-3):

(a-4)

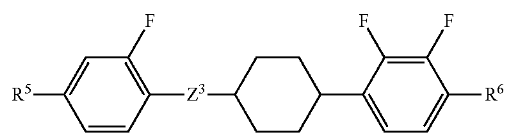

(a-5)

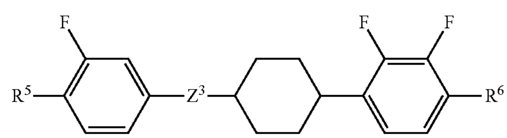

(a-6)

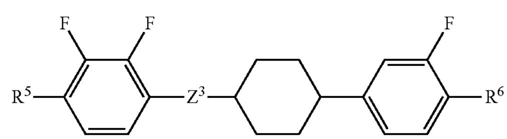

(a-7)

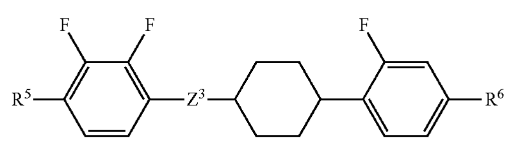

(a-8)

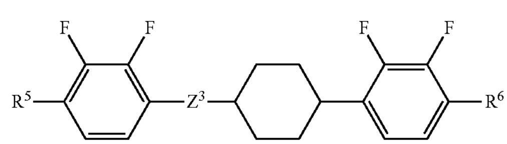

(a-9)

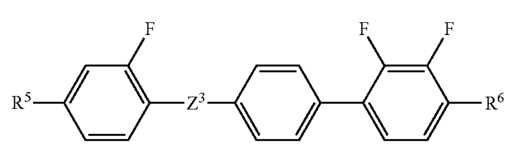

-continued (a-10)

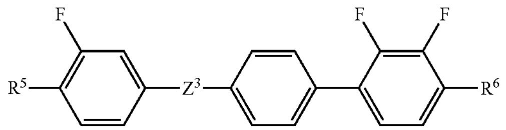

(a-11)

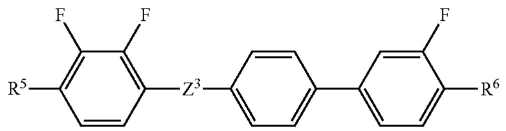

(a-12)

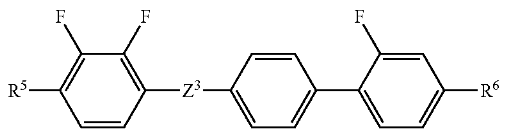

(a-13)

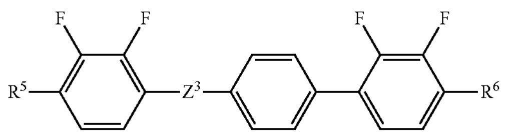

wherein $R^5$ and $R^6$ are each independently alkyl having 1 to 10 carbons, alkenyl having 2 to 10 carbons, alkoxy having 1 to 9 carbons, alkoxyalkyl having 2 to 9 carbons or alkenyloxy having 2 to 9 carbons; and $Z^3$ is —$(CH_2)_2$—, —CH═CH—, —$CH_2O$— or —$OCH_2$—, (e-1)

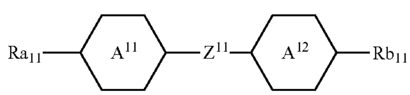

-continued (e-2)

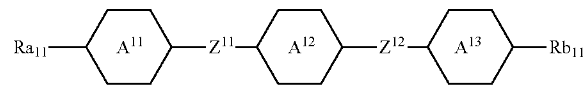

(e-3)

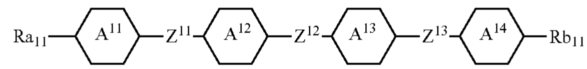

wherein $Ra_{11}$ and $Rb_{11}$ are each independently alkyl having 1 to 10 carbons, and in the alkyl, arbitrary —$CH_2$— may be nonadjacently replaced by —O—, and arbitrary —$(CH_2)_2$— may be nonadjacently replaced by —CH═CH—, and arbitrary hydrogen may be replaced by fluorine;

ring $A^{11}$, ring $A^{12}$, ring $A^{13}$ and ring $A^{14}$ are each independently trans-1,4-cyclohexylene, 1,4-phenylene, 2-fluoro-1,4-phenylene, 3-fluoro-1,4-phenylene, pyrimidine-2,5-diyl, 1,3-dioxane-2,5-diyl or tetrahydropyran-2,5-diyl; and $Z^{11}$, $Z^{12}$ and $Z^{13}$ are each independently a single bond, —$CH_2$—$CH_2$—, —CH═CH—, —C≡C—, —COO— or —$CH_2O$—.

10. The liquid crystal composition according to claim 8, wherein the content ratio of the first component is in the range of 5% to 60% by weight and the content ratio of the second component is in the range of 40% to 95% by weight, based on the total weight of the liquid crystal composition.

11. The liquid crystal composition according to claim 8, further comprising a third component consisting of at least one compound selected from the group of compounds represented by formulas (g-1) to (g-6), in addition to the first and second components:

(g-1)

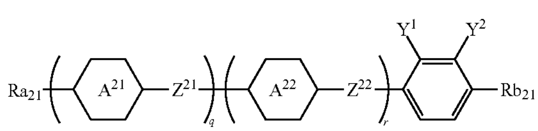

(g-2)

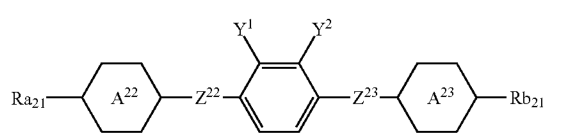

(g-3)

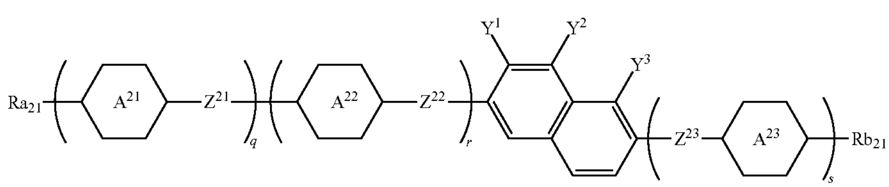

(g-4)

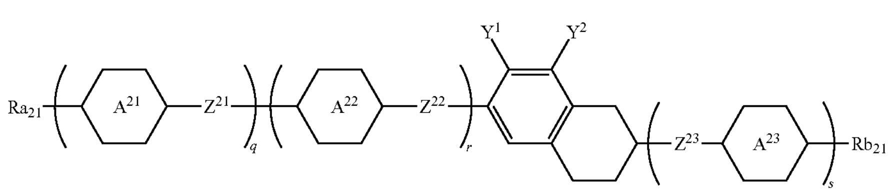

-continued (g-5)

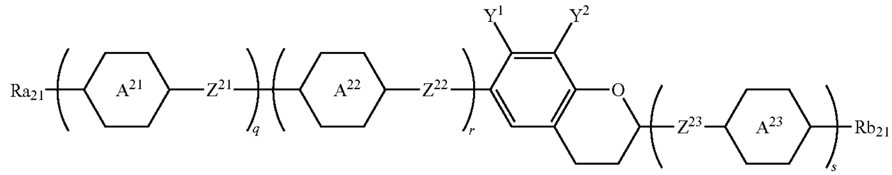

(g-6)

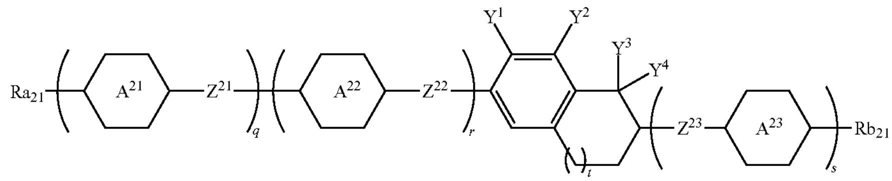

wherein $Ra_{21}$ and $Rb_{21}$ are each independently hydrogen or alkyl having 1 to 10 carbons, and in the alkyl, arbitrary —$CH_2$— may be nonadjacently replaced by —O—, and arbitrary —$(CH_2)_2$— may be nonadjacently replaced by —CH═CH—, and arbitrary hydrogen may be replaced by fluorine;

ring $A^{21}$, ring $A^{22}$ and ring $A^{23}$ are each independently trans-1,4-cyclohexylene, 1,4-phenylene, 2-fluoro-1,4-phenylene, 3-fluoro-1,4-phenylene, 2,3-difluoro-1,4-phenylene, pyrimidine-2,5-diyl, 1,3-dioxane-2,5-diyl or tetrahydropyran-2,5-diyl;

$Z^{21}$, $Z^{22}$ an $Z^{23}$ are each independently a single bond, —$CH_2$—$CH_2$—, —CH═CH—, —C≡C—, —$OCF_2$—, —$CF_2O$—, —$OCF_2CH_2CH_2$—, —$CH_2CH_2CF_2O$—, —COO—, —OCO—, —$OCH_2$— or —$CH_2O$—;

$Y^1Y^2$, $Y^3$ and $Y^4$ are each independently fluorine or chlorine;

q, r and s are each independently 0, 1 or 2, q+r is 1 or 2, and q+r+s is 1, 2 or 3; and t is 0, 1 or 2.

12. The liquid crystal composition according to claim 11, wherein the third component is at least one compound selected from the group of compounds represented by formulas (h-1) to (h-7):

(h-1)

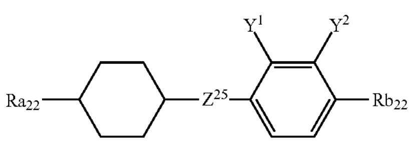

(h-2)

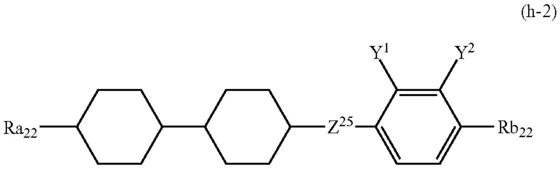

(h-3)

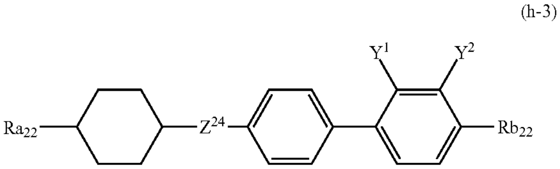

-continued (h-4)

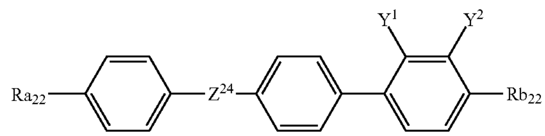

(h-5)

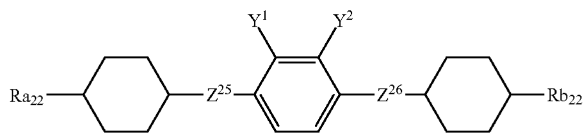

(h-6)

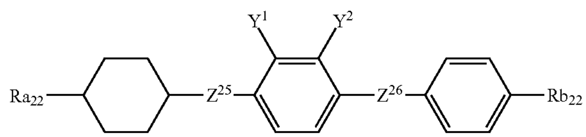

(h-7)

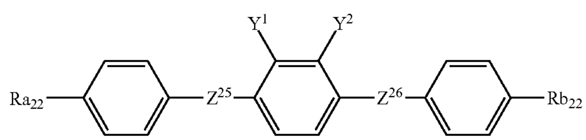

wherein $Ra_{22}$ and $Rb_{22}$ are each independently straight-chain alkyl having 1 to 8 carbons, straight-chain alkenyl having 2 to 8 carbons or straight-chain alkoxy having 1 to 7 carbons;

$Z^{24}$, $Z^{25}$ and $Z^{26}$ are each independently a single bond, —$CH_2CH_2$—, —$CH_2O$— or —$OCH_2$—; and $Y^1$ and $Y^2$ are simultaneously fluorine, or one of $Y^1$ and $Y^2$ is fluorine and the other is chlorine.

13. A liquid crystal composition which has negative dielectric anisotropy, comprising a first component consisting of at least one compound selected from the compounds represented by formulas (a-4) to (a-13), a second component consisting of at least one compound selected from the group of compounds represented by formulas (e-1) to (e-3), and a third component consisting of at least one compound selected from the group of compounds represented by formulas (h-1) to (h-7):

(a-4)

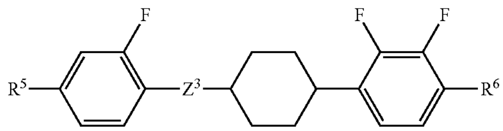

(a-5)

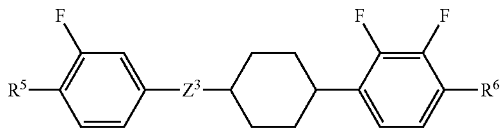

(a-6)

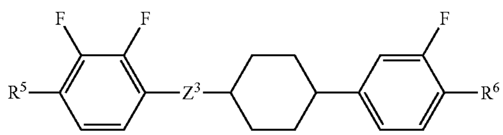

(a-7)

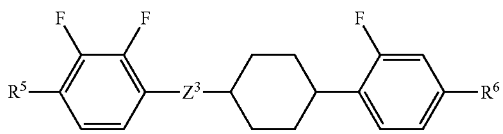

(a-8)

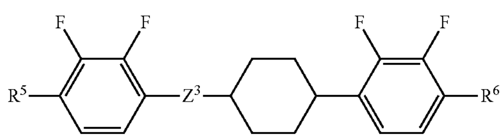

(a-9)

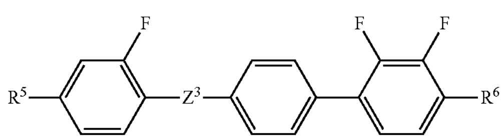

(a-10)

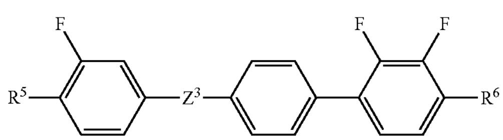

(a-11)

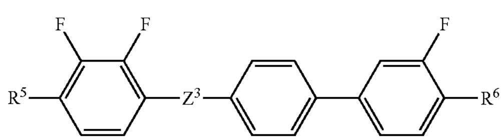

(a-12)

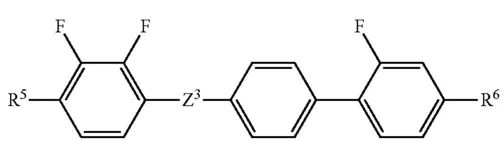

(a-13)

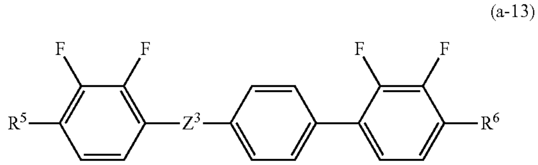

wherein $R^5$ and $R^6$ are each independently alkyl having 1 to 10 carbons, alkenyl having 2 to 10 carbons, alkoxy having 1 to 9 carbons, alkoxyalkyl having 2 to 9 carbons or alkenyloxy having 2 to 9 carbons; and $Z^3$ is —$(CH_2)_2$—, —CH═CH—, —$CH_2O$— or —$OCH_2$, (e-1)

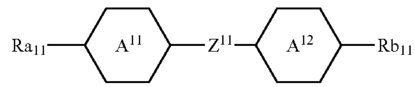

(e-2)

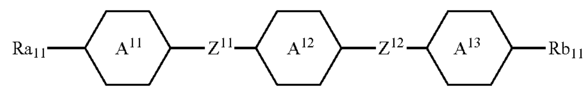

(e-3)

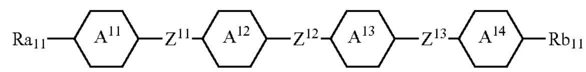

wherein $Ra_{11}$ and $Rb_{11}$ are each independently alkyl having 1 to 10 carbons, and in the alkyl, arbitrary —$CH_2$— may be nonadjacently replaced by —O—, and arbitrary —$(CH_2)_2$— may be nonadjacently replaced by —CH═CH—, and arbitrary hydrogen may be replaced by fluorine;

ring $A^{11}$, ring $A^{12}$, ring $A^{13}$ and ring $A^{14}$ are each independently trans-1,4-cyclohexylene, 1,4-phenylene, 2-fluoro-1,4-phenylene, 3-fluoro-1,4-phenylene, pyrimidine-2,5-diyl, 1,3-dioxane-2,5-diyl or tetrahydropyran-2,5-diyl; and $Z^{11}$, $Z^{12}$ and $Z^{13}$ are each independently a single bond, —$CH_2$—$CH_2$—, —CH═CH—, —C≡C—, —COO— or —$CH_2O$—, (h-1)

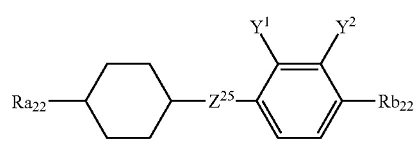

(h-2)

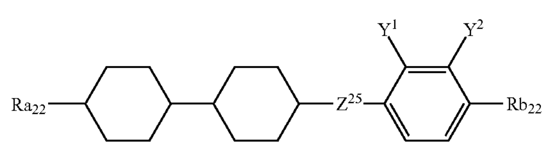

(h-3)

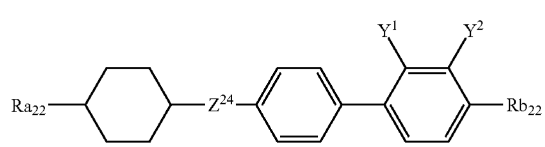

(h-4)

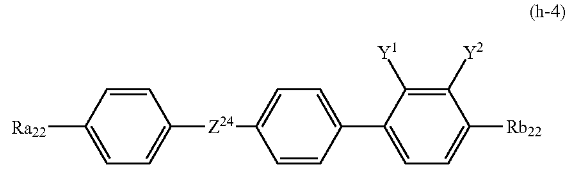

-continued (h-5)

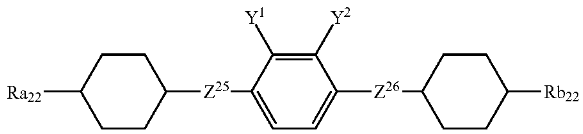

(h-6)

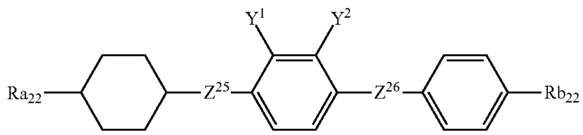

(h-7)

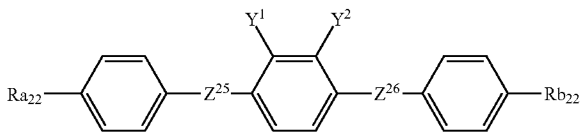

wherein $Ra_{22}$ and $Rb_{22}$ are each independently straight-chain alkyl having 1 to 8 carbons, straight-chain alkenyl having 2 to 8 carbons or straight-chain alkoxy having 1 to 7 carbons;

$Z^{24}$, $Z^{25}$ and $Z^{26}$ are each independently a single bond, —$CH_2CH_2$— —$CH_2O$— or —$OCH_2$—; and $Y^1$ and $Y^2$ are simultaneously fluorine, or one of $Y^1$ and $Y^2$ is fluorine and the other is chlorine.

14. The liquid crystal composition according to claim 13, wherein the content ratio of the first component is in the range of 5% to 60% by weight, the content ratio of the second component is in the range of 20% to 75% by weight, and the content ratio of the third component is in the range of 20% to 75% by weight, based on the total weight of the liquid crystal composition.

15. A liquid crystal display device comprising the liquid crystal composition according to claim 8.

16. The liquid crystal display device according to claim 15, wherein the operating mode thereof is a VA mode or an IPS mode, and the driving mode thereof is an active matrix mode.

* * * * *